US012528791B2

(12) United States Patent
Kirschberg et al.

(10) Patent No.: US 12,528,791 B2
(45) Date of Patent: Jan. 20, 2026

(54) THYROID HORMONE RECEPTOR BETA AGONIST COMPOUNDS

(71) Applicant: Terns Pharmaceuticals, Inc., Foster City, CA (US)

(72) Inventors: Thorsten A. Kirschberg, Foster City, CA (US); Randall Halcomb, Foster City, CA (US); Yingzi Xu, Palo Alto, CA (US); F. Anthony Romero, Redwood City, CA (US)

(73) Assignee: Terns Pharmaceuticals, Inc., Foster City, CA (US)

( * ) Notice: Subject to any disclaimer, the term of this patent is extended or adjusted under 35 U.S.C. 154(b) by 987 days.

(21) Appl. No.: 17/637,426

(22) PCT Filed: Aug. 21, 2020

(86) PCT No.: PCT/US2020/047467
§ 371 (c)(1),
(2) Date: Feb. 22, 2022

(87) PCT Pub. No.: WO2021/041237
PCT Pub. Date: Mar. 4, 2021

(65) Prior Publication Data
US 2022/0281849 A1 Sep. 8, 2022

Related U.S. Application Data

(60) Provisional application No. 62/967,943, filed on Jan. 30, 2020, provisional application No. 62/891,078, filed on Aug. 23, 2019.

(51) Int. Cl.
*C07D 403/12* (2006.01)
*C07D 401/12* (2006.01)
*C07D 413/12* (2006.01)
*C07D 471/04* (2006.01)
*C07D 498/04* (2006.01)

(52) U.S. Cl.
CPC ......... *C07D 403/12* (2013.01); *C07D 401/12* (2013.01); *C07D 413/12* (2013.01); *C07D 471/04* (2013.01); *C07D 498/04* (2013.01)

(58) Field of Classification Search
CPC .. C07D 403/12; C07D 401/12; C07D 413/12; C07D 471/04; C07D 498/04
See application file for complete search history.

(56) References Cited

U.S. PATENT DOCUMENTS

| 4,197,307 | A  | 4/1980  | Gallay et al. |
| 5,114,938 | A  | 5/1992  | Lindner et al. |
| 6,787,652 | B1 | 9/2004  | Dow et al. |
| 7,807,674 | B2 | 10/2010 | Haynes et al. |
| 8,153,624 | B2 | 4/2012  | Genin et al. |
| 8,785,408 | B2 | 7/2014  | Feinstein et al. |
| 8,791,266 | B2 | 7/2014  | Kawata et al. |
| 10,800,767 | B2 | 10/2020 | Kirschberg et al. |
| 11,034,676 | B2 | 6/2021  | Yu et al. |
| 11,084,802 | B2 | 8/2021  | Yu et al. |
| 11,168,079 | B2 | 11/2021 | Carpenter et al. |
| 11,203,587 | B2 | 12/2021 | Kirschberg et al. |
| 11,964,964 | B2 | 4/2024  | Jin et al. |
| 12,338,232 | B2 | 6/2025  | Yu et al. |
| 12,365,669 | B2 | 7/2025  | Yu et al. |
| 2003/0078288 | A1 | 4/2003  | Haning et al. |
| 2004/0157844 | A1 | 8/2004  | Dow et al. |
| 2005/0085541 | A1 | 4/2005  | Shiohara et al. |
| 2008/0167313 | A1 | 7/2008  | Dupont-Passelaigue et al. |
| 2009/0005383 | A1 | 1/2009  | Haynes et al. |
| 2009/0247539 | A1 | 10/2009 | Bell et al. |
| 2010/0004271 | A1 | 1/2010  | Garcia Collazo et al. |
| 2010/0152166 | A1 | 6/2010  | Genin et al. |
| 2010/0286182 | A1 | 11/2010 | Samuels et al. |
| 2011/0118266 | A1 | 5/2011  | Leroy et al. |
| 2012/0129812 | A1 | 5/2012  | Kawata et al. |
| 2014/0275077 | A1 | 9/2014  | Dandu et al. |
| 2015/0051211 | A1 | 2/2015  | Ji et al. |
| 2015/0368205 | A1 | 12/2015 | Ji et al. |
| 2017/0050949 | A1 | 2/2017  | Dandu et al. |
| 2017/0334883 | A1 | 11/2017 | Albrecht et al. |
| 2018/0297987 | A1 | 10/2018 | Coates et al. |
| 2019/0111012 | A1 | 4/2019  | Hanf |
| 2019/0247404 | A1 | 8/2019  | Namisaki et al. |
| 2019/0321364 | A1 | 10/2019 | Satyal et al. |
| 2019/0352286 | A1 | 11/2019 | Claremon et al. |

(Continued)

FOREIGN PATENT DOCUMENTS

| CN | 102898377 A | 1/2013 |
| CN | 105477636 A | 4/2016 |

(Continued)

OTHER PUBLICATIONS

Ashburner, et al., "Gene ontology: Tool for the unification of biology," Nature Genetics, 25(1): 25-9 (2000).
Bashir, M., et al., "Liver Volume Reduction in Resmetirom Treated Non-Cirrhotic and Cirrhotic Nash Patients," Hepatology, Oct. 2021, vol. 74, No. 1(Suppl), pp. 1142A-1143A.
Basnak, I. et al. (1975). "Synthesis of 5-cyclopropyl-6-azauracil," Collection of Czechoslovak Chemical Communications, 40(4):1038-1042.
Baxter, J. D. et al., "Thyroid hormone mimetics: potential applications in atherosclerosis, obesity and type 2 diabetes," Nature Reviews Drug Discovery, vol. 8, No. 4, pp. 308-320 (Apr. 2009).
Belikov, V. G., Pharmaceutical Chemistry, Chapter 2.6, "Relationship between the chemical structure, the properties of substances and their effects on the body", Medpress Inform, Moscow, 2007, pp. 27-29 (with English translation).

(Continued)

*Primary Examiner* — Joseph K McKane
*Assistant Examiner* — David M Shim
(74) *Attorney, Agent, or Firm* — Cooley LLP

(57) ABSTRACT

Provided herein are compounds of formula (I), or tautomers thereof, or pharmaceutically acceptable salts of any of the foregoing, compositions of any of the foregoing, and methods of their preparation, and methods of agonizing THR beta and methods for treating disorders mediated by THR beta.

33 Claims, No Drawings

(56) References Cited

U.S. PATENT DOCUMENTS

| | | | |
|---|---|---|---|
| 2020/0009092 A1 | 1/2020 | Roberts et al. | |
| 2020/0054589 A1 | 2/2020 | Noel et al. | |
| 2020/0062742 A1 | 2/2020 | Kirschberg et al. | |
| 2020/0115362 A1 | 4/2020 | Kirschberg et al. | |
| 2020/0190064 A1 | 6/2020 | Yu et al. | |
| 2020/0347035 A1* | 11/2020 | Wang | C07D 403/12 |
| 2020/0354345 A1 | 11/2020 | Vandyck et al. | |
| 2020/0397798 A1 | 12/2020 | Mohan et al. | |
| 2020/0399249 A1 | 12/2020 | Yu et al. | |
| 2021/0379040 A1 | 12/2021 | Fenaux et al. | |
| 2021/0379043 A1 | 12/2021 | Fenaux et al. | |
| 2022/0135540 A1 | 5/2022 | Sweetana et al. | |
| 2022/0332707 A1 | 10/2022 | Du et al. | |
| 2022/0348561 A1 | 11/2022 | Kirschberg et al. | |
| 2022/0356177 A1 | 11/2022 | Kirschberg et al. | |
| 2023/0181583 A1 | 6/2023 | Jones et al. | |
| 2023/0241071 A1 | 8/2023 | Fenaux et al. | |
| 2023/0278988 A1 | 9/2023 | Yu et al. | |
| 2024/0000765 A1 | 1/2024 | Fenaux et al. | |
| 2024/0059682 A1 | 2/2024 | Kirschberg et al. | |
| 2024/0156826 A1 | 5/2024 | Taub | |
| 2024/0239761 A1 | 7/2024 | Zhang et al. | |
| 2024/0293416 A1 | 9/2024 | Jones et al. | |
| 2024/0316025 A1 | 9/2024 | Fenaux et al. | |
| 2024/0360106 A1 | 10/2024 | Jin et al. | |
| 2025/0179053 A1 | 6/2025 | Yu et al. | |
| 2025/0179054 A1 | 6/2025 | Yu et al. | |
| 2025/0195512 A1 | 6/2025 | Jones et al. | |
| 2025/0236615 A1 | 7/2025 | Kirschberg et al. | |

FOREIGN PATENT DOCUMENTS

| | | |
|---|---|---|
| CN | 110167557 A | 8/2019 |
| CN | 111320609 A | 6/2020 |
| CN | 111484481 A | 8/2020 |
| CN | 111909137 A | 11/2020 |
| CN | 114430743 A | 5/2022 |
| CN | 114437034 A | 5/2022 |
| EP | 1471049 A1 | 10/2004 |
| EP | 3437659 A1 | 2/2019 |
| EP | 3807267 A1 | 4/2021 |
| JP | H02225483 A | 9/1990 |
| JP | 2001114768 A | 4/2001 |
| JP | 2007512314 A | 5/2007 |
| JP | 2009500305 A | 1/2009 |
| JP | 2011528007 A | 11/2011 |
| JP | 2015500212 A | 1/2015 |
| RU | 2668960 C2 | 10/2018 |
| WO | WO-0198256 A1 | 12/2001 |
| WO | WO-03064369 A1 | 8/2003 |
| WO | WO-03094845 A2 | 11/2003 |
| WO | WO-2005049616 A1 | 6/2005 |
| WO | WO-2007003419 A1 | 1/2007 |
| WO | WO-2007009913 A1 | 1/2007 |
| WO | WO-2007128492 A1 | 11/2007 |
| WO | WO-2007132475 A1 | 11/2007 |
| WO | WO-2007134864 A1 | 11/2007 |
| WO | WO-2009012125 A1 | 1/2009 |
| WO | WO-2009037172 A1 | 3/2009 |
| WO | WO-2010006962 A1 | 1/2010 |
| WO | WO-2010122980 A1 | 10/2010 |
| WO | WO-2011038207 A1 | 3/2011 |
| WO | WO-2014043706 A1 | 3/2014 |
| WO | WO-2016036873 A1 | 3/2016 |
| WO | WO-2017167935 A1 | 10/2017 |
| WO | WO-2017170434 A1 | 10/2017 |
| WO | WO-2018027892 A1 | 2/2018 |
| WO | WO-2018028517 A1 | 2/2018 |
| WO | WO-2018073154 A1 | 4/2018 |
| WO | WO-2018075650 A1 | 4/2018 |
| WO | WO-2018103624 A1 | 6/2018 |
| WO | WO-2018153933 A1 | 8/2018 |
| WO | WO-2018167103 A1 | 9/2018 |
| WO | WO-2018170173 A1 | 9/2018 |
| WO | WO-2018193006 A1 | 10/2018 |
| WO | WO-2018193007 A1 | 10/2018 |
| WO | WO-2018208707 A1 | 11/2018 |
| WO | WO-2019023245 A1 | 1/2019 |
| WO | WO-2019038456 A1 | 2/2019 |
| WO | WO-2019053233 A1 | 3/2019 |
| WO | WO-2019053235 A1 | 3/2019 |
| WO | WO-2019094777 A1 | 5/2019 |
| WO | WO-2019144835 A1 | 8/2019 |
| WO | WO-2019240938 A1 | 12/2019 |
| WO | WO-2020041741 A1 | 2/2020 |
| WO | WO-2020042114 A1 | 3/2020 |
| WO | WO-2020061086 A2 | 3/2020 |
| WO | WO-2020061114 A1 | 3/2020 |
| WO | WO-2020073974 A1 | 4/2020 |
| WO | WO-2020077123 A1 | 4/2020 |
| WO | WO-2020123827 A1 | 6/2020 |
| WO | WO-2020131578 A2 | 6/2020 |
| WO | WO-2020169069 A1 | 8/2020 |
| WO | WO-2020227549 A1 | 11/2020 |
| WO | WO-2020239076 A1 | 12/2020 |
| WO | WO-2021014350 A1 | 1/2021 |
| WO | WO-2021041237 A1 | 3/2021 |
| WO | WO-2021050945 A1 | 3/2021 |
| WO | WO-2021121210 A1 | 6/2021 |
| WO | WO-2021231644 A1 | 11/2021 |
| WO | WO-2021231646 A1 | 11/2021 |
| WO | WO-2022152770 A1 | 7/2022 |
| WO | WO-2022187403 A1 | 9/2022 |
| WO | WO-2023083288 A1 | 5/2023 |
| WO | WO-2023086561 A1 | 5/2023 |
| WO | WO-2023220404 A1 | 11/2023 |

OTHER PUBLICATIONS

Berry, M. J, et al., "Thyroid hormone regulates type I deiodinase messenger RNA in rat liver," Molecular Endocrinology, 1990, 4:743-748.

Brecher, J. (Jan. 2006). "Graphical Representation of Stereochemical Configuration (IUPAC Recommendations 2006)," Pure and Appl. Chem. 78(10):1897-1959.

Chen, H.C. et al. (Nov. 13-16, 2020). MET409, an Optimized Sustained FXR Agonist, Was Safe and Well-Tolerated in a 14-Day Phase 1 Study in Healthy Subjects, Metacrine, 1 page, Poster presented at Poster presentation at EASL—The International Liver Congress, Apr. 2019, Vienna, Austria.

Chung, D. et al. (2020). "Pharmacokinetics of Two Oral Formulations of Liver-Directed, Nonsteroidal Farnesoid XReceptor Agonist Tern-101 in Healhy Volunteers," Terns Pharmaceutical, Inc., 1 page, Poster presented at Paris Nash Meeting, Oct. 22-23, 2020, Paris, France.

Dennis, A., et al., "Correlations Between MRI Biomarkers PDFF and cT1 with Histopathological Features on Non-Alcoholic Steatohepatitis," Frontiers in Endocrinology, Jan. 2021, vol. 11, Article 575843, 10 pages.

Dermer, G.B.., "Another Anniversary for the War on Cancer," Bio/Technology, 12:320, 1 page (Mar. 1994).

Dufour, J.-F. et al., "Combination Therapy for Non-Alcoholic Steatohepatitis: Rationale, Opportunities and Challenges, "Gut, 69(10):1877-1884 (2020).

Dunkel, P. et al., "Semicarbazide-sensitive amine oxidase/vascular adhesion protein-1: a patent survey," Expert Opinion on Therapeutic Patents, Jun. 2011, vol. 21, No. 9, pp. 1453-1471, doi: 10.1517/13543776.2011.594040.

Erion, M.D., "Targeting thyroid hormone receptor-β agonists to the liver reduces cholesterol and triglycerides and improves the therapeutic index," PNAS USA 2007, 104(39), 15490-15495.

Extended European Search Report and Search Opinion, dated Apr. 2, 2024, for European Patent Application No. 21803928.7, 11 pages.

Extended European Search Report and Search Opinion, dated Dec. 23, 2024, for European Patent Application No. 22764006.7, 10 pages.

Extended European Search Report and Search Opinion, mailed Aug. 17, 2023, for European Patent Application No. 20863146.5, 7 pages.

Extended European Search Report and Search Opinion, mailed Jul. 6, 2022, for European Application No. 19896475.1 (8 total pages).

(56) References Cited

OTHER PUBLICATIONS

Extended European Search Report and Search Opinion, mailed Mar. 30, 2023, for European Application No. 20856291.8 (8 total pages).
Extended European Search Report and Search Opinion, dated May 18, 2022, for European Patent Application No. 19870196.3 (5 total pages).
Extended Search Report and Search Opinion, mailed Mar. 22, 2022, for European Patent Application No. 19852050.4 (7 total pages).
Fiorucci, S. et al., "Future trends in the treatment of non-alcoholic steatopehatits," Pharmacological Research, Jul. 2018, vol. 134, pp. 289-298, doi: 10.1016/J.PHRS.2018.07.014.
Freshney, R. I., et al., "Culture of Animal Cells," A Manual of Basic Technique, 1983, Alan R. Liss, Inc., New York, p. 4 and pp. 129-133 (9 total pages).
Gallup. Americans' Average Weight Holds Steady in 2020, Jan. 4, 2021, Retrieved from the Internet on Sep. 27, 2023, https://news.gallup.com/poll/328241/americans-average-weight-holds-steady-2020.aspx, 9 pages.
Gene Ontology Consortium, Creating the Gene Ontology Resource: Design and Implementation. Genome Research 11: 1425-1433 (2001).
Grover et al., "Effects of the thyroid hormone receptor Agonist GC-1 on metabolic rate and cholesterol in rats and primates: selective actions relative to 3,5,3'-triiodo-L-thyronine," Endocrinology, vol. 145, No. 4, pp. 1656-1661 (Apr. 2004).
Han, C.Y., "Update on FXR Biology: Promising Therapeutic Target?", International Journal of Molecular Sciences, Int. J. Mol. Sci., 19, 2069, 25 pages (Jul. 2018).
Hansen, H. H., et al., "Human translatability of the GAN diet-induced obese mouse model of non-alcoholic steatohepatitis," BMC Gastroenterology 2020, 20:210, pp. 1-12.
Harrison, S. A., et al., "A Phase 3, Randomized, Controlled Trial of Resmetirom in Nash with Liver Fibrosis," The New England Journal of Medicine, Feb. 8, 2024, vol. 390, No. 6, pp. 497-509.
Harrison, S. A., et al., "Resmetirom for nonalcoholic fatty liver disease: a randomized, double-blind, placebo-controlled phase 3 trial," Nature Medicine, Nov. 2023, vol. 29, 2919-2928, including additional material, 19 pages, DOI: 10.1038/s41591-023-02603-1.
Hennessey, J. V., et al., "The emergence of levothyroxine as a treatment for hypothyroidism," Endocrine, 2017, 55: 6-18, DOI: 10.1007/s12020-016-1199-8.
Hill, S. R. Jr., et al., "The Metabolic Effects of the Acetic and Propionic Acid Analogs of Thyroxine and Triiodothyronine," J Clin. Invest. 1960, (39):523-533.
Ichiki, T., et al., "Thyroid Hormone and Vascular Remodeling," Journal of Atherosclerosis and Thrombosis, 2016, vol. 23, No. 3, pp. 266-275.
International Preliminary Report on Patentability, issued Jan. 19, 2010, for PCT Application No. PCT/US2008/069719, filed Jul. 11, 2008, 7 pages.
International Preliminary Report on Patentability, mailed Apr. 22, 2021, for International Application No. PCT/US2019/055689, 9 pages.
International Preliminary Report on Patentability, mailed Jun. 24, 2021, for International Application No. PCT/US2019/066013, 6 pages.
International Preliminary Report on Patentability, mailed Mar. 11, 2021, for International Application No. PCT/US2019/047968 (7 total pages).
International Preliminary Report on Patentability, mailed Mar. 11, 2021, for PCT Application No. PCT/CN2018/103349, filed Aug. 30, 2018, 7 pages.
International Preliminary Report on Patentability, mailed Mar. 24, 2022, for International Application No. PCT/US2020/050497 (7 total pages).
International Preliminary Report on Patentability, mailed Mar. 3, 2022, for International Application No. PCT/US2020/047467 (9 total pages).
International Preliminary Report on Patentability, mailed May 23, 2024, for International Application No. PCT/CN2022/131297, 7 pages.
International Preliminary Report on Patentability, mailed May 23, 2024, for International Application No. PCT/US2022/049690, 12 pages.
International Preliminary Report on Patentability, mailed Nov. 24, 2022, for International Application No. PCT/US2021/032085 (12 total pages).
International Preliminary Report on Patentability, mailed Nov. 28, 2024, for International Application No. PCT/US2023/022093, 6 pages.
International Preliminary Report on Patentability, mailed Sep. 14, 2023, for International Application No. PCT/US2022/018575, 18 pages.
International Search Report and Written Opinion, mailed Aug. 2, 2023, for International Application No. PCT/US2023/022093, 8 pages.
International Search Report and Written Opinion, mailed Dec. 8, 2020, for International Application No. PCT/US2020/050497 (9 total pages).
International Search Report and Written Opinion mailed Feb. 5, 2021, for International Application No. PCT/US2020/059522, filed Nov. 6, 2020, 9 pages.
International Search Report and Written Opinion, mailed Feb. 10, 2023, for International Application No. PCT/CN2022/131297, 10 Pages.
International Search Report and Written Opinion, mailed Feb. 28, 2020, for International Application No. PCT/US2019/066013, 8 pages.
International Search Report and Written Opinion, mailed Jan. 15, 2021, for International Application No. PCT/US2020/047467, 12 pages.
International Search Report and Written Opinion, mailed Jan. 23, 2020, for International Application No. PCT/US2019/055689, 12 Pages.
International Search Report and Written Opinion, mailed Jun. 5, 2019, for International Application No. PCT/CN2018/103349 (9 total pages).
International Search Report and Written Opinion, mailed Mar. 16, 2023, for International Application No. PCT/US2022/049690 (21 total pages).
International Search Report and Written Opinion, mailed May 23, 2022, for International Application No. PCT/US2022/018575 (21 total pages).
International Search Report and Written Opinion, mailed Nov. 21, 2019, for International Application No. PCT/US19/47968, 9 pages.
International Search Report and Written Opinion, mailed Nov. 6, 2008, for International Application No. PCT/US2008/069719, 9 pages.
International Search Report and Written Opinion, mailed Sep. 30, 2021, for International Application No. PCT/US2021/032085 (17 total pages).
Invitation to Pay Additional Fees, and, Where Applicable, Protest Fee, dated Jul. 6, 2021, for International Application No. PCT/US2021/032083 (3 total pages).
Invitation to Pay Additional Fees, dated Nov. 21, 2019, for International Application No. PCT/US2019/055689, 2 pages.
Invitation to Pay Additional Fees, mailed Jul. 6, 2021, for PCT Application No. PCT/US2021/032085, 3 pages.
Invitation to Pay Additional Fees, mailed Oct. 4, 2020, for International Application No. PCT/US2020/047467, 2 pages.
Jones, C. el al., "Combination of Tern-101, A Farnesoid X Receptor Agonist, and Tern-501, A Selective Agonist of Thyroid Hormone Receptor Beta, Reduces Activation of Inflammatory and Fibrotic Gene Pathways in a Mouse Model of Non-Alcoholic Steatohepatilis," Terns Pharmaceuticals Inc., Poster #0517, 1 page, Poster presented at AASLD The Liver Meeting, Nov. 13-16, 2020.
Jones, C., et al., EASL, Aug. 28, 2020, Single doses of Tern-201, a novel selective semicarbazide-sensitive amine oxidase (SSAO) inhibitor, are safe, well-tolerated, and result in sustained reduction of SSAO activity in healthy participants, Poster, 1 page.

(56) References Cited

OTHER PUBLICATIONS

Jones, C., et al., Single doses of the THR-β agonist Tern-501 are well tolerated and result in dose-dependent changes in LDL cholesterol and sex hormone binding globulin in a first-in-human clinical trial, AASLD, Nov. 12-15, 2021, Poster No. 1889, 1 page.

Kawamata, Y. et al., "A G Protein-Coupled Receptor Responsive to Bile Acids," The Journal of Biological Chemistry, vol. 278, No. 11, pp. 9435-9440 (Mar. 14, 2003).

Kelly M. J., et al., "Discovery of 2-[3,5-Dichloro-4-(5-isopropyl-6-oxo-1,6-dihydropyridazin-3-yloxy)phenyl]-3,5-dioxo-2,3,4,5-tetrahydro[1,2,4]triazine-6-carbonitrile (MGL3196), a Highly Selective Thyroid Hormone Receptor beta Agonist in Clinical Trials for the Treatment of Dyslipidemia," Journal of Medicinal Chemistry, vol. 57, No. 10, pp. 3912-3923, DOI:10.1021/jm4019299 (Apr. 2014).

Kim D., et al., "Critical Roles of the Histone Methyltransferase MLL4/KMT2D in Murine Hepatic Steatosis Directed by ABL1 and PPARgamma2," Cell Reports, 2016, vol. 17(6), pp. 1671-1682, DOI: 10.1016/j.celrep.2016.10.023.

Kirschberg, T., et al., EASL, Aug. 29, 2020, "Tern-501, a potent and selective agonist of thyroid hormone receptor beta, strongly reduces histological features and biomarkers of non-alcoholic steatohepatitis associated pathology in rodent models," poster, 1 page.

Kirschberg, T., et al., "Tern-501, a potent and selective agonist of thyroid hormone receptor beta, strongly redcues histological features and biomarkers of non-alcoholic steatohepatitis associated pathology in rodent models," Journal of Hepatology 2020, vol. 73, S653-S915, p. S684, SAT066.

Klein, I. et al. (Oct. 9, 2007). "Cardiovascular Involvement in General Medical Conditions, Thyroid Disease and the Heart," Circulation 116(15):1725-1735.

Kleiner, D. E., et al., "Design and validation of a histological scoring system for nonalcoholic fatty liver disease," Hepatology, Jun. 2005, 41(6):1313-1321.

Klucher, K., et al., EASL, Aug. 29, 2020, Anti-inflammatory and anti-fibrotic activity of Tern-201, a semicarbazide-sensitive amine oxidase inhibitor, in a rat choline-deficient high-fat diet non-alcoholic steatohepatitis model, Poster, 1 page.

Kogler, M. (Mar. 2012). "Synthesis and Evaluation of 6-aza-2'-deoxyuridine Monophosphate Analogs as Inhibitors of Thymidylate Synthases, and as Substrates or Inhibitors of Thymidine Monophosphate Kinase in Mycobacterium Tuberculosis," Chemistry and Biodiversity, 9(3):536-556.

Kowalik et al., "Thyroid Hormones, Thyromimetics and Their Metabolites in the Treatment of Liver Disease," Frontiers in Endocrinology, vol. 9, Article 382, pp. 1-11 (Jul. 2018).

Krchnak, V. et al., "Novel Pyrimidine Derivatives, Reactions and Ultraviolet Spectra," Collect. Czech. Chem. Commun. 1975, 40(5):1038-1042.

Kremoser, C., "FXR Agonists for Nash: How Are They Different and What Difference Do They Make?", Journal of Hepatology 2021, vol. 75, pp. 12-15.

Liver Meeting® Digital Experience 2020, Oct. 14, 2020, 3 pages, https://www.ternspharma.com/10-14-20-terns-to-present-positive-data-on-single-agend-and-combo-nash-at-liver-meeting-exp-2020).

Loomba, R., et al., "Nonalcoholic fatty liver disease progression rates to cirrhosis and progression of cirrhosis to decompensation and mortality: a real world analysis of Medicare data," Alimentary Pharmacology and Therapeutics, 2020, 51:1149-59.

Loomba, R., et al., Relationship of Non-Invasive Measures with Histological Response in Patients with NonAlcoholic Steatohepatitis and Fibrosis: 52-Week Data from the Phase 3 Maestro-Nash Trial, Hepatology, 2023, 78 (Suppl 1):S155-S159, Abstract 149.

Nelson, C. H., et al., Multiple Doses of Thyroid Hormone Receptor-Beta Agonist Tern-501 were Well-Tolerated and Resulted in Significant Dose-Dependent Changes in Serum Lipids and Sex Hormone Binding Globulin in a First-in-Human Clinical Study, EASL, Presentation, Abstract No. OS123, Jun. 25, 2022, 18:15-18-30, 17 pages.

Nelson, C. H., et al., Thyroid Hormone Beta Receptor Agonist Tern-501 Demonstrates Dose- and Exposure-Dependent Increases in Sex Hormone Binding Globulin With Associated Decreases in Atherogenic Lipids in Healthy Subjects, AASLD The Liver Meeting, Nov. 4-8, 2022, poster, 1 page.

Nelson, R. H., "Hyperlipidemia as a risk factor for cardiovascular disease," Primary Care, Mar. 2013, 40(1):195-211.

Noureddin, M., et al., "Head-to-Head Comparison of Fast, Mast, MEFIB and cT1 in Identifying at-Risk Nash Patients in a Low-Prevalence Population," Hepatology, 2023, 78(Supplement 1):S1-S2154, pp. S806-S810, Abstract 2050-A.

Noureddin, M., et al., "5000 | Topline Results from a 12-Week Phase 2a Trial (Duet) Evaluating Tern-501, A Highly Selective Thyroid Hormone Receptor (THR) Beta Agonist, Either as Monotherapy or in Combination with Tern-101, A Nonsteroidal Farnesoid X Receptor (FXR) Agonist, Demonstrated Significant Reductions in MR-Based Liver Fat Content and Fibroinflammation in Patients with Presumed MASH," Hepatology 2024, 79:E33-E85, p. E33.

Obach, R. S. et al., "The Prediction of Human Pharmacokinetic Parameters from Preclinical and In Vitro Metabolism Data," The Journal of Pharmacology and Experimental Therapeutics, vol. 283, No. 1, pp. 46-58 (1997).

Pagadala, M. R, et al., "Prevalence of hypothyroidism in nonalcoholic fatty liver disease," Digestive Diseases and Sciences, 2012, 57:528-34.

Pubchem (Jan. 12, 2016). "4-(1,2,4-Benzotriazin-3-Yloxy)-N-Methylaniline," CID: 103204817, 7 pages.

Reagan-Shaw, S., et al., "Dose translation from animal to human studies revisited," The FASEB Journal, Mar. 2007, vol. 22, pp. 659-661, doi: 10.1096/fj.07-9574LSF.

Rich, N. E., et al., "Racial and Ethnic Disparities in Nonalcoholic Fatty Liver Disease Prevalence, Severity, and Outcomes in the United States: A Systematic Review and Meta-analysis," Clinical Gastroenterology and Hepatology 2018, 16, 198-210, 210.e1-210.e2.

Rinella, M. E., et al., "AASLD Practice Guidance on the clinical assessment and management of nonalcoholic fatty liver disease," Hepatology 2023, 77, 1797-1835.

Romero, F., et al., "The Race to Bash Nash: Emerging Targets and Drug Development in a Complex Liver Disease," Journal of Medicinal Chemistry, 2020, 63:5031-5073, doi: 10.1021/acs.jmedchem.9b01701.

Schwimmer, et al., "Prevalence of Fatty Liver in Children and Adolescents," Pediatrics, 2006, 118:1388-1393.

Shepherd, E.L. et al., "Inhibition of Vascular Adhesion Protein-1 Modifies Hepatic Steatosis In Vitro and In Vivo", World Journal of Hepatology, 12(11):931-948 (Nov. 27, 2020).

Simone, J. V. (1996) "Introduction" in Cecil Textbook of Medicine. 20th Ed., vol. I . J. Claude Bennet and F. Plum (Eds.) W.B. Sauders Co.; pp. 1004-1010.

Sinha, R. A. et al., "Direct Effects of Thyroid Hormones on Hepatic Lipid Metabolism," Nat. Rev. Endocrinology, May 2018, 14(5):259-269 (26 total pages).

Stine, J. G., et al., "Change in MRI-PDFF and Histologic Response in Patients with Nonalcohlic Steatohepatitis: A Systematic Review and Meta-Analysis," Clinical Gastroenterology and Hepatology 2021, vol. 19, No. 11, 2274-2283, 2283.e1-2283.e5.

Sumida, Y., et al., "Current and new pharmacotherapy options for non-alcoholic steatohepatitis", Expert Opinion on Pharmacotherapy, vol. 21, No. 8, Apr. 1, 2020, pp. 953-967, DOI: 10.1080/14656566.2020.1744564.

Taub, R., et al., 'Lipid lowering in healthy volunteers treated with multiple doses of MGL-3196, a liver-targeted thyroid hormone receptor-β agonist,' Atherosclerosis, 2013, 230:373-80.

U.S. Appl. No. 17/305,302, filed Jul. 2, 2021, by Shanghai Yu et al. (The U.S. Patent application is not submitted herewith pursuant lo the waiver of 37 C.F.R. § 1.98(a){2}{iii} issued by the Office on Sep. 21, 2004.).

U.S. Appl. No. 18/818,705, filed Aug. 29, 2024, by Kirschberg et al.

Vuppalanchi, R et al., "Therapeutic pipeline in nonalcoholic steatohepatitis," Nature Reviews Gastroenterology, Feb. 2021, vol. 18, No. 6, pp. 373-392, doi: 10.1038/S41575-020-00408-Y.

(56) References Cited

OTHER PUBLICATIONS

Walenbergh S. A., et al., "Cholesterol is a significant risk factor for nonalcoholic steatohepatitis," Expert Review of Gastroenterology & Hepatology, 2015, 9(11):1343-1346.
Extended European Search Report and Search Opinion, dated May 22, 2025, for European Patent Application No. 25157448.9, 11 pages.
Extended European Search Report and Search Opinion for European Application No. 25157450.5 dated May 22, 2025, 11 pages.
Finck Brian N., "Targeting Metabolism, Insulin Resistance, and Diabetes to Treat Nonalcoholic Steatohepatitis", Diabetes, vol. 67, Dec. 2018, pp. 2485-2493.
Harrison, S. A., et al., "A 52-Week Phase 3 Clinical Trial of Resmetirom in 180 Patients with Well-Compensated Nash Cirrhosis," AASLD, Nov. 4-8, 2022, 6 pages.
International Search Report and Written Opinion, mailed Jul. 30, 2025, for International Application No. PCT/US2025/030358, 15 pages.
Sinha, R. A., et al., "Nonalcoholic Fatty Liver Disease and Hypercholesterolemia: Roles of Thyroid Hormones, Metabolites, and Agonists," Thyroid 2019, vol. 29, No. 9, pp. 1173-1191, DOI: 10.1089/thy.2018.0664.
U.S. Appl. No. 19/213,790, filed May 20, 2025, by Fenaux et al.

\* cited by examiner

THYROID HORMONE RECEPTOR BETA AGONIST COMPOUNDS

CROSS REFERENCE TO RELATED APPLICATIONS

This application is a national stage application under 35 U.S.C. § 371 of International Application No. PCT/US2020/047467, filed internationally on Aug. 21, 2020, and claims priority to U.S. Provisional Application No. 62/891,078 filed on Aug. 23, 2019, and U.S. Provisional Application No. 62/967,943 filed on Jan. 30, 2020, the content of all of which are incorporated herein by reference in their entirety.

FIELD OF THE INVENTION

This invention relates to compounds, preferably thyroid hormone receptor beta (THR beta) agonist compounds, compositions thereof, and methods of their preparation, and methods of agonizing THR beta and methods for treating disorders mediated by THR beta.

STATE OF THE ART

The beneficial effects arising from treating hyperthyroid or hypothyroid patients with T3/T4 endogenous ligands or early analogs of these endogenous ligands have been described in the literature (Richardson Hill Jr., S. et al. *J. Clin. Invest.* 1960, 39, 523-533). These early studies, as well as similar follow-up studies, established the heart as a major organ for the manifestation of side effects of both hyperthyroidism and hypothyroidism (Klein, I. et al. *Circulation*, 2007, 1725-1735). In particular, tachycardia, hypertrophism, atrial dysrhythmias, and atrial fibrillation are serious concerns. In addition, increased bone turn-over leading to decreased bone mineral density has also been noted. Negative effects at both sites, heart and bone, have been linked to the agonism of the THR alpha isoform, whereas the beneficial effects of THR agonism in the liver are largely linked to the THR beta isoform (Sinha, R. A. et al. *Nat. Rev. Endocrinology* 2018, 14, 259-269).

Diseases or disorders associated with THR beta include non-alcoholic steatohepatitis (NASH), non-alcoholic fatty liver disease (NAFLD), metabolic syndrome, dyslipidemia, hypertriglyceridemia, and hypercholesterolemia. There is a need for thyroid hormone analogs, such as those that are THR beta agonists, and preferably those that avoid the undesirable effects of hyperthyroidism and hypothyroidism, and maintain the beneficial effects of thyroid hormones, e.g., for the treatment for patients with non-alcoholic steatohepatitis (NASH). In particular, there is a need to develop new thyroid hormone analogs that are selective agonists for THR beta, and preferably those that avoid the undesirable effects associated with agonism of THR alpha, and maintain the beneficial effects of thyroid hormones, e.g., for the treatment for patients with non-alcoholic steatohepatitis (NASH), non-alcoholic fatty liver disease (NAFLD), metabolic syndrome, dyslipidemia, hypertriglyceridemia, or hypercholesterolemia.

SUMMARY

In one aspect, provided herein is a compound of formula (I):

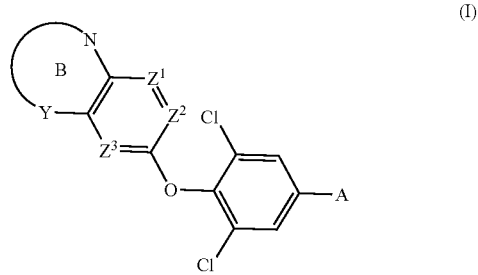

or a tautomer thereof, or a pharmaceutically acceptable salt of any of the foregoing, wherein A, B, Y, $Z^1$, $Z^2$, and $Z^3$ are as detailed herein.

In one aspect, provided herein is a pharmaceutical composition comprising a compound provided herein and at least one pharmaceutically acceptable excipient.

In one aspect, provided herein is a method of agonizing thyroid hormone receptor beta (THR beta) comprising contacting either an effective amount of a compound provided herein, or an effective amount of a pharmaceutical composition provided herein, with the THR beta.

In one aspect, provided herein is a method of treating a disorder which is mediated by THR beta in a patient, comprising administering to the patient a therapeutically effective amount of a compound provided herein, or a therapeutically effective amount of a composition provided herein. In some embodiments, the disorder is non-alcoholic steatohepatitis (NASH).

DETAILED DESCRIPTION

Definitions

As used herein, the following definitions shall apply unless otherwise indicated. Further, if any term or symbol used herein is not defined as set forth below, it shall have its ordinary meaning in the art.

"Comprising" is intended to mean that the compositions and methods include the recited elements, but not excluding others. "Consisting essentially of", when used to define compositions and methods, shall mean excluding other elements of any essential significance to the combination. For example, a composition consisting essentially of the elements as defined herein would not exclude other elements that do not materially affect the basic and novel characteristic(s) of the claimed invention. "Consisting of" shall mean excluding more than trace amount of, e.g., other ingredients and substantial method steps recited. Embodiments defined by each of these transition terms are within the scope of this invention.

"Effective amount" or dose of a compound or a composition refers to that amount of the compound or the composition that results in an intended result as desired based on the disclosure herein. Effective amounts can be determined by standard pharmaceutical procedures in cell cultures or experimental animals, e.g., and without limitation, by determining the $LD_{50}$ (the dose lethal to 50% of the population) and the $ED_{50}$ (the dose therapeutically effective in 50% of the population).

The term "excipient" as used herein means an inert or inactive substance that may be used in the production of a drug or pharmaceutical, such as a tablet containing a compound of the invention as an active ingredient. Various substances may be embraced by the term excipient, including without limitation any substance used as a binder, disintegrant, coating, compression/encapsulation aid, cream or lotion, lubricant, solutions for parenteral administration, materials for chewable tablets, sweetener or flavoring, suspending/gelling agent, or wet granulation agent. Binders include, e.g., carbomers, povidone, xanthan gum, etc.; coatings include, e.g., cellulose acetate phthalate, ethylcellulose, gellan gum, maltodextrin, enteric coatings, etc.; compression/encapsulation aids include, e.g., calcium carbonate, dextrose, fructose dc (dc="directly compressible"), honey dc, lactose (anhydrate or monohydrate; optionally in combination with aspartame, cellulose, or microcrystalline cellulose), starch dc, sucrose, etc.; disintegrants include, e.g., croscarmellose sodium, gellan gum, sodium starch glycolate, etc.; creams or lotions include, e.g., maltodextrin, carrageenans, etc.; lubricants include, e.g., magnesium stearate, stearic acid, sodium stearyl fumarate, etc.; materials for chewable tablets include, e.g., dextrose, fructose dc, lactose (monohydrate, optionally in combination with aspartame or cellulose), etc.; suspending/gelling agents include, e.g., carrageenan, sodium starch glycolate, xanthan gum, etc.; sweeteners include, e.g., aspartame, dextrose, fructose dc, sorbitol, sucrose dc, etc.; and wet granulation agents include, e.g., calcium carbonate, maltodextrin, microcrystalline cellulose, etc.

"Patient" refers to mammals and includes humans and non-human mammals. Examples of patients include, but are not limited to, mice, rats, hamsters, guinea pigs, pigs, rabbits, cats, dogs, goats, sheep, cows, and humans. In some embodiments, patient refers to a human.

"Pharmaceutically acceptable" refers to safe and non-toxic, preferably for in vivo, more preferably, for human administration.

"Pharmaceutically acceptable salt" refers to a salt that is pharmaceutically acceptable. A compound described herein may be administered as a pharmaceutically acceptable salt.

"Salt" refers to an ionic compound formed between an acid and a base. When the compound provided herein contains an acidic functionality, such salts include, without limitation, alkali metal, alkaline earth metal, and ammonium salts. As used herein, ammonium salts include salts containing protonated nitrogen bases and alkylated nitrogen bases. Exemplary and non-limiting cations useful in pharmaceutically acceptable salts include Na, K, Rb, Cs, $NH_4$, Ca, Ba, imidazolium, and ammonium cations based on naturally occurring amino acids. When the compounds utilized herein contain basic functionality, such salts include, without limitation, salts of organic acids, such as carboxylic acids and sulfonic acids, and mineral acids, such as hydrogen halides, sulfuric acid, phosphoric acid, and the like. Exemplary and non-limiting anions useful in pharmaceutically acceptable salts include oxalate, maleate, acetate, propionate, succinate, tartrate, chloride, sulfate, bisulfate, mono-, di-, and tribasic phosphate, mesylate, tosylate, and the like.

"Therapeutically effective amount" or dose of a compound or a composition refers to that amount of the compound or the composition that results in reduction or inhibition of symptoms or a prolongation of survival in a patient. The results may require multiple doses of the compound or the composition.

"Treating" or "treatment" of a disease in a patient refers to 1) preventing the disease from occurring in a patient that is predisposed or does not yet display symptoms of the disease; 2) inhibiting the disease or arresting its development; or 3) ameliorating or causing regression of the disease. As used herein, "treatment" or "treating" is an approach for obtaining beneficial or desired results including clinical results. For purposes of this invention, beneficial or desired results include, but are not limited to, one or more of the following: decreasing one or more symptoms resulting from the disease or disorder, diminishing the extent of the disease or disorder, stabilizing the disease or disorder (e.g., preventing or delaying the worsening of the disease or disorder), delaying the occurrence or recurrence of the disease or disorder, delaying or slowing the progression of the disease or disorder, ameliorating the disease or disorder state, providing a remission (whether partial or total) of the disease or disorder, decreasing the dose of one or more other medications required to treat the disease or disorder, enhancing the effect of another medication used to treat the disease or disorder, delaying the progression of the disease or disorder, increasing the quality of life, and/or prolonging survival of a patient. Also encompassed by "treatment" is a reduction of pathological consequence of the disease or disorder. The methods of the invention contemplate any one or more of these aspects of treatment.

An "isotopomer" of a compound is a compound in which one or more atoms of the compound have been replaced with isotopes of those same atoms. For example, where H has been replaced by D or T, or $^{12}C$ has been replaced by $^{11}C$, or $^{14}N$ has been replaced by $^{15}N$. For example, and without limitation, replacement of with D can in some instances lead to reduced rates of metabolism and therefore longer half-lives. Replacement of H with T can provide radioligands potentially useful in binding studies. Replacement of $^{12}C$ with the short-lived isotope $^{11}C$ can provide ligands useful in Positron Emission Tomography (PET) scanning. Replacement of $^{14}N$ with $^{15}N$ provides compounds that can be detected/monitored by $^{15}N$ NMR spectroscopy. For example, an isotopomer of a compound containing —$CH_2CH_3$ is that compound but containing —$CD_2CD_3$ instead of the —$CH_2CH_3$.

Unless a specific isotope of an element is indicated in a formula, the disclosure includes all isotopologues of the compounds disclosed herein, such as, for example, deuterated derivatives of the compounds (where H can be $^2H$, i.e., D). Isotopologues can have isotopic replacements at any or at all locations in a structure, or can have atoms present in natural abundance at any or all locations in a structure.

"Stereoisomer" or "stereoisomers" refer to compounds that differ in the stereogenicity of the constituent atoms such as, without limitation, in the chirality of one or more stereocenters or related to the cis or trans configuration of a carbon-carbon or carbon-nitrogen double bond. Stereoisomers include enantiomers and diastereomers.

"Tautomer" refers to alternate forms of a compound that differ in the position of a proton, such as enol-keto and imine-enamine tautomers, or the tautomeric forms of heteroaryl groups containing a ring atom attached to both a ring —NH— moiety and a ring =N— moiety such as pyrazoles, imidazoles, benzimidazoles, triazoles, and tetrazoles.

"Alkyl" refers to monovalent saturated aliphatic hydrocarbyl groups having from 1 to 12 carbon atoms, preferably from 1 to 10 carbon atoms, and more preferably from 1 to 6 carbon atoms. This term includes, by way of example, linear and branched hydrocarbyl groups such as methyl ($CH_3$—), ethyl ($CH_3CH_2$—), n-propyl ($CH_3CH_2CH_2$—), isopropyl (($CH_3)_2CH$—), n-butyl ($CH_3CH_2CH_2CH_2$—), isobutyl (($CH_3)_2CHCH_2$—), sec-butyl (($CH_3)(CH_3CH_2)$ CH—), t-butyl ((CH$_3$)$_3$C—), n-pentyl (CH$_3$CH$_2$CH$_2$CH$_2$CH$_2$—), and neopentyl ((CH$_3$)$_3$CCH$_2$—). C$_x$ alkyl refers to an alkyl group having x number of carbon atoms.

"Aryl" or "Ar" refers to a monovalent aromatic carbocyclic group of from 6 to 14 carbon atoms having a single ring (e.g., phenyl (Ph)) or multiple condensed rings (e.g., naphthyl or anthryl) which condensed rings may or may not be aromatic (e.g., 2-benzoxazolinone, 2H-1,4-benzoxazin-3 (4H)-one-7-yl, and the like) provided that the point of attachment is at an aromatic carbon atom. Preferred aryl groups include phenyl and naphthyl.

"Cycloalkyl" refers to saturated or unsaturated but non-aromatic cyclic alkyl groups of from 3 to 10 carbon atoms, preferably from 3 to 8 carbon atoms, and more preferably from 3 to 6 carbon atoms, having single or multiple cyclic rings including fused, bridged, and spiro ring systems. C$_x$ cycloalkyl refers to a cycloalkyl group having x number of ring carbon atoms. Examples of suitable cycloalkyl groups include, for instance, adamantyl, cyclopropyl, cyclobutyl, cyclopentyl, and cyclooctyl. One or more the rings can be aryl, heteroaryl, or heterocyclic provided that the point of attachment is through the non-aromatic, non-heterocyclic ring saturated carbocyclic ring.

"Halo" or "halogen" refers to fluoro, chloro, bromo and iodo and preferably is fluoro or chloro.

"Hydroxy" or "hydroxyl" refers to the group —OH.

"Heteroaryl" refers to an aromatic group of from 1 to 10 carbon atoms and 1 to 4 heteroatoms selected from the group consisting of oxygen, nitrogen and sulfur within the ring. Such heteroaryl groups can have a single ring (e.g., pyridinyl or furyl) or multiple condensed rings (e.g., indolizinyl or benzothienyl) wherein the condensed rings may or may not be aromatic and/or contain a heteroatom provided that the point of attachment is through an atom of the aromatic heteroaryl group. In one embodiment, the nitrogen and/or the sulfur ring atom(s) of the heteroaryl group are optionally oxidized to provide for the N-oxide (N→O), sulfinyl, or sulfonyl moieties. Preferred heteroaryls include 5 or 6 membered heteroaryls such as pyridinyl, pyrrolyl, thiophenyl, and furanyl. Other preferred heteroaryls include 9 or 10 membered heteroaryls, such as indolyl, quinolinyl, quinolonyl, isoquinolinyl, and isoquinolonyl.

"Heterocycle" or "heterocyclic" or "heterocycloalkyl" or "heterocyclyl" refers to a saturated or partially saturated, but not aromatic, group having from 1 to 10 ring carbon atoms, preferably from 1 to 8 carbon atoms, and more preferably from 1 to 6 carbon atoms, and from 1 to 4 ring heteroatoms, preferably from 1 to 3 heteroatoms, and more preferably from 1 to 2 heteroatoms selected from the group consisting of nitrogen, sulfur, or oxygen. C$_x$ heterocycloalkyl refers to a heterocycloalkyl group having x number of ring atoms including the ring heteroatoms. Heterocycle encompasses single ring or multiple condensed rings, including fused, bridged and spiro ring systems. In fused ring systems, one or more the rings can be cycloalkyl, aryl or heteroaryl provided that the point of attachment is through the non-aromatic ring. In one embodiment, the nitrogen and/or sulfur atom(s) of the heterocyclic group are optionally oxidized to provide for the N-oxide, sulfinyl, sulfonyl moieties.

Examples of heterocyclyl and heteroaryl include, but are not limited to, azetidinyl, pyrrolyl, imidazolyl, pyrazolyl, pyridyl, pyrazyl, pyrimidyl, pyridazyl, indolizyl, isoindolyl, indolyl, dihydroindolyl, indazolyl, purinyl, quinolizinyl, isoquinolinyl, quinolinyl, phthalazinyl, naphthylpyridinyl, quinoxalinyl, quinazolinyl, cinnolinyl, pteridinyl, carbazolyl, carbolinyl, phenanthridinyl, acridinyl, phenanthrolinyl, isothiazolyl, phenazinyl, isoxazolyl, phenoxazinyl, phenothiazinyl, imidazolidinyl, imidazolinyl, piperidinyl, piperazinyl, indolinyl, phthalimidyl, 1,2,3,4-tetrahydroisoquinolinyl, 4,5,6,7-tetrahydrobenzo[b] thiophenyl, thiazolyl, thiazolidinyl, thiophenyl, benzo[b] thiophenyl, morpholinyl, thiomorpholinyl (also referred to as thiamorpholinyl), 1,1-dioxothiomorpholinyl, piperidinyl, pyrrolidinyl, and tetrahydrofuranyl.

"Oxo" refers to the atom (=O) or (O).

The terms "optional" or "optionally" as used throughout the specification means that the subsequently described event or circumstance may but need not occur, and that the description includes instances where the event or circumstance occurs and instances in which it does not. For example, "the nitrogen atom is optionally oxidized to provide for the N-oxide (N→O) moiety" means that the nitrogen atom may but need not be oxidized, and the description includes situations where the nitrogen atom is not oxidized and situations where the nitrogen atom is oxidized.

"Optionally substituted" unless otherwise specified means that a group may be unsubstituted or substituted by one or more (e.g., 1, 2, 3, 4 or 5) of the substituents listed for that group in which the substituents may be the same or different, provided that the group's normal valence is not exceeded. In one embodiment, an optionally substituted group has one substituent. In another embodiment, an optionally substituted group has two substituents. In another embodiment, an optionally substituted group has three substituents. In another embodiment, an optionally substituted group has four substituents. In some embodiments, an optionally substituted group has 1 to 2, 2 to 5, 3 to 5, 2 to 3, 2 to 4, 3 to 4, 1 to 3, 1 to 4 or 1 to 5 substituents.

Unless indicated otherwise, the nomenclature of substituents that are not explicitly defined herein are arrived at by naming the terminal portion of the functionality followed by the adjacent functionality toward the point of attachment. For example, the substituent "alkoxycarbonylalkyl" refers to the group (alkoxy)-C(O)-(alkyl)-.

It is understood that in all substituted groups defined above, polymers arrived at by defining substituents with further substituents to themselves (e.g., substituted aryl having a substituted aryl group as a substituent which is itself substituted with a substituted aryl group, etc.) are not intended for inclusion herein. In such cases, the maximum number of such substituents is three. That is to say that each of the above definitions is constrained by a limitation that, for example, substituted aryl groups are limited to -substituted aryl-(substituted aryl)-substituted aryl.

It is understood that the above definitions are not intended to include impermissible substitution patterns (e.g., methyl substituted with 4 fluoro groups). Such impermissible substitution patterns are well known to the skilled artisan.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination. All combinations of the embodiments pertaining to the chemical groups represented by the variables are specifically embraced by the present invention and are disclosed herein just as if each and every combination was individually and explicitly disclosed, to the extent that such combinations embrace compounds that are stable compounds (i.e., compounds that can be isolated, characterized, and tested for biological activity). In addition, all subcombinations of the chemical groups listed in the embodiments describing such variables are also specifically embraced by the present invention and are disclosed herein just as if each and every such sub-combination of chemical groups was individually and explicitly disclosed herein.

Compounds

In one aspect, provided herein is a compound of formula (I):

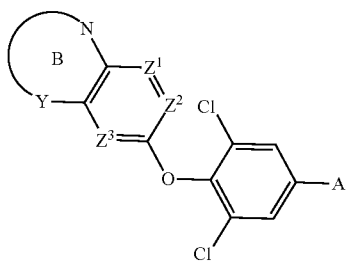

(I)

or a tautomer or an N-oxide thereof, or an isotopomer of each thereof, or a stereoisomer of the aforesaid, or a pharmaceutically acceptable salt of each of the foregoing, or a solvate of each of the preceding, wherein:

A is

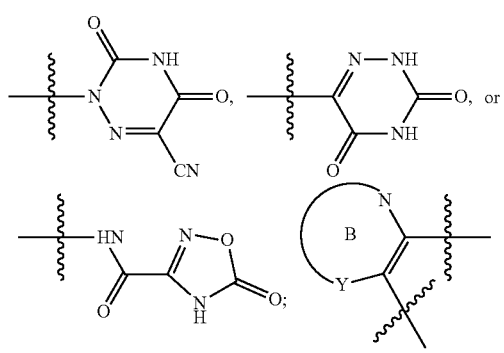

is 5-membered heterocyclyl or 5- to 6-membered heteroaryl, each of which optionally contains 1-2 additional annular heteroatoms selected from the group consisting of N and O,
  wherein each heteroatom of the heterocyclyl or heteroaryl is bound to one $R^1$ group if needed to complete the valency of the heteroatom, and
  wherein each carbon atom of the heterocyclyl or heteroaryl is bound to one $R^2$ group if needed to complete the valency of the carbon atom, provided that no more than one $R^2$ group is needed to complete the valency of each carbon atom;

$Z^1$, $Z^2$, and $Z^3$ are independently N or CH;

Y is N or C;

each $R^1$ is independently H, $C_1$-$C_6$ alkyl, or $C_3$-$C_6$ cycloalkyl, wherein each $C_1$-$C_6$ alkyl or $C_3$-$C_6$ cycloalkyl group is optionally substituted by 1-5 $R^3$ groups;

each $R^2$ is independently H, $C_1$-$C_6$ alkyl, $C_3$-$C_6$ cycloalkyl, —O($C_1$-$C_6$ alkyl), —O($C_3$-$C_6$ cycloalkyl), hydroxyl, or oxo,
  wherein each $C_1$-$C_6$ alkyl, $C_3$-$C_6$ cycloalkyl, —O($C_1$-$C_6$ alkyl), or —O($C_3$-$C_6$ cycloalkyl) group is optionally substituted by 1-5 $R^3$ groups;

or $R^1$ and $R^2$ are taken together to form a 5- to 6-membered heteroaryl or 5- to 7-membered heterocyclyl;

or two $R^2$ groups are taken together to form a 5- to 6-membered heteroaryl, 5- to 7-membered heterocyclyl, $C_5$-$C_7$ cycloalkyl, or $C_6$ aryl;

each $R^3$ is independently halogen, $C_1$-$C_6$ alkyl, $C_3$-$C_6$ cycloalkyl, $C_1$-$C_6$ haloalkyl, $C_1$-$C_6$ alkyl-OH, —$NH_2$, —CN, or hydroxyl.

In some embodiments, provided is a compound of formula (I), or a tautomer thereof, or a pharmaceutically acceptable salt of any of the foregoing. In some embodiments, the compound of formula (I) is a pharmaceutically acceptable salt thereof.

In some embodiments, A is

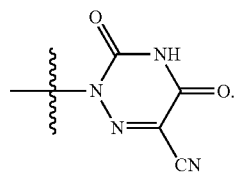 [SMILES: *n1nc(C#N)c(=O)[nH]c1=O]

In some embodiments, A is

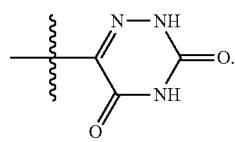 [SMILES: *c1n[nH]c(=O)[nH]c1=O]

In some embodiments, A is H

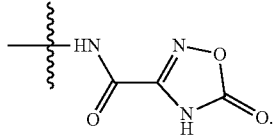 [SMILES: *NC(=O)c1noc(=O)[nH]1]

In some embodiments, the compound of formula (I) is a compound of formula (II):

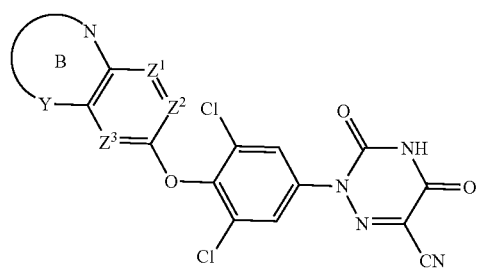

(II)

wherein B, Y, $Z^1$, $Z^2$, and $Z^3$ are as defined herein for formula (I).

In some embodiments, the compound of formula (I) is a compound of formula (III):

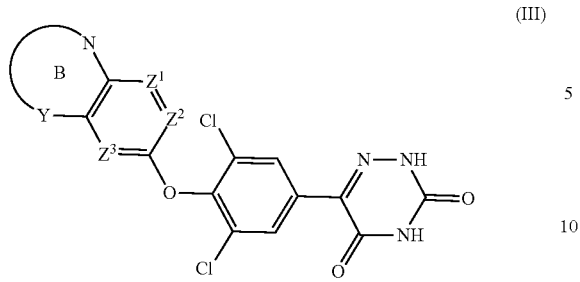

(III)

wherein B, Y, $Z^1$, $Z^2$, and $Z^3$ are as defined herein for formula (I).

In some embodiments, the compound of formula (I) is a compound of formula (IV):

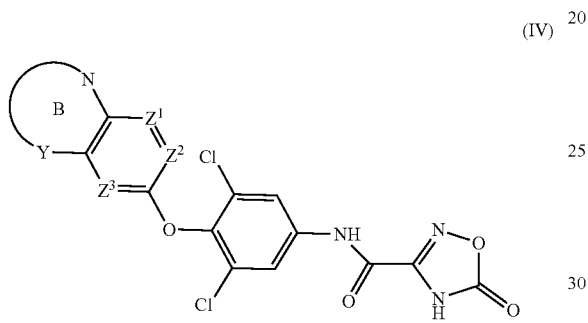

(IV)

wherein B, Y, $Z^1$, $Z^2$, and $Z^3$ are as defined herein for formula (I).

In some embodiments of a compound of formula (I) or any variation thereof, $Z^1$ is CH. In some embodiments, $Z^1$ is N.

In some embodiments of a compound of formula (I) or any variation thereof, $Z^2$ is CH. In some embodiments, $Z^2$ is N.

In some embodiments of a compound of formula (I) or any variation thereof, $Z^3$ is CH. In some embodiments, $Z^3$ is N.

In some embodiments a compound of formula (I) or any variation thereof, $Z^1$ is CH and $Z^2$ is CH. In some embodiments, $Z^1$ is CH and $Z^2$ is N. In some embodiments, $Z^1$ is N and $Z^2$ is CH. In some embodiments, $Z^1$ is N and $Z^2$ is N. In some embodiments, $Z^1$ is CH and $Z^3$ is CH. In some embodiments, $Z^1$ is CH and $Z^3$ is N. In some embodiments, $Z^1$ is N and $Z^3$ is CH. In some embodiments, $Z^1$ is N and $Z^3$ is N. In some embodiments, $Z^2$ is CH and $Z^3$ is CH. In some embodiments, $Z^2$ is CH and $Z^3$ is N. In some embodiments, $Z^2$ is N and $Z^3$ is CH. In some embodiments, $Z^2$ is N and $Z^3$ is N. In some embodiments, $Z^1$ is CH; $Z^2$ is CH; and $Z^3$ is CH. In some embodiments, $Z^1$ is CH; $Z^2$ is CH; and $Z^3$ is N. In some embodiments, $Z^1$ is CH; $Z^2$ is N; and $Z^3$ is N. In some embodiments, $Z^1$ is CH; $Z^2$ is N; and $Z^3$ is CH. In some embodiments, $Z^1$ is N; $Z^2$ is CH; and $Z^3$ is CH. In some embodiments, $Z^1$ is N; $Z^2$ is CH; and $Z^3$ is N. In some embodiments, $Z^1$ is N; $Z^2$ is N; and $Z^3$ is CH. In some embodiments, one of $Z^1$, $Z^2$, and $Z^3$ is N. In some embodiments, two of $Z^1$, $Z^2$, and $Z^3$ are N.

In some embodiments, the compound of formula (I) is a compound of any one of formulae (I-1) to (I-3), (II-1) to (II-3), (III-1) to (III-3), and (IV-1) to (IV-3):

(I-1)

(I-2)

(I-3)

(II-1)

(II-2)

(II-3)

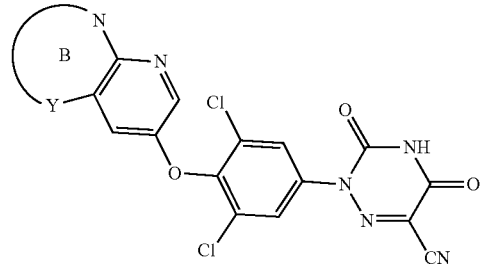

(III-1)

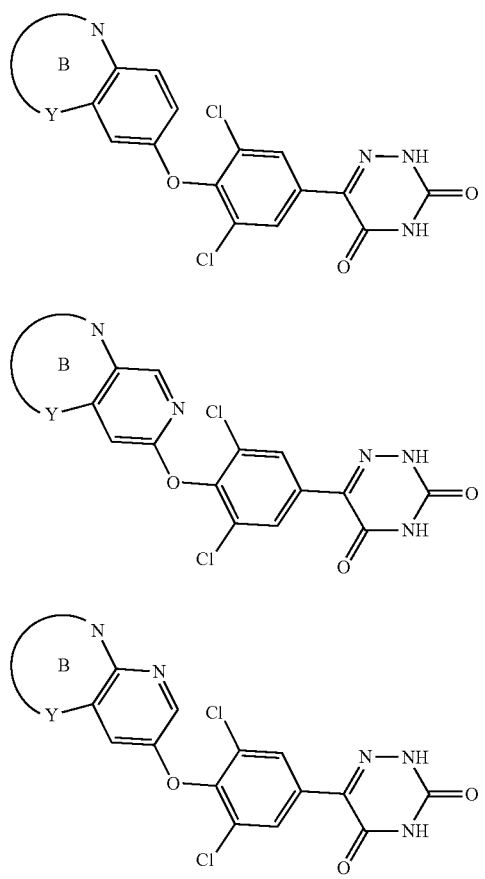

(III-2)

(III-3)

(IV-1)

(IV-2)

(IV-3)

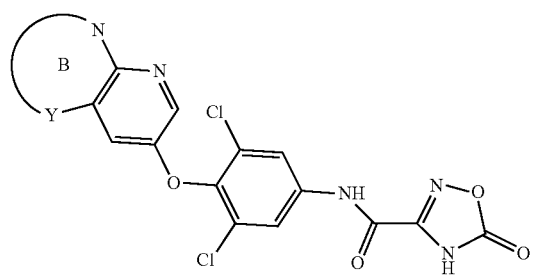

wherein A, B, Y are as defined herein for formula (I).

In some embodiments of a compound of formula (I), the compound is of formula (I-1). In some embodiments, the compound is of formula (I-2). In some embodiments, the compound is of formula (I-3). In some embodiments, the compound is of formula (II-1). In some embodiments, the compound is of formula (II-2). In some embodiments, the compound is of formula (II-3). In some embodiments, the compound is of formula (III-1). In some embodiments, the compound is of formula (III-2). In some embodiments, the compound is of formula (III-3). In some embodiments, the compound is of formula (IV-1). In some embodiments, the compound is of formula (IV-2). In some embodiments, the compound is of formula (IV-3).

In some embodiments of a compound of formula (I) or any variation thereof,

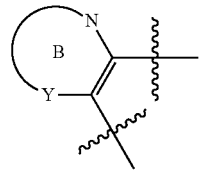

is 5-6 membered heteroaryl optionally containing 1-2 additional annular heteroatoms selected from the group consisting of N and O, wherein each heteroatom of the heteroaryl is bound to one $R^1$ group if needed to complete the valency of the heteroatom, and wherein each carbon atom of the heteroaryl is bound to one $R^2$ group if needed to complete the valency of the carbon atom, provided that no more than one $R^2$ group is needed to complete the valency of each carbon atom. In some embodiments,

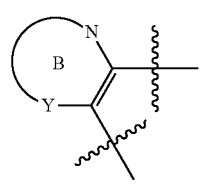

is 5-6 membered heteroaryl containing no additional annular heteroatoms. In some embodiments,

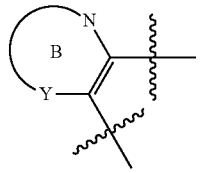

is 5-6 membered heteroaryl optionally containing 1-2 additional annular heteroatoms that are N. In some embodiments,

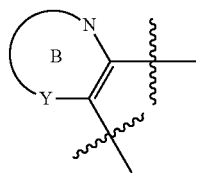

is 5-6 membered heteroaryl optionally containing 1 additional annular heteroatom that is N. In some embodiments,

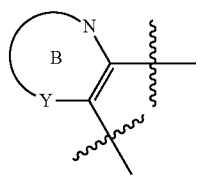

is 5-6 membered heteroaryl optionally containing 1 additional annular heteroatom that is O. In some embodiments,

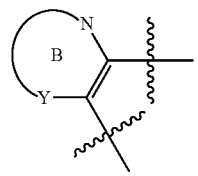

is 5-6 membered heteroaryl optionally containing 2 additional annular heteroatoms that are N. In some embodiments,

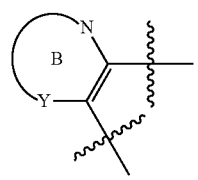

is 6-membered heteroaryl optionally containing 1-2 additional annular heteroatoms selected from the group consisting of N and O. In some embodiments,

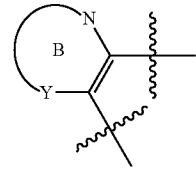

is 6-membered heteroaryl optionally containing 1-2 additional annular heteroatoms that are N. In some embodiments,

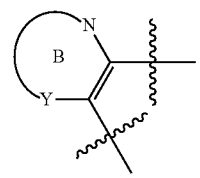

is 6-membered heteroaryl optionally containing 1 additional annular heteroatom that is N. In some embodiments,

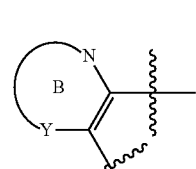

is 6-membered heteroaryl optionally containing 2 additional annular heteroatoms that are N. In some embodiments, is 5-membered heteroaryl optionally containing 1-2 additional annular heteroatoms that are N. In some embodiments,

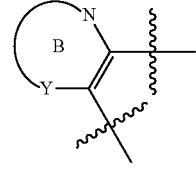

is 5-membered heteroaryl optionally containing 1 additional annular heteroatom that is N. In some embodiments,

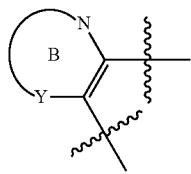

is 5-membered heteroaryl optionally containing 1 additional annular heteroatom that is O. In some embodiments,

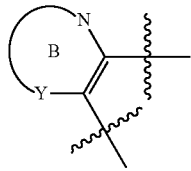

is 5-membered heteroaryl optionally containing 2 additional annular heteroatoms that are N.

In some embodiments of a compound of formula (I) or any variation thereof,

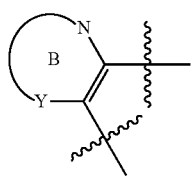

is 5-membered heterocyclyl optionally containing 1-2 additional annular heteroatoms selected from the group consisting of N and O, wherein each heteroatom of the heterocyclyl is bound to one R¹ group if needed to complete the valency of the heteroatom, and wherein each carbon atom of the heterocyclyl is bound to one R² group if needed to complete the valency of the carbon atom, provided that no more than one R² group is needed to complete the valency of each carbon atom. In some embodiments of a compound of formula (I) or any variation thereof,

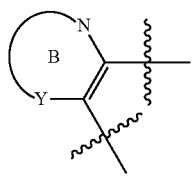

is 5-membered heterocyclyl containing no additional annular heteroatoms. In some embodiments,

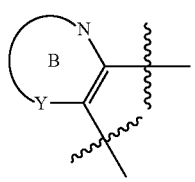

is 5-membered heterocyclyl optionally containing 1-2 additional annular heteroatoms that are N. In some embodiments,

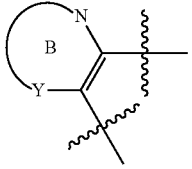

is 5-membered heterocyclyl optionally containing 1 additional annular heteroatom that is N. In some embodiments,

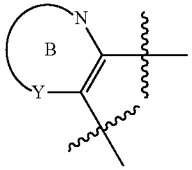

is 5-membered heterocyclyl optionally containing 1 additional annular heteroatom that is O. In some embodiments,

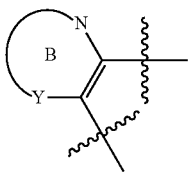

is 5-membered heterocyclyl optionally containing 2 additional annular heteroatoms that are N.

In some embodiments of a compound of formula (I) or any variation thereof, Y is N. In some embodiments,

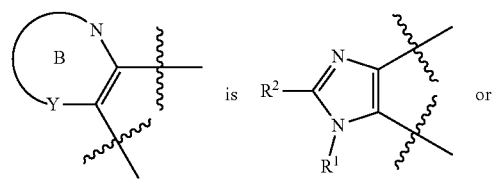

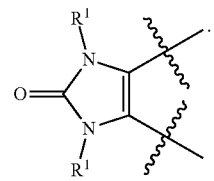

In some embodiments,
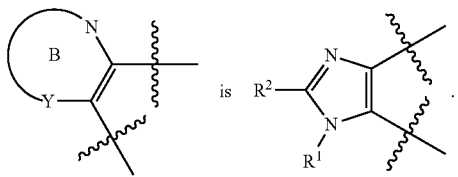
In some embodiments,
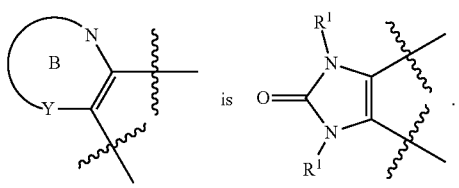
In some embodiments, Y is C. In some embodiments,
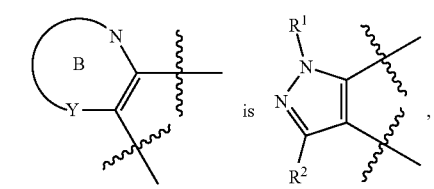
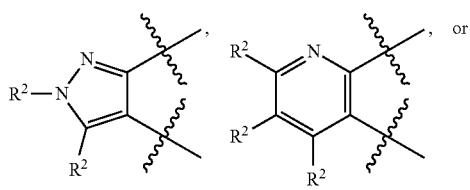
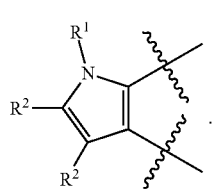
In some embodiments,
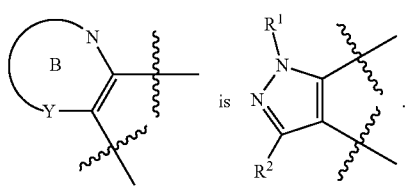
In some embodiments,
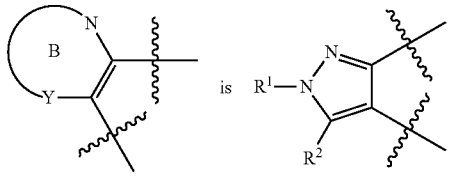
In some embodiments,
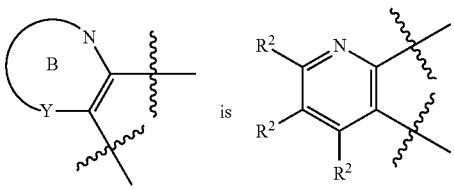
In some embodiments,
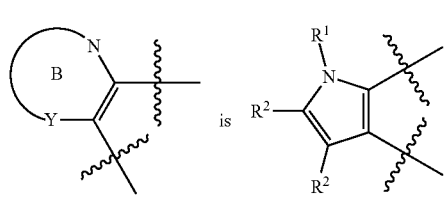
In some embodiments,
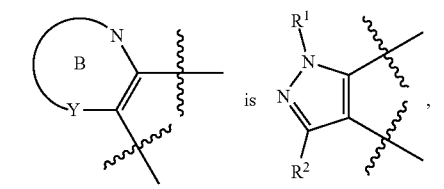
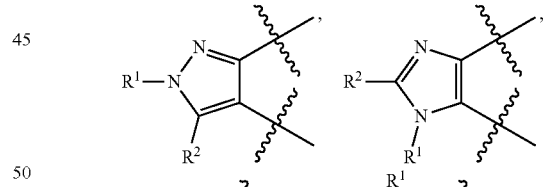
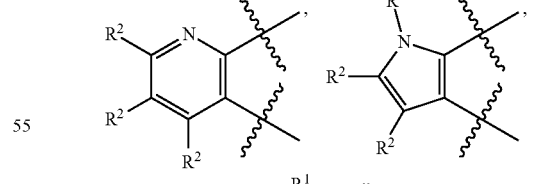
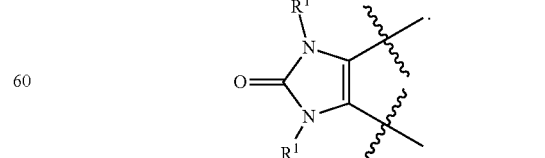
In some embodiments, the compound of formula (I) is a compound of any one of formulae (I-4) to (I-9), (II-4) to (II-9), (III-4) to (III-9), and (IV-4) to (IV-9).

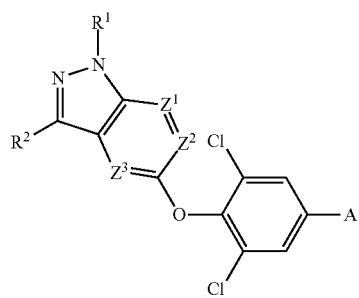
(I-4)
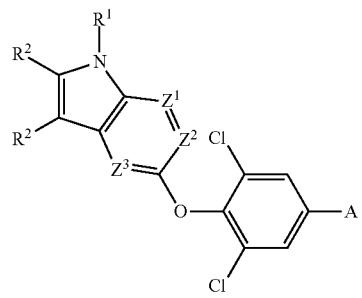
(I-9)
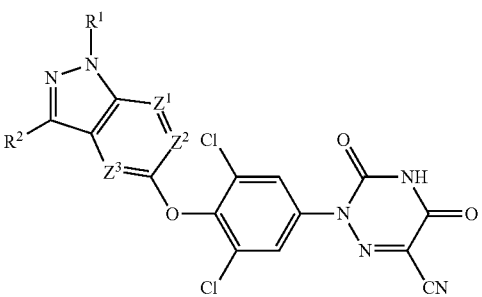
(II-4)
(I-5)
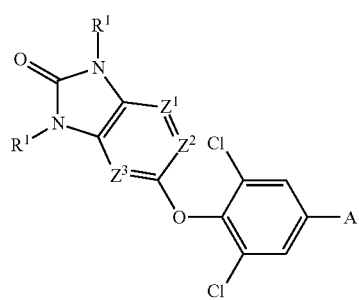
(I-6)
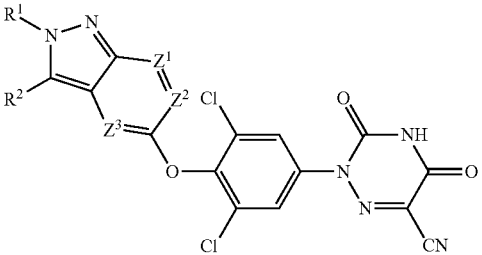
(II-5)
(I-7)
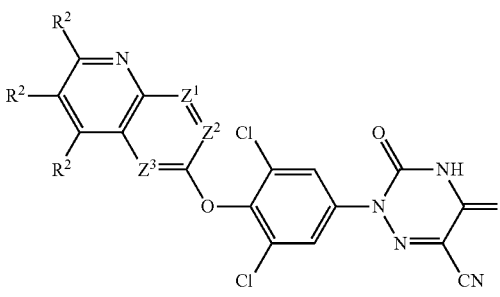
(II-6)
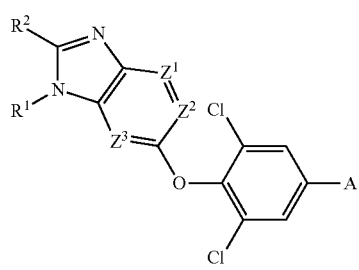
(I-8)
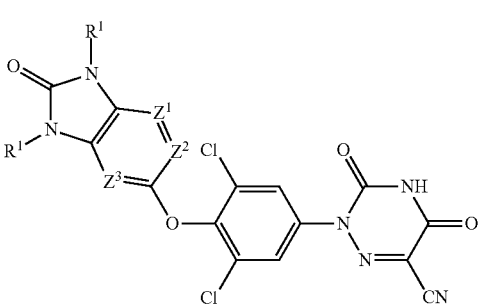
(II-7)

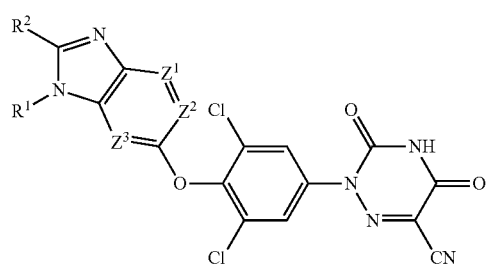
(II-8)
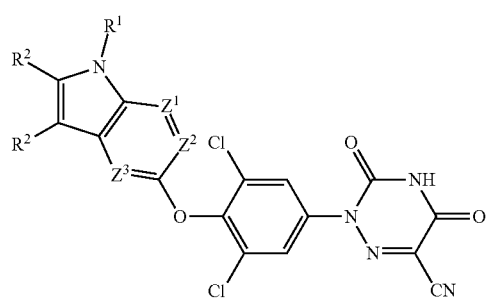
(II-9)
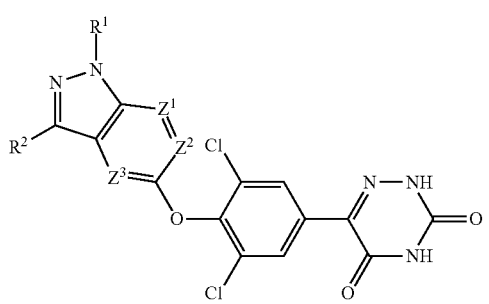
(III-4)
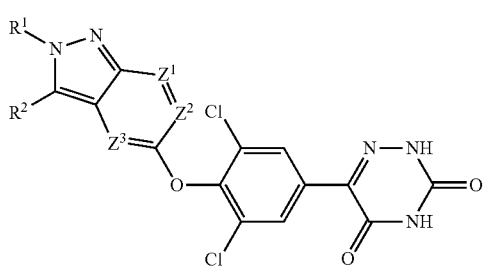
(III-5)
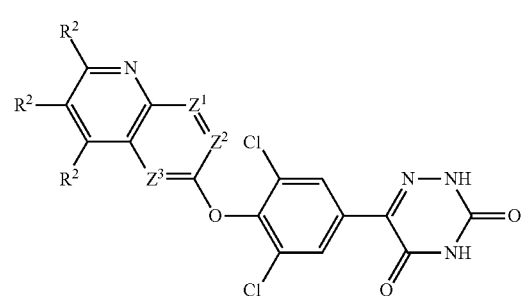
(III-6)
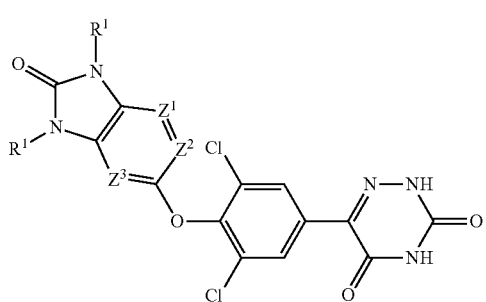
(III-7)
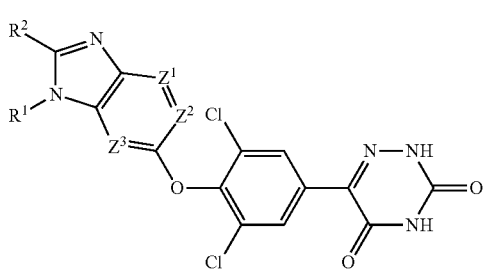
(III-8)
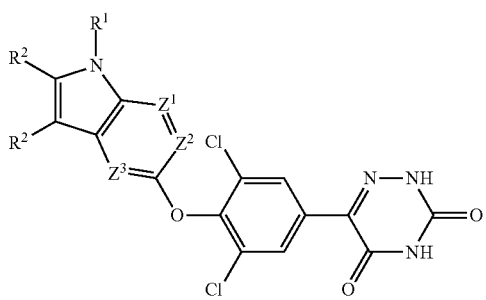
(III-9)
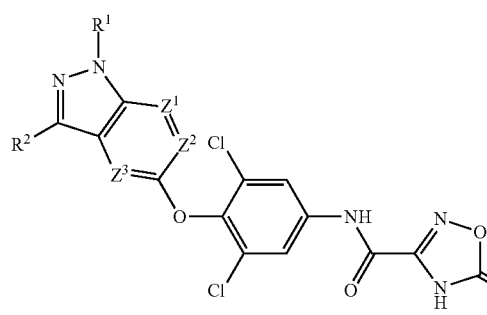
(IV-4)
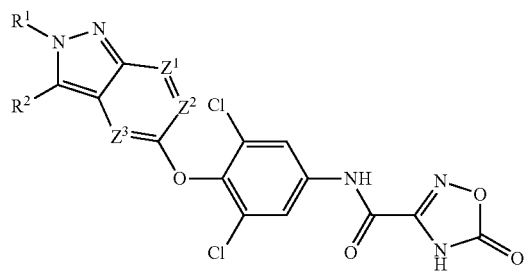
(IV-5)

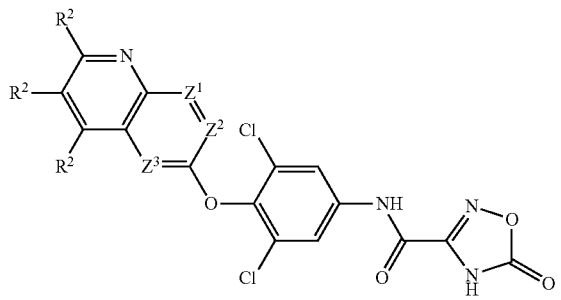
(IV-6)

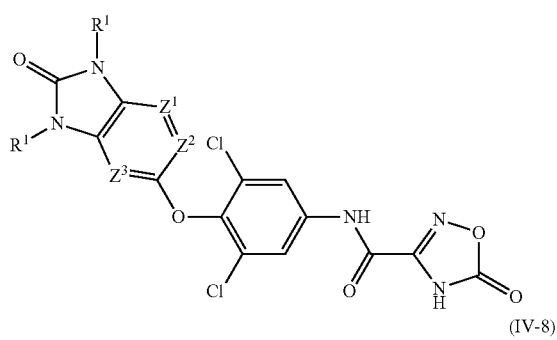
(IV-7)

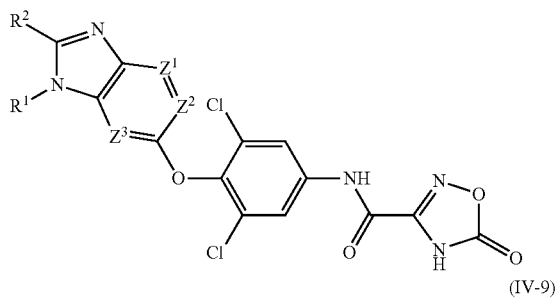
(IV-8)

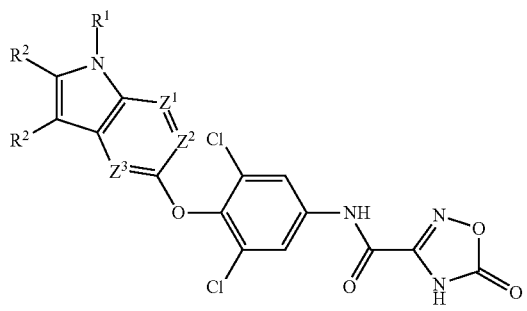
(IV-9)

wherein A, $Z^1$, $Z^2$, $Z^3$, $R^1$, and $R^2$ are as defined for formula (I).

In some embodiments of a compound of formula (I), the compound is of formula (I-4). In some embodiments, the compound is of formula (I-5). In some embodiments, the compound is of formula (I-6). In some embodiments, the compound is of formula (I-7). In some embodiments, the compound is of formula (I-8). In some embodiments, the compound is of formula (I-9). In some embodiments, the compound is of formula (II-4). In some embodiments, the compound is of formula (II-5). In some embodiments, the compound is of formula (II-6). In some embodiments, the compound is of formula (II-7). In some embodiments, the compound is of formula (II-8). In some embodiments, the compound is of formula (II-9). In some embodiments, the compound is of formula (III-4). In some embodiments, the compound is of formula (III-5). In some embodiments, the compound is of formula (III-6). In some embodiments, the compound is of formula (III-7). In some embodiments, the compound is of formula (III-8). In some embodiments, the compound is of formula (III-9). In some embodiments, the compound is of formula (IV-4). In some embodiments, the compound is of formula (IV-5). In some embodiments, the compound is of formula (IV-6). In some embodiments, the compound is of formula (IV-7). In some embodiments, the compound is of formula (IV-8). In some embodiments, the compound is of formula (IV-9).

In some embodiments of a compound of formula (I) or any variation thereof, each $R^1$ is independently H, $C_1$-$C_3$ alkyl, or $C_3$-$C_5$ cycloalkyl, wherein each $C_1$-$C_3$ alkyl or $C_3$-$C_5$ cycloalkyl group is optionally substituted by 1-3 $R^3$ groups. In some embodiments, each $R^1$ is independently H, —$CH_3$, or —$CH_2CH_3$. In some embodiments, each $R^1$ is independently H, cyclopropyl, —$CH_3$, —$CH(CH_3)_2$, t-butyl, or —$CH_2CH_3$. In some embodiments, where $R^1$ is present, at least one $R^1$ is H. In some embodiments, where $R^1$ is present, at least one $R^1$ is $C_1$-$C_6$ alkyl which is optionally substituted by 1-5 $R^3$ groups. In some embodiments, where $R^1$ is present, at least one $R^1$ is $C_1$-$C_6$ alkyl which is unsubstituted. In some embodiments, where $R^1$ is present, at least one $R^1$ is $C_1$-$C_3$ alkyl which is optionally substituted by 1-3 $R^3$ groups. In some embodiments, where $R^1$ is present, at least one $R^1$ is $C_1$-$C_3$ alkyl which is unsubstituted. In some embodiments, where $R^1$ is present, at least one $R^1$ is —$CH_3$ or —$CH_2CH_3$. In some embodiments, where $R^1$ is present, at least one $R^1$ is —$CH_3$, —$CH(CH_3)_2$, t-butyl, or —$CH_2CH_3$. In some embodiments, where $R^1$ is present, at least one $R^1$ is —$CH_3$. In some embodiments, where $R^1$ is present, at least one $R^1$ is —$CH_2CH_3$. In some embodiments, where $R^1$ is present, at least one $R^1$ is —$CH(CH_3)_2$. In some embodiments, where $R^1$ is present, at least one $R^1$ is t-butyl. In some embodiments, where $R^1$ is present, at least one $R^1$ is $C_3$-$C_6$ cycloalkyl which is optionally substituted by 1-5 $R^3$ groups. In some embodiments, where $R^1$ is present, at least one $R^1$ is $C_3$-$C_6$ cycloalkyl which is unsubstituted. In some embodiments, where $R^1$ is present, at least one $R^1$ is $C_3$-$C_5$ cycloalkyl which is optionally substituted by 1-3 $R^3$ groups. In some embodiments, where $R^1$ is present, at least one $R^1$ is $C_3$-$C_5$ cycloalkyl which is unsubstituted. In some embodiments, where $R^1$ is present, at least one $R^1$ is cyclopropyl. In some embodiments, where $R^1$ is present, at least one $R^1$ is cyclopropyl which is substituted by 1 $R^3$ group. In some embodiments, where $R^1$ is present, at least one $R^1$ is cyclopropyl which is substituted by 1 $R^3$ group, wherein the $R^3$ group is $C_1$-$C_6$ alkyl or $C_1$-$C_6$ haloalkyl. In some embodiments, where $R^1$ is present, at least one $R^1$ is

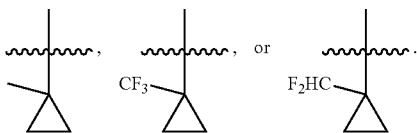

In some embodiments, where $R^1$ is present, at least one $R^1$ is

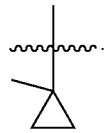

In some embodiments, where $R^1$ is present, at least one $R^1$ is

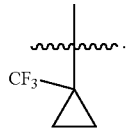

In some embodiments, where $R^1$ is present, at least one $R^1$ is

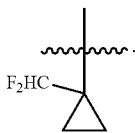

In some embodiments of a compound of formula (I) or any variation thereof, each $R^2$ is independently H, $C_1$-$C_3$ alkyl, $C_3$-$C_5$ cycloalkyl, —O($C_1$-$C_3$ alkyl), —O($C_3$-$C_5$ cycloalkyl), hydroxyl, or oxo, wherein each $C_1$-$C_3$ alkyl, $C_3$-$C_5$ cycloalkyl, —O($C_1$-$C_3$ alkyl), or —O($C_3$-$C_5$ cycloalkyl) group is optionally substituted by 1-3 $R^3$ groups. In some embodiments, each $R^2$ is independently H, $C_1$-$C_3$ alkyl, $C_3$-$C_5$ cycloalkyl, —O($C_1$-$C_3$ alkyl), or oxo, wherein each $C_1$-$C_3$ alkyl, $C_3$-$C_5$ cycloalkyl, or —O($C_1$-$C_3$ alkyl) group is optionally substituted by 1-3 $R^3$ groups. In some embodiments, each $R^2$ is independently H, —CH$_3$, —CH$_2$CH$_3$, —OCH$_3$, or oxo. In some embodiments, each $R^2$ is independently H, —CH$_3$, —CH$_2$CH$_3$, —OCH$_3$, cyclopropyl, or oxo. In some embodiments, where $R^2$ is present, at least one $R^2$ is H. In some embodiments, where $R^2$ is present, at least one $R^2$ is $C_1$-$C_6$ alkyl which is optionally substituted by 1-5 $R^3$ groups. In some embodiments, where $R^2$ is present, at least one $R^2$ is $C_1$-$C_6$ alkyl which is unsubstituted. In some embodiments, where $R^2$ is present, at least one $R^2$ is $C_1$-$C_3$ alkyl which is optionally substituted by 1-3 $R^3$ groups. In some embodiments, where $R^2$ is present, at least one $R^2$ is $C_1$-$C_3$ alkyl which is unsubstituted. In some embodiments, where $R^2$ is present, at least one $R^2$ is —CH$_3$ or —CH$_2$CH$_3$. In some embodiments, where $R^2$ is present, at least one $R^2$ is —CH$_3$. In some embodiments, where $R^2$ is present, at least one $R^2$ is —CH$_2$CH$_3$. In some embodiments, where $R^2$ is present, at least one $R^2$ is $C_3$-$C_6$ cycloalkyl which is optionally substituted by 1-5 $R^3$ groups. In some embodiments, where $R^2$ is present, at least one $R^2$ is $C_3$-$C_6$ cycloalkyl which is unsubstituted. In some embodiments, where $R^2$ is present, at least one $R^2$ is $C_3$-$C_5$ cycloalkyl which is optionally substituted by 1-3 $R^3$ groups. In some embodiments, where $R^2$ is present, at least one $R^2$ is $C_3$-$C_5$ cycloalkyl which is unsubstituted. In some embodiments, where $R^2$ is present, at least one $R^2$ is cyclopropyl. In some embodiments, where $R^2$ is present, at least one $R^2$ is —O($C_1$-$C_6$ alkyl) which is optionally substituted by 1-5 $R^3$ groups. In some embodiments, where $R^2$ is present, at least one $R^2$ is —O($C_1$-$C_6$ alkyl) which is unsubstituted. In some embodiments, where $R^2$ is present, at least one $R^2$ is —O($C_1$-$C_3$ alkyl) which is optionally substituted by 1-3 $R^3$ groups. In some embodiments, where $R^2$ is present, at least one $R^2$ is —O($C_1$-$C_3$ alkyl) which is unsubstituted. In some embodiments, where $R^2$ is present, at least one $R^2$ is —OCH$_3$. In some embodiments, where $R^2$ is present, at least one $R^2$ is —O($C_3$-$C_6$ cycloalkyl) which is optionally substituted by 1-5 $R^3$ groups. In some embodiments, where $R^2$ is present, at least one $R^2$ is —O($C_3$-$C_6$ cycloalkyl) which is unsubstituted. In some embodiments, where $R^2$ is present, at least one $R^2$ is —O($C_3$-$C_5$ cycloalkyl) which is optionally substituted by 1-3 $R^3$ groups. In some embodiments, where $R^2$ is present, at least one $R^2$ is —O($C_3$-$C_5$ cycloalkyl) which is unsubstituted. In some embodiments, where $R^2$ is present, at least one $R^2$ is hydroxyl. In some embodiments, where $R^2$ is present, at least one $R^2$ is oxo.

In some embodiments of a compound of formula (I) or any variation thereof, $R^1$ and $R^2$ are taken together to form a 5- to 6-membered heteroaryl or 5- to 7-membered heterocyclyl. In some embodiments, $R^1$ and $R^2$ are taken together to form a 5- to 6-membered heteroaryl, such as pyridinyl, pyrazinyl, pyridazinyl, pyrimidinyl, triazinyl, pyrrolyl, pyrazolyl, imidazolyl, triazolyl, tetrazolyl, oxazolyl, thiazolyl, thiazolyl, or furanyl. In some embodiments, $R^1$ and $R^2$ are taken together to form a 5-membered heteroaryl. In some embodiments, $R^1$ and $R^2$ are taken together to form a 6-membered heteroaryl. In some embodiments, $R^1$ and $R^2$ are taken together to form a 5- to 7-membered heterocyclyl, such as such as tetrahydrofuranyl, pyrrolidinyl, piperidinyl, piperazinyl, morpholinyl, azepanyl, oxazinanyl, or thiomorpholinyl. In some embodiments, $R^1$ and $R^2$ are taken together to form a 5- to 6-membered heterocyclyl. In some embodiments, $R^1$ and $R^2$ are taken together to form a 5-membered heterocyclyl. In some embodiments, $R^1$ and $R^2$ are taken together to form a 6-membered heterocyclyl. In some embodiments, $R^1$ and $R^2$ are taken together to form a 7-membered heterocyclyl. In some embodiments, $R^1$ and $R^2$ are taken together to form.

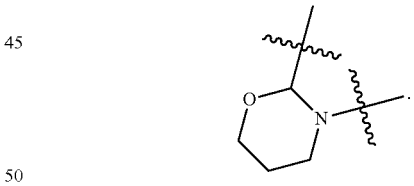

In some embodiments of a compound of formula (I) or any variation thereof, two $R^2$ groups are taken together to form a 5- to 6-membered heteroaryl, 5- to 7-membered heterocyclyl, $C_5$-$C_7$ cycloalkyl, or $C_6$ aryl. In some embodiments, two $R^2$ groups are taken together to form a 5- to 6-membered heteroaryl, such as pyridinyl, pyrazinyl, pyridazinyl, pyrimidinyl, triazinyl, pyrrolyl, pyrazolyl, imidazolyl, triazolyl, tetrazolyl, oxazolyl, thiazolyl, thiazolyl, or furanyl. In some embodiments, two $R^2$ groups are taken together to form a 5-membered heteroaryl. In some embodiments, two $R^2$ groups are taken together to form a 6-membered heteroaryl. In some embodiments, two $R^2$ groups are taken together to form a 5- to 7-membered heterocyclyl, such as such as tetrahydrofuranyl, pyrrolidinyl, piperidinyl, piperazinyl, morpholinyl, azepanyl, or thiomorpholinyl. In some embodiments, two $R^2$ groups are taken together to form a 5- to 6-membered heterocyclyl. In some embodiments, two $R^2$ groups are taken together to form a 5-membered heterocyclyl. In some embodiments, two $R^2$ groups are taken together to form a 6-membered heterocyclyl. In some embodiments, two $R^2$ groups are taken together to form a 7-membered heterocyclyl. In some embodiments, two $R^2$ are taken together to form a $C_5$-$C_7$ cycloalkyl. In some embodiments, two $R^2$ are taken together to form a $C_5$-$C_6$ cycloalkyl. In some embodiments, two $R^2$ are taken together to form a $C_5$ cycloalkyl. In some embodiments, two $R^2$ are taken together to form a $C_6$ cycloalkyl. In some embodiments, two $R^2$ are taken together to form a $C_7$ cycloalkyl. In some embodiments, two $R^2$ are taken together to form $C_6$ aryl.

In some embodiments of a compound of formula (I), each $R^3$, where present, is independently halogen, $C_1$-$C_3$ alkyl, $C_1$-$C_3$ haloalkyl, $C_1$-$C_3$ alkyl-OH, —$NH_2$, —CN, or hydroxyl. In some embodiments, each $R^3$, where present, is independently Cl, F, —$CH_3$, —$CF_3$, —$CHF_2$, —$CH_2OH$, —$NH_2$, —CN, or hydroxyl. In some embodiments, where $R^3$ is present, at least one $R^3$ is halogen, such as Cl or F. In some embodiments, where $R^3$ is present, at least one $R^3$ is $C_1$. In some embodiments, where $R^3$ is present, at least one $R^3$ is F. In some embodiments, where $R^3$ is present, at least one $R^3$ is $C_1$-$C_3$ alkyl, such as —$CH_3$, —$CH_2CH_3$, —$CH_2CH_2CH_3$, or —$CH(CH_3)_2$. In some embodiments, where $R^3$ is present, at least one $R^3$ is —$CH_3$. In some embodiments, where $R^3$ is present, at least one $R^3$ is $C_3$-$C_6$ cycloalkyl. In some embodiments, where $R^3$ is present, at least one $R^3$ is $C_1$-$C_3$ haloalkyl. In some embodiments, where $R^3$ is present, at least one $R^3$ is $C_1$-$C_3$ haloalkyl having 1-3 halogen atoms. In some embodiments, where $R^3$ is present, at least one $R^3$ is $C_1$-$C_3$ haloalkyl having 1 halogen atom. In some embodiments, where $R^3$ is present, at least one $R^3$ is $C_1$-$C_3$ haloalkyl having 2 halogen atoms. In some embodiments, where $R^3$ is present, at least one $R^3$ is $C_1$-$C_3$ haloalkyl having 3 halogen atoms. In some embodiments, where $R^3$ is present, at least one $R^3$ is —$CF_3$. In some embodiments, where $R^3$ is present, at least one $R^3$ is —$CHF_2$. In some embodiments, where $R^3$ is present, at least one $R^3$ is $C_1$-$C_3$ alkyl-OH. In some embodiments, where $R^3$ is present, at least one $R^3$ is —$CH_2OH$. In some embodiments, where $R^3$ is present, at least one $R^3$ is —$NH_2$. In some embodiments, where $R^3$ is present, at least one $R^3$ is —CN. In some embodiments, where $R^3$ is present, at least one $R^3$ is hydroxyl.

In some embodiments of a compound of formula (I),

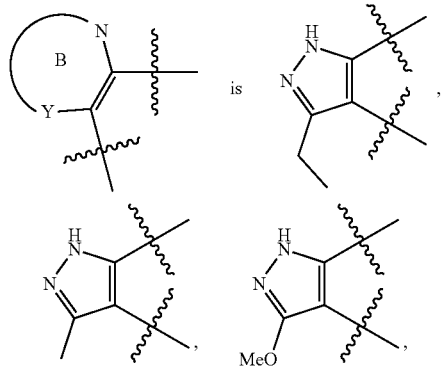

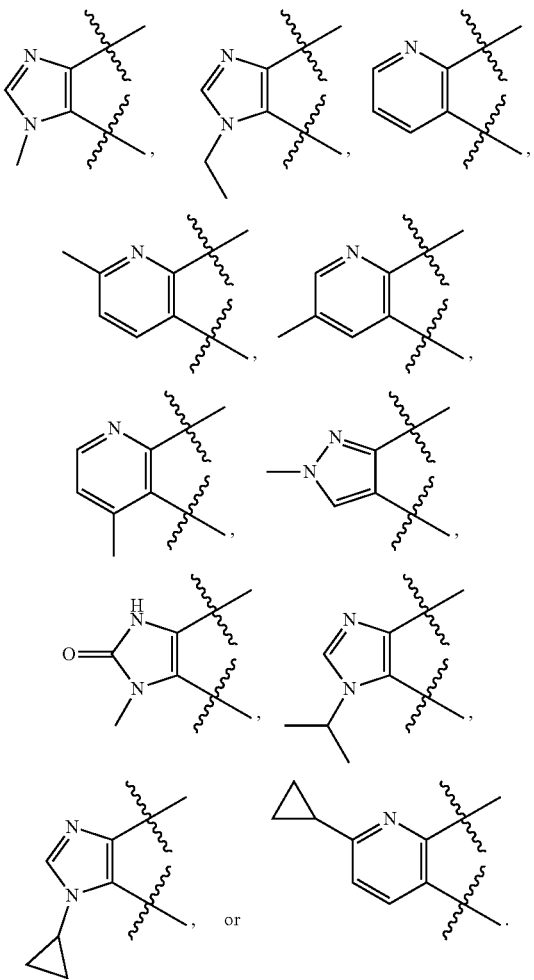

In other embodiments of a compound of formula (I),

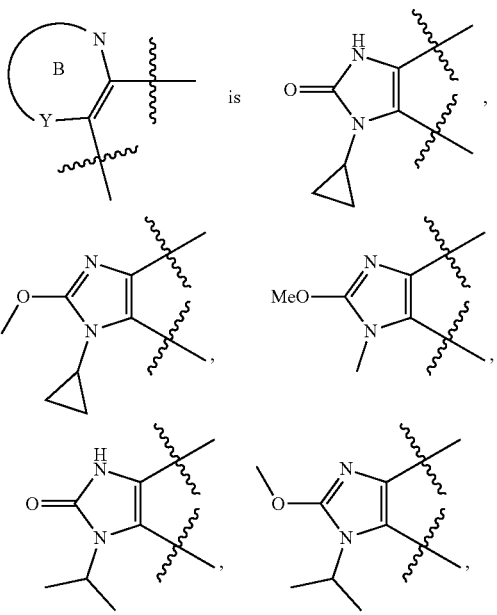

-continued

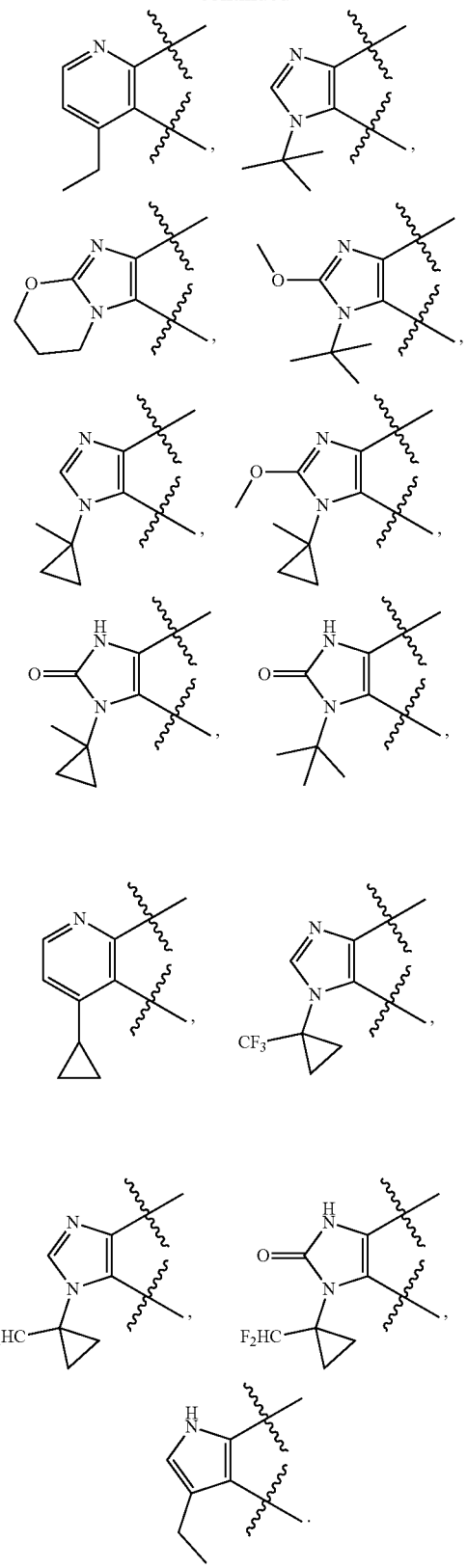

(I) A is

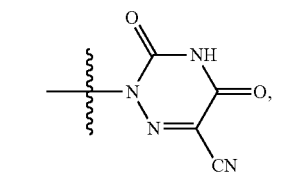 (i)

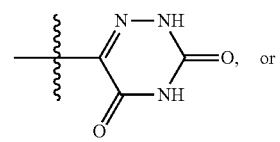 (ii)

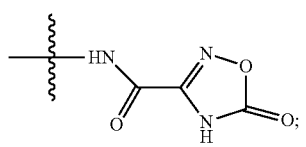 (iii)

(II) the combination of $Z^1$, $Z^2$, $Z^3$ is
  (iv) $Z^1$, $Z^2$, $Z^3$ are each CH,
  (v) $Z^1$ is N and $Z^2$ and $Z^3$ are each CH, or
  (vi) $Z^2$ is N and $Z^1$ and $Z^3$ are each CH;

(III)

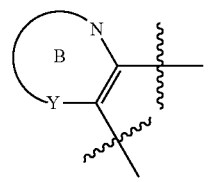

is
(vii) 5- to 6-membered heteroaryl optionally containing 1-2 additional annular heteroatoms selected from group consisting of N and O, such as

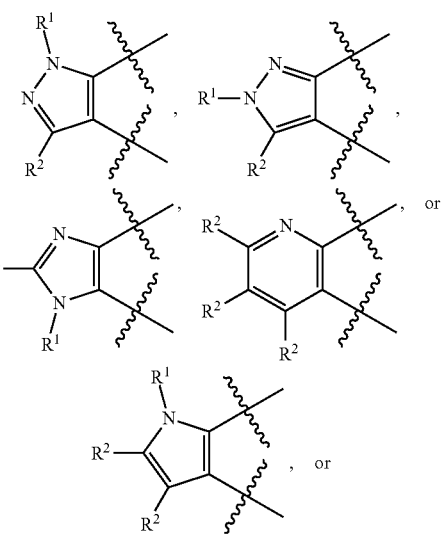

In one some embodiments, provided is a compound of formula (I) or any variation thereof, wherein the compound has any one or more of the following features:

(viii) is 5-membered heterocyclyl optionally containing 1-2 additional annular heteroatoms selected from group consisting of N and O, such as

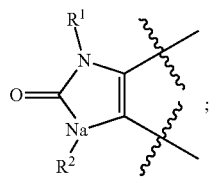

(IV) each $R^1$ is independently H, $C_1$-$C_3$ alkyl, or $C_3$-$C_5$ cycloalkyl, wherein each $C_1$-$C_3$ alkyl or $C_3$-$C_5$ cycloalkyl group is optionally substituted by 1-3 $R^3$ groups;

(V) each $R^2$ is independently H, $C_1$-$C_3$ alkyl, $C_3$-$C_5$ cycloalkyl, —O($C_1$-$C_3$ alkyl), or oxo, wherein each $C_1$-$C_3$ alkyl, $C_3$-$C_5$ cycloalkyl, or —O($C_1$-$C_3$ alkyl) group is optionally substituted by 1-3 $R^3$ groups.

In some embodiments, (II) applies. In some embodiments, (IV) applies. In some embodiments, (V) applies. In some embodiments, (i) applies. In some embodiments, (ii) applies. In some embodiments, (iii) applies. In some embodiments, (iv) applies. In some embodiments, (v) applies. In some embodiments, (vi) applies. In some embodiments, (vii) applies. In some embodiments, (viii) applies. In some embodiments, (i) and (II) apply. In some embodiments, (ii) and (II) apply. In some embodiments, (iii) and (II) apply. In some embodiments, (vii) and (II) apply. In some embodiments, (viii) and (II) apply. In some embodiments, (iv) and (vii) apply. In some embodiments, (iv) and (viii) apply. In some embodiments, (v) and (vii) apply. In some embodiments, (v) and (viii) apply. In some embodiments, (vi) and (vii) apply. In some embodiments, (vi) and (viii) apply. In some embodiments, (I), (II), (III), (IV), and (V) apply. In some embodiments, (i), (II), (III), (IV), and (V) apply. In some embodiments, (ii), (II), (III), (IV), and (V) apply. In some embodiments, (iii), (II), (III), (IV), and (V) apply. In some embodiments, (I), (iv), (III), (IV), and (V) apply. In some embodiments, (I), (v), (III), (IV), and (V) apply. In some embodiments, (I), (vi), (III), (IV), and (V) apply. In some embodiments, (I), (II), (vii), (IV), and (V) apply. In some embodiments, (I), (II), (viii), (IV), and (V) apply.

In some embodiments, the compound of formula (I) is an agonist of THR beta. In some embodiments, the compound of formula (I) is an agonist of THR beta and is selective over THR alpha. In some embodiments, the compound of formula (I) has at least 2-fold selectivity for THR beta over THR alpha. In some embodiments, the compound of formula (I) has at least 5-fold selectivity for THR beta over THR alpha. In some embodiments, the compound of formula (I) has at least 10-fold selectivity for THR beta over THR alpha. In some embodiments, the compound of formula (I) has at least 20-fold selectivity for THR beta over THR alpha. In some embodiments, the compound of formula (I) has at least 50-fold selectivity for THR beta over THR alpha. In some embodiments, the compound of formula (I) has at least 75-fold selectivity for THR beta over THR alpha. In some embodiments, the compound of formula (I) has at least 100-fold selectivity for THR beta over THR alpha. In some embodiments, the compound of formula (I) has at least 2-, 3-, 4-, 5-, 6-, 7-, 8-, 9-, 10-, 15-, 20-, 25-, 30-, 35-, 40-, 45-, 50-, 55-, 60-, 65-, 70-, 75-, 80-, 85-, 90-, 95-, or 100-fold selectivity for THR beta over THR alpha. In any such embodiment, in one aspect selectivity is assessed via a biochemical assay, such as the TR-FRET assay described in Example B1. In some embodiments, in another aspect selectivity is assessed via a biochemical assay, such as the RXR heterodimer assay described in Example B2.

In the descriptions herein, it is understood that every description, variation, embodiment or aspect of a moiety may be combined with every description, variation, embodiment or aspect of other moieties the same as if each and every combination of descriptions is specifically and individually listed. For example, every description, variation, embodiment or aspect provided herein with respect to A of formula (I) may be combined with every description, variation, embodiment or aspect of $Z^1$, $Z^2$, $Z^3$, $R^1$, $R^2$, $R^3$, B, and Y the same as if each and every combination were specifically and individually listed. It is also understood that all descriptions, variations, embodiments or aspects of formula (I), where applicable, apply equally to other formulae detailed herein, and are equally described, the same as if each and every description, variation, embodiment or aspect were separately and individually listed for all formulae. For example, it is understood that, all descriptions, variations, embodiments or aspects of formula (I), where applicable, apply equally to any of formulae as detailed herein, such as formulae (I-1) to (I-9), (II), (II-1) to (II-9), (III), (III-1) to (III-9), (IV), (IV-1) to (IV-9), and are equally described, the same as if each and every description, variation, embodiment or aspect were separately and individually listed for all formulae.

In some embodiments, provided is a compound selected from the compounds in Table 1, or pharmaceutically acceptable salt thereof. Although certain compounds described in the present disclosure, including in Table 1, are presented as specific stereoisomers and/or in a non-stereochemical form, it is understood that any or all stereochemical forms, including any enantiomeric or diastereomeric forms, and any tautomers or other forms of any of the compounds of the present disclosure, including in Table 1, are herein described.

In one embodiment, provided herein is a compound selected from those tabulated below in Table 1:

TABLE 1

| Example | Structure |
|---------|-----------|
| 1 | |

TABLE 1-continued
| Example | Structure |
|---------|-----------|
| 2 | 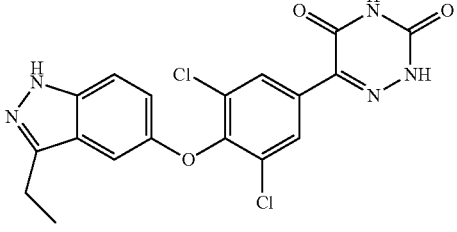 |
| 3 | 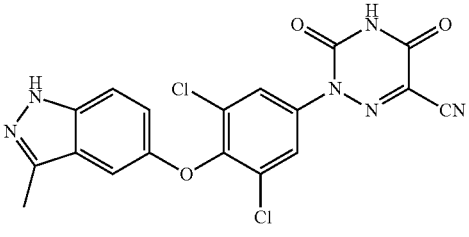 [SMILES: Cc1n[nH]c2ccc(Oc3c(Cl)cc(-n4nc(C#N)c(=O)[nH]c4=O)cc3Cl)cc12] |
| 4 | 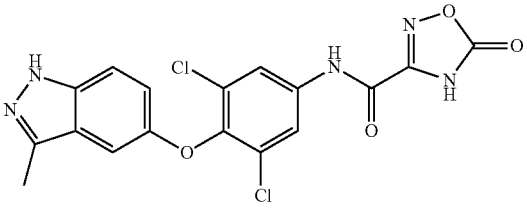 [SMILES: Cc1n[nH]c2ccc(Oc3c(Cl)cc(NC(=O)c4noc(=O)[nH]4)cc3Cl)cc12] |
| 5 | 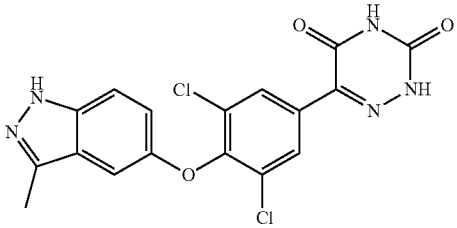 [SMILES: Cc1n[nH]c2ccc(Oc3c(Cl)cc(-c4n[nH]c(=O)[nH]c4=O)cc3Cl)cc12] |
| 6 | 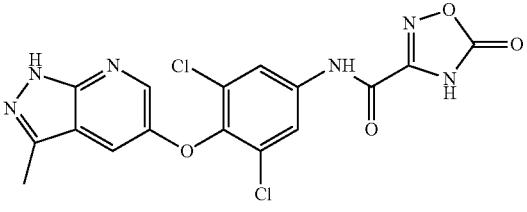 [SMILES: Cc1n[nH]c2ncc(Oc3c(Cl)cc(NC(=O)c4noc(=O)[nH]4)cc3Cl)cc12] |
| 7 | 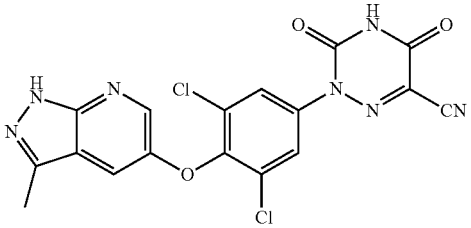 [SMILES: Cc1n[nH]c2ncc(Oc3c(Cl)cc(-n4nc(C#N)c(=O)[nH]c4=O)cc3Cl)cc12] |
| 8 | 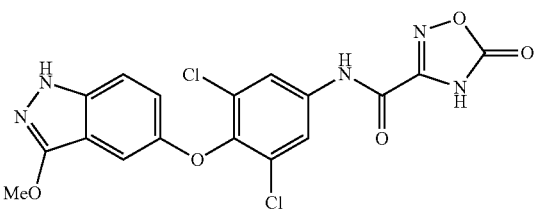 [SMILES: COc1n[nH]c2ccc(Oc3c(Cl)cc(NC(=O)c4noc(=O)[nH]4)cc3Cl)cc12] |

TABLE 1-continued
| Example | Structure |
|---|---|
| 9 | 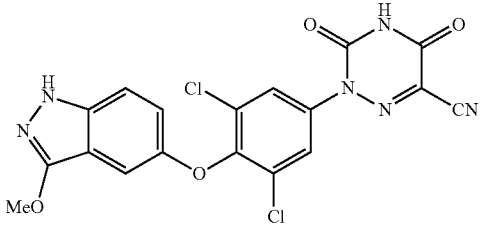 [SMILES: COc1n[nH]c2ccc(Oc3c(Cl)cc(-n4nc(C#N)c(=O)[nH]c4=O)cc3Cl)cc12] |
| 10 | 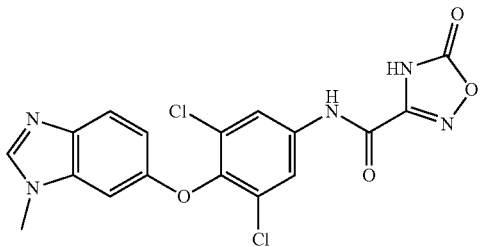 [SMILES: Cn1cnc2ccc(Oc3c(Cl)cc(NC(=O)c4noc(=O)[nH]4)cc3Cl)cc21] |
| 11 | 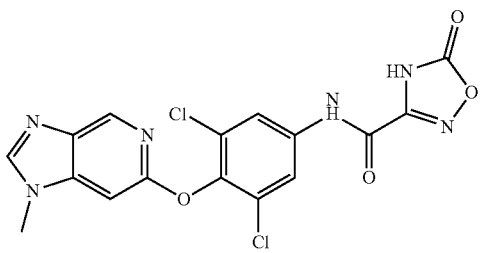 [SMILES: Cn1cnc2cnc(Oc3c(Cl)cc(NC(=O)c4noc(=O)[nH]4)cc3Cl)cc21] |
| 12 | 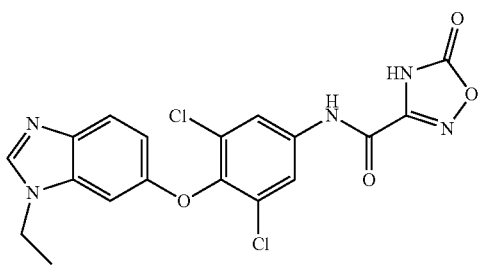 [SMILES: CCn1cnc2ccc(Oc3c(Cl)cc(NC(=O)c4noc(=O)[nH]4)cc3Cl)cc21] |
| 13 | 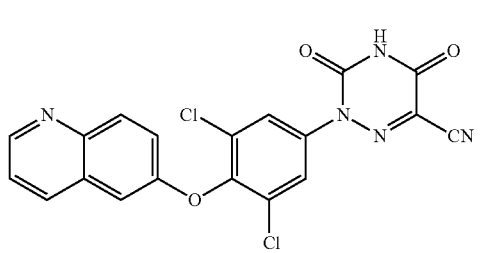 [SMILES: N#Cc1nn(-c2cc(Cl)c(Oc3ccc4ncccc4c3)c(Cl)c2)c(=O)[nH]c1=O] |
| 14 | 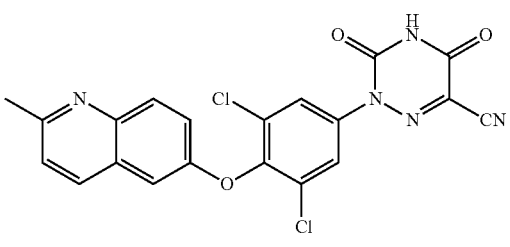 [SMILES: Cc1ccc2cc(Oc3c(Cl)cc(-n4nc(C#N)c(=O)[nH]c4=O)cc3Cl)ccc2n1] |

TABLE 1-continued

| Example | Structure |
|---|---|
| 15 | |
| 16 | |
| 17 | |
| 18 | |
| 19 | |
| 20 | |

TABLE 1-continued

| Example | Structure |
|---|---|
| 21 | |
| 22 | |
| 23 | |
| 24 | |
| 25 | |
| 26 | |

TABLE 1-continued

| Example | Structure |
|---|---|
| 27 | |
| 28 | |
| 29 | |
| 30 | |
| 31 | |
| 32 | |

TABLE 1-continued

| Example | Structure |
|---|---|
| 33 | |
| 34 | |
| 35 | |
| 36 | |
| 37 | |
| 38 | |

TABLE 1-continued

| Example | Structure |
|---|---|
| 39 | |
| 40 | |
| 41 | |
| 42 | |
| 43 | |
| 44 | |

TABLE 1-continued

| Example | Structure |
|---|---|
| 45 | |
| 46 | |
| 47 | |
| 48 | |
| 49 | |
| 50 | |

TABLE 1-continued
| Example | Structure |
|---|---|
| 51 | 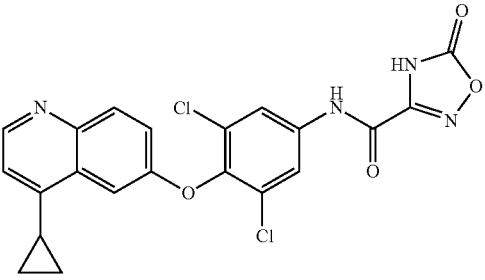 |
| 52 | 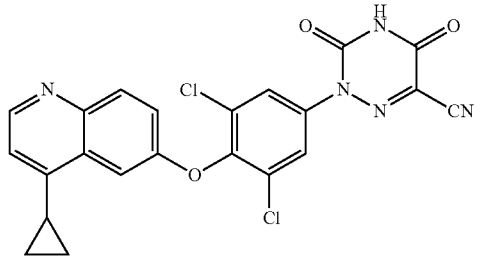 |
| 53 | 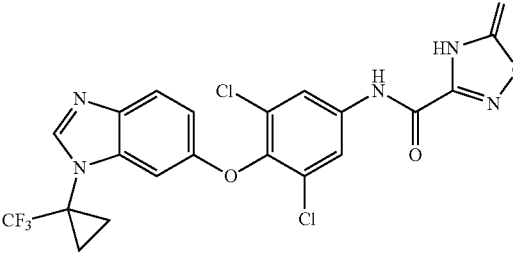 |
| 54 | 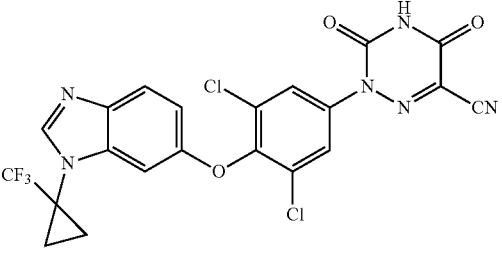 |
| 55 | 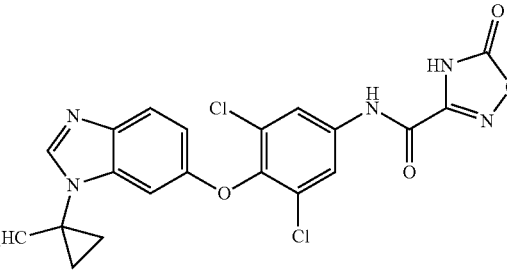 |

TABLE 1-continued

| Example | Structure |
|---------|-----------|
| 56 | |
| 57 | |
| 58 | |
| 59 | | or a tautomer or an N-oxide thereof, or an isotopomer of each thereof, or a stereoisomer of the aforesaid, or a pharmaceutically acceptable salt of each of the foregoing, or a solvate of each of the preceding.

In some embodiments, provided herein is a compound selected from those listed in Table 1 or a pharmaceutically acceptable salt thereof. In some embodiments, provided herein is a compound selected from Examples 1-59 or a pharmaceutically acceptable salt thereof.

The invention also includes all salts, such as pharmaceutically acceptable salts, of compounds referred to herein. The invention also includes any or all of the stereochemical forms, including any enantiomeric or diastereomeric forms, and any tautomers or other forms, such as N-oxides, solvates, or isotopomers, of the compounds described. Unless stereochemistry is explicitly indicated in a chemical structure or name, the structure or name is intended to embrace all possible stereoisomers of a compound depicted. In addition, where a specific stereochemical form is depicted, it is understood that other stereochemical forms are also embraced by the invention. All forms of the compounds are also embraced by the invention, such as crystalline or non-crystalline forms of the compounds. Compositions comprising a compound of the invention are also intended, such as a composition of substantially pure compound, including a specific stereochemical form thereof. Compositions comprising a mixture of compounds of the invention in any ratio are also embraced by the invention, including mixtures of two or more stereochemical forms of a compound of the invention in any ratio, such that racemic, non-racemic, enantioenriched and scalemic mixtures of a compound are embraced.

Methods of Synthesis

Scheme 1a

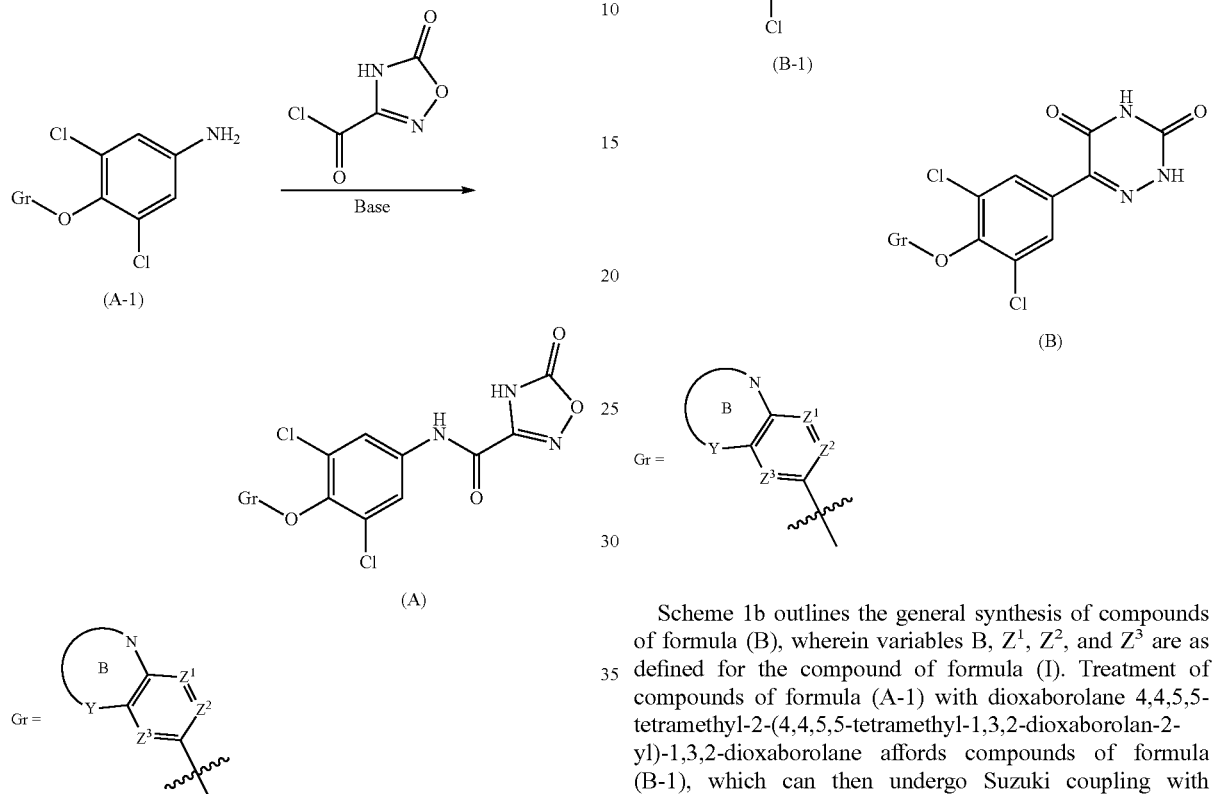

Scheme 1a shows a synthesis of compounds of general formula (A), wherein variables B, $Z^1$, $Z^2$, and $Z^3$ are as defined for the compound of formula (I). Amine derivatives of formula (A-1) can react with 5-oxo-4,5-dihydro-1,2,4-oxadiazole-3-carbonyl chloride in the presence of base to form compounds of formula (A).

Scheme 1b

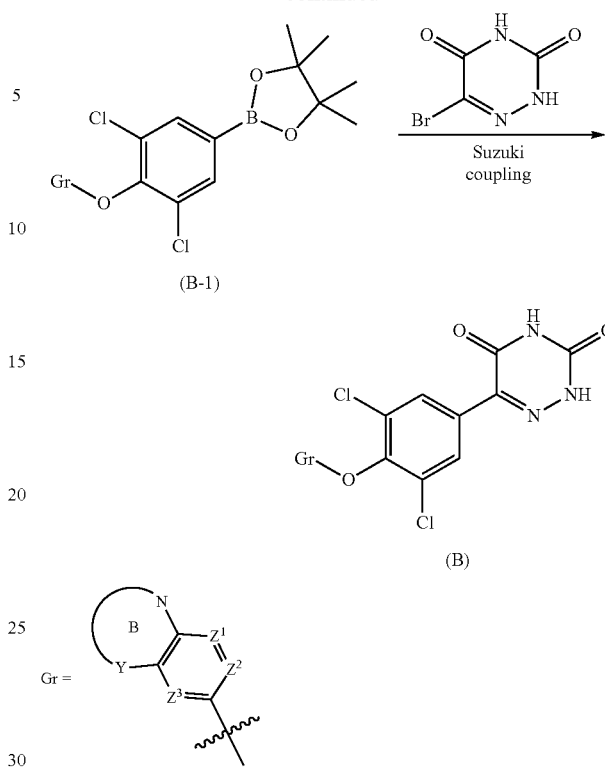

Scheme 1b outlines the general synthesis of compounds of formula (B), wherein variables B, $Z^1$, $Z^2$, and $Z^3$ are as defined for the compound of formula (I). Treatment of compounds of formula (A-1) with dioxaborolane 4,4,5,5-tetramethyl-2-(4,4,5,5-tetramethyl-1,3,2-dioxaborolan-2-yl)-1,3,2-dioxaborolane affords compounds of formula (B-1), which can then undergo Suzuki coupling with 6-bromo-1,2,4-triazine-3,5(2H,4H)-dione to form compounds of general formula (B).

Scheme 1c

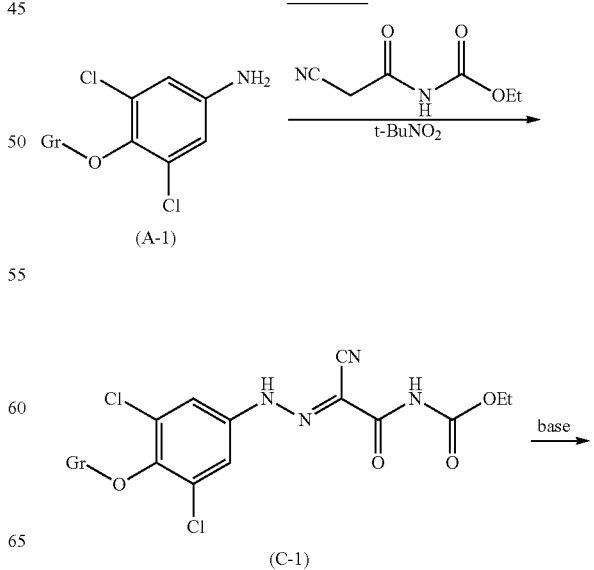

55

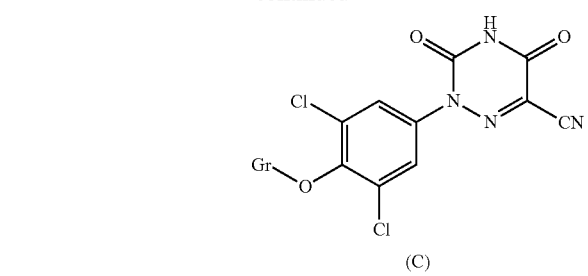

(C)

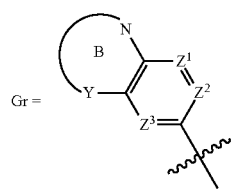

Gr =

Scheme 1c shows a synthesis of compounds of general formula (C), wherein variables B, $Z^1$, $Z^2$, and $Z^3$ are as defined for the compound of formula (I). Reaction of compounds of formula (A-1) with ethyl (2-cyanoacetyl)carbamate affords intermediate compounds of formula (C-1), which can subsequently be treated with base to afford compounds of formula (C).

Scheme 2

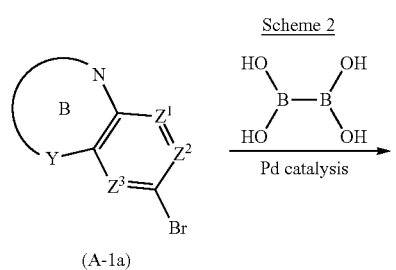

(A-1a)

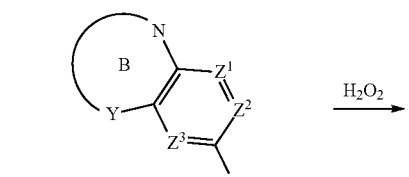

(A-1b)

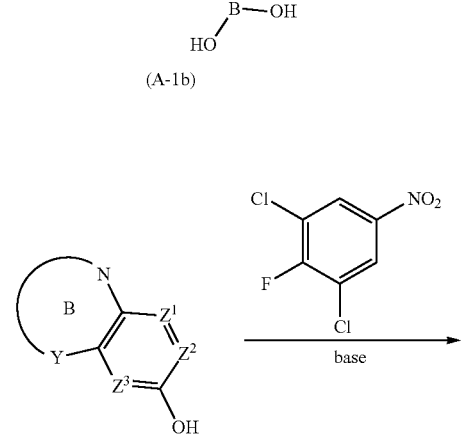

(A-1c)

56

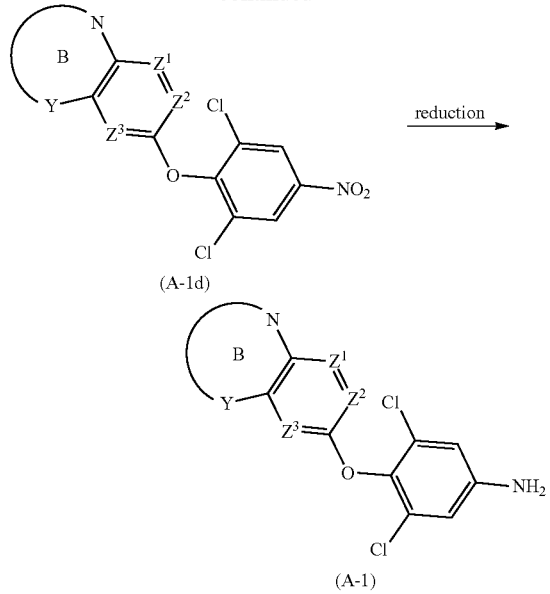

(A-1d)

(A-1)

Scheme 2 shows a synthesis of compounds of general formula (A-1), wherein variables B, $Z^1$, $Z^2$, and $Z^3$ are as defined for the compound of formula (I), which are employed in the synthetic methods described herein and as outlined in Schemes 1a-1c. The bromide derivative (A-1a) can react with hypodiboric acid to form boronic acid derivative (A-1b), which can then be oxidized to form hydroxide (A-1c). Subsequent treatment of the compound of formula (A-1c) with 1,3-dichloro-2-fluoro-5-nitrobenzene and base affords the nitro derivative (A-1d), which can then be reduced to form a compound of formula (A-1).

Scheme 3

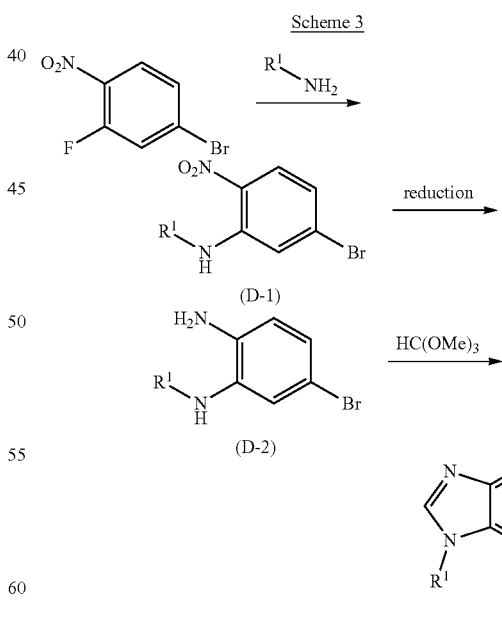

(D)

Scheme 3 outlines a synthesis of compounds of general formula (D), wherein variable $R^1$ is as defined for the compound of formula (I), which are used in the synthetic methods described herein for introducing the fused ring system containing ring B. Reaction of 4-bromo-2-fluoro-1-nitrobenzene with an R¹-substituted amine affords derivatives of formula (D-1), which can be reduced to form amine derivatives of formula (D-2). Subsequent reaction of compounds of formula (D-2) with trimethoxymethane yields compounds of formula (D).

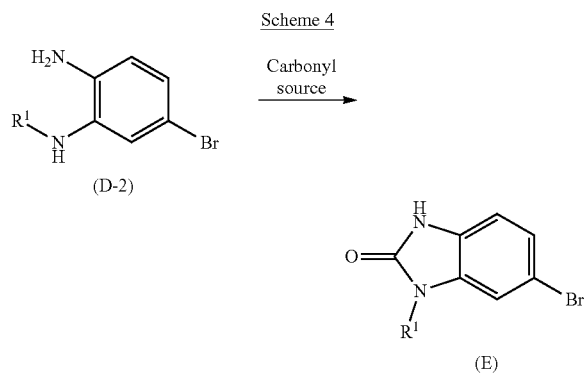

Scheme 4

(D-2)

(E)

Scheme 4 outlines a synthesis of compounds of general formula (E), wherein variable R¹ is as defined for the compound of formula (I), which are used in the synthetic methods described herein for introducing the fused ring system containing ring B. Reaction of amine derivative (D-2) with a carbonyl source affords the compound of formula (E).

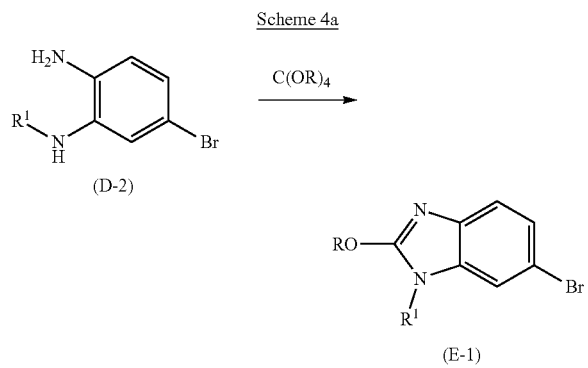

Scheme 4a (D-2)

(E-1)

Scheme 4a outlines a procedure for preparing alkoxy derivatives of general formula (E-1), wherein variable R¹ is as defined for the compound of formula (I) and R is an alkyl group, which are used in the synthetic methods described herein for introducing the fused ring system containing ring B. Reaction of amine derivative (D-2) with C(OR)₄ as a carbonyl source affords the compound of formula (E-1). In some variations, R is methyl. In some embodiments, a compound of formula (E-1) is an intermediate in the preparation of a compound of formula (E), as provided in Scheme 4. In some embodiments, a compound of formula (E-1) can further react with an agent that cleaves C—O bonds in ethers (for example, BCl₃) to give a compound of formula (E), as provided in Scheme 4. In some embodiments, the compound of formula (E-1) is a compound of formula (A-1a), as provided in Scheme 2, and can react according to the general procedure outlined in Scheme 2, wherein the intermediate and product compounds retain the —OR functionality present in the compound of formula (E-1).

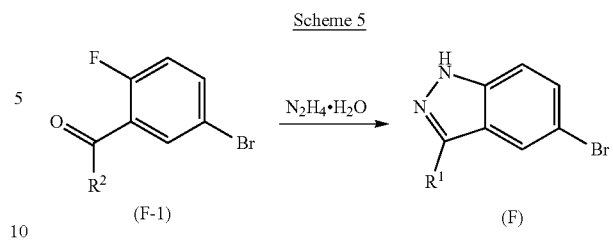

Scheme 5

(F-1)

(F)

Scheme 5 outlines a general synthesis of compounds of formula (F), wherein variable R² is as defined for the compound of formula (I), which are used in the synthetic methods described herein for introducing the fused ring system containing ring B. Reaction of fluoro derivative (F-1) with hydrazine affords the compound of formula (F).

Synthesis of certain compounds provided herein are schematically illustrated above, and provided in the Examples section below. The variables listed in the schemes above are as defined for the compound of formula (I) or any variation, embodiments, or aspect thereof. Synthesis of other compounds provided herein will be apparent to the skilled artisan based on the guidance provided herein and based on synthetic methods well known to the skilled artisan.

Where it is desired to obtain a particular enantiomer of a compound, this may be accomplished from a corresponding mixture of enantiomers using any suitable conventional procedure for separating or resolving enantiomers. Thus, for example, diastereomeric derivatives may be produced by reaction of a mixture of enantiomers, e.g., a racemate, and an appropriate chiral compound. The diastereomers may then be separated by any convenient means, for example by crystallization, and the desired enantiomer recovered. In another resolution process, a racemate may be separated using chiral High Performance Liquid Chromatography. Alternatively, if desired a particular enantiomer may be obtained by using an appropriate chiral intermediate in one of the processes described.

Chromatography, recrystallization and other conventional separation procedures may also be used with intermediates or final products where it is desired to obtain a particular isomer of a compound or to otherwise purify a product of a reaction.

Solvates of a compound provided herein or a pharmaceutically acceptable salt thereof are also contemplated. Solvates contain either stoichiometric or non-stoichiometric amounts of a solvent, and are often formed during the process of crystallization. Hydrates are formed when the solvent is water, or alcoholates are formed when the solvent is alcohol.

It is understood that the synthetic process disclosed here may be modified to arrive at various compounds of the invention by selection of appropriate reagents and starting materials. It is also understood that where protection of certain active or incompatible groups (e.g., an amine or a carboxylic acid) is required, the formulae in e.g., the scheme (s) provided here intend and include compounds where such active or incompatible groups are in appropriate protected forms. For a general description of protecting groups and their use, see P. G. M. Wuts and T. W. Greene, Greene's Protective Groups in Organic Synthesis 4th edition, Wiley-Interscience, New York, 2006.

Pharmaceutical Compositions and Formulations

Pharmaceutical compositions of any of the compounds detailed herein are embraced by this invention. Thus, the invention includes pharmaceutical compositions comprising a compound of the invention or a pharmaceutically acceptable salt thereof and a pharmaceutically acceptable carrier or excipient. In one aspect, the pharmaceutically acceptable salt is an acid addition salt, such as a salt formed with an inorganic or organic acid. Pharmaceutical compositions according to the invention may take a form suitable for oral, buccal, parenteral, nasal, topical or rectal administration or a form suitable for administration by inhalation.

A compound as detailed herein may in one aspect be in a purified form and compositions comprising a compound in purified forms are detailed herein. Compositions comprising a compound as detailed herein or a salt thereof are provided, such as compositions of substantially pure compounds. In some embodiments, a composition containing a compound as detailed herein or a salt thereof is in substantially pure form. In one variation, "substantially pure" intends a composition that contains no more than 35% impurity, wherein the impurity denotes a compound other than the compound comprising the majority of the composition or a salt thereof. For example, a composition of a substantially pure compound selected from a compound of Table 1 intends a composition that contains no more than 35% impurity, wherein the impurity denotes a compound other than the compound or a salt thereof. In one variation, a composition of substantially pure compound or a salt thereof is provided wherein the composition contains no more than 25% impurity. In another variation, a composition of substantially pure compound or a salt thereof is provided wherein the composition contains no more than 20% impurity. In still another variation, a composition of substantially pure compound or a salt thereof is provided wherein the composition contains no more than 10% impurity. In a further variation, a composition of substantially pure compound or a salt thereof is provided wherein the composition contains no more than 5% impurity. In another variation, a composition of substantially pure compound or a salt thereof is provided wherein the composition contains no more than 3% impurity. In still another variation, a composition of substantially pure compound or a salt thereof is provided wherein the composition contains no more than 1% impurity. In a further variation, a composition of substantially pure compound or a salt thereof is provided wherein the composition contains no more than 0.5% impurity. In yet other variations, a composition of substantially pure compound means that the composition contains no more than 15%, or preferably no more than 10%, or more preferably no more than 5%, or even more preferably no more than 3%, and most preferably no more than 1% impurity, which impurity may be the compound in a different stereochemical form. For instance, and without limitation, a composition of substantially pure (S) compound means that the composition contains no more than 15%, or no more than 10%, or no more than 5%, or no more than 3%, or no more than 1% of the (R) form of the compound.

In one variation, the compounds herein are synthetic compounds prepared for administration to an individual such as a human. In another variation, compositions are provided containing a compound in substantially pure form. In another variation, the invention embraces pharmaceutical compositions comprising a compound detailed herein and a pharmaceutically acceptable carrier or excipient. In another variation, methods of administering a compound are provided. The purified forms, pharmaceutical compositions and methods of administering the compounds are suitable for any compound or form thereof detailed herein.

The compound may be formulated for any available delivery route, including an oral, mucosal (e.g., nasal, sublingual, vaginal, buccal or rectal), parenteral (e.g., intramuscular, subcutaneous or intravenous), topical or transdermal delivery form. A compound may be formulated with suitable carriers to provide delivery forms that include, but are not limited to, tablets, caplets, capsules (such as hard gelatin capsules or soft elastic gelatin capsules), cachets, troches, lozenges, gums, dispersions, suppositories, ointments, cataplasms (poultices), pastes, powders, dressings, creams, solutions, patches, aerosols (e.g., nasal spray or inhalers), gels, suspensions (e.g., aqueous or non-aqueous liquid suspensions, oil-in-water emulsions or water-in-oil liquid emulsions), solutions and elixirs.

One or several compounds described herein can be used in the preparation of a formulation, such as a pharmaceutical formulation, by combining the compound or compounds as an active ingredient with a pharmaceutically acceptable carrier, such as those mentioned above. Depending on the therapeutic form of the system (e.g., transdermal patch vs. oral tablet), the carrier may be in various forms. In addition, pharmaceutical formulations may contain preservatives, solubilizers, stabilizers, re-wetting agents, emulgators, sweeteners, dyes, adjusters, and salts for the adjustment of osmotic pressure, buffers, coating agents or antioxidants. Formulations comprising the compound may also contain other substances which have valuable therapeutic properties. Pharmaceutical formulations may be prepared by known pharmaceutical methods. Suitable formulations can be found, e.g., in *Remington: The Science and Practice of Pharmacy*, Lippincott Williams & Wilkins, $21^{st}$ ed. (2005), which is incorporated herein by reference.

Compounds as described herein may be administered to individuals (e.g., a human) in a form of generally accepted oral compositions, such as tablets, coated tablets, and gel capsules in a hard or in soft shell, emulsions or suspensions. Examples of carriers, which may be used for the preparation of such compositions, are lactose, corn starch or its derivatives, talc, stearate or its salts, etc. Acceptable carriers for gel capsules with soft shell are, for instance, plant oils, wax, fats, semisolid and liquid polyols, and so on. In addition, pharmaceutical formulations may contain preservatives, solubilizers, stabilizers, re-wetting agents, emulgators, sweeteners, dyes, adjusters, and salts for the adjustment of osmotic pressure, buffers, coating agents or antioxidants.

Any of the compounds described herein can be formulated in a tablet in any dosage form described.

Compositions comprising a compound provided herein, or a pharmaceutically acceptable salt thereof, are also described. In one variation, the composition comprises a compound and a pharmaceutically acceptable carrier or excipient. In another variation, a composition of substantially pure compound is provided.

Methods of Use/Treatments

Compounds and compositions detailed herein, such as a pharmaceutical composition containing a compound of any formula provided herein, or a pharmaceutically acceptable salt thereof, and a pharmaceutically acceptable carrier or excipient, may be used in methods of administration and treatment as provided herein. The compounds and compositions may also be used in in vitro methods, such as in vitro methods of administering a compound or composition to cells for screening purposes and/or for conducting quality control assays.

In one aspect, provided herein is a method of agonizing thyroid hormone receptor beta (THR beta) comprising contacting either an effective amount of a compound provided herein, or a pharmaceutically acceptable salt thereof, or an effective amount of a pharmaceutical composition provided herein, with the THR beta.

In one aspect, provided herein is a method of treating a disorder, which is mediated by THR beta, in a patient, comprising administering to the patient in need thereof a therapeutically effective amount of a compound provided herein, or a pharmaceutically acceptable salt thereof, or a therapeutically effective amount of a composition provided herein.

Methods of treating a disorder mediated by THR beta, including without limitation non-alcoholic fatty liver disease, non-alcoholic steatohepatitis, and symptoms and manifestations of each thereof are well known to the skilled artisan and can be adapted to treating such a disorder with a compound, or a pharmaceutically acceptable salt thereof, or composition provided herein.

In one aspect, provided herein is a method of agonizing thyroid hormone receptor beta (THR beta) comprising contacting either an effective amount of a compound provided herein, or a salt thereof, such as a pharmaceutically acceptable salt thereof, or an effective amount of a pharmaceutical composition provided herein, with the THR beta. In one aspect, provided herein is a method of selectively agonizing THR beta over THR alpha comprising contacting either an effective amount of a compound provided herein, or a pharmaceutically acceptable salt thereof, or an effective amount of a pharmaceutical composition provided herein, with the THR beta. In one such aspect, the method selectively agonizes THR beta over THR alpha by at least 2-, 3-, 4-, 5-, 6-, 7-, 8-, 9-, 10-, 15-, 20-, 25-, 30-, 35-, 40-, 45-, 50-, 55-, 60-, 65-, 70-, 75-, 80-, 85-, 90-, 95-, or 100-fold. In any such embodiment, in one aspect selectivity is assessed via a biochemical assay, such as the TR-FRET assay described in Example B1. In any such embodiment, in another aspect selectivity is assessed via a biochemical assay, such as the RXR heterodimer assay described in Example B2.

In one aspect, provided herein is a method of treating a disease or disorder that is mediated by THR beta in a patient in need thereof, comprising administering to the patient a therapeutically effective amount of a compound provided herein, or a pharmaceutically acceptable salt thereof, or a therapeutically effective amount of a composition provided herein. In one aspect, the disease or disorder is a liver disease or disorder. In one aspect, provided herein is a method of treating a disease or disorder of the liver associated with sub-optimal THR beta agonism in a patient in need thereof, comprising administering to the patient a compound of formula (I), or a pharmaceutically acceptable salt thereof, wherein the compound selectively agonizes THR beta over THR alpha.

In one aspect, provided herein is a method of treating non-alcoholic fatty liver disease in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of treating non-alcoholic steatohepatitis (NASH) in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of treating metabolic syndrome in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of treating dyslipidemia in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of treating hypertriglyceridemia in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of treating hypercholesterolemia in a patient in need thereof, comprising administering to the patient a therapeutically effective amount of a compound provided herein, or a pharmaceutically acceptable salt thereof, or a therapeutically effective amount of a composition provided herein.

In any of the embodiments described herein, a patient having a disease or disorder associated with THR beta agonism may include, but is not limited to, a patient with an underlying hypothyroid disorder.

In another aspect is provided a method of delaying the onset and/or development of a disease or disorder that is mediated by THR beta in a patient (such as a human) who is at risk for developing the disease or disorder. It is appreciated that delayed development may encompass prevention in the event the individual does not develop the disease or disorder. An individual at risk of developing a disease or disorder that is mediated by THR beta in one aspect has one or more risk factors for developing the disease or disorder, such as age, increased waist circumference, high body to mass index or the presence of an associated comorbidity.

In one aspect, provided herein is a method of delaying the onset and/or development of non-alcoholic fatty liver disease in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of delaying the onset and/or development of non-alcoholic steatohepatitis (NASH) in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of delaying the onset and/or development of metabolic syndrome in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of delaying the onset and/or development of dyslipidemia in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of delaying the onset and/or development of hypertriglyceridemia in a patient in need thereof, comprising administering to the patient a therapeutically effective amount of a compound provided herein, or a pharmaceutically acceptable salt thereof, or a therapeutically effective amount of a composition provided herein. In one aspect, provided herein is a method of delaying the onset and/or development of hypercholesterolemia in a patient in need thereof, comprising administering to the patient a therapeutically effective amount of a compound provided herein, or a pharmaceutically acceptable salt thereof, or a therapeutically effective amount of a composition provided herein.

In one aspect, provided herein is a compound of formula (I) or any variation thereof, or a pharmaceutically acceptable salt thereof, for use in therapy. In some embodiments, provided herein is a compound of formula (I) or any variation thereof, or a pharmaceutically acceptable salt thereof or pharmaceutical composition comprising such compound or a pharmaceutically acceptable salt thereof, for use in the treatment of non-alcoholic fatty liver disease. In some embodiments, provided herein is a compound of formula (I) or any variation thereof, or a pharmaceutically acceptable salt thereof or pharmaceutical composition comprising such compound or a pharmaceutically acceptable salt thereof, for use in the treatment of non-alcoholic steatohepatitis (NASH). In some embodiments, provided is a compound of formula (I) or any variation thereof, or a pharmaceutically acceptable salt thereof, or a pharmaceutical composition comprising such compound or a pharmaceutically acceptable salt thereof, for use in the treatment of metabolic syndrome. In some embodiments, provided is a compound of formula (I) or any variation thereof, or a pharmaceutically acceptable salt thereof, or a pharmaceutical composition comprising such compound or a pharmaceutically acceptable salt thereof, for use in the treatment of dyslipidemia. In some embodiments, provided is a compound of formula (I) or any variation thereof, or a pharmaceutically acceptable salt thereof, or a pharmaceutical composition comprising such compound or a pharmaceutically acceptable salt thereof, for use in the treatment of hypertriglyceridemia. In some embodiments, provided is a compound of formula (I) or any variation thereof, or a pharmaceutically acceptable salt thereof, or a pharmaceutical composition comprising such compound or a pharmaceutically acceptable salt thereof, for use in the treatment of hypercholesterolemia.

In another embodiment, provided herein is a compound of formula (I) or any variation thereof, or a pharmaceutically acceptable salt thereof, for use in the manufacture of a medicament for the treatment of non-alcoholic fatty liver disease. In another embodiment, provided herein is a compound of formula (I) or any variation thereof, or a pharmaceutically acceptable salt thereof, for use in the manufacture of a medicament for the treatment of non-alcoholic steatohepatitis (NASH). In another embodiment, provided herein is a compound of formula (I) or any variation thereof, or a pharmaceutically acceptable salt thereof, for use in the manufacture of a medicament for the treatment of metabolic syndrome. In some embodiments, the medicament is for the treatment of dyslipidemia. In some embodiments, the medicament is for the treatment of hypertriglyceridemia. In some embodiments, the medicament is for the treatment of dyslipidemia. In some embodiments, the medicament is for the treatment of hypercholesterolemia.

In some embodiments, the individual is a mammal. In some embodiments, the individual is a primate, dog, cat, rabbit, or rodent. In some embodiments, the individual is a primate. In some embodiments, the individual is a human. In some embodiments, the human is at least about or is about any of 18, 21, 30, 50, 60, 65, 70, 75, 80, or 85 years old. In some embodiments, the human is a child. In some embodiments, the human is less than about or about any of 21, 18, 15, 10, 5, 4, 3, 2, or 1 years old.

Dosing and Method of Administration

The dose of a compound described herein, or a stereoisomer, tautomer, solvate, or salt thereof, administered to an individual (such as a human) may vary with the particular compound or salt thereof, the method of administration, and the particular disease or disorder, such as non-alcoholic fatty liver disease, non-alcoholic steatohepatitis (NASH), metabolic syndrome, hypertriglyceridemia, dyslipidemia, or hypercholesterolemia, being treated. In some embodiments, the amount of the compound, or a stereoisomer, tautomer, solvate, or salt thereof, is a therapeutically effective amount.

The compounds provided herein or a salt thereof may be administered to an individual via various routes, including, e.g., intravenous, intramuscular, subcutaneous, oral, and transdermal.

The effective amount of the compound may in one aspect be a dose of between about 0.01 and about 100 mg/kg. Effective amounts or doses of the compounds of the present disclosure may be ascertained by routine methods, such as modeling, dose escalation, or clinical trials, taking into account routine factors, e.g., the mode or route of administration or drug delivery, the pharmacokinetics of the agent, the severity and course of the disease to be treated, the subject's health status, condition, and weight. An exemplary dose is in the range of about from about 0.7 mg to 7 g daily, or about 7 mg to 350 mg daily, or about 350 mg to 1.75 g daily, or about 1.75 to 7 g daily.

Any of the methods provided herein may in one aspect comprise administering to an individual a pharmaceutical composition that contains an effective amount of a compound provided herein, or a stereoisomer, tautomer, solvate, or salt thereof, and a pharmaceutically acceptable excipient.

A compound or composition provided herein may be administered to an individual in accordance with an effective dosing regimen for a desired period of time or duration, such as at least about one month, at least about 2 months, at least about 3 months, at least about 6 months, or at least about 12 months or longer, which in some variations may be for the duration of the individual's life. In one variation, the compound is administered on a daily or intermittent schedule. The compound can be administered to an individual continuously (for example, at least once daily) over a period of time. The dosing frequency can also be less than once daily, e.g., about a once weekly dosing. The dosing frequency can be more than once daily, e.g., twice or three times daily. The dosing frequency can also be intermittent, including a 'drug holiday' (e.g., once daily dosing for 7 days followed by no doses for 7 days, repeated for any 14 day time period, such as about 2 months, about 4 months, about 6 months or more). Any of the dosing frequencies can employ any of the compounds described herein, or a pharmaceutically acceptable salt thereof, together with any of the dosages described herein.

Articles of Manufacture and Kits

The present disclosure further provides articles of manufacture comprising a compound described herein or a salt thereof, a composition described herein, or one or more unit dosages described herein in suitable packaging. In certain embodiments, the article of manufacture is for use in any of the methods described herein. Suitable packaging is known in the art and includes, for example, vials, vessels, ampules, bottles, jars, flexible packaging and the like. An article of manufacture may further be sterilized and/or sealed.

The present disclosure further provides kits for carrying out the methods of the present disclosure, which comprises one or more compounds described herein, or a pharmaceutically acceptable salt thereof, or a composition comprising a compound described herein. The kits may employ any of the compounds disclosed herein or a pharmaceutically acceptable salt thereof. In one variation, the kit employs a compound described herein or pharmaceutically acceptable salt thereof. The kits may be used for any one or more of the uses described herein, and, accordingly, may contain instructions for the treatment of any disease or described herein, for example for the treatment of non-alcoholic steatohepatitis (NASH).

Kits generally comprise suitable packaging. The kits may comprise one or more containers comprising any compound described herein. Each component (if there is more than one component) can be packaged in separate containers or some components can be combined in one container where cross-reactivity and shelf life permit.

The kits may be in unit dosage forms, bulk packages (e.g., multi-dose packages) or sub-unit doses. For example, kits may be provided that contain sufficient dosages of a compound as disclosed herein, or a pharmaceutically acceptable salt thereof, and/or an additional pharmaceutically active compound useful for a disease detailed herein to provide effective treatment of an individual for an extended period, such as any of a week, 2 weeks, 3 weeks, 4 weeks, 6 weeks, 8 weeks, 3 months, 4 months, 5 months, 7 months, 8 months, 9 months, or more. Kits may also include multiple unit doses of the compounds and instructions for use and be packaged in quantities sufficient for storage and use in pharmacies (e.g., hospital pharmacies and compounding pharmacies).

The kits may optionally include a set of instructions, generally written instructions, although electronic storage media (e.g., magnetic diskette or optical disk) containing instructions are also acceptable, relating to the use of component(s) of the methods of the present disclosure. The instructions included with the kit generally include information as to the components and their administration to an individual.

EXAMPLES

It is understood that the present disclosure has been made only by way of example, and that numerous changes in the combination and arrangement of parts can be resorted to by those skilled in the art without departing from the spirit and scope of present disclosure.

The chemical reactions in the Examples described can be readily adapted to prepare a number of other compounds disclosed herein, and alternative methods for preparing the compounds of this disclosure are deemed to be within the scope of this disclosure. For example, the synthesis of non-exemplified compounds according to the present disclosure can be successfully performed by modifications apparent to those skilled in the art, e.g., by appropriately protecting interfering groups, by utilizing other suitable reagents known in the art other than those described, or by making routine modifications of reaction conditions, reagents, and starting materials. Alternatively, other reactions disclosed herein or known in the art will be recognized as having applicability for preparing other compounds of the present disclosure.

The following abbreviations may be relevant for the application.

Abbreviations

Ac: acetyl
ACN or MeCN: acetonitrile
BAST: bis(2-methoxyethyl)aminosulfurtrifluoride
BINAP: 2,2'-bis(diphenylphosphino)-1,1'-binaphthyl
BPD: bispinacolatodiboron
Boc: tertiarybutyloxycarbonyl
Bu: butyl
cataCXium A-Pd-G2: chloro[(di(1-adamantyl)-N-butylphosphine)-2-(2-aminobiphenyl)]palladium(II)
DBA: dibenzylideneacetone
DCM: dichloromethane
DIEA or DIPEA: N,N-diisopropylethylamine
DMA: dimethylacetamide
DMAP: dimethylaminopyridine
DMF: dimethylformamide
DMF-DMA: dimethylformamide dimethylacetal
DMSO: dimethylsulfoxide
DPPA: diphenylphosphoryl azide
DSC: disuccinimidylcarbonate
Et: ethyl
FA: formic acid
MBTE: methyl tert-butyl ether
Me: methyl
NIS: N-iodosuccinimide
Pd(dba)$_2$: bis(dibenzylideneacetone)palladium(O)
Pr: propyl
Py or Pyr: pyridine
rt: room temperature
sat: saturated
SEMCl: 2-(trimethylsilyl)ethoxymethyl chloride
SFC: supercritical fluid chromatography
TEA: triethylamine
TFA: trifluoroacetic acid
THF: tetrahydrofuran
Tol: toluene
XPhos: 2-dicyclohexylphosphino-2',4',6'-triisopropylbiphenyl
t-Bu Xphos: 2-di-tert-butylphosphino-2',4',6'-triisopropylbiphenyl Synthetic Examples Scheme A. Synthesis of 3,5-dichloro-4-((3-ethyl-1-((2-(trimethylsilyl)ethoxy)methyl)-1H-indazol-5-yl)oxy)aniline (Compound 1e)

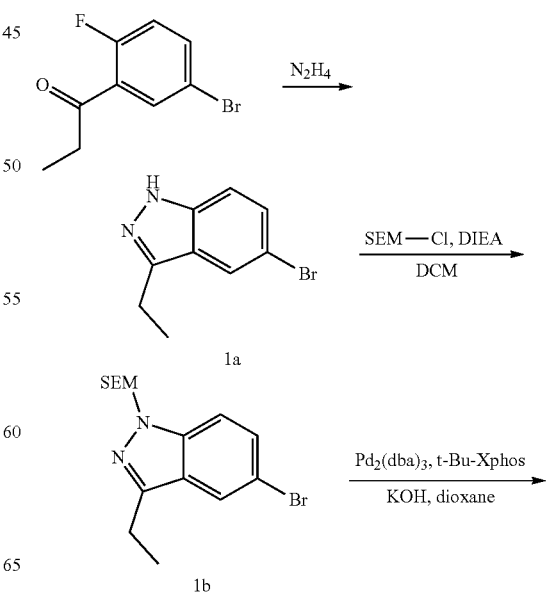

-continued

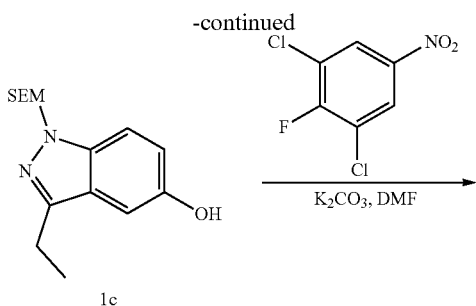

1c

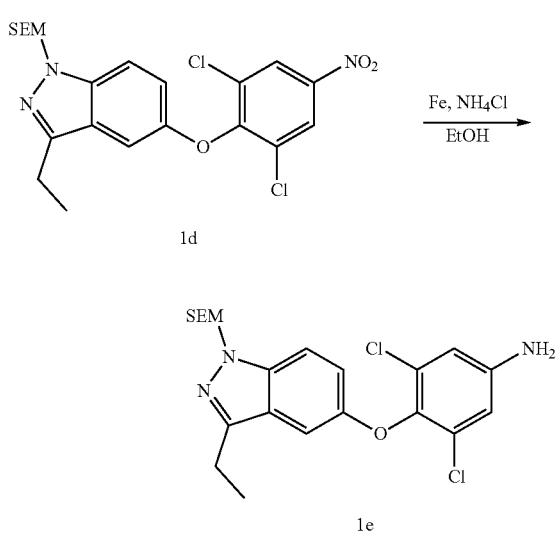

Synthesis of 5-bromo-3-ethyl-1H-indazole (1a). A solution of 1-(5-bromo-2-fluorophenyl)propan-1-one (770 mg, 3.33 mmol) in N2H4-H₂O (6.72 mL) was stirred at 115° C. for 32 hours under sealed tube. LCMS showed starting material was consumed completely and desired MS was detected. The mixture was poured into a mixture of ice and water. The precipitate was collected by filtration and washed thoroughly with water to give 1a. MS mass calculated for [M+1]⁺ (C₉H₉BrN₂) requires m/z 225.0, LCMS found m/z 225.1; ¹H NMR (400 MHz, CDCl₃) δ 9.81 (br s, 1H), 7.87 (d, J=1.0 Hz, 1H), 7.46 (dd, J=8.8, 1.6 Hz, 1H), 7.33 (d, J=8.8 Hz, 1H), 2.99 (q, J=7.8 Hz, 2H), 1.41 (t, J=7.6 Hz, 3H).

Synthesis of 5-bromo-3-ethyl-1-((2-(trimethylsilyl) ethoxy)methyl)-1H-indazole (1b). A solution of 5-bromo-3-ethyl-1H-indazole (1a) (610 mg, 2.71 mmol) in DCM (8 mL) was added SEM-Cl (451.83 mg, 2.71 mmol, 479.65 uL) and DIEA (420.30 mg, 3.25 mmol, 566.45 uL) dropwise at 0° C. Then the mixture was stirred at 20° C. for 4 hours. TLC showed 1a was consumed completely and two new spots were formed. LCMS showed desired MS. The mixture was extracted DCM (30 mL*2) and H₂O (10 mL). The combined organic phase was washed with brine (20 mL*3), dried with anhydrous Na₂SO₄, filtered and concentrated in vacuum to give a residue. The residue was purified by prep-TLC (SiO₂, petroleum ether:ethyl acetate) to give 1b. MS mass calculated for [M+1]⁺ (C₁₅H₂₃BrN₂OSi) requires m/z 355.1, LCMS found m/z 355.1; ¹H NMR (400 MHz, CDCl₃) δ 7.81 (d, J=1.0 Hz, 1H), 7.55 (d, J=9.0 Hz, 1H), 7.33 (dd, J=9.2, 1.8 Hz, 1H), 5.72 (s, 2H), 3.57-3.64 (m, 2H), 3.11 (q, J=7.6 Hz, 2H), 1.38 (t, J=7.6 Hz, 3H), 0.87-0.95 (m, 2H), −0.04 (s, 9H).

Synthesis of 3-ethyl-1-((2-(trimethylsilyl)ethoxy) methyl)-1H-indazol-5-ol (1c). To a mixture of 5-bromo-3-ethyl-1-((2-(trimethylsilyl)ethoxy)methyl)-1H-indazole (1b) (190 mg, 534.69 umol), 2-[(5-bromo-3-ethyl-indazol-2-yl)methoxy]ethyl-trimethyl-silane (200 mg, 562.83 umol), KOH (39.00 mg, 695.10 umol), Pd₂(dba)₃ (48.96 mg, 53.47 umol) and t-Bu Xphos (34.06 mg, 80.20 umol) in dioxane (5 mL) and H₂O (5 mL) was degassed and purged with N2 for 3 times, and then the mixture was stirred at 100° C. for 3.5 hours under N2 atmosphere. TLC showed 1b was consumed completely and many new spots were formed. LCMS showed desired MS. The suspension was filtered with a pad of Celite and the pad cake was washed with EtOAc (5 ml*3). The combined filtrates were extracted Ethyl acetate (20 mL*2) and (H₂O 10 mL). The combined organic phase was washed with brine (10 mL*3), dried with anhydrous Na₂SO₄, filtered and concentrated in vacuum to give a residue. The residue was purified by prep-TLC (SiO₂, ethyl acetate: petroleum ether) to give 1c. MS mass calculated for [M+1]⁺ (C₁₅H₂₄N₂O₂Si) requires m/z 293.2, LCMS found m/z 293.2; ¹H NMR (400 MHz, CDCl₃) δ 7.54-7.61 (m, 1H), 6.93-7.00 (m, 1H), 6.90 (d, J=1.8 Hz, 1H), 5.69 (s, 2H), 4.96 (br s, 2H), 3.55-3.64 (m, 2H), 3.07 (q, J=7.6 Hz, 2H), 1.23-1.29 (m, 3H), 0.87-0.94 (m, 4H), −0.04 (s, 9H).

Synthesis of 5-(2,6-dichloro-4-nitrophenoxy)-3-ethyl-1-((2-(trimethylsilyl)ethoxy)methyl)-1H-indazole (1d). To a solution of 3-ethyl-1-((2-(trimethylsilyl)ethoxy)methyl)-1H-indazol-5-ol (1c) (115 mg, 393.23 umol) and 1,3-dichloro-2-fluoro-5-nitrobenzene (90.83 mg, 432.56 umol) in DMF (5 mL) was added K₂CO₃ (81.52 mg, 589.85 umol). The mixture was degassed and purged with N2 for 3 times and stirred at 20° C. for 1 hours. TLC showed 1c was consumed completely and one new spot was formed. LCMS showed desired MS. The mixture was extracted Ethyl acetate (30 mL*2) and H₂O (10 mL). The combined organic phase was washed with brine (10 mL*3), dried with anhydrous Na₂SO₄, filtered and concentrated in vacuum to give a residue. The residue was purified by Prep-TLC (petroleum ether:ethyl acetate) to give 1d. MS mass calculated for [M+1]⁺ (C₂₁H₂₅Cl₂N₃O₄Si) requires m/z 482.1, LCMS found m/z 482.2; ¹H NMR (400 MHz, CDCl₃) δ 8.35 (s, 2H), 7.68 (d, J 9.0 Hz, 1H), 7.12 (dd, J=9.4, 2.4 Hz, 1H), 6.65 (d, J=2.0 Hz, 1H), 5.69 (s, 2H), 3.59-3.64 (m, 2H), 3.53-3.58 (m, 1H), 3.02 (q, J=7.6 Hz, 2H), 1.26-1.31 (m, 4H), −0.03 (s, 9H)

Synthesis of 3,5-dichloro-4-((3-ethyl-1-((2-(trimethylsilyl)ethoxy)methyl)-1H-indazol-5-yl)oxy)aniline (1e). To a solution of 5-(2,6-dichloro-4-nitrophenoxy)-3-ethyl-1-((2-(trimethylsilyl)ethoxy)methyl)-1H-indazole (1d) (100 mg, 207.28 umol) in EtOH (4 mL) was added iron powder (57.88 mg, 1.04 mmol) and NH₄Cl (55.44 mg, 1.04 mmol). The mixture was stirred at 80° C. for 2 hours. TLC showed 1d was consumed completely and one new spot was formed. LCMS showed desired MS. The suspension was filtered with a pad of Celite and the pad cake was washed with EtOAc (5 mL*3). The combined filtrates were extracted ethyl acetate (20 mL*2) and washed with H₂O (10 mL). The combined organic phase was washed with brine (10 mL*3), dried with anhydrous Na₂SO₄, filtered and concentrated in vacuum to give a residue. The residue was purified by prep-TLC (SiO₂, ethyl acetate: petroleum ether) to give 1e. MS mass calculated for [M+1]⁺ (C₂₁H₂₇Cl₂N₃O₂Si) requires m/z 452.1, LCMS found m/z 452.1.

Example 1. 2-(3,5-dichloro-4-((3-ethyl-1H-indazol-5-yl)oxy)phenyl)-3,5-dioxo-2,3,4,5-tetrahydro-1,2,4-triazine-6-carbonitrile Example 2. 6-(3,5-dichloro-4-((3-ethyl-1H-indazol-5-yl)oxy)phenyl)-1,2,4-triazine-3,5(2H,4H)-dione

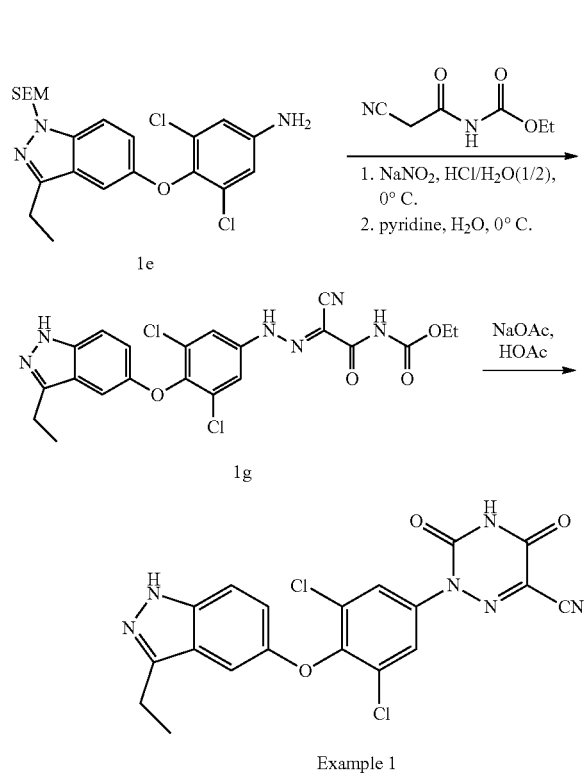

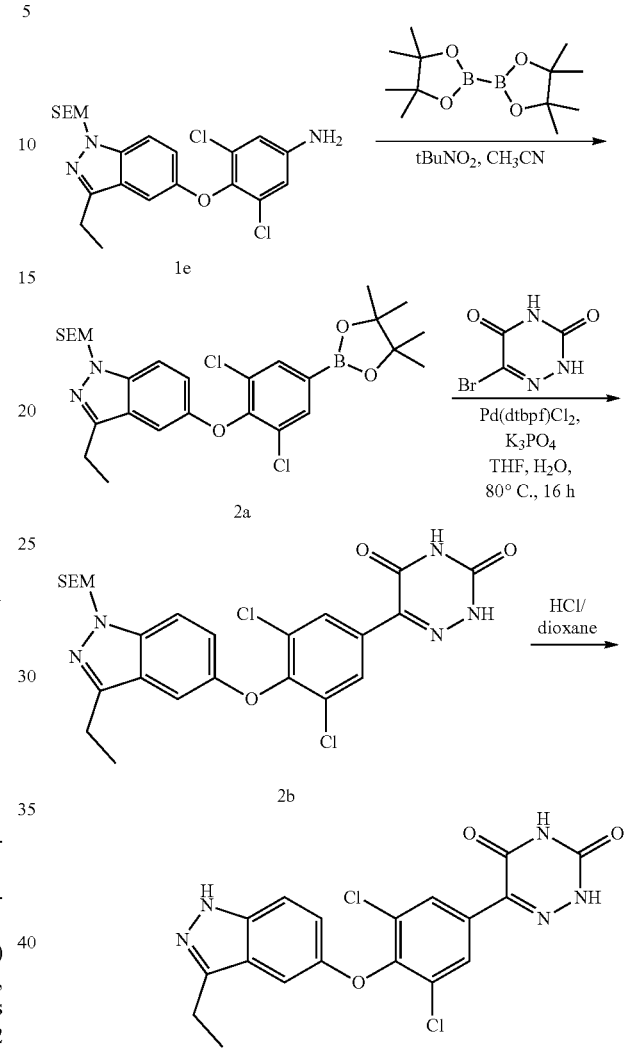

Synthesis of (E)-ethyl (2-cyano-2-(2-(3,5-dichloro-4-((3-ethyl-1H-indazol-5-yl)oxy)phenyl)hydrazono)acetyl)carbamate (1g). To a solution of 3,5-dichloro-4-((3-ethyl-1-((2-(trimethylsilyl)ethoxy)methyl)-1H-indazol-5-yl)oxy)aniline (1e) (20 mg, 44.20 umol) in HCl (0.5 mL) and H$_2$O (1 mL) at 0° C. and then was added NaNO$_2$ (3.96 mg, 57.47 umol), the mixture was stirred at 0° C. for 0.5 h. The solution was added to ethyl (2-cyanoacetyl) carbamate (7.59 mg, 48.62 umol) in H$_2$O (1 mL) and Py (0.5 mL) at 0° C., then the reaction mixture was stirred at 0° C. for another 0.5 h. LCMS showed starting material was consumed completely. The reaction mixture filtered and filter cake was dried under reduce pressure to give 1g.

Synthesis of 2-(3,5-dichloro-4-((3-ethyl-1H-indazol-5-yl)oxy)phenyl)-3,5-dioxo-2,3,4,5-tetrahydro-1,2,4-triazine-6-carbonitrile (Example 1). To a mixture of (E)-ethyl (2-cyano-2-(2-(3,5-dichloro-4-((3-ethyl-1H-indazol-5-yl)oxy)phenyl)hydrazono)acetyl) carbamate (1 g) (18 mg, 36.79 umol) in HOAc (1 mL) was added NaOAc (15.09 mg, 183.93 umol) under N2. The mixture was stirred at 120° C. for 3 hours. LCMS showed starting material was consumed completely and desired MS was detected. The reaction mixture concentrated under reduced pressure to give a residue. The residue was purified by prep-HPLC (column: Phenomenex Luna C18 150*30 mm*5 um; mobile phase: [water (0.04% HCl)-MeCN]) to give Example 1. MS mass calculated for [M+1]$^+$ (C$_{19}$H$_{12}$Cl$_2$N$_6$O$_3$) requires m/z 443.0, LCMS found m/z 443.0; $^1$H NMR (400 MHz, CD$_3$OD) δ 7.80 (s, 2H), 7.49 (d, J=9.0 Hz, 1H), 7.20-7.15 (m, 1H), 6.94-6.91 (m, 1H), 2.94-2.85 (m, 2H), 1.33-1.27 (m, 3H).

Synthesis of 5-(2,6-dichloro-4-(4,4,5,5-tetramethyl-1,3,2-dioxaborolan-2-yl)phenoxy)-3-ethyl-1-((2-(trimethylsilyl)ethoxy)methyl)-1H-indazole (2a). To a mixture of 3,5-dichloro-4-((3-ethyl-1-((2-(trimethylsilyl)ethoxy)methyl)-1H-indazol-5-yl)oxy)aniline (1e) (10 mg, 22.10 umol) and 4,4,5,5-tetramethyl-2-(4,4,5,5-tetramethyl-1,3,2-dioxaborolan-2-yl)-1,3,2-dioxaborolane (16.84 mg, 66.31 umol) in CH$_3$CN (2 mL) was added t-BuONO (4.56 mg, 44.20 umol, 5.26 uL) at 20° C. Then the mixture was stirred at 20° C. for 16 hours. TLC and LCMS showed the starting material was consumed completely and desired MS was detected. The mixture was concentrated in vacuum to give a residue. The residue was purified by prep-TLC (SiO$_2$, petroleum ether: ethyl acetate) to give 2a. MS mass calculated for [M+1]$^+$ (C$_{21}$H$_{27}$Cl$_2$N$_3$O$_2$Si) requires m/z 563.2, LCMS found m/z 563.2.

Synthesis of 6-(3,5-dichloro-4-((3-ethyl-1-((2-(trimethylsilyl)ethoxy)methyl)-1H-indazol-5-yl)oxy)phenyl)-1,2,4-triazine-3,5(2H,4H),-dione (2b). To a mixture of 5-(2,6-dichloro-4-(4,4,5,5-tetramethyl-1,3,2-dioxaborolan-2-yl)

phenoxy)-3-ethyl-1-((2-(trimethylsilyl)ethoxy)methyl)-1H-indazole (2a) (10 mg, 17.75 umol) and 6-bromo-2H-1,2,4-triazine-3,5-dione (3.41 mg, 17.75 umol) in H$_2$O (0.5 mL) and THF (2 mL) was added K$_3$PO$_4$ (7.54 mg, 35.50 umol) and ditert-butyl(cyclopentyl)phosphane;dichloro-palladium; iron (1.16 mg, 1.77 umol) was degassed and purged with N2 for 3 times, and then the mixture was stirred at 90° C. for 3 hours under N2 atmosphere. TLC and LCMS showed 2a was consumed completely and desired MS was detected. The mixture was extracted with ethyl acetate (30 mL*2) and H$_2$O (15 mL). The combined organic phase was washed with brine (10 mL*3), dried with anhydrous Na$_2$SO$_4$, filtered and concentrated in vacuum to give a residue. The mixture was purified by Prep-TLC (petroleum ether:ethyl acetate) to give 2b. $^1$H NMR (400 MHz, CD$_3$OD) δ 8.23 (s, 2H), 7.60 (d, J=9.4 Hz, 1H), 7.45 (d, J=9.0 Hz, 1H), 7.19 (s, 1H), 6.81 (s, 1H), 6.69 (s, 1H), 5.70 (s, 2H), 3.80 (s, 2H), 3.61 (t, J=8.2 Hz, 2H), 3.49 (s, 3H), 3.14 (s, 3H), 3.04 (d, J=7.6 Hz, 2H), 1.95 (s, 1H), 1.22-1.31 (m, 23H), 1.20 (s, 9H), −0.04 (s, 7H).

Synthesis of 6-(3,5-dichloro-4-((3-ethyl-1H-indazol-5-yl)oxy)phenyl)-1,2,4-triazine-3,5(2H,4H),-dione (Example 2). A solution of 6-(3,5-dichloro-4-((3-ethyl-1-((2-(trimethylsilyl)ethoxy)methyl)-1H-indazol-5-yl)oxy)phenyl)-1,2,4-triazine-3,5(2H,4H),-dione (2b) (20 mg, 36.46 umol) in HCl/dioxane (7 mL) was stirred at 20° C. for 1 hours. HPLC and LCMS showed 2b was consumed completely and desired MS was detected. The reaction mixture was concentrated under reduced pressure to give a residue. The residue was purified by Prep-HPLC (FA) column: Phenomenex Luna C18 100*30 mm*5 um; mobile phase: [water (0.04% HCl)-MeCN] to give Example 2. MS mass calculated for [M+1]$^+$ (C$_{18}$H$_{13}$Cl$_2$N$_5$O$_3$) requires m/z 418.0, LCMS found m/z 418.0; $^1$H NMR (400 MHz, CD$_3$OD) δ 8.23 (s, 2H), 7.52 (d, J=9.2 Hz, 1H), 7.22 (dd, J=9.2, 2.4 Hz, 1H), 6.92 (d, J=2.2 Hz, 1H), 4.82-4.95 (m, 2H), 2.91 (q, J=7.6 Hz, 2H), 1.29-1.33 (m, 3H).

Scheme B. Synthesis of 3,5-dichloro-4-((3-methyl-1-((2-(trimethylsilyl)ethoxy)methyl)-1H-indazol-5-yl)oxy)aniline (Compound 3f)

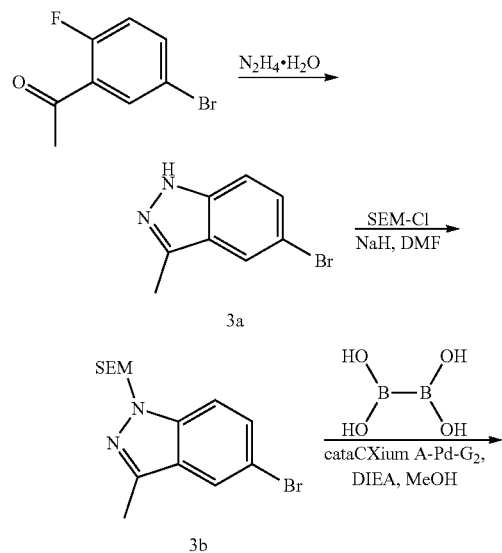

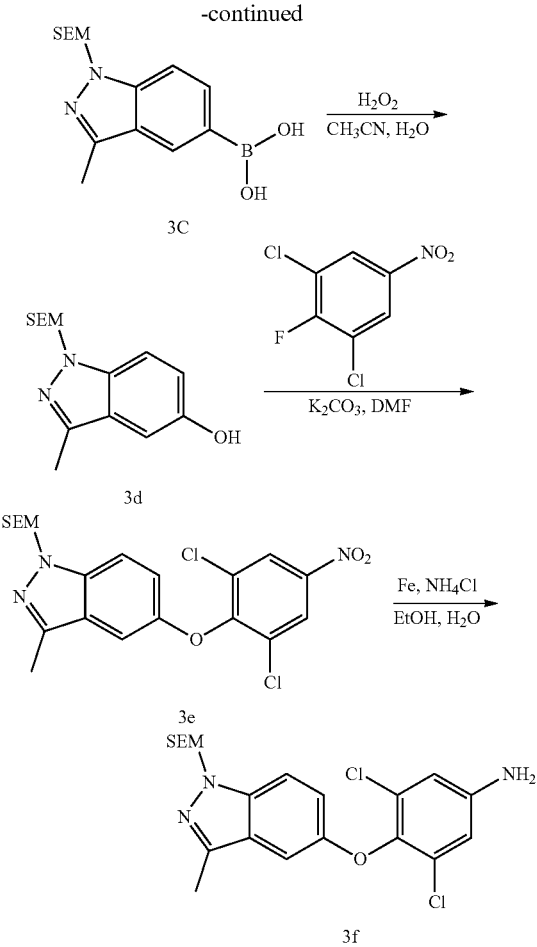

Synthesis of 5-bromo-3-methyl-1H-indazole (3a). A mixture of 1-(5-bromo-2-fluorophenyl)-ethanone (3 g, 13.82 mmol) in N$_2$H$_4$.H$_2$O (41.20 g, 806.55 mmol, 40.00 mL 98% purity) was stirred at 120° C. for 16 hours under N$_2$. TLC indicated the starting material was consumed completely and one new spot formed. The residue was poured into water (15 mL). The aqueous phase was extracted with ethyl acetate (30 mL*3). The combined organic phase was washed with brine (30 mL*2), dried with anhydrous Na$_2$SO$_4$, filtered and concentrated in vacuum to give 3a. $^1$H NMR (400 MHz, CDCl$_3$) δ 7.83 (d, J=1.4 Hz, 1H), 7.46 (s, 1H), 7.47-7.42 (m, 1H), 7.32 (d, J=8.8 Hz, 1H), 3.97 (br s, 1H), 2.57 (s, 3H).

Synthesis of 5-bromo-3-methyl-1-((2-(trimethylsilyl)ethoxy)methyl)-1H-indazole (3b). To a mixture of 5-bromo-3-methyl-1H-indazole (3a) (1.7 g, 8.05 mmol) in DMF (25 mL) was added NaH (386.59 mg, 9.67 mmol, 990.33 uL, 60% purity) under N$_2$ at 0° C., and then SEM-Cl (1.34 g, 8.05 mmol, 1.43 mL) was added in the mixture. The mixture was stirred at 20° C. for 16 hours. The reaction mixture was poured into NH$_4$Cl (20 mL). The aqueous phase was extracted with ethyl acetate (30 mL*3). The combined organic phase was washed with brine (30 mL*2), dried with anhydrous Na$_2$SO$_4$, filtered and concentrated in vacuum. The residue was purified by silica gel chromatography (SiO$_2$, petroleum ether/ethyl acetate) to give 3b. $^1$H NMR (400 MHz, CDCl$_3$) δ 7.90-7.73 (m, 1H), 7.48 (dd, J=1.8, 8.8 Hz, 1H), 7.44-7.36 (m, 1H), 7.36-7.19 (m, 1H), 5.64 (s, 2H), 3.63-3.44 (m, 2H), 2.54 (s, 3H), 0.99-0.77 (m, 2H), −0.06 (s, 9H).

Synthesis of (3-methyl-1-((2-(trimethylsilyl)ethoxy) methyl)-1H-indazol-5-yl)boronic acid (3c). To a mixture of 5-bromo-3-methyl-1-((2-(trimethylsilyl)ethoxy)methyl)-1H-indazole (3b) (1.7 g, 4.98 mmol) in MeOH (15 mL) was added hypodiboric acid (1.34 g, 14.94 mmol), DIPEA (1.93 g, 14.94 mmol, 2.60 mL) and [2-(2-aminophenyl) phenyl]-chloro-palladium; bis(1-adamantyl)-butylphosphane (33.30 mg, 49.81 umol) under $N_2$. The mixture was stirred at 50° C. for 1.5 hours. LCMS showed the 3b was consumed completely and desired MS was detected. The reaction mixture was filtered and the filtration was concentrated under reduced pressure to give 3c. MS mass calculated for $[M+1]^+$ ($C_{14}H_{23}BN_2O_3Si$) requires m/z 307.1, LCMS found m/z 307.1.

Synthesis of 3-methyl-1-((2-(trimethylsilyl)ethoxy) methyl)-1H-indazol-5-ol (3d). To a mixture of (3-methyl-1-((2-(trimethylsilyl)ethoxy)methyl)-1H-indazol-5-yl)boronic acid (3c) (1.53 g, 5.00 mmol) in $H_2O$ (5 mL) and $CH_3CN$ (10 mL) was added ammonium bicarbonate (394.97 mg, 5.00 mmol) and $H_2O_2$ (1.13 g, 9.99 mmol, 30% purity) under $N_2$. The mixture was stirred at 20° C. for 2 hours. LCMS showed the 3c was consumed completely and desired MS was detected. TLC indicated the material was consumed completely and new spots were formed. The residue was poured into $NaHS_2O_3$ (20 mL). The aqueous phase was extracted with ethyl acetate (40 mL*2). The combined organic phase was washed with brine (30 mL*2), dried with anhydrous $Na_2SO_4$, filtered and concentrated in vacuum. The residue was purified by silica gel chromatography ($SiO_2$, petroleum ether/ethyl acetate) to give 3d. MS mass calculated for $[M+1]^+$ ($C_{14}H_{22}N_2O_2Si$) requires m/z 279.1, LCMS found m/z 279.1.

Synthesis of 5-(2,6-dichloro-4-nitrophenoxy)-3-methyl-1-((2-(trimethylsilyl)ethoxy)methyl)-1H-indazole (3e). To a mixture of 3-methyl-1-((2-(trimethylsilyl)ethoxy)methyl)-1H-indazol-5-ol (3d) (1.06 g, 3.81 mmol) and 1,3-dichloro-2-fluoro-5-nitrobenzene (879.42 mg, 4.19 mmol) in DMF (10 mL) was added $K_2CO_3$ (789.26 mg, 5.71 mmol) under $N_2$. The mixture was stirred at 20° C. for 1 hour. TLC indicated starting material was consumed completely and two spots were formed. The residue was poured into water (15 mL). The aqueous phase was extracted with ethyl acetate (30 mL*3). The combined organic phase was washed with brine (20 mL*2), dried with anhydrous $Na_2SO_4$, filtered and concentrated in vacuum. The residue was purified by column chromatography ($SiO_2$, petroleum ether/ethyl acetate) to give 3e. $^1$H NMR (400 MHz, $CDCl_3$) δ 8.35 (s, 2H), 7.50 (d, J=9.0 Hz, 1H), 7.16 (dd, J=2.4, 9.0 Hz, 1H), 6.83 (d, J=2.2 Hz, 1H), 5.65 (s, 2H), 3.66-3.45 (m, 2H), 2.48 (s, 3H), 1.01-0.78 (m, 2H), -0.02--0.08 (m, 9H).

Synthesis of 3,5-dichloro-4-((3-methyl-1-((2-(trimethylsilyl)ethoxy)methyl)-1H-indazol-5-yl)oxy)aniline (3f). To a mixture of 5-(2,6-dichloro-4-nitrophenoxy)-3-methyl-1-((2-(trimethylsilyl)ethoxy)methyl)-1H-indazole (3e) (200 mg, 426.98 umol) in EtOH (5 mL) and $H_2O$ (1 mL) was added $NH_4Cl$ (114.20 mg, 2.13 mmol) and Fe (119.22 mg, 2.13 mmol). The mixture was stirred at 80° C. for 2 hours. TLC and LCMS showed the 3e was consumed completely and desired MS was detected. The reaction mixture was filtered and concentrated under reduced pressure. The residue was diluted with ethyl acetate (10 mL) and water (10 mL) and extracted with ethyl acetate (20 mL*3). The combined organic layers were washed with brine (20 mL*2), dried with anhydrous $Na_2SO_4$, and filtered and concentrated under reduced pressure to give 3f. MS mass calculated for $[M+1]^+$ ($C_{20}H_{25}Cl_2N_3O_2Si$) requires m/z 438.0, LCMS found m/z 438.0; $^1$H NMR (400 MHz, $CDCl_3$) δ 7.50-7.43 (m, 1H), 7.19-7.10 (m, 1H), 6.83 (d, J=2.4 Hz, 1H), 6.82-6.65 (m, 2H), 5.63 (s, 2H), 3.79 (br s, 2H), 3.64-3.45 (m, 2H), 2.47 (s, 3H), 1.57 (s, 2H), 0.99-0.79 (m, 2H), 0.03-0.14 (m, 9H).

Example 3. 2-(3,5-dichloro-4-((3-methyl-1H-indazol-5-yl)oxy)phenyl)-3,5-dioxo-2,3,4,5-tetrahydro-1,2,4-triazine-6-carbonitrile

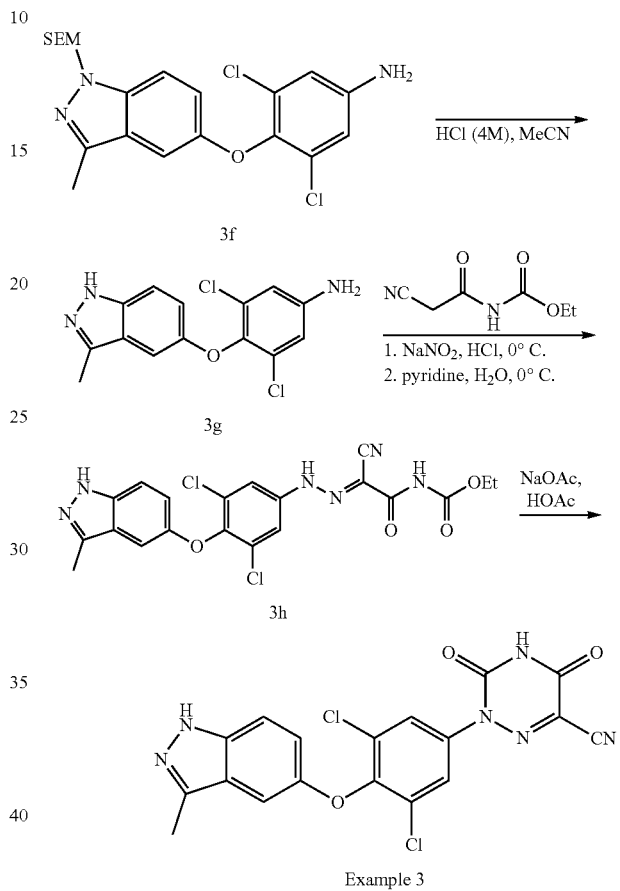

Example 3

Synthesis of 3,5-dichloro-4-((3-methyl-1H-indazol-5-yl)oxy)aniline (3g). A solution of 3,5-dichloro-4-((3-methyl-1-((2-(trimethylsilyl)ethoxy)methyl)-1H-indazol-5-yl)oxy)aniline (3f) (50 mg, 114.05 umol) in MeCN (1 mL) and HCl (1 mL) was stirred at 20° C. for 1 hours. LCMS showed 3f was consumed completely and desired MS was detected. The reaction mixture was concentrated under reduced pressure to give 3g. MS mass calculated for $[M+1]^+$ ($C_{14}H_{11}Cl_2N_3O$) requires m/z 308.0, LCMS found m/z 308.0.

Synthesis of (E)-ethyl (2-cyano-2-(2-(3,5-dichloro-4-((3-methyl-1H-indazol-5-yl)oxy)phenyl)hydrazono)acetyl)carbamate (3h). To a solution of 3,5-dichloro-4-((3-methyl-1H-indazol-5-yl)oxy)aniline (3g) (35 mg, 113.58 umol) in HCl (1 mL) and $H_2O$ (2 mL) at 0° C. and then $NaNO_2$ (10.19 mg, 147.65 umol) was added, the mixture was stirred at 0° C. for 0.5 h and then the mixture was quickly filtered to give a solution. The solution was added to ethyl N-(2-cyanoacetyl) carbamate (19.51 mg, 124.93 umol) in $H_2O$ (2 mL) and Pyr (1 mL) at 0° C., then the reaction mixture was stirred at 0° C. for another 0.5 hours. LCMS showed 3g was consumed completely and desired MS was detected. The suspension was filtered and then washed with $H_2O$ (5 mL*3). The filter cake was dried over under reduced pressure to give 3h. MS mass calculated for [M+1]$^+$ (C$_{20}$H$_{16}$Cl$_2$N$_6$O$_4$) requires m/z 475.0, LCMS found m/z 475.1.

Synthesis of 2-(3,5-dichloro-4-((3-methyl-1H-indazol-5-yl)oxy)phenyl)-3,5-dioxo-2,3,4,5-tetrahydro-1,2,4-triazine-6-carbonitrile (Example 3). To a solution of (E)-ethyl (2-cyano-2-(2-(3,5-dichloro-4-((3-methyl-1H-indazol-5-yl)oxy)phenyl)hydrazono)acetyl)-carbamate (3h), (50 mg, 105.20 umol) in HOAc (3 mL) was added NaOAc (43.15 mg, 526.00 umol). The mixture was stirred at 120° C. for 16 hours. LCMS and HPLC showed 3h was consumed completely and desired MS was detected. The reaction mixture was concentrated under reduced pressure to give a residue. The residue was purified by Prep-HPLC (FA) column: Phenomenex Luna C18 150*30 mm*5 um; mobile phase: [water (0.2% FA)-MeCN]; to give Example 3. MS mass calculated for [M+1]$^+$ (C$_{18}$H$_{10}$Cl$_2$N$_6$O$_3$) requires m/z 429.0, LCMS found m/z 429.0. $^1$H NMR (400 MHz, CD$_3$OD) δ 7.80 (s, 2H), 7.48 (d, J=9.0 Hz, 1H), 7.17 (dd, J=9.0, 2.4 Hz, 1H), 6.88 (d, J=2.2 Hz, 1H), 2.44 (s, 3H).

Example 4. N-(3,5-dichloro-4-((3-methyl-1H-indazol-5-yl)oxy)phenyl)-5-oxo-4,5-dihydro-1,2,4-oxadiazole-3-carboxamide

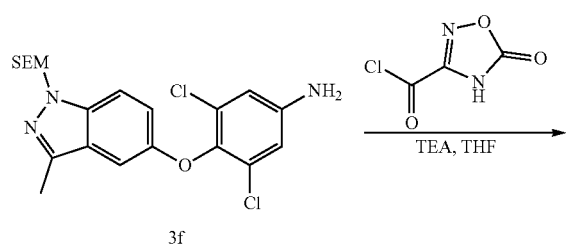

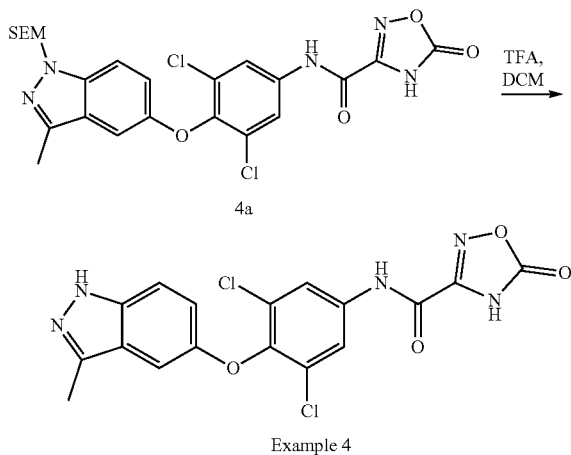

Example 4

Synthesis of N-(3,5-dichloro-4-((3-methyl-1-((2-(trimethylsilyl)ethoxy)methyl)-1H-indazol-5-yl)oxy)phenyl)-5-oxo-4,5-dihydro-1,2,4-oxadiazole-3-carboxamide (4a). To a mixture of 3,5-dichloro-4-((3-methyl-1-((2-(trimethylsilyl)ethoxy)methyl)-1H-indazol-5-yl)oxy)aniline (3f) (30 mg, 68.43 umol) in THF (2 mL) was added TEA (20.77 mg, 205.28 umol) and 5-oxo-4H-1,2,4-oxadiazole-3-carbonyl chloride (30.49 mg, 205.28 umol) under N$_2$. The mixture was stirred at 25° C. for 16 hours. TLC and LCMS showed the 3f was consumed completely and desired MS was detected. The residue was poured into water (5 mL). The aqueous phase was extracted with ethyl acetate (10 mL*3). The combined organic phase was washed with brine (10 mL*2), dried with anhydrous Na$_2$SO$_4$, filtered and concentrated in vacuum. The residue was purified by Prep-TLC (SiO$_2$, petroleum ether/ethyl acetate) to give 4a. MS mass calculated for [M+1]$^+$ (C$_{23}$H$_{25}$Cl$_2$N$_5$O$_5$Si) requires m/z 550.1, LCMS found m/z 550.1.

Synthesis of N-(3,5-dichloro-4-((3-methyl-1H-indazol-5-yl)oxy)phenyl)-5-oxo-4,5-dihydro-1,2,4-oxadiazole-3-carboxamide (Example 4). To a mixture of N-(3,5-dichloro-4-((3-methyl-1-((2-(trimethylsilyl)ethoxy)methyl)-1H-indazol-5-yl)oxy)phenyl)-5-oxo-4,5-dihydro-1,2,4-oxadiazole-3-carboxamide (4a) (20 mg, 36.33 umol) in DCM (1.5 mL) was added TFA (0.5 mL) under N$_2$. The mixture was stirred at 25° C. for 16 hours. LCMS showed the 4a was consumed completely and desired MS was detected. The residue was poured into NaHCO$_3$ (10 mL). The aqueous phase was extracted with ethyl acetate (20 mL*2). The combined organic phase was washed with brine (10 mL*2), dried with anhydrous Na$_2$SO$_4$, filtered and concentrated in vacuum. The residue was purified by prep-HPLC (column: Phenomenex Luna C18 200*40 mm*10 um; mobile phase: [water (0.2% FA)-ACN]) to give Example 4. MS mass calculated for [M+1]$^+$ (C$_{17}$H$_{11}$Cl$_2$N$_5$O$_4$) requires m/z 420.0, LCMS found m/z 420.0; $^1$H NMR (400 MHz, CD$_3$OD) δ 7.97 (s, 2H), 7.49-7.42 (m, 1H), 7.14 (dd, J=2.4, 9.0 Hz, 1H), 6.81 (d, J=2.4 Hz, 1H), 2.47-2.40 (m, 3H).

Example 5. 6-(3,5-dichloro-4-((3-methyl-1H-indazol-5-yl)oxy)phenyl)-1,2,4-triazine-3,5(2H,4H)-dione

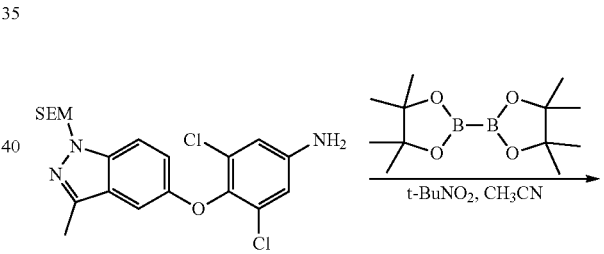

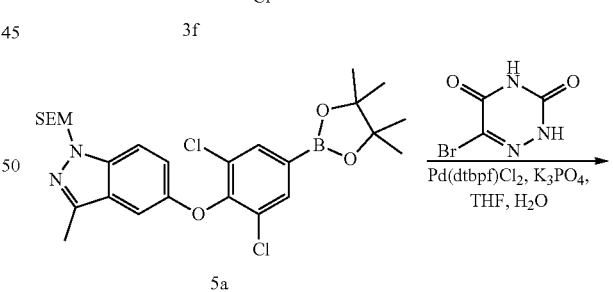

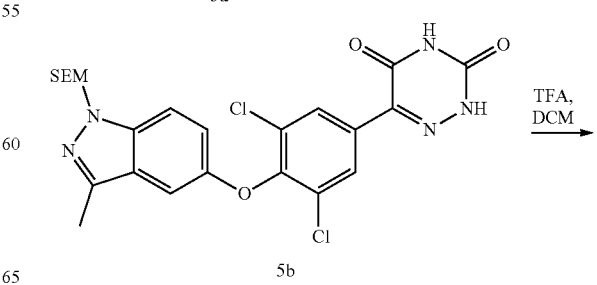

-continued

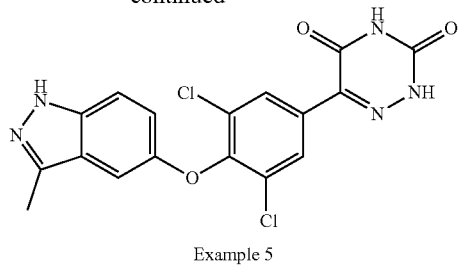

Example 5

Synthesis of 5-(2,6-dichloro-4-(4,4,5,5-tetramethyl-1,3,2-dioxaborolan-2-yl)phenoxy)-3-methyl-1-((2-(trimethylsilyl)ethoxy)methyl)-1H-indazole (5a). To a mixture of 3,5-dichloro-4-((3-methyl-1-((2-(trimethylsilyl)ethoxy)methyl)-1H-indazol-5-yl)oxy)aniline (3f) (50 mg, 114.05 umol) and BPD (86.88 mg, 342.14 umol) in $CH_3CN$ (2 mL) was added 4A MS (100 mg, 1.00 mmol, 8.77 eq) and was added t-BuONO (23.52 mg, 228.09 umol, 27.13 uL, 2 eq) at 0° C. under $N_2$. The mixture was stirred at 20° C. for 16 hours. TLC and LCMS showed the 3f was consumed completely and desired MS was detected. The reaction mixture was filtered and concentrated under reduced pressure to give a residue. The residue was purified by prep-TLC ($SiO_2$, petroleum ether/ethyl acetate) to give 5a. MS mass calculated for $[M+1]^+$ ($C_{26}H_{35}BCl_2N_2O_4Si$) requires m/z 549.2, LCMS found m/z 549.2.

Synthesis of 6-(3,5-dichloro-4-((3-methyl-1-((2-(trimethylsilyl)ethoxy)methyl)-1H-indazol-5-yl)oxy)phenyl)-1,2,4-triazine-3,5(2H,4H)-dione (5b). To a mixture of 5-(2,6-dichloro-4-(4,4,5,5-tetramethyl-1,3,2-dioxaborolan-2-yl)phenoxy)-3-methyl-1-((2-(trimethylsilyl)ethoxy)methyl)-1H-indazole (5a) (40 mg, 72.81 umol) and 6-bromo-1,2,4-triazine-3,5(2H,4H)-dione (15.38 mg, 80.09 umol) in THF (2 mL) was added the mixture of $K_3PO_4$ (30.91 mg, 145.62 umol, 2 eq) in $H_2O$ (0.5 mL) and ditert-butyl(cyclopentyl)phosphane;dichloropalladium (4.75 mg, 7.28 umol) under $N_2$. The mixture was stirred at 90° C. for 2 hours. LCMS showed the 5a was consumed completely and desired MS was detected. The mixture was poured into water (5 mL). The aqueous phase was extracted with ethyl acetate (10 mL*3). The combined organic phase was washed with brine (10 mL*2), dried with anhydrous $Na_2SO_4$, filtered and concentrated in vacuum. The residue was purified by Prep-TLC ($SiO_2$, petroleum ether/ethyl acetate) to give 5b. MS mass calculated for $[M+1]^+$ ($C_{23}H_{25}Cl_2N_5O_4Si$) requires m/z 534.1, LCMS found m/z 534.1.

Synthesis of 6-(3,5-dichloro-4-((3-methyl-1H-indazol-5-yl)oxy)phenyl)-1,2,4-triazine-3,5(2H,4H)-dione (Example 5). To a mixture of 6-(3,5-dichloro-4-((3-methyl-1-((2-(trimethylsilyl)ethoxy)methyl)-1H-indazol-5-yl)oxy)phenyl)-1,2,4-triazine-3, 5(2H,4H)-dione (5b) (20 mg, 37.42 umol) in TFA (0.5 mL) and DCM (1.5 mL) under $N_2$. The mixture was stirred at 25° C. for 16 hours. LCMS showed the 5b was consumed completely and desired MS was detected. The residue was poured into $NaHCO_3$ (5 mL). The aqueous phase was extracted with ethyl acetate (10 mL*3). The combined organic phase was washed with brine (10 mL*2), dried with anhydrous $Na_2SO_4$, filtered and concentrated in vacuum. The residue was purified by prep-HPLC (column: Phenomenex Luna C18 100*30 mm*5 um; mobile phase: [water (0.2% FA)-ACN]) to give Example 5. MS mass calculated for $[M+1]^+$ ($C_{17}H_{11}Cl_2N_5O_3$) requires m/z 404.0, LCMS found m/z 404.0; $^1$H NMR (400 MHz, $CD_3OD$) δ 8.22 (s, 2H), 7.46 (d, J=8.8 Hz, 1H), 7.18-7.09 (m, 1H), 6.85-6.78 (m, 1H), 2.45-2.40 (m, 3H).

Scheme C. Synthesis of 3,5-dichloro-4-((3-methyl-1-((2-(trimethylsilyl)ethoxy)methyl)-1H-pyrazolo[3,4-b]pyridin-5-yl)oxy)aniline (Compound 6e)

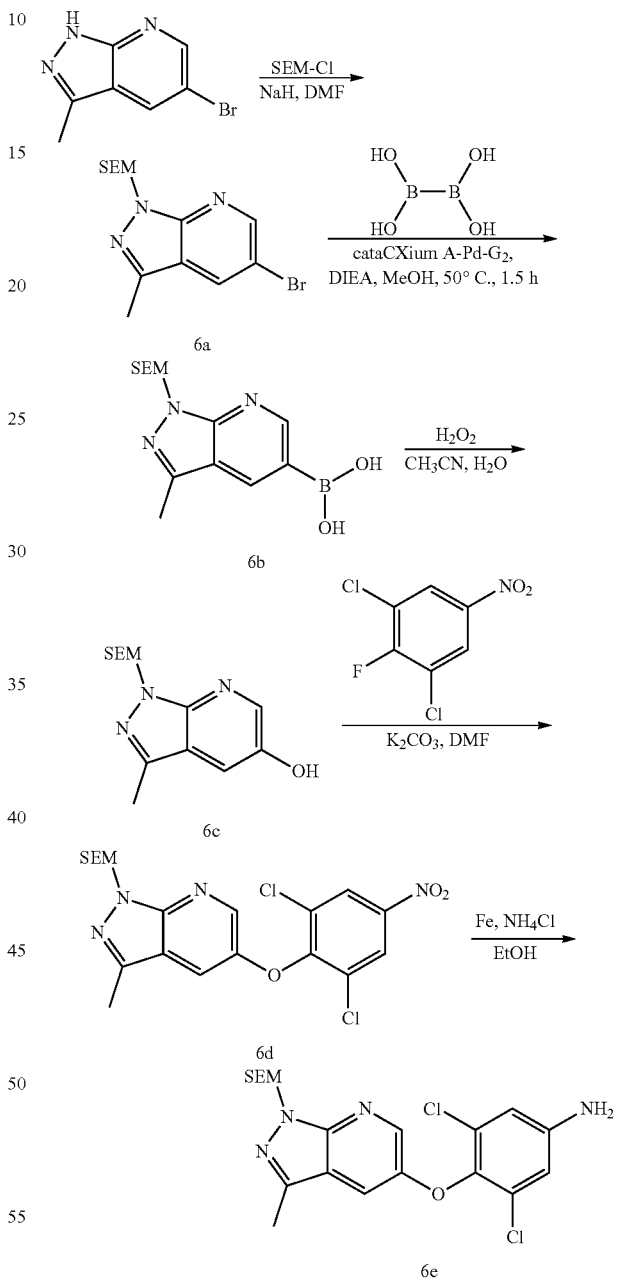

Synthesis of 5-bromo-3-methyl-1-((2-(trimethylsilyl)ethoxy)methyl)-1H-pyrazolo[3,4-b]pyridine (6a). To a solution of 5-bromo-3-methyl-1H-pyrazolo[3,4-b]pyridine (300 mg, 1.41 mmol) in DMF (2 mL) was added NaH (84.88 mg, 2.12 mmol, 60% purity) at 0° C. The mixture was stirred at 0° C. for 0.5 hr. Then SEM-Cl (283.05 mg, 1.70 mmol, 300.48 uL) was added at 0° C. The mixture was stirred at 20° C. for 1.5 hr. TLC indicated the reaction was completely and one new spot formed. The reaction mixture was quenched by addition H₂O (2 mL), and then diluted with EtOAc (10 mL) and H₂O (10 mL) and extracted with EtOAc (10 mL*2). The combined organic layers were washed with brine (10 mL), dried over anhydrous Na₂SO₄, filtered and concentrated under reduced pressure to give a residue. The residue was purified by column chromatography (SiO₂, petroleum ether: ethyl acetate) to give 6a. MS mass calculated for [M+1]⁺ (C₁₃H₂₀BrN₃OSi) requires m/z 342.0, MS found m/z 342.1; ¹H NMR (400 MHz, CDCl₃) δ 8.56 (t, J=2.4 Hz, 1H), 8.13 (t, J=2.4 Hz, 1H), 5.77 (d, J=3.0 Hz, 2H), 3.57-3.68 (m, 2H), 2.56 (d, J=3.0 Hz, 3H), 0.87-0.99 (m, 2H), −0.05 (d, J=3.0 Hz, 9H).

Synthesis of (3-methyl-1-((2-(trimethylsilyl)ethoxy)methyl)-1H-pyrazolo[3,4-b]pyridin-5-yl)boronic acid (6b). A mixture of 5-bromo-3-methyl-1-((2-(trimethylsilyl)ethoxy)methyl)-1H-pyrazolo[3,4-b]pyridine (6a) (340 mg, 993.26 umol), hypoboric acid (267.14 mg, 2.98 mmol, 3 eq), DIEA (385.11 mg, 2.98 mmol, 519.01 uL) and cataCXium A-Pd-G2 (6.64 mg, 9.93 umol) in MeOH (4 mL) was degassed and purged with N₂ for 3 times, and then the mixture was stirred at 50° C. for 1 hr under N₂ atmosphere. LCMS showed 6a was consumed completely and one main peak with desired mass was detected. The reaction mixture was concentrated under reduced pressure to remove solvent to give 6b, and used directly for the next step without purification. MS mass calculated for [M+1]⁺ (C₁₃H₂₂BN₃O₃Si) requires m/z 308.1, MS found m/z 308.1.

Synthesis of 3-methyl-1-((2-(trimethylsilyl)ethoxy)methyl)-1H-pyrazolo[3,4-b]pyridin-5-ol (6c). To a solution of (3-methyl-1-((2-(trimethylsilyl)ethoxy)methyl)-1H-pyrazolo[3,4-b]pyridin-5-yl)boronic acid (6b) (300 mg, 976.47 umol) in ACN (2 mL) was added H₂O₂ (221.43 mg, 1.95 mmol, 187.65 uL, 30% purity) and the solution of NH₄HCO₃ (77.20 mg, 976.47 umol, 80.41 uL) in H₂O (1 mL). The mixture was stirred at 20° C. for 1 hr. TLC and LCMS showed 6b was consumed completely and one main peak with desired mass was detected. The reaction mixture was diluted with EtOAc (20 mL) and Na₂SO₃ (10 mL) and extracted with EtOAc (20 mL*2). The combined organic layers were washed with brine (10 mL), dried over anhydrous Na₂SO₄, filtered and concentrated under reduced pressure to give a residue. The residue was purified by column chromatography (SiO₂, (petroleum ether:ethyl acetate) to give 6c. MS mass calculated for [M+1]⁺ (C₁₃H₂₁N₃O₂Si) requires m/z 280.1, MS found m/z 280.1; ¹H NMR (400 MHz, CDCl₃) δ 8.26-8.33 (m, 1H), 7.40 (d, J=2.6 Hz, 1H), 5.76 (s, 2H), 3.57-3.66 (m, 2H), 2.53 (s, 3H), 0.85-1.03 (m, 2H), −0.10--0.04 (m, 9H).

Synthesis of 5-(2,6-dichloro-4-nitrophenoxy)-3-methyl-1-((2-(trimethylsilyl)ethoxy)methyl)-1H-pyrazolo[3,4-b]pyridine (6d). To a solution of 3-methyl-1-((2-(trimethylsilyl)ethoxy)methyl)-1H-pyrazolo[3,4-b]pyridin-5-ol (6c) (175 mg, 626.32 umol, 1 eq) in DMF (2 mL) was added K₂CO₃ (129.84 mg, 939.48 umol) and 1,3-dichloro-2-fluoro-5-nitrobenzene (144.67 mg, 688.95 umol). The mixture was stirred at 20° C. for 1 hr. TLC and LCMS showed 6c was consumed completely and one main peak with desired mass was detected. The reaction mixture was diluted with EtOAc (10 mL) and H₂O (10 mL) and extracted with EtOAc (10 mL*2). The combined organic layers were washed with brine (5 mL), dried over anhydrous Na₂SO₄, filtered and concentrated under reduced pressure to give a residue. The residue was purified by column chromatography (SiO₂, petroleum ether:ethyl acetate) to give 6d. MS mass calculated for [M+1]⁺ (C₁₉H₂₂Cl₂N₄O₄Si) requires m/z 469.0, MS found m/z 469.1; ¹H NMR (400 MHz, CDCl₃) δ 8.45 (d, J=2.6 Hz, 1H), 8.36 (s, 2H), 7.18 (d, J=2.6 Hz, 1H), 5.79 (s, 2H), 3.59-3.73 (m, 2H), 2.51 (s, 3H), 0.84-1.04 (m, 2H), −0.04 (s, 9H).

Synthesis of 3,5-dichloro-4-((3-methyl-1-((2-(trimethylsilyl)ethoxy)methyl)-1H-pyrazolo[3,4-b]pyridin-5-yl)oxy)aniline (6e). To a solution of 5-(2,6-dichloro-4-nitrophenoxy)-3-methyl-1-((2-(trimethylsilyl)ethoxy)methyl)-1H-pyrazolo[3,4-b]pyridine (6d) (180 mg, 383.47 umol) in EtOH (3 mL) was added Fe (107.08 mg, 1.92 mmol) and the solution of NH₄Cl (102.56 mg, 1.92 mmol) in H₂O (0.1 mL). The mixture was stirred at 80° C. for 1 hr. TLC and LCMS showed 6d was consumed completely and one main peak with desired mass was detected. The suspension was filtered through a pad of Celite gel and the pad was washed with EtOH (20 mL). The filtrate was concentrated to dryness to give the residue. The residue was diluted with EtOAc (10 mL) and H₂O (10 mL) and extracted with EtOAc (10 mL*2). The combined organic layers were washed with brine (5 mL), dried over anhydrous Na₂SO₄, filtered and concentrated under reduced pressure to give 6e. MS mass calculated for [M+1]⁺ (C₁₉H₂₄Cl₂N₄O₂Si) requires m/z 439.1, MS found m/z 439.1; ¹H NMR (400 MHz, CDCl₃) δ 8.45 (d, J=2.6 Hz, 1H), 7.15 (d, J=2.6 Hz, 1H), 6.74 (s, 2H), 5.77 (s, 2H), 3.82 (br s, 2H), 3.60-3.67 (m, 2H), 2.49 (s, 3H), 0.84-0.99 (m, 2H), −0.05 (s, 9H).

Example 6. N-(3,5-dichloro-4-((3-methyl-1H-pyrazolo[3,4-b]pyridin-5-yl)oxy)phenyl)-5-oxo-4,5-dihydro-1,2,4-oxadiazole-3-carboxamide

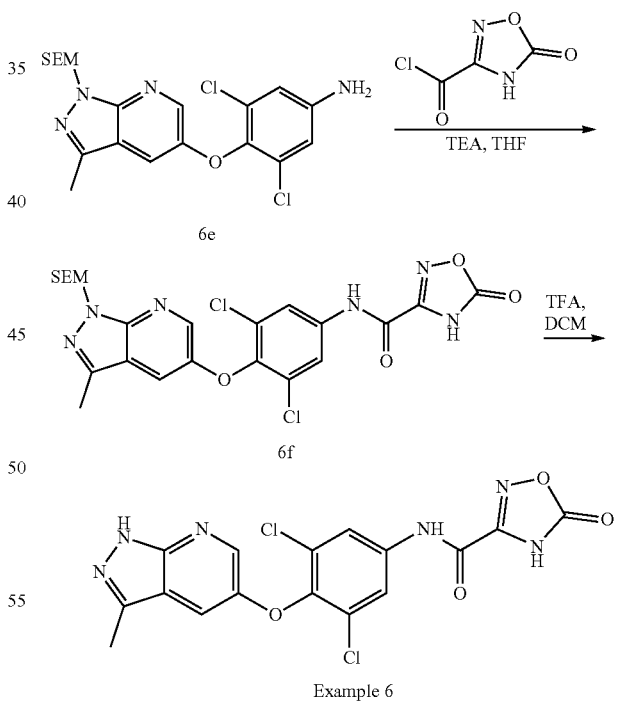

Example 6

Synthesis of N-(3,5-dichloro-4-((3-methyl-1-((2-(trimethylsilyl)ethoxy)methyl)-1H-pyrazolo[3,4-b]pyridin-5-yl)oxy)phenyl)-5-oxo-4,5-dihydro-1,2,4-oxadiazole-3-carboxamide (6f). To a solution of 3,5-dichloro-4-((3-methyl-1-((2-(trimethylsilyl)ethoxy)methyl)-1H-pyrazolo[3,4-b]pyridin-5-yl)oxy)aniline (6e) (50 mg, 113.79 umol) in THF (3 mL) was added TEA (34.54 mg, 341.37 umol) and 5-oxo-4,5- dihydro-1,2,4-oxadiazole-3-carbonyl chloride (25.35 mg, 170.68 umol). The mixture was stirred at 20° C. for 0.5 hours. TLC and LCMS showed the 6e was consumed and desired mass was detected. The reaction mixture was quenched by addition H$_2$O (0.5 mL). The reaction mixture was diluted with EtOAc (10 mL) and H$_2$O (10 mL) and extracted with EtOAc (10 mL*2). The combined organic layers were washed with brine (5 mL), dried over anhydrous Na$_2$SO$_4$, filtered and concentrated under reduced pressure to give a residue. The residue was purified by prep-TLC (SiO$_2$, petroleum ether:ethyl acetate*0.2% HOAc) to give 6f. MS mass calculated for [M+1]$^+$ (C$_{22}$H$_{24}$Cl$_2$N$_6$O$_5$Si) requires m/z 551.1, LCMS found m/z 551.1.

Synthesis of N-(3,5-dichloro-4-((3-methyl-1H-pyrazolo[3,4-b]pyridin-5-yl)oxy)phenyl)-5-oxo-4,5-dihydro-1,2,4-oxadiazole-3-carboxamide (Example 6). A mixture of N-(3,5-dichloro-4-((3-methyl-1-((2-(trimethylsilyl)ethoxy)methyl)-1H-pyrazolo[3,4-b]pyridin-5-yl)oxy)phenyl)-5-oxo-4,5-dihydro-1,2,4-oxadiazole-3-carboxamide (6f) (58 mg, 105.18 umol) in the mixture of TFA (1 mL) and DCM (2 mL) was stirred at 20° C. for 1 hour under N$_2$ atmosphere. LCMS showed 6f was consumed and desired mass was detected. The reaction mixture was quenched by addition H$_2$O (0.5 mL). The reaction mixture was concentrated under reduced pressure to remove solvent. The residue was purified by prep-HPLC (column: Waters Xbridge BEH C18 100*25 mm*5 um; mobile phase: [water (10 mM NH$_4$HCO$_3$)-MeCN]) and prep-HPLC (column: Phenomenex Luna C18 100*30 mm*5 um; mobile phase: [water (0.2% FA)-MeCN]) to give Example 6. MS mass calculated for [M+1]$^+$ (C$_{16}$H$_{10}$Cl$_2$N$_6$O$_4$) requires m/z 421.0, LCMS found m/z 421.0; $^1$H NMR (400 MHz, CD$_3$OD) δ 8.38 (d, J=2.6 Hz, 1H) 8.00 (s, 2H) 7.38 (d, J=2.6 Hz, 1H) 2.46 (s, 3H).

Example 7. 2-(3,5-dichloro-4-((3-methyl-1H-pyrazolo[3,4-b]pyridin-5-yl)oxy)phenyl)-3,5-dioxo-2,3,4,5-tetrahydro-1,2,4-triazine-6-carbonitrile Synthesis of (E)-ethyl (2-cyano-2-(2-(3,5-dichloro-4-((3-methyl-1H-pyrazolo[3,4-b]pyridin-5-yl)oxy)phenyl)hydrazono)acetyl)carbamate (7a). To a solution of 3,5-dichloro-4-((3-methyl-1-((2-(trimethylsilyl)ethoxy)methyl)-1H-pyrazolo[3,4-b]pyridin-5-yl)oxy)aniline (6e) (30 mg, 97.04 umol) in HCl (1 mL) and H$_2$O (2 mL) was added NaNO$_2$ (8.70 mg, 126.15 umol). The mixture was stirred at 0° C. for 0.5 hours. Then the solution was added to a solution of ethyl (2-cyanoacetyl)carbamate (16.67 mg, 106.74 umol) in Pyr (1 mL) and H$_2$O (2 mL) at 0° C. The mixture was stirred at 0° C. for another 0.5 hours. LCMS showed 6e was consumed completely and one main peak with desired mass was detected. The reaction mixture was filtered. The filter cake was washed with H$_2$O (10 mL), dried in vacuum to give 7a. MS mass calculated for [M+1]$^+$ (C$_{19}$H$_{15}$Cl$_2$N$_7$O$_4$) requires m/z 476.0, LCMS found m/z 476.1.

Synthesis of 2-(3,5-dichloro-4-((3-methyl-1H-pyrazolo[3,4-b]pyridin-5-yl)oxy)phenyl)-3,5-dioxo-2,3,4,5-tetrahydro-1,2,4-triazine-6-carbonitrile (Example 7). To a solution of (E)-ethyl (2-cyano-2-(2-(3,5-dichloro-4-((3-methyl-1H-pyrazolo[3,4-b]pyridin-5-yl)oxy)phenyl)hydrazono)acetyl)carbamate (7a) (40 mg, 83.99 umol) in HOAc (2 mL) was added NaOAc (34.45 mg, 419.93 umol). The mixture was stirred at 120° C. for 3 hours. LCMS showed 7a was consumed completely and one main peak with desired mass was detected. The reaction mixture was concentrated under reduced pressure to remove solvent. The residue was purified by prep-HPLC (column: Phenomenex Luna C18 100*30 mm*5 um; mobile phase: [water (0.2% FA)-MeCN]) to give Example 7. MS mass calculated for [M+1]$^+$ (C$_{17}$H$_9$Cl$_2$N$_7$O$_3$) requires m/z 430.0, MS found m/z 429.9; $^1$H NMR (400 MHz, DMSO-d$_6$) δ 13.29 (s, 2H) 8.45 (d, J=2.6 Hz, 1H) 7.83 (s, 2H) 7.58 (br d, J=2.6 Hz, 1H) 2.42 (s, 3H).

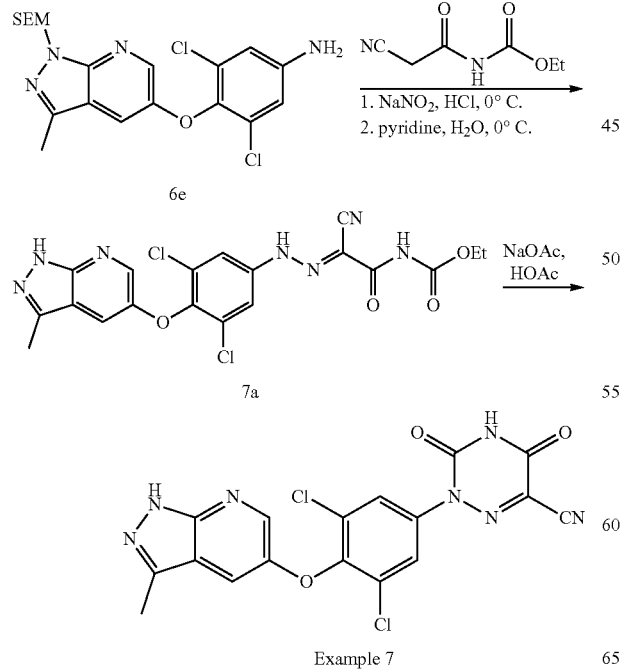

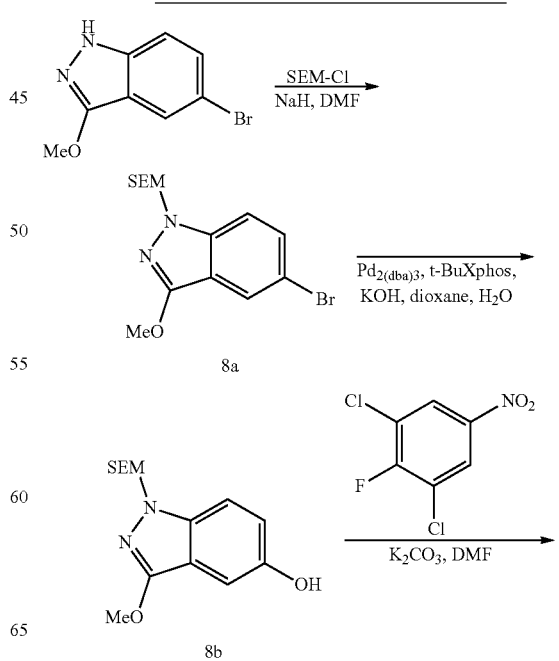

Scheme D. Synthesis of 3,5-dichloro-4-((3-methoxy-1-((2-(trimethylsilyl)ethoxy)methyl)-1H-indazol-5-yl)oxy)aniline (Compound 8d)

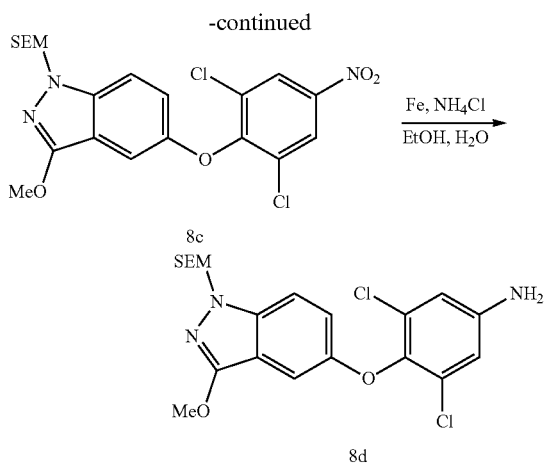

Synthesis of 5-bromo-3-methoxy-1-((2-(trimethylsilyl) ethoxy)methyl)-1H-indazole (8a). To a solution of 5-bromo-3-methoxy-1H-indazole (500 mg, 2.20 mmol) in DMF (10 mL) was added NaH (105.69 mg, 2.64 mmol, 60% purity) by portions at 0° C. over 5 minutes. After addition, the mixture was stirred at 0° C. for 0.5 hours, and then SEM-Cl (550.70 mg, 3.30 mmol, 584.61 uL) was added dropwise at 0° C. The resulting mixture was stirred at 0° C. for 1 hour. TLC indicated starting material was consumed, and one major new spot was detected. The reaction mixture was poured into NH₄Cl aq (40 mL), and then extracted with EtOAc (30 mL*2). The combined organic layers were washed with brine (20 mL*2), dried over with Na₂SO₄, filtered and concentrated under reduced pressure. The residue was purified by column chromatography (SiO₂, petroleum ether/ethyl acetate) to give 8a.

Synthesis of 3-methoxy-1-((2-(trimethylsilyl)ethoxy) methyl)-1H-indazol-5-ol (8b). A mixture of 5-bromo-3-methoxy-1-((2-(trimethylsilyl)ethoxy)methyl)-1H-indazole (8a) (250 mg, 699.66 umol), KOH (51.04 mg, 909.56 umol), Pd₂(dba)₃ (64.07 mg, 69.97 umol) and t-Bu Xphos (44.57 mg, 104.95 umol) in dioxane (5 mL) and H₂O (5 mL) was degassed and purged with N₂ for 3 times, and then the mixture was stirred at 100° C. for 16 hours under N₂ atmosphere. TLC showed 8a was consumed completely and many new spots were formed. LCMS showed desired MS. The suspension was filtered with a pad of Celite and the pad cake was washed with EtOAc (5 ml*3). The combined filtrates were extracted Ethyl acetate 15 mL and H₂O 5 mL twice. The combined organic phase was washed with brine (10 mL*3), dried with anhydrous Na₂SO₄, filtered and concentrated in vacuum to give a residue. The residue was purified by prep-TLC (SiO₂, ethyl acetate: petroleum ether) to give 8b. MS mass calculated for [M−1]⁻ ($C_{14}H_{22}N_2O_3Si$) requires m/z 293.0, LCMS found m/z 293.0.

Synthesis of 5-(2,6-dichloro-4-nitrophenoxy)-3-methoxy-1-((2-(trimethylsilyl)ethoxy)methyl)-1H-indazole (8c). To a solution of 3-methoxy-1-((2-(trimethylsilyl)ethoxy)methyl)-1H-indazol-5-ol (8b) (30 mg, 101.90 umol) and 1,3-dichloro-2-fluoro-5-nitrobenzene (23.54 mg, 112.08 umol) in DMF (2 mL) was added K₂CO₃ (21.12 mg, 152.84 umol). The mixture was degassed and purged with N₂ for 3 times and stirred at 20° C. for 1 hour. TLC showed 8c was consumed completely and one new spot was formed. The mixture was extracted Ethyl acetate (15 mL) and H₂O (5 mL). The combined organic phase was washed with brine (10 mL*3), dried with anhydrous Na₂SO₄, filtered and concentrated in vacuum to give a residue. The residue was purified by Prep-TLC (SiO₂, petroleum ether:ethyl acetate) to give 8c.

Synthesis of 3,5-dichloro-4-((3-methoxy-1-((2-(trimethylsilyl)ethoxy)methyl)-1H-indazol-5-yl)oxy)aniline (8d). To a solution of 5-(2,6-dichloro-4-nitrophenoxy)-3-methoxy-1-((2-(trimethylsilyl)ethoxy)methyl)-1H-indazole (8c) (20 mg, 41.29 umol) in EtOH (2 mL) and H₂O (0.5 mL) was added iron powder (11.53 mg, 206.44 umol) and NH₄Cl (11.04 mg, 206.44 umol). The mixture was stirred at 80° C. for 2 hours. TLC showed 8d was consumed completely and one new spot was formed. The suspension was filtered with a pad of Celite and the pad cake was washed with EtOH (5 mL*3). The combined filtrates were extracted DCM (15 mL*2) and H₂O (5 mL). The combined organic phase was washed with brine (10 mL*3), dried with anhydrous Na₂SO₄, filtered and blow dry with nitrogen gas to give 8d. MS mass calculated for [M+1]⁺ ($C_{20}H_{25}Cl_2N_3O_3Si$) requires m/z 454.1, LCMS found m/z 454.1; ¹H NMR (400 MHz, CDCl₃) δ 7.33-7.37 (m, 1H), 7.22 (dd, J=9.0, 2.4 Hz, 1H), 6.79 (d, J=2.0 Hz, 1H), 6.71 (s, 2H), 5.51 (s, 2H), 4.05 (s, 3H), 3.73 (q, J=7.0 Hz, 2H), 3.53-3.59 (m, 2H), 1.25-1.28 (m, 4H), 0.87-0.93 (m, 2H), −0.06-−0.03 (m, 9H).

Example 8. Synthesis of N-(3,5-dichloro-4-((3-methoxy-1H-indazol-5-yl)oxy)phenyl)-5-oxo-4,5-dihydro-1,2,4-oxadiazole-3-carboxamide

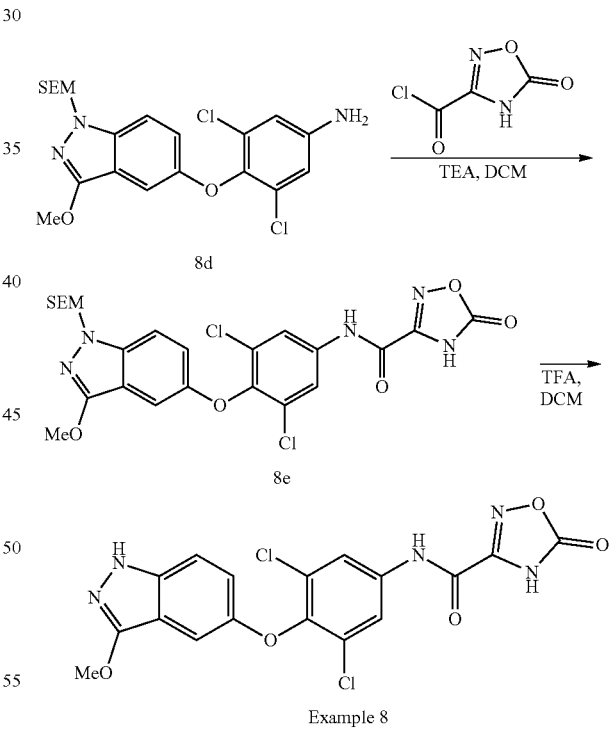

Example 8

Synthesis of N-(3,5-dichloro-4-((3-methoxy-1-((2-(trimethylsilyl)ethoxy)methyl)-1H-indazol-5-yl)oxy)phenyl)-5-oxo-4,5-dihydro-1,2,4-oxadiazole-3-carboxamide (8e). To a solution of 3,5-dichloro-4-((3-methoxy-1-((2-(trimethylsilyl)ethoxy)methyl)-1H-indazol-5-yl)oxy)aniline (8d) (7 mg, 15.40 umol) in DCM (0.5 mL) was added TEA (4.68 mg, 46.21 umol, 6.43 uL) and 5-oxo-4H-1,2,4-oxadiazole-3-carbonyl chloride (3.43 mg, 23.11 umol). The mixture was stirred at 25° C. for 0.5 hours. TLC showed 8d was consumed completely and one new spot was formed. LCMS showed desired MS. The mixture was quenched with H$_2$O (5 mL) and then extracted DCM (10 mL*2) and H$_2$O (5 mL). The combined organic phase was washed with brine (10 mL*3), dried with anhydrous Na$_2$SO$_4$, filtered and concentrated in vacuum. The residue was purified by Prep-TLC (petroleum ether:ethyl acetate) to give 8e. MS mass calculated for [M+1]$^+$ (C$_{23}$H$_{25}$Cl$_2$N$_5$O$_6$Si) requires m/z 566.1, LCMS found m/z 566.1; $^1$H NMR (400 MHz, CD$_3$OD) δ 7.97 (s, 2H), 7.50 (br d, J=9.05 Hz, 1H), 7.19 (br dd, J=8.8, 2.2 Hz, 1H), 6.71 (d, J=2.0 Hz, 1H), 5.54 (s, 2H), 4.28-4.40 (m, 7H), 4.02 (s, 4H), 3.88 (s, 1H), 3.52-3.67 (m, 11H), 3.42-3.50 (m, 10H), 1.76-1.87 (m, 12H), 1.62-1.76 (m, 12H), 0.77-0.90 (m, 3H), −0.08 (s, 9H).

Synthesis of N-(3,5-dichloro-4-((3-methoxy-1H-indazol-5-yl)oxy)phenyl)-5-oxo-4,5-dihydro-1,2,4-oxadiazole-3-carboxamide (Example 8). A solution of N-(3,5-dichloro-4-((3-methoxy-1-((2-(trimethylsilyl)ethoxy)methyl)-1H-indazol-5-yl)oxy)phenyl)-5-oxo-4,5-dihydro-1,2,4-oxadiazole-3-carboxamide (8e) (5 mg, 8.83 umol) in TFA (0.5 mL) and DCM (1 mL) was stirred at 25° C. for 24 hours. LCMS and HPLC showed 8e was consumed completely and desired MS was detected. The mixture was concentrated in vacuum, and the residue was purified by Prep-HPLC (column: Phenomenex Synergi C18 150*25*10 um; mobile phase: [water (0.2% FA)-MeCN]) to give Example 8. MS mass calculated for [M+1]$^+$ (C$_{17}$H$_{11}$Cl$_2$N$_5$O$_5$) requires m/z 435.9, LCMS found m/z 435.9; $^1$H NMR (400 MHz, CD$_3$OD) δ 7.96 (s, 2H), 7.34 (d, J=9.0 Hz, 1H), 7.15 (dd, J=9.0, 2.4 Hz, 1H), 6.66 (d, J=2.0 Hz, 1H), 4.00 (s, 3H).

Example 9. 2-(3,5-dichloro-4-((3-methoxy-1H-indazol-5-yl)oxy)phenyl)-3,5-dioxo-2,3,4,5-tetrahydro-1,2,4-triazine-6-carbonitrile

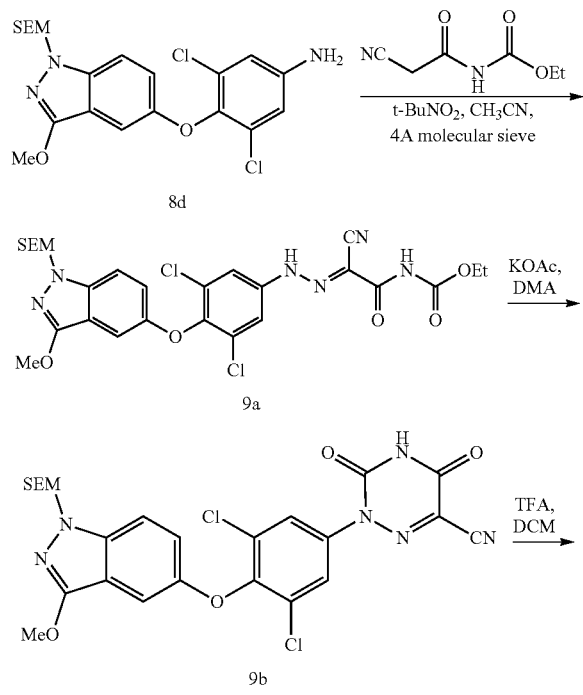

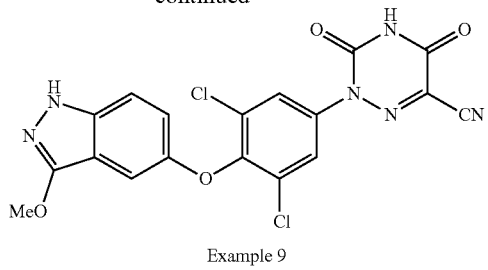

Example 9

Synthesis of (E)-ethyl (2-cyano-2-(2-(3,5-dichloro-4-((3-methoxy-1-((2-(trimethylsilyl)ethoxy)methyl)-1H-indazol-5-yl)oxy)phenyl)hydrazono)acetyl)carbamate (9a). To a mixture of 3,5-dichloro-4-((3-methoxy-1-((2-(trimethylsilyl)ethoxy)-methyl)-1H-indazol-5-yl)oxy)aniline (8d) (20 mg, 44.01 umol) and ethyl (2-cyanoacetyl)carbamate (7.56 mg, 48.41 umol) in CH$_3$CN (2.5 mL) was added t-BuONO (9.08 mg, 88.02 umol, 10.47 uL) at 0° C. Then the mixture was stirred at 0° C. for 1 hour. LCMS showed 8d was consumed completely and desired MS was detected. The suspension was filtered. The pad cake was diluted in MeOH (15 mL) and concentrated in vacuum to give 9a. MS mass calculated for [M+1]$^+$ (C$_{26}$H$_3$OCl$_2$N$_6$O$_6$Si) requires m/z 621.1, LCMS found m/z 621.2.

Synthesis of 2-(3,5-dichloro-4-((3-methoxy-1-((2-(trimethylsilyl)ethoxy)methyl)-1H-indazol-5-yl)oxy)phenyl)-3,5-dioxo-2,3,4,5-tetrahydro-1,2,4-triazine-6-carbonitrile (9b). To a solution of (E)-ethyl (2-cyano-2-(2-(3,5-dichloro-4-((3-methoxy-1-((2-(trimethylsilyl)ethoxy)methyl)-1H-indazol-5-yl)oxy)phenyl)hydrazono)acetyl)carb-amate (9a) (25 mg, 40.22 umol) in DMA (3 mL) was added KOAc (7.89 mg, 80.44 umol). The mixture was stirred at 115° C. for 2 hours. LCMS and HPLC showed 9a was consumed completely and desired MS was detected. The reaction mixture was extracted with Ethyl acetate (15 mL*2) and H$_2$O (5 mL). The combined organic phase was washed with brine (10 mL*3), dried with anhydrous Na$_2$SO$_4$, filtered and concentrated in vacuum to give a residue. The residue was purified by Prep-HPLC (FA) column: Phenomenex Synergi C18 150*25*10 um; mobile phase: [water (0.2% FA)-MeCN] to give 9b. $^1$HNMR (400 MHz, CD$_3$OD) δ 7.80 (s, 2H), 7.53 (d, J=9.2 Hz, 1H), 7.23 (dd, J=9.2, 2.4 Hz, 1H), 6.77 (d, J=2.0 Hz, 1H), 5.55 (s, 2H), 4.03 (s, 4H), 3.56 (t, J=8.0 Hz, 2H), 0.84 (t, J=8.0 Hz, 2H), −0.08 (s, 9H).

Synthesis of 2-(3,5-dichloro-4-((3-methoxy-1H-indazol-5-yl)oxy)phenyl)-3,5-dioxo-2,3,4,5-tetrahydro-1,2,4-triazine-6-carbonitrile (Example 9). A solution of 2-(3,5-dichloro-4-((3-methoxy-1-((2-(trimethylsilyl)ethoxy)methyl)-1H-indazol-5-yl)oxy)phenyl)-3,5-dioxo-2,3,4,5-tetrahydro-1,2,4-triazine-6-carbonitrile (9b) (4 mg, 6.95 umol) in TFA (0.5 mL) and DCM (1 mL) was stirred at 25° C. for 16 hours. LCMS and HPLC showed 9b was consumed completely and desired MS was detected. The mixture was concentrated in vacuum to give a residue. The residue was purified by Prep-HPLC (column: Phenomenex Synergi C18 150*25*10 um; mobile phase: [water (0.2% FA)-MeCN]) to give Example 9. MS mass calculated for [M+1] (C$_{18}$H$_{10}$Cl$_2$N$_6$O$_4$) requires m/z 445.0, LCMS found m/z 444.9; $^1$H NMR (400 MHz, CD$_3$OD) δ 7.79 (s, 2H), 7.35 (d, J=9.0 Hz, 1H), 7.18 (dd, J=9.0, 2.45 Hz, 1H), 6.72-6.74 (m, 1H), 4.01 (s, 3H).

Example 10. N-(3,5-dichloro-4-((1-methyl-1H-benzo[d]imidazol-6-yl)oxy)phenyl)-5-oxo-4,5-dihydro-1,2,4-oxadiazole-3-carboxamide

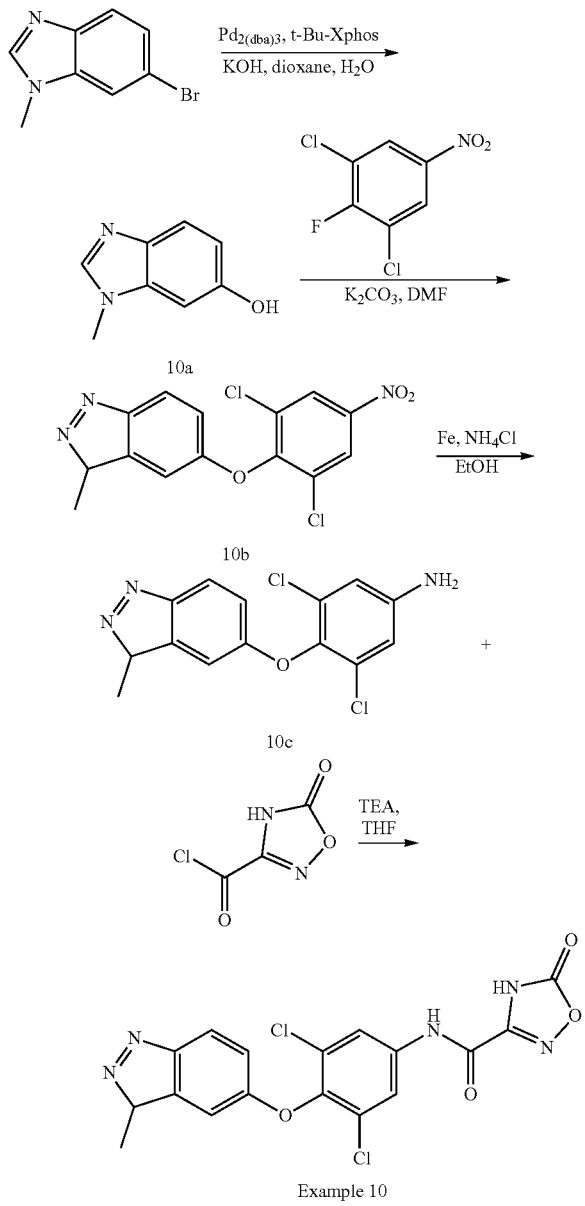

Example 10

Synthesis of 1-methyl-1H-benzo[d]imidazol-6-ol (10a). A mixture of 6-bromo-1-methyl-1H-benzo[d]imidazole (620 mg, 2.94 mmol), KOH (214.28 mg, 3.82 mmol), Pd$_2$(dba)$_3$ (269.00 mg, 293.76 umol) and t-Bu Xphos (187.11 mg, 440.64 umol) in dioxane (5 mL) and H$_2$O (5 mL) was degassed and purged with N$_2$ for 3 times, and then the mixture was stirred at 100° C. for 3.5 hours under N$_2$ atmosphere. TLC showed starting material was consumed completely and many new spots was formed. LCMS showed desired MS. The suspension was filtered through a pad of Celite and the pad cake was washed with EtOAc (10 ml*3). The combined filtrates were extracted Ethyl acetate 30 mL and H$_2$O 10 mL twice. The combined organic phase was washed with brine (15 mL*3), dried with anhydrous Na$_2$SO$_4$, filtered and concentrated in vacuum to give a residue. The residue was purified by prep-TLC (SiO$_2$, ethyl acetate/MeOH) to give 10a. MS mass calculated for [M+1]$^+$ (C$_8$H$_8$N$_2$O) requires m/z 149.1, LCMS found m/z 149.2; $^1$H NMR (400 MHz, CD$_3$OD) δ 7.92 (s, 1H), 7.44 (d, J=8.6 Hz, 1H), 6.86 (d, J=2.0 Hz, 1H), 6.79 (dd, J=8.6, 2.2 Hz, 1H), 3.79 (s, 3H).

Synthesis of 6-(2,6-dichloro-4-nitrophenoxy)-1-methyl-1H-benzo[d]imidazole (10b). To a solution of 1-methyl-1H-benzo[d]imidazol-6-ol (10a) (200 mg, 1.35 mmol) and 1,3-dichloro-2-fluoro-5-nitrobenzene (311.81 mg, 1.48 mmol) in DMF (10 mL) was added K$_2$CO$_3$ (279.85 mg, 2.02 mmol). The mixture was degassed and purged with N$_2$ for 3 times and stirred at 20° C. for 1 hour. TLC showed 10a was consumed completely and one new spot was formed. LCMS showed desired MS. The mixture was extracted Ethyl acetate (30 mL*2) and H$_2$O (10 mL). The combined organic phase was washed with brine (10 mL*3), dried with anhydrous Na$_2$SO$_4$, filtered and concentrated in vacuum. The residue was purified by Prep-TLC (ethyl acetate: MeOH) to give 10b. MS mass calculated for [M+1]$^+$ (C$_{14}$H$_9$Cl$_2$N$_3$O$_3$) requires m/z 338.0, LCMS found m/z 338.0; $^1$H NMR (400 MHz, DMSO) δ 8.56 (s, 2H), 8.14 (s, 1H), 7.62 (d, J=8.6 Hz, 1H), 7.09 (d, J=2.4 Hz, 1H), 6.85 (dd, J=8.6, 2.4 Hz, 1H), 3.33 (s, 3H), 3.31 (s, 1H).

Synthesis of 3,5-dichloro-4-((1-methyl-1H-benzo[d]imidazol-6-yl)oxy)aniline (10c). To a solution of 6-(2,6-dichloro-4-nitrophenoxy)-1-methyl-1H-benzo[d]imidazole (10b) (180 mg, 532.32 umol) in EtOH (8 mL) was added Fe (148.65 mg, 2.66 mmol) and NH$_4$Cl (142.37 mg, 2.66 mmol). The mixture was stirred at 80° C. for 2 hours. TLC showed 10b was consumed completely and one new spot was formed. LCMS showed desired MS. The suspension was filtered with a pad of Celite and the pad cake was washed with EtOAc (5 mL*3). The combined filtrates were extracted ethyl acetate (30 mL) and H$_2$O (10 mL). The combined organic phase was washed with brine (10 mL*3), dried with anhydrous Na$_2$SO$_4$, filtered and concentrated in vacuum to give 10c. MS mass calculated for [M+1]$^+$ (C$_{14}$H$_{11}$Cl$_2$N$_3$O) requires m/z 308.0, LCMS found m/z 308.0; $^1$H NMR (400 MHz, DMSO) δ 8.09 (s, 1H), 7.56 (d, J=8.8 Hz, 1H), 6.88 (d, J=2.4 Hz, 1H), 6.72-6.74 (m, 3H), 6.71 (d, J=2.4 Hz, 1H), 5.61-5.66 (m, 2H), 3.74 (s, 3H).

Synthesis of N-(3,5-dichloro-4-((1-methyl-1H-benzo[d]imidazol-6-yl)oxy)phenyl)-5-oxo-4,5-dihydro-1,2,4-oxadiazole-3-carboxamide (Example 10). A solution of 3,5-dichloro-4-((1-methyl-1H-benzo[d]imidazol-6-yl)oxy)aniline (10c) (50 mg, 162.25 umol) and NaH (6.49 mg, 162.25 umol, 60% purity) in DMSO (5 mL) was stirred at 20° C. for 10 minutes, then 5-oxo-4,5-dihydro-1,2,4-oxadiazole-3-carbonyl chloride (36.14 mg, 243.38 umol) was added in the mixture. The mixture was stirred at 20° C. for 0.5 hours. TLC (ethyl acetate: MeOH) showed one new spot was formed. LCMS showed desired MS. The mixture was extracted with ethyl acetate (15 mL) and saturated NH$_4$Cl aqueous solution (5 mL). The combined organic phase was washed with brine (5 mL*3), dried with anhydrous Na$_2$SO$_4$, filtered and concentrated in vacuum. The residue was purified by Prep-HPLC (column: Phenomenex Luna C18 100*30 mm*5 um; mobile phase: [water (0.2% FA)-MeCN) to give Example 10. MS mass calculated for [M+1]$^+$ (C$_{17}$H$_{11}$Cl$_2$N$_5$O$_4$) requires m/z 420.0, LCMS found m/z 420.0; $^1$H NMR (400 MHz, DMSO) δ 10.94 (br s, 1H), 8.13 (br s, 1H), 8.11 (s, 1H), 8.10-8.14 (m, 1H), 7.58 (d, J=8.8 Hz, 1H), 6.97 (d, J=2.2 Hz, 1H), 6.78 (dd, J=8.8, 2.51 Hz, 1H), 6.72 (s, 1H), 3.73-3.75 (m, 3H).

Example 11. Synthesis of N-(3,5-dichloro-4-((1-methyl-1H-imidazo[4,5-c]pyridin-6-yl)oxy)phenyl)-5-oxo-4,5-dihydro-1,2,4-oxadiazole-3-carboxamide

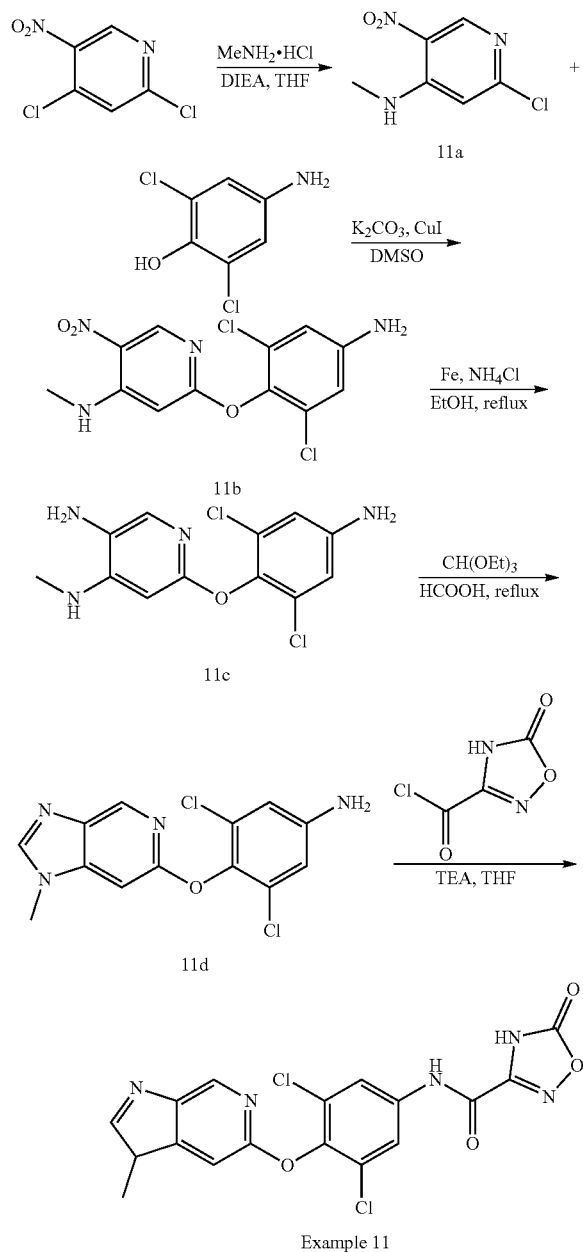

Example 11

Synthesis of 2-chloro-N-methyl-5-nitropyridin-4-amine (11a). To a solution of 2,4-dichloro-5-nitropyridine in THF (50 mL) was added a mixture of methylamine;hydrochloride (629.74 mg, 9.33 mmol) and DIEA (1.34 g, 10.36 mmol, 1.81 mL) in THF (50 mL) by portions at 0° C. Then the mixture was stirred at 0° C. for 0.5 hours and 20° C. for 16 hours. TLC showed the reaction was completed. And one new spot was formed. The mixture was extracted with EtOAc (20 mL) and H$_2$O (20 mL). The combined organic layer was concentrated in vacuum. The residue was purified by Prep-TLC (petroleum ether:ethyl acetate) to give 11a. $^1$H NMR (400 MHz, CDCl$_3$) δ 9.03 (s, 1H), 8.17 (br s, 1H), 6.76 (s, 1H), 3.07 (dt, J=3.4, 1.6 Hz, 3H).

Synthesis of 2-(4-amino-2,6-dichlorophenoxy)-N-methyl-5-nitropyridin-4-amine (11b). To a solution of 2-chloro-N-methyl-5-nitropyridin-4-amine (11a) (580 mg, 3.09 mmol) and 4-amino-2,6-dichlorophenol (605.46 mg, 3.40 mmol) in DMF (10 mL) was added K$_2$CO$_3$ (1.71 g, 12.37 mmol) and CuI (353.32 mg, 1.86 mmol) at 20° C. Then the mixture was stirred at 90° C. for 16 hours. TLC showed the reaction was completed. The mixture was adjust with HCl (1M) to pH=4-5, and extracted with EtOAc (30 mL) and H$_2$O (15 mL). The organic layer was dried over in vacuum. The residue was purified by column silicagel chromatography (petroleum ether:ethyl acetate) to give 11b. $^1$H NMR (400 MHz, CDCl$_3$) δ 8.94 (s, 1H), 8.10 (br s, 1H), 6.70 (s, 2H), 6.30 (s, 1H), 3.80 (m, 2H), 3.07 (d, J=5.2 Hz, 3H).

Synthesis of 6-(4-amino-2,6-dichlorophenoxy)-N$_4$-methylpyridine-3,4-diamine (11c). To a solution of 2-(4-amino-2,6-dichlorophenoxy)-N-methyl-5-nitropyridin-4-amine (11b) (440 mg, 1.34 mmol) in EtOH (8 mL) was added iron powder (373.31 mg, 6.68 mmol) and NH$_4$Cl (357.53 mg, 6.68 mmol). The mixture was stirred at 80° C. for 16 hours. LCMS showed 11b was consumed completely. The suspension was filtered with a pad of Celite and the pad cake was washed with EtOAc (5 mL*3). The combined filtrates were extracted ethyl acetate (20 mL*2) and H$_2$O (10 mL). The combined organic phase was washed with brine (10 mL*3), dried with anhydrous Na$_2$SO$_4$, filtered and concentrated in vacuum to give 11c. MS mass calculated for [M+1]$^+$ (C$_{12}$H$_{12}$Cl$_2$N$_4$O) requires m/z 299.0, LCMS found m/z 299.1.

Synthesis of 3,5-dichloro-4-((1-methyl-1H-imidazo[4,5-c]pyridin-6-yl)oxy)aniline (11d). A solution of 6-(4-amino-2,6-dichlorophenoxy)-N$_4$-methylpyridine-3,4-diamine (11c) (150 mg, 501.41 umol) in CH(OEt)$_3$ (5 mL) and HCOOH (0.5 mL) was stirred at 100° C. for 2 hours. TLC showed 11c was consumed completely and one new spot was formed. LCMS showed desired MS. The mixture was concentrated in vacuum to give a residue. The residue was purified by prep-TLC (SiO$_2$, ethyl acetate: methanol) to give 11d. MS mass calculated for [M+1]$^+$ (C$_{13}$H$_{10}$Cl$_2$N$_4$O) requires m/z 309.0, LCMS found m/z 309.1; $^1$H NMR (400 MHz, CD$_3$OD) δ 8.43 (d, J=0.8 Hz, 1H), 8.18 (s, 1H), 6.97 (d, J=0.8 Hz, 1H), 6.75 (s, 2H), 3.85 (s, 3H).

Synthesis of N-(3,5-dichloro-4-((1-methyl-1H-imidazo[4,5-c]pyridin-6-yl)oxy)phenyl)-5-oxo-4,5-dihydro-1,2,4-oxadiazole-3-carboxamide (Example 11). A solution of 3,5-dichloro-4-((1-methyl-1H-imidazo[4,5-c]pyridin-6-yl)oxy)aniline (11d) (20 mg, 64.69 umol) and NaH (2.59 mg, 64.69 umol, 60% purity) in DMSO (3 mL) was stirred at 20° C. for 10 minutes, then 5-oxo-4,5-dihydro-1,2,4-oxadiazole-3-carbonyl chloride (14.41 mg, 97.04 umol) was added in the mixture. The mixture was stirred at 20° C. for 0.5 hours. TLC showed one new spot was formed. The mixture was extracted ethyl acetate (20 mL*2) and saturated NH$_4$Cl aqueous solution (10 mL). The combined organic phase was washed with brine (10 mL*3), dried with anhydrous Na$_2$SO$_4$, filtered and concentrated in vacuum to give a residue. The residue was purified by Prep-HPLC (column: Phenomenex Luna C18 100*30 mm*5 um; mobile phase: [water (0.2% FA)-MeCN]) to give Example 11. MS mass calculated for [M+1]$^+$ (C$_{16}$H$_{10}$Cl$_2$N$_6$O$_4$) requires m/z 421.0, LCMS found m/z 421.0; $^1$H NMR (400 MHz, DMSO) δ

11.19 (s, 1H), 8.43 (d, J=0.6 Hz, 1H), 8.28 (s, 1H), 7.98 (s, 2H), 7.39 (d, J=0.8 Hz, 1H), 3.85 (s, 3H).

Example 12. N-(3,5-dichloro-4-((1-ethyl-1H-benzo[d]imidazol-6-yl)oxy)phenyl)-5-oxo-4,5-dihydro-1,2,4-oxadiazole-3-carboxamide

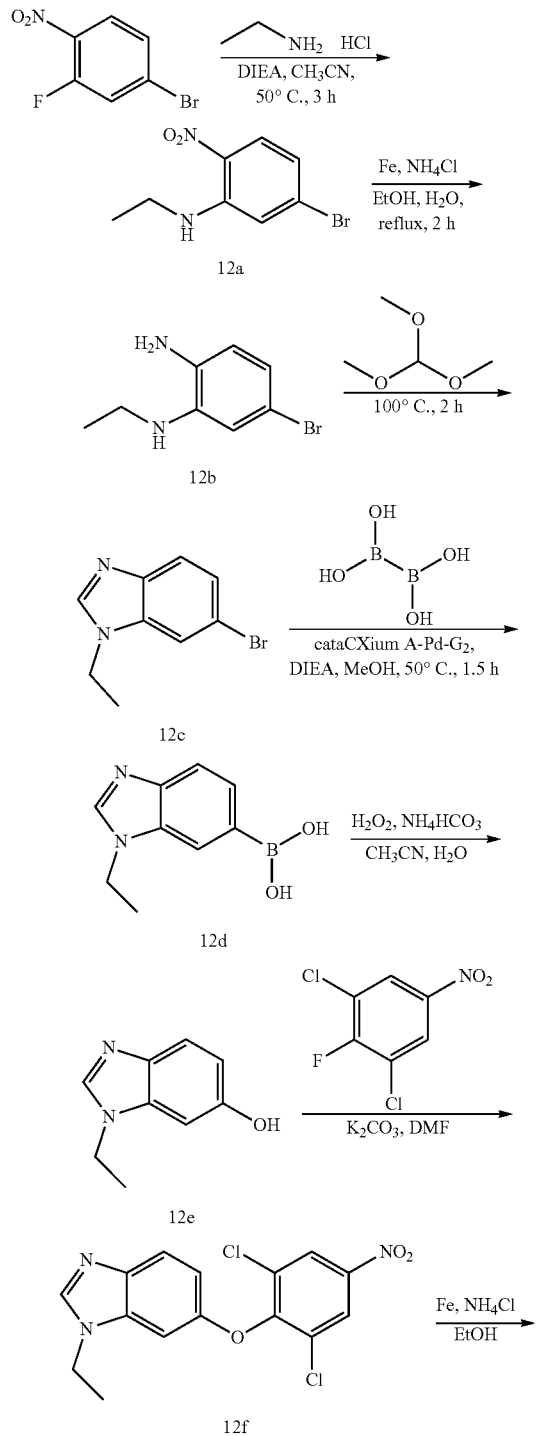

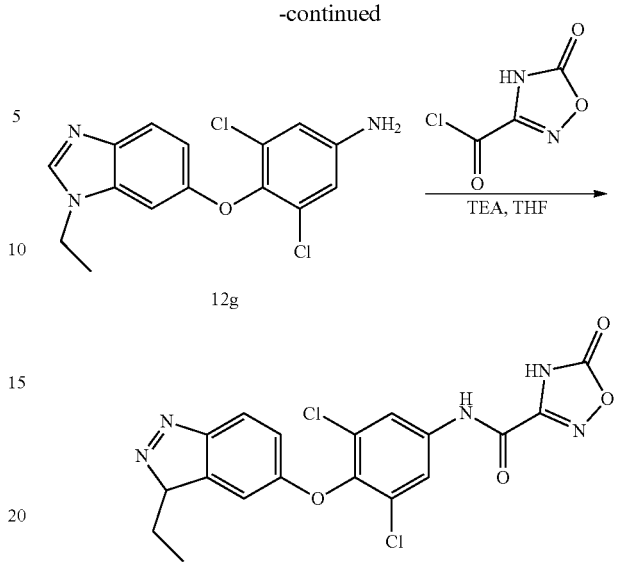

Example 12

Synthesis of 5-bromo-N-ethyl-2-nitroaniline (12a). To a solution of 4-bromo-2-fluoro-1-nitrobenzene (2 g, 9.09 mmol) and ethanamine (1.65 g, 36.53 mmol, 2.39 mL, HCl) in $CH_3CN$ (50 mL) was added DIEA (5.87 g, 45.45 mmol). Then the mixture was stirred at 60° C. for 16 hours. TLC showed the reaction was completed. The mixture was concentrated in vacuum. The residue was extracted with EtOAc (50 mL+20 mL) and $H_2O$ (20 mL). The combined organic layer was washed with brine (10 mL), dried over $Na_2SO_4$, filtered and concentrated in vacuum to give 12a.

Synthesis of 5-bromo-N1-ethylbenzene-1,2-diamine (12b). To a mixture of 5-bromo-N-ethyl-2-nitroaniline (12a) (2 g, 8.16 mmol) in EtOH (30 mL) and $H_2O$ (10 mL) was added $NH_4Cl$ (1.75 g, 32.64 mmol) and iron powder (1.82 g, 32.64 mmol). The mixture was stirred at 80° C. for 2 hours. TLC showed the reaction was completed. The mixture was filtered and was concentrated in vacuum to give 12b.

Synthesis of 6-bromo-1-ethyl-1H-benzo[d]imidazole (12c). A mixture of 5-bromo-N1-ethylbenzene-1,2-diamine (12b) (500 mg, 2.32 mmol) in trimethoxymethane (2 mL) was degassed and purged with $N_2$ for 3 times, and then the mixture was stirred at 100° C. for 2 hours under $N_2$ atmosphere. TLC indicated 12c was consumed completely and one new spot formed. The reaction mixture was concentrated under reduced pressure to remove solvent. The residue was purified by column chromatography ($SiO_2$, petroleum ether:ethyl acetate=1:1) to give 12c. MS mass calculated for $[M+1]^+$ ($C_9H_9BrN_2$) requires m/z 224.9, LCMS found m/z 224.9; $^1H$ NMR (400 MHz, $CDCl_3$) δ 7.90 (s, 1H), 7.67 (d, J=8.6 Hz, 1H), 7.57 (d, J=1.8 Hz, 1H), 7.39 (dd, J=8.6, 1.8 Hz, 1H), 4.21 (q, J=7.2 Hz, 2H), 1.43-1.68 (m, 3H).

Synthesis of (1-ethyl-1H-benzo[d]imidazol-6-yl)boronic acid (12d). A mixture of 6-bromo-1-ethyl-1H-benzo[d]imidazole (12c) (690 mg, 3.07 mmol), hypodiboric acid (824.47 mg, 9.20 mmol), DIEA (1.19 g, 9.20 mmol, 1.60 mL) and cataCXium A-Pd-G2 (20.50 mg, 30.66 umol) in MeOH (3 mL) was degassed and purged with $N_2$ for 3 times, and then the mixture was stirred at 50° C. for 1 hour under $N_2$ atmosphere. TLC and LCMS showed 12c was consumed completely and one main peak with desired mass was detected. The reaction mixture was filtered and concentrated under reduced pressure to give 12d. MS mass calculated for [M+1]$^+$ (C$_9$H$_{11}$BN$_2$O$_2$) requires m/z 191.0, LCMS found m/z 191.1.

Synthesis of 1-ethyl-1H-benzo[d]imidazol-6-ol (12e). To a solution of (1-ethyl-1H-benzo[d]imidazol-6-yl)boronic acid (12d) (580 mg, 3.05 mmol) in ACN (6 mL) was added H$_2$O$_2$ (692.20 mg, 6.11 mmol, 586.61 uL, 30% purity) the solution of NH$_4$HCO$_3$ (241.32 mg, 3.05 mmol, 251.37 uL) in H$_2$O (3 mL). The mixture was stirred at 20° C. for 2 hours. TLC and LCMS showed 12d was consumed completely and one main peak with desired mass was detected. The reaction mixture was diluted with EtOAc (10 mL) and Na$_2$S$_2$O$_3$ (10 mL) and extracted with EtOAc (10 mL*2). The combined organic layers were washed with brine (5 mL), dried over anhydrous Na$_2$SO$_4$, filtered and concentrated under reduced pressure to give 12e. MS mass calculated for [M+1]$^+$ (C$_9$H$_{10}$N$_2$O) requires m/z 163.0, LCMS found m/z 163.1.

Synthesis of 6-(2,6-dichloro-4-nitrophenoxy)-1-ethyl-1H-benzo[d]imidazole (12f). A mixture of 1-ethyl-1H-benzo[d]imidazol-6-ol (12e) (50 mg, 308.28 umol), 1,3-dichloro-2-fluoro-5-nitrobenzene (71.21 mg, 339.11 umol) and K$_2$CO$_3$ (63.91 mg, 462.43 umol) in DMF (2 mL) was degassed and purged with N$_2$ for 3 times, and then the mixture was stirred at 20° C. for 1 hr under N$_2$ atmosphere. TLC and LCMS showed 12e was consumed completely and one main peak with desired mass was detected. The reaction mixture was diluted with EtOAc (10 mL) and H$_2$O (10 mL) and extracted with EtOAc (10 mL*2). The combined organic layers were washed with brine (5 mL), dried over anhydrous Na$_2$SO$_4$, filtered and concentrated under reduced pressure to give a residue. The residue was purified by prep-TLC (SiO$_2$, DCM/MeOH) to give 12f. MS mass calculated for [M+1]$^+$ (C$_{15}$H$_{11}$Cl$_2$N$_3$O$_3$) requires m/z 352.0, LCMS found m/z 352.0; $^1$H NMR (400 MHz, CDCl$_3$) δ 8.35 (s, 1H), 7.91 (s, 1H), 7.73 (d, J=8.4 Hz, 1H), 6.79-6.86 (m, 2H), 4.16 (q, J=7.2 Hz, 2H), 1.53 (t, J=7.4 Hz, 3H).

Synthesis of 3,5-dichloro-4-((1-ethyl-1H-benzo[d]imidazol-6-yl)oxy)aniline (12g). To a solution of 6-(2,6-dichloro-4-nitrophenoxy)-1-ethyl-1H-benzo[d]imidazole (12f) (94 mg, 266.92 umol) in EtOH (3 mL) was added iron powder (74.53 mg, 1.33 mmol) and the solution of NH$_4$Cl (71.39 mg, 1.33 mmol) in H$_2$O (0.1 mL). The mixture was stirred at 80° C. for 1 hour. TLC and LCMS showed 12f was consumed completely and one main peak with desired mass was detected. The suspension was filtered through a pad of Celite gel and the pad was washed with EtOH (20 mL). The filtrate was concentrated to dryness to give the residue. The residue was diluted with EtOAc (10 mL) and H$_2$O (10 mL) and extracted with EtOAc (10 mL*2). The combined organic layers were washed with brine (5 mL), dried over anhydrous Na$_2$SO$_4$, filtered and concentrated under reduced pressure to give 12g. MS mass calculated for [M+1]$^+$ (C$_{15}$H$_{13}$Cl$_2$N$_3$O) requires m/z 322.0, LCMS found m/z 322.0; $^1$H NMR (400 MHz, CDCl$_3$) δ 7.85 (br s, 1H), 7.69 (d, J=8.8 Hz, 1H), 6.86 (dd, J=8.8, 2.4 Hz, 1H), 6.81 (d, J=2.2 Hz, 1H), 6.73 (s, 2H), 4.14 (q, J=7.2 Hz, 2H), 3.71-3.85 (m, 2H), 1.48-1.58 (m, 3H).

Synthesis of N-(3,5-dichloro-4-((1-ethyl-1H-benzo[d]imidazol-6-yl)oxy)phenyl)-5-oxo-4,5-dihydro-1,2,4-oxadiazole-3-carboxamide (Example 12). To a solution of 3,5-dichloro-4-((1-ethyl-1H-benzo[d]imidazol-6-yl)oxy)aniline (12g) (60 mg, 186.23 umol) in THF (2 mL) was added TEA (56.53 mg, 558.68 umol, 77.76 uL) and a solution of 5-oxo-4,5-dihydro-1,2,4-oxadiazole-3-carbonyl chloride (41.48 mg, 279.34 umol) in THF (2 mL). The mixture was stirred at 20° C. for 0.5 hours. TLC and LCMS showed 12g was consumed completely and one main peak with desired mass was detected. The reaction mixture was quenched by addition H$_2$O (0.5 mL). The reaction mixture was concentrated under reduced pressure to remove solvent. The residue was purified by prep-HPLC (column: Phenomenex Luna C18 100*30 mm*5 um; mobile phase: [water (0.2% FA)-MeCN]) to give Example 12. MS mass calculated for [M+1]$^+$ (C$_{18}$H$_{13}$Cl$_2$N$_5$O$_4$) requires m/z 434.0, LCMS found m/z 434.0; $^1$H NMR (400 MHz, DMSO-d$_6$) δ 11.29 (s, 1H), 8.31 (s, 1H), 8.08 (s, 2H), 7.60 (d, J=8.8 Hz, 1H), 7.10 (d, J=2.4 Hz, 1H), 6.77 (dd, J=8.8, 2.45 Hz, 1H), 4.21 (q, J=7.2 Hz, 2H), 1.35 (t, J=7.2 Hz, 3H).

Example 13. 2-(3,5-dichloro-4-(quinolin-6-yloxy)phenyl)-3,5-dioxo-2,3,4,5-tetrahydro-1,2,4-triazine-6-carbonitrile

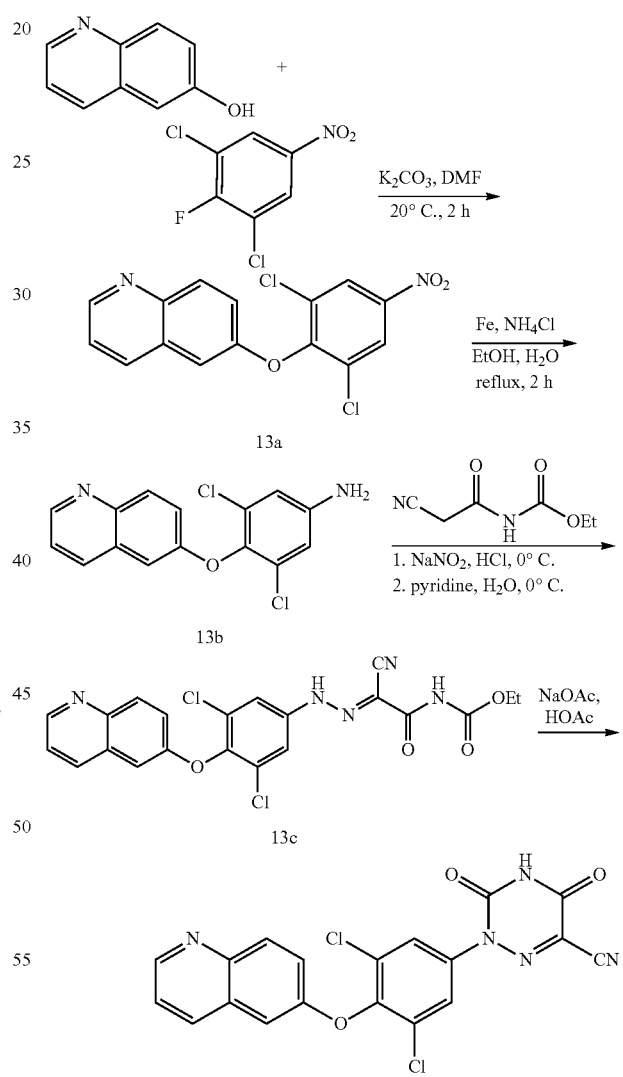

Example 13

Synthesis of 6-(2,6-dichloro-4-nitrophenoxy)quinoline (13a). To a solution of quinolin-6-ol (100 mg, 688.90 umol) in DMF (3 mL) was added K$_2$CO$_3$ (190.42 mg, 1.38 mmol) and 1,3-dichloro-2-fluoro-5-nitro-benzene (144.66 mg, 688.90 umol). Then the mixture was stirred at 20° C. for 1 hour. TLC showed the reaction was completed. The mixture was extracted with EtOAc (6 mL*2) and H₂O (10 mL). The combined organic layer was washed with brine (5 mL*2), dried over Na₂SO₄, filtered and concentrated in vacuum to give 13a. The product was used directly in next step.

Synthesis of 3,5-dichloro-4-(quinolin-6-yloxy)aniline (13b). To a solution of 6-(2,6-dichloro-4-nitrophenoxy)quinoline (13a) (180 mg, 537.09 umol) in EtOH (5 mL) and H₂O (2 mL) was added NH₄Cl (143.65 mg, 2.69 mmol) and iron powder (149.97 mg, 2.69 mmol). Then the mixture was stirred at 80° C. for 2 hours. LCMS showed the reaction was completed. The mixture was filtered and the filtration was concentrated in vacuum. The residue was extracted with EtOAc (10 mL) and H₂O (5 mL). The organic layer was dried over Na₂SO₄, filtered and concentrated in vacuum to give 13b. MS mass calculated for [M+1]⁺ (C₁₅H₁₀Cl₂N₂O) requires m/z 305.0, LCMS found m/z 304.9; ¹H NMR (400 MHz, DMSO-d₆) δ 8.77 (br s, 1H), 8.26 (br d, J=8.0 Hz, 1H), 8.02 (br d, J=9.0 Hz, 1H), 7.40-7.56 (m, 2H), 7.04 (br s, 1H), 6.76 (s, 2H), 5.72 (br s, 2H).

Synthesis of (E)-ethyl (2-cyano-2-(2-(3,5-dichloro-4-(quinolin-6-yloxy)phenyl)hydrazono)acetyl) carbamate (13c). To a mixture of 3,5-dichloro-4-(quinolin-6-yloxy)aniline (13b) (30 mg, 98.31 umol) in HCl (1 mL) and H₂O (0.5 mL) was added NaNO₂ (13.57 mg, 196.62 umol) at 0° C. Then the mixture was stirred at 0° C. for 20 minutes. Then the mixture was added in a solution of ethyl N-(2-cyanoacetyl) carbamate (16.88 mg, 108.14 umol) in Pyr (1 mL) at 0° C. Then the mixture was stirred at 0° C. for another 20 minutes. LCMS showed the reaction was completed, and desired MS was detected. The mixture was extracted with EtOAc (5 mL*2) and H₂O (5 mL). The combined organic layer was dried over Na₂SO₄, filtered and concentrated in vacuum to give 13c. The product was used directly in next step. MS mass calculated for [M+1]⁺ (C₂₁H₁₅Cl₂N₅O₄) requires m/z 472.0, LCMS found m/z 471.9.

Synthesis of 2-(3,5-dichloro-4-(quinolin-6-yloxy)phenyl)-3,5-dioxo-2,3,4,5-tetrahydro-1,2,4-triazine-6-carbonitrile (Example 13). To a solution of (E)-ethyl (2-cyano-2-(2-(3,5-dichloro-4-(quinolin-6-yloxy)phenyl)hydrazono)acetyl)carbamate (13c) (40 mg, 84.70 umol) in HOAc (2 mL) was added NaOAc (27.79 mg, 338.78 umol). Then the mixture was stirred at 120° C. for 2 hours. LCMS showed the reaction was completed, and desired MS was found in the major peak. The mixture was concentrated in vacuum. The residue was extracted with EtOAc (5 mL*2) and H₂O (5 mL). The combined organic layer was concentrated in vacuum. The residue was purified by Prep-HPLC (column: Phenomenex Luna C18 100*30 mm*5 um; mobile phase: [water (0.2% FA)-MeCN]) to give Example 13. MS mass calculated for [M+1]⁺ (C₁₉H₉Cl₂N₅O₃) requires m/z 426.0, LCMS found m/z 426.1; ¹H NMR (400 MHz, DMSO-d₆) δ 8.82 (br d, J=2.8 Hz, 1H), 8.32 (br d, J=7.8 Hz, 1H), 8.09 (d, J=9.2 Hz, 1H), 7.87 (s, 2H), 7.63 (dd, J=8.8, 2.6 Hz, 1H), 7.50 (dd, J=8.4, 3.8 Hz, 1H), 7.20 (d, J=2.6 Hz, 1H).

Example 14. 2-(3,5-dichloro-4-((2-methylquinolin-6-yl)oxy)phenyl)-3,5-dioxo-2,3,4,5-tetrahydro-1,2,4-triazine-6-carbonitrile

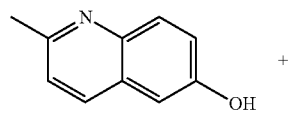

+

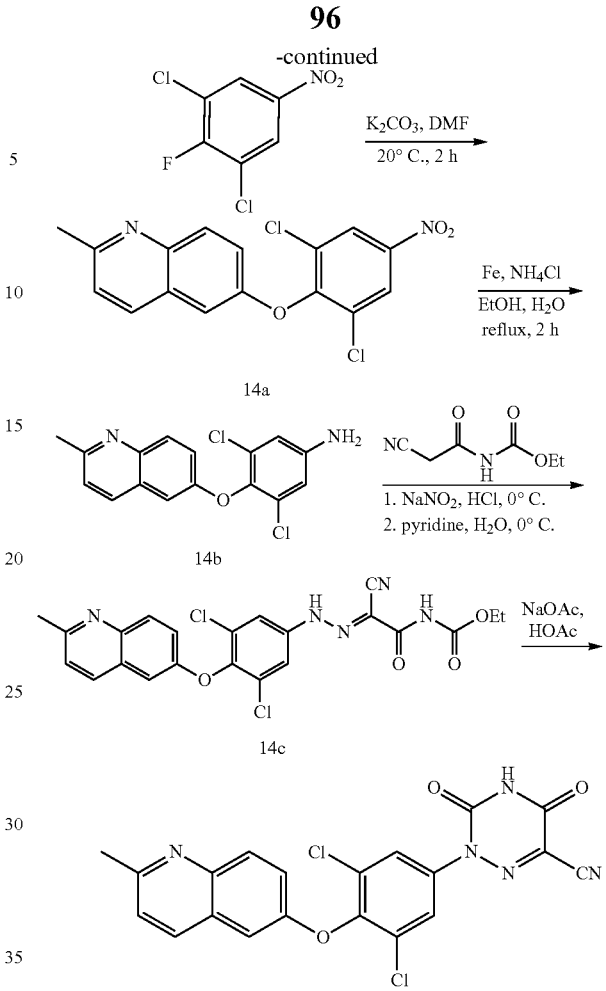

Example 14

Synthesis of 6-(2,6-dichloro-4-nitrophenoxy)-2-methylquinoline (14a). To a solution of 2-methylquinolin-6-ol (55 mg, 345.51 umol) in DMF (2 mL) was added K₂CO₃ (95.51 mg, 691.02 umol) and 1,3-dichloro-2-fluoro-5-nitrobenzene (72.55 mg, 345.51 umol). Then the mixture was stirred at 20° C. for 1 hour. TLC showed the reaction was completed. The mixture diluted in H₂O (10 mL), and the mixture was filtered to collect solid. The solid was washed with H₂O (2 mL*2) and dried over in vacuum to give 14a. The product was used directly in next step.

Synthesis of 3,5-dichloro-4-((2-methylquinolin-6-yl)oxy)aniline (14b). To a solution of 6-(2,6-dichloro-4-nitrophenoxy)-2-methylquinoline (14a) (100 mg, 286.40 umol) in EtOH (5 mL) and H₂O (2 mL) was added NH₄Cl (76.60 mg, 1.43 mmol) and iron powder (79.98 mg, 1.43 mmol). The mixture was stirred at 90° C. for 2 hours. LCMS showed the reaction was completed. The mixture was filtered and the filtration was concentrated in vacuum. The residue was diluted in H₂O (10 mL) and filtered to collect solid. The solid was washed with H₂O (2 mL*2) and dried over in vacuum to give 14b. MS mass calculated for [M+1]⁺ (C₁₆H₁₂Cl₂N₂O) requires m/z 319.0, LCMS found m/z 318.9; ¹H NMR (400 MHz, DMSO-d₆) δ 8.12 (br d, J=8.4 Hz, 1H), 7.89 (br d, J=8.8 Hz, 1H), 7.42 (br d, J=7.0 Hz, 1H), 7.33 (br d, J=8.4 Hz, 1H), 6.97 (br s, 1H), 6.73 (s, 2H), 5.68 (br s, 2H), 2.59 (s, 3H).

Synthesis of (E)-ethyl (2-cyano-2-(2-(3,5-dichloro-4-((2-methylquinolin-6-yl)oxy)phenyl) hydrazono)acetyl)carbamate (14c). To a mixture of 3,5-dichloro-4-((2-methylquinolin-6-yl)oxy)aniline (14b) (50 mg, 156.65 umol) in HCl (1 mL) and H₂O (0.5 mL) was added NaNO₂ (21.62 mg, 313.30 umol) at 0° C. The mixture was stirred at 0° C. for 20 minutes. Then the mixture was added to a solution of ethyl N-(2-cyanoacetyl) carbamate (26.90 mg, 172.31 umol) in Pyr (1 mL) at 0° C. Then the mixture was stirred at 0° C. for another 20 minutes. LCMS showed the reaction was completed, and desired MS was detected. The mixture was filtered to collect solid. The solid was dried in vacuum to give 14c. The residue was used directly in next step. MS mass calculated for [M+1]⁺ (C$_{22}$H$_{17}$Cl$_2$N$_5$O$_4$) requires m/z 486.1, LCMS found m/z 486.1.

Synthesis of 2-(3,5-dichloro-4-((2-methylquinolin-6-yl)oxy)phenyl)-3,5-dioxo-2,3,4,5-tetrahydro-1,2,4-triazine-6-carbonitrile (Example 14). To a solution of (E)-ethyl (2-cyano-2-(2-(3,5-dichloro-4-((2-methylquinolin-6-yl)oxy)phenyl) hydrazono)acetyl)carbamate (14c) (35 mg, 71.97 umol) in HOAc (2 mL) was added NaOAc (23.62 mg, 287.88 umol). Then the mixture was stirred at 120° C. for 2 hours. LCMS showed the reaction was completed. The mixture was concentrated in vacuum. The residue was extracted with EtOAc (5 mL*2) and H₂O (5 mL). The combined organic layer was concentrated in vacuum. The residue was purified by Prep-HPLC (column: Phenomenex Synergi C18 150*25*10 um; mobile phase: [water (0.2% FA)-MeCN]) to give Example 14. MS mass calculated for [M+1]⁺ (C$_{20}$H$_{11}$Cl$_2$N$_5$O$_3$) requires m/z 440.0, LCMS found m/z 440.0; ¹H NMR (400 MHz, DMSO-d$_6$) δ 8.26 (d, J=8.4 Hz, 1H), 8.04 (d, J=9.2 Hz, 1H), 7.93 (s, 2H), 7.62 (dd, J=9.2, 2.8 Hz, 1H), 7.45 (d, J=8.4 Hz, 1H), 7.21 (d, J=2.8 Hz, 1H), 2.69 (s, 3H).

Example 15. 2-(3,5-dichloro-4-((4-methylquinolin-6-yl)oxy)phenyl)-3,5-dioxo-2,3,4,5-tetrahydro-1,2,4-triazine-6-carbonitrile

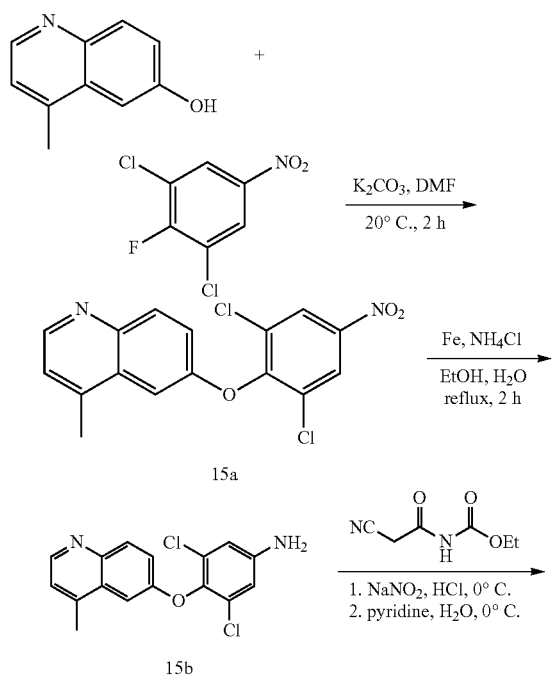

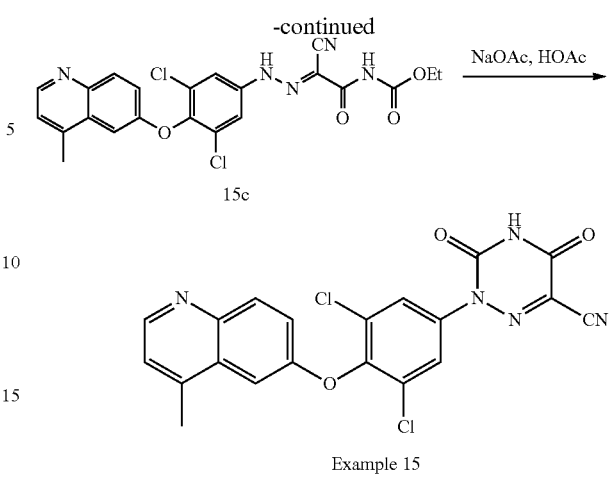

Example 15

Synthesis of 6-(2,6-dichloro-4-nitrophenoxy)-4-methylquinoline (15a). To a mixture of 4-methylquinolin-6-ol (40 mg, 251.28 umol) in DMF (3 mL) was added K₂CO₃ (52.09 mg, 376.92 umol) and 1,3-dichloro-2-fluoro-5-nitrobenzene (58.04 mg, 276.41 umol) under N₂. The mixture was stirred at 20° C. for 1 hour. LCMS showed the starting material was consumed completely and desired MS was detected. The residue was poured into water (5 mL) The aqueous phase was extracted with ethyl acetate (15 mL*3). The combined organic phase was washed with brine (10 mL*2), dried with anhydrous Na₂SO₄, filtered and concentrated in vacuum to give to 15a. MS mass calculated for [M+1]⁺ (C$_{16}$H$_{10}$Cl$_2$N$_2$O$_3$) requires m/z 349.0, LCMS found m/z 349.0; ¹H NMR (400 MHz, CDCl₃) δ 8.73 (d, J=4.2 Hz, 1H), 8.38 (s, 1H), 8.12 (d, J=9.4 Hz, 1H), 7.37 (dd, J=2.8, 9.2 Hz, 1H), 7.27 (s, 1H), 7.22 (dd, J=3.4, 20.0 Hz, 2H), 2.58 (s, 3H).

Synthesis of 3,5-dichloro-4-((4-methylquinolin-6-yl)oxy)aniline (15b) To a mixture of 6-(2,6-dichloro-4-nitrophenoxy)-4-methylquinoline (15a) (70 mg, 200.48 umol) in EtOH (3 mL) was added NH₄Cl (53.62 mg, 1.00 mmol) in H₂O (0.5 mL) and Fe (55.98 mg, 1.00 mmol) under N₂. The mixture was stirred at 80° C. for 2 hours. LCMS showed the 15b was consumed completely and desired MS was detected. The reaction mixture was filtered and concentrated under reduced pressure to give a residue. The residue was diluted with ethyl acetate (10 mL) and water (10 mL). The aqueous phase was extracted with ethyl acetate (20 mL*2). The combined organic phase was washed with brine (15 mL*2), dried with anhydrous Na₂SO₄, filtered and concentrated in vacuum to give 15b. MS mass calculated for [M+1]⁺ (C$_{16}$H$_{12}$Cl$_2$N$_2$O) requires m/z 319.0, LCMS found m/z 319.0;

Synthesis of (E)-ethyl (2-cyano-2-(2-(3,5-dichloro-4-((4-methylquinolin-6-yl)oxy)phenyl)hydrazono)acetyl)carbamate (15c) To a mixture of 3,5-dichloro-4-((4-methylquinolin-6-yl)oxy)aniline (15b) (30 mg, 93.99 umol) in HCl (0.5 mL) and H₂O (1 mL) under N₂ at 0° C., then NaNO₂ (8.43 mg, 122.19 umol) was added, the mixture was stirred at 0° C. for 0.5 h, then the resulting mixture was added to ta solution of ethyl (2-cyanoacetyl)carbamate (16.14 mg, 103.39 umol) in Py (0.5 mL) and H₂O (1 mL) at 0° C. under N₂, the mixture was stirred at 0° C. for another 0.5 h, TLC and LCMS showed the 15b was consumed completely and one main peak with desired MS was detected. The reaction mixture was filtered and the filter cake was dried in vacuum to give 15c. MS mass calculated for [M+1]⁺ (C₂₂H₁₇Cl₂N₅O₄) requires m/z 486.1, LCMS found m/z 486.1.

Synthesis of 2-(3,5-dichloro-4-((4-methylquinolin-6-yl)oxy)phenyl)-3,5-dioxo-2,3,4,5-tetrahydro-1,2,4-triazine-6-carbonitrile (Example 15). To a mixture of (E)-ethyl (2-cyano-2-(2-(3,5-dichloro-4-((4-methylquinolin-6-yl)oxy)phenyl)hydrazono)acetyl)carbamate (15c) (45.71 mg, 93.99 umol) in HOAc (2 mL) was added NaOAc (38.55 mg, 469.97 umol) under N₂. The mixture was stirred at 120° C. for 2.5 hours. LCMS showed the 15c was consumed completely and desired MS was detected. The reaction mixture was concentrated under reduced pressure to give a residue. The residue was purified by Prep-HPLC (column: Phenomenex Synergi C18 150*25*10 um; mobile phase: [water (0.2% FA)-MeCN]) to give Example 15. MS mass calculated for [M+1]⁺ (C₂₀H₁₁Cl₂N₅O₃) requires m/z 440.0, LCMS found m/z 439.9. ¹HNMR (400 MHz, DMSO-d₆) δ 8.68 (d, J=4.2 Hz, 1H), 8.03 (d, J=9.2 Hz, 1H), 7.86 (s, 2H), 7.32-7.43 (m, 3H), 2.55 (s, 3H).

Example 16. 2-(3,5-dichloro-4-((3-methylquinolin-6-yl)oxy)phenyl)-3,5-dioxo-2,3,4,5-tetrahydro-1,2,4-triazine-6-carbonitrile

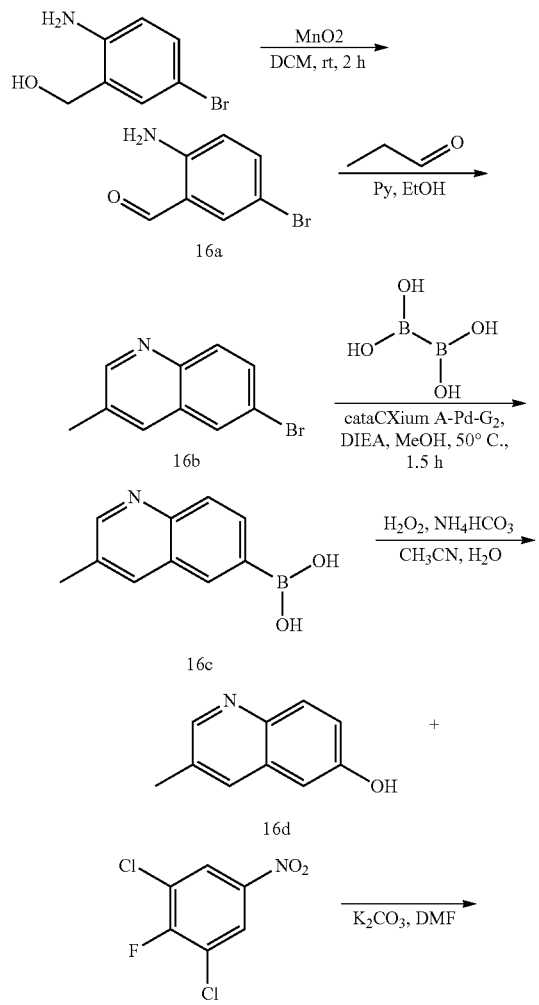

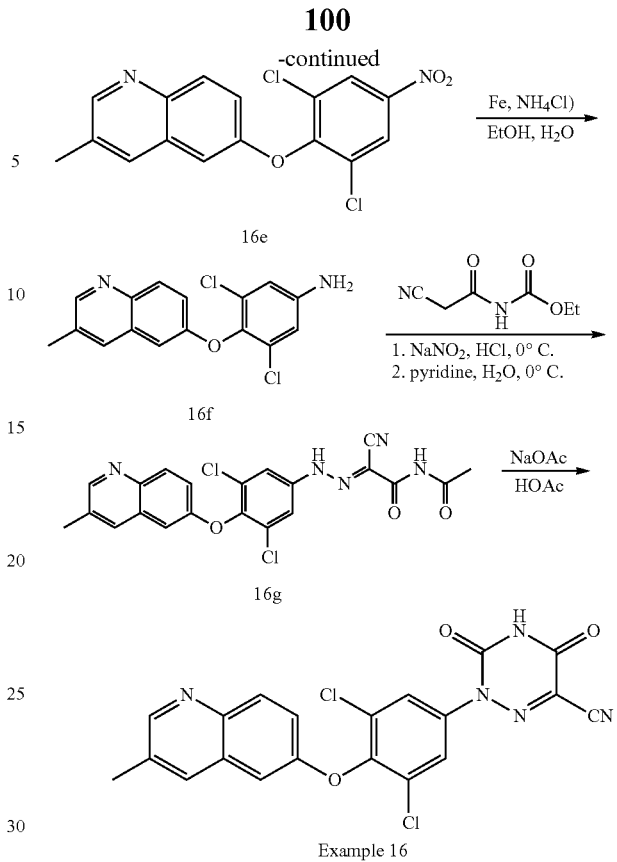

Example 16

Synthesis of 2-amino-5-bromobenzaldehyde (16a). To a solution of (2-amino-5-bromophenyl)methanol (200 mg, 989.86 umol) in DCM (10 mL) was added MnO₂ (516.33 mg, 5.94 mmol). Then the mixture was stirred at 20° C. for 16 hours. TLC showed the reaction was completed. The mixture was filtered, and the filtration was concentrated in vacuum to give 16a.

Synthesis of 6-bromo-3-methylquinoline (16b). To a solution of 2-amino-5-bromobenzaldehyde (16a) (50 mg, 249.96 umol) in EtOH (2 mL) was added dropwise Pyr (43.50 mg, 549.91 umol, 44.39 uL) at 55° C. and stirred for 0.5 h, then propanal (21.78 mg, 374.94 umol, 27.29 uL) was added in the mixture. The mixture was heated to 90° C. and stirred for 16 hours. TLC showed 16a was consumed completely and many new spots were formed. LCMS showed desired MS was detected. The mixture was concentrated in vacuum. The residue was extracted ethyl acetate (10 m*2 L) and H₂O (5 mL). The combined organic phase was washed with brine (10 mL*3), dried with anhydrous Na₂SO₄, filtered and concentrated in vacuum. The residue was purified by Prep-TLC (petroleum ether:ethyl acetate) to give 16b. ¹HNMR (400 MHz, CDCl₃) δ 8.78 (d, J=2.0 Hz, 1H), 7.91-7.96 (m, 2H), 7.84 (s, 1H), 7.72 (dd, J=9.0, 2.2 Hz, 1H), 2.54 (s, 3H).

Synthesis of (3-methylquinolin-6-yl)boronic acid (16c). To a mixture of 6-bromo-3-methylquinoline (16b) (25 mg, 112.57 umol) in MeOH (2 mL) was added hypoboric acid (30.28 mg, 337.71 umol), DIPEA (43.65 mg, 337.71 umol, 58.82 uL) and [2-(2-aminophenyl)phenyl]-chloro-palladium;bis(1-adamantyl)-butyl-phosphane (752.69 ug, 1.13 umol) under N₂. The mixture was stirred at 50° C. for 1.5 hours. LCMS showed 16b was consumed completely and desired MS was detected. The suspension was filtered with a pad of Celite and the pad cake was washed with MeOH (5 mL*3). The combined filtrates were concentrated in vacuum to give 16c. MS mass calculated for [M+1]$^+$ (C$_{10}$H$_{10}$BNO$_2$) requires m/z 188.0, LCMS found m/z 188.1.

Synthesis of 3-methylquinolin-6-ol (16d). To a mixture of (3-methylquinolin-6-yl)boronic acid (16c) (20 mg, 106.95 umol) in H$_2$O (1 mL) and CH$_3$CN (2 mL) was added ammonia;carbonic acid (8.45 mg, 106.95 umol, 8.81 uL) and H$_2$O$_2$ (24.25 mg, 213.90 umol, 20.55 uL, 30% purity) under N$_2$. The mixture was stirred at 20° C. for 1 hour. TLC indicated 16c was consumed completely and many new spots were formed. LCMS showed desired MS. The mixture was poured into NaHSO$_3$ (10 mL) and stirred for 10 minutes. The aqueous phase was extracted with ethyl acetate (10 mL*3). The combined organic phase was washed with brine (10 mL*2), dried with anhydrous Na$_2$SO$_4$, filtered and concentrated in vacuum. The residue was purified by prep-TLC (SiO$_2$, ethyl acetate: petroleum ether) to give 16d. MS mass calculated for [M+1]$^+$ (C$_{10}$H9NO) requires m/z 160.0, LCMS found m/z 160.1.

Synthesis of 6-(2,6-dichloro-4-nitrophenoxy)-3-methylquinoline (16e). To a solution of 3-methylquinolin-6-ol (16d) (10 mg, 62.82 umol) and 1,3-dichloro-2-fluoro-5-nitrobenzene (14.51 mg, 69.10 umol) in DMF (2 mL) was added K$_2$CO$_3$ (13.02 mg, 94.23 umol). The mixture was degassed and purged with N$_2$ for 3 times and stirred at 20° C. for 1 hour. TLC showed 16d was consumed completely and one new spot was formed. LCMS showed desired MS. The mixture was extracted Ethyl acetate (15 mL) and H$_2$O (5 mL). The combined organic phase was washed with brine (10 mL*3), dried with anhydrous Na$_2$SO$_4$, filtered and concentrated in vacuum to give a residue. The residue was purified by Prep-TLC (petroleum ether:ethyl acetate) to give 16e. MS mass calculated for [M+1]$^+$ (C$_{16}$H$_{10}$Cl$_2$N$_2$O$_3$) requires m/z 349.0, LCMS found m/z 349.0.

Synthesis of 3,5-dichloro-4-((3-methylquinolin-6-yl)oxy) aniline (16f). To a solution of 6-(2,6-dichloro-4-nitrophenoxy)-3-methylquinoline (16e) (10 mg, 28.64 umol) in EtOH (2 mL) and H$_2$O (1 mL) was added Fe (8.00 mg, 143.20 umol) and NH$_4$Cl (7.66 mg, 143.20 umol). The mixture was stirred at 80° C. for 1 hour. TLC showed 16e was consumed completely and one new spot was formed. LCMS showed desired MS. The suspension was filtered with a pad of Celite and the pad cake was washed with EtOH (5 ml*3). The combined filtrates were concentrated in vacuum to give a residue. The residue was extracted ethyl acetate (10 mL*2) and H$_2$O (3 mL). The combined organic phase was washed with brine (10 mL*3), dried with anhydrous Na$_2$SO$_4$, filtered and concentrated in vacuum to give 16f. MS mass calculated for [M+1]$^+$ (C$_{16}$H$_{12}$Cl$_2$N$_2$O) requires m/z 319.0, LCMS found m/z 319.1; $^1$HNMR (400 MHz, CDCl$_3$) δ 8.63-8.86 (m, 1H), 8.11 (br d, J=17.4 Hz, 1H), 7.77-7.92 (m, 1H), 7.38-7.46 (m, 1H), 6.86-6.89 (m, 1H), 6.72-6.75 (m, 2H), 2.49 (s, 3H).

Synthesis of (E)-ethyl (2-cyano-2-(2-(3,5-dichloro-4-((3-methylquinolin-6-yl)oxy)phenyl)hydrazono)acetyl)carbamate (16g). To a solution of 3,5-dichloro-4-((3-methylquinolin-6-yl)oxy)aniline (16f) (5 mg, 15.66 umol) in HCL (0.5 mL) and H$_2$O (1 mL) at 0° C. and then was added NaNO$_2$ (1.41 mg, 20.36 umol), the mixture was stirred at 0° C. for 0.5 h and then the mixture was added to a ethyl N-(2-cyanoacetyl)carbamate (2.69 mg, 17.23 umol) in H$_2$O (1 mL) and Pyr (0.5 mL) at 0° C., then the reaction mixture was stirred at 0° C. for another 0.5 hours. LCMS showed 16f was consumed completely and desired MS was detected. The suspension was filtered and then washed with H$_2$O (5 mL*3). The filter cake was concentrated under reduced pressure to give 16g. MS mass calculated for [M+1]$^+$ (C$_{22}$H$_{17}$Cl$_2$N$_5$O$_4$) requires m/z 486.0, LCMS found m/z 486.1.

Synthesis of 2-(3,5-dichloro-4-((3-methylquinolin-6-yl)oxy)phenyl)-3,5-dioxo-2,3,4,5-tetrahydro-1,2,4-triazine-6-carbonitrile (Example 16). To a solution of (E)-ethyl (2-cyano-2-(2-(3,5-dichloro-4-((3-methylquinolin-6-yl)oxy)phenyl)hydrazono)acetyl)carbamate (16g) (5 mg, 10.28 umol) in HOAc (1.5 mL) was added NaOAc (4.22 mg, 51.41 umol). The mixture was stirred at 120° C. for 2.5 hours. LCMS showed 16g was consumed completely and desired MS was detected. The reaction mixture was concentrated under reduced pressure. The residue was purified by Prep-HPLC (column: Phenomenex Synergi C18 150*25*10 um; mobile phase: [water (0.2% FA)-MeCN]) to give Example 16. MS mass calculated for [M+1]$^+$ (C$_{16}$H$_{12}$Cl$_2$N$_2$O) requires m/z 440.0, LCMS found m/z 439.9; $^1$HNMR (400 MHz, CD$_3$OD) δ 8.64 (d, J=2.0 Hz, 1H), 7.99-8.04 (m, 2H), 7.84 (s, 2H), 7.50-7.55 (m, 1H), 7.01 (d, J=2.8 Hz, 1H), 2.50 (s, 3H).

Example 17. 2-(3,5-dichloro-4-((2-methyl-2H-indazol-5-yl)oxy)phenyl)-3,5-dioxo-2,3,4,5-tetrahydro-1,2,4-triazine-6-carbonitrile

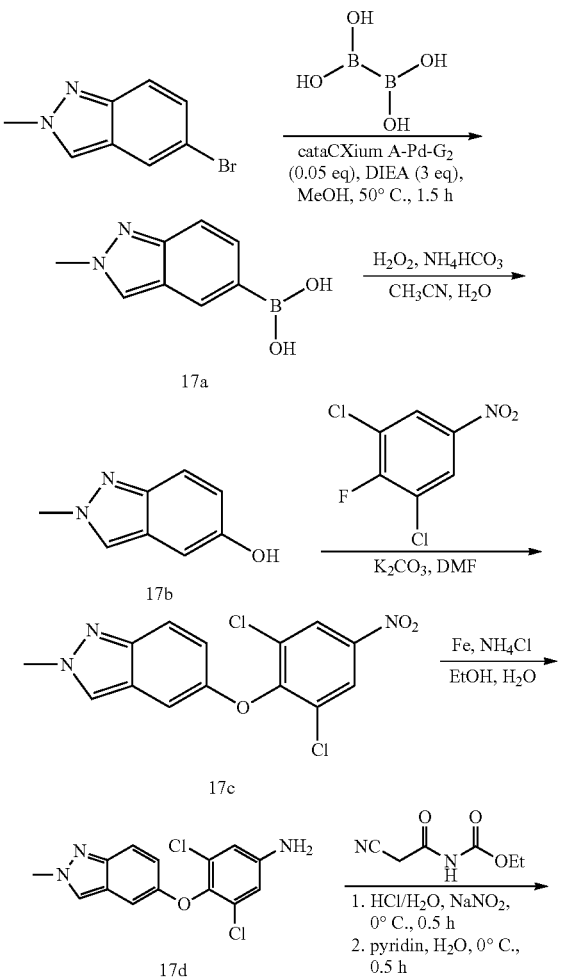

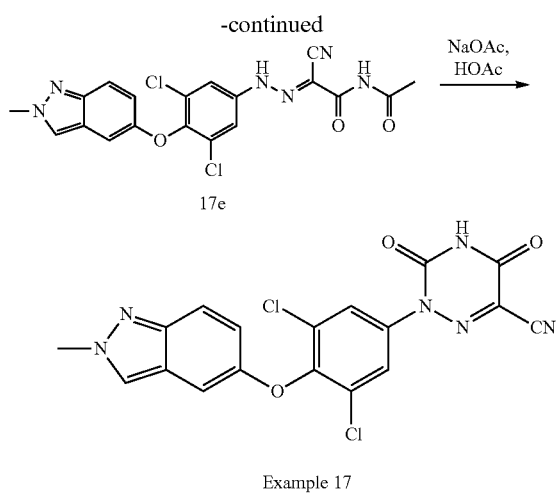

Example 17

Synthesis of (2-methyl-2H-indazol-5-yl)boronic acid (17a). A mixture of 5-bromo-2-methyl-2H-indazole (150 mg, 710.70 umol), hypodiboric acid (191.14 mg, 2.13 mmol), DIEA (275.55 mg, 2.13 mmol, 371.37 uL) and cataCXium A-Pd-G2 (4.75 mg, 7.11 umol) in MeOH (4 mL) was degassed and purged with $N_2$ for 3 times, and then the mixture was stirred at 50° C. for 1 hour under $N_2$ atmosphere. LCMS showed the reaction was completed and one main peak with desired mass was detected. The reaction mixture was concentrated under reduced pressure to remove solvent to give 17a. MS mass calculated for [M+1]$^+$ ($C_8H_9BN_2O_2$) requires m/z 177.0, LCMS found m/z 177.1.

Synthesis of 2-methyl-2H-indazol-5-ol (17b). To a solution of (2-methyl-2H-indazol-5-yl)boronic acid (17a) (120 mg, 681.90 umol) in ACN (2 mL) was added the solution of $NH_4HCO_3$ (53.91 mg, 681.90 umol, 56.15 uL) in $H_2O$ (1 mL) and $H_2O_2$ (154.63 mg, 1.36 mmol, 131.04 uL, 30% purity). The mixture was stirred at 20° C. for 1 hour. TLC and LCMS showed 17a was consumed completely and one main peak with desired mass was detected. The reaction mixture was diluted with EtOAc (20 mL) and $Na_2SO_3$ (10 mL) and extracted with EtOAc (20 mL*2). The combined organic layers were washed with brine (10 mL), dried over anhydrous $Na_2SO_4$, filtered and concentrated under reduced pressure to give a residue. The residue was purified by prep-TLC ($SiO_2$, DCM: MeOH) to give 17b. MS mass calculated for [M+1]$^+$ ($C_8H_8N_2O$) requires m/z 149.0, LCMS found m/z 149.1; $^1$H NMR (400 MHz, METHANOL-$d_4$) δ 7.90 (s, 1H), 7.44 (d, J=9.2 Hz, 1H), 6.93 (dd, J=9.2, 2.4 Hz, 1H), 6.87 (d, J=1.8 Hz, 1H), 4.13 (s, 3H).

Synthesis of 5-(2,6-dichloro-4-nitrophenoxy)-2-methyl-2H-indazole (17c). A mixture of 2-methyl-2H-indazol-5-ol (17b) (50 mg, 337.47 umol), 1,3-dichloro-2-fluoro-5-nitrobenzene (77.95 mg, 371.22 umol), $K_2CO_3$ (69.96 mg, 506.20 umol) in DMF (2 mL) was stirred at 20° C. for 1 hr under $N_2$ atmosphere. TLC indicated 17c was consumed completely and one new spot formed. To the reaction mixture was added $H_2O$ (2 mL). The mixture was filtered and the filter cake was washed with 5 mL of $H_2O$, dried in vacuum to give 17c. MS mass calculated for [M+1]$^+$ ($C_{14}H_9Cl_2N_3O_3$) requires m/z 338.0, LCMS found m/z 338.0; $^1$H NMR (400 MHz, CDCl$_3$) δ 8.33 (s, 2H) 7.75 (s, 1H) 7.73 (d, J=9.2 Hz, 1H) 7.16 (dd, J=9.2, 2.4 Hz, 1H) 6.67 (d, J=2.2 Hz, 1H) 4.20 (s, 3H).

Synthesis of 3,5-dichloro-4-((2-methyl-2H-indazol-5-yl)oxy)aniline (17d). A mixture of 5-(2,6-dichloro-4-nitrophenoxy)-2-methyl-2H-indazole (17c) (100 mg, 295.73 umol), Fe (82.58 mg, 1.48 mmol), $NH_4Cl$ (79.09 mg, 1.48 mmol) in EtOH (2 mL) was stirred at 80° C. for 1 hour under $N_2$ atmosphere. LCMS showed 17c was consumed completely and one main peak with desired mass was detected. The reaction mixture was concentrated under reduced pressure to remove solvent. The residue was washed with 5 mL of $H_2O$, dried in vacuum to give 17d. MS mass calculated for [M+1]$^+$ ($C_{14}H_{11}Cl_2N_3O$) requires m/z 308.0, LCMS found m/z 308.0.

Synthesis of (E)-ethyl (2-cyano-2-(2-(3,5-dichloro-4-((2-methyl-2H-indazol-5-yl)oxy)phenyl)hydrazono)acetyl)carbamate (17e). To a solution of 3,5-dichloro-4-((2-methyl-2H-indazol-5-yl)oxy)aniline (17d) (40 mg, 129.80 umol) in HCl (0.5 mL) and $H_2O$ (1 mL) was added $NaNO_2$ (11.64 mg, 168.74 umol) at 0° C. The mixture was stirred at 0° C. for 10 minutes. Then the mixture was added to a solution of ethyl N-(2-cyanoacetyl)carbamate (22.29 mg, 142.78 umol) in $H_2O$ (1 mL) and Pyr (0.5 mL) at 0° C. The reaction mixture was stirred at 0° C. for another 10 minutes. LCMS showed 17d was consumed completely and one main peak with desired mass was detected. The reaction mixture was filtered and the filter cake was washed with 10 mL of $H_2O$, dried in vacuum to give 17e. MS mass calculated for [M+1]$^+$ ($C_{20}H_{16}Cl_2N_6O_4$) requires m/z 475.0, MS found m/z 475.1.

Synthesis of 2-(3,5-dichloro-4-((2-methyl-2H-indazol-5-yl)oxy)phenyl)-3,5-dioxo-2,3,4,5-tetrahydro-1,2,4-triazine-6-carbonitrile (Example 17). To a solution of (E)-ethyl (2-cyano-2-(2-(3,5-dichloro-4-((2-methyl-2H-indazol-5-yl)oxy)phenyl)hydrazono)acetyl) carbamate (17e) (60 mg, 126.24 umol) in HOAc (2 mL) was added NaOAc (51.78 mg, 631.20 umol). The mixture was stirred at 120° C. for 2 hours. LCMS showed 17e was consumed completely and one main peak with desired mass was detected. The reaction mixture was concentrated under reduced pressure to remove solvent. The residue was purified by prep-HPLC (column: Phenomenex Synergi C18 150*25*10 um; mobile phase: [water (0.2% FA)-MeCN]) to give Example 17. MS mass calculated for [M+1]$^+$ ($C_{18}H_{10}Cl_2N_6O_3$) requires m/z 429.0, LCMS found m/z 429.0; $^1$H NMR (400 MHz, DMSO-$d_6$) δ 8.12 (s, 1H), 7.80 (s, 1H), 7.63 (d, J=9.2 Hz, 1H), 7.12 (dd, J=9.2, 2.4 Hz, 1H), 6.74 (d, J=2.2 Hz, 1H), 4.10 (s, 3H).

Example 18. N-(3,5-dichloro-4-((3-methyl-2-oxo-2,3-dihydro-1H-benzo[d]imidazol-5-yl)oxy)phenyl)-5-oxo-4,5-dihydro-1,2,4-oxadiazole-3-carboxamide

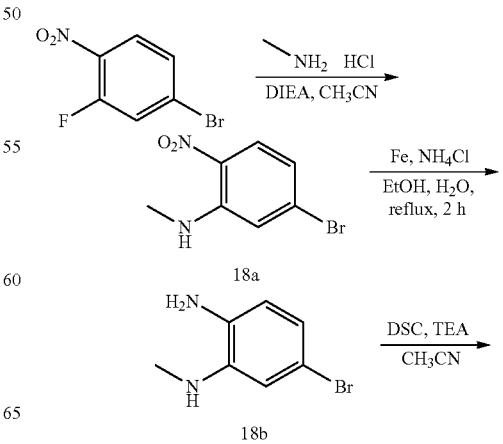

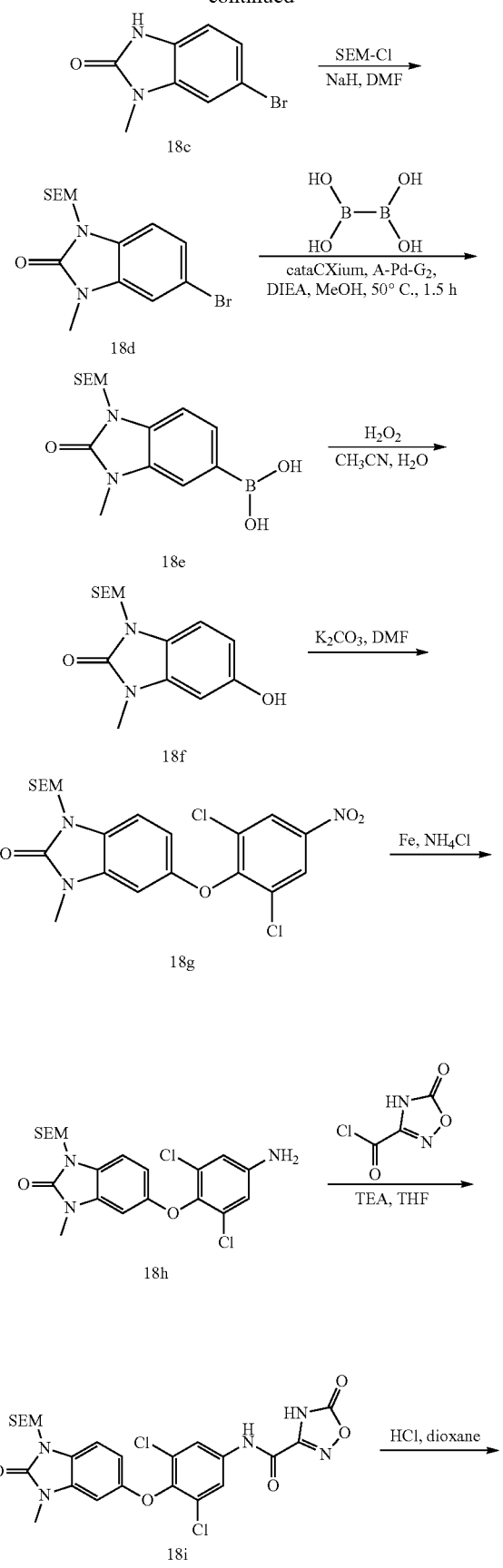

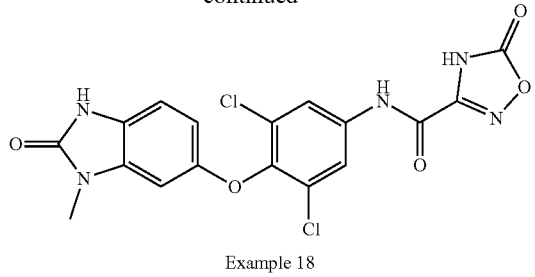

Example 18

Synthesis of 5-bromo-N-methyl-2-nitroaniline (18a). To a solution of 4-bromo-2-fluoro-1-nitrobenzene (2 g, 9.09 mmol) and methylamine (2.47 g, 36.53 mmol, HCl) in CH₃CN (50 mL) was added DIEA (5.87 g, 45.46 mmol, 7.92 mL). Then the mixture was stirred at 60° C. for 12 hours. TLC showed the reaction was completed. The mixture was concentrated in vacuum. The residue was extracted with EtOAc (50 mL+20 mL) and H₂O (20 mL). The combined organic layer was washed with brine (10 mL), dried over Na₂SO₄, filtered and concentrated in vacuum to give 18a.

Synthesis of 5-bromo-N1-methylbenzene-1,2-diamine (18b). To a solution of 5-bromo-N-methyl-2-nitroaniline (18a) (1.8 g, 7.79 mmol) in EtOH (30 mL) and H₂O (10 mL) was added NH₄Cl (2.08 g, 38.95 mmol) and iron powder (2.18 g, 38.95 mmol). Then the mixture was stirred at 80° C. for 16 hours. LCMS showed the reaction was completed, and desired MS was detected. The mixture was filtered and the filtration was concentrated in vacuum to give 18b. MS mass calculated for [M+1]$^+$ (C$_7$H$_9$BrN$_2$) requires m/z 201.0, LCMS found m/z 201.0.

Synthesis of 6-bromo-1-methyl-1H-benzo[d]imidazol-2 (3H)-one (18c). To a solution of 5-bromo-N1-methylbenzene-1,2-diamine (18b) (1.2 g, 5.97 mmol) in CH₃CN (30 mL) was added TEA (1.81 g, 17.90 mmol, 2.49 mL) and DSC (1.68 g, 6.57 mmol). Then the mixture was stirred at 20° C. for 16 hours. TLC showed the reaction was completed. The mixture was concentrated in vacuum. The residue was diluted in H₂O (15 mL) and EtOAc (15 mL). The mixture was filtrated to collect solid. The solid was extracted with EtOAc (5 mL*5) and dried over in vacuum to give 18c.

Synthesis of 5-bromo-3-methyl-1-((2-(trimethylsilyl) ethoxy)methyl)-1H-benzo[d]imidazol-2(3H)-one (18d). To a mixture of 6-bromo-1-methyl-1H-benzo[d]imidazol-2 (3H)-one (18c) (1.1 g, 4.84 mmol) in DMF (15 mL) was added NaH (213.14 mg, 5.33 mmol, 60% purity) at 20° C. Then the mixture was stirred at 20° C. for 10 min. Then SEM-Cl (888.46 mg, 5.33 mmol) was added in the mixture by dropwise. Then the mixture was stirred at 20° C. for 10 minutes. TLC showed the starting material was consumed, and one new spot was formed. The mixture was added in H₂O (45 mL) and extracted with EtOAc (20 mL*2). The combined organic layer was washed with brine (10 mL*2), dried over Na₂SO₄, filtered and concentrated in vacuum. The residue was purified by column silicagel chromatography (petroleum ether:ethyl acetate) to give 18d. ¹H NMR (400 MHz, CHLOROFORM-d) δ ppm 7.27 (s, 1H), 7.23 (dd, J=8.4, 1.8 Hz, 1H), 7.13 (d, J=1.8 Hz, 1H), 7.04 (d, J=8.4 Hz, 1H), 5.30 (s, 2H), 3.55-3.64 (m, 2H), 3.41 (s, 3H), 0.95-0.97 (m, 1H), 0.88-0.94 (m, 2H), −0.05-0.00 (m, 8H).

Synthesis of (3-methyl-2-oxo-1-((2-(trimethylsilyl) ethoxy)methyl)-2,3-dihydro-1H-benzo[d]imidazol-5-yl)boronic acid (18e). To a mixture of 5-bromo-3-methyl-1-((2-(trimethylsilyl)ethoxy)methyl)-1H-benzo[d]imidazol-2 (3H)-one (18d) (200 mg, 559.73 umol) and hypoboric acid (150.54 mg, 1.68 mmol) in MeOH (5 mL) was added DIEA (217.02 mg, 1.68 mmol, 292.48 uL) and cataCXium A-Pd-G2 (3.74 mg, 5.60 umol) under $N_2$. The mixture was stirred at 50° C. for 1.5 hours. LCMS showed the 18d was consumed completely and desired MS was detected. The reaction mixture was filtered and concentrated under reduced pressure to give a residue to give 18e. MS mass calculated for $[M+1]^+$ ($C_{14}H_{23}BN_2O_4Si$) requires m/z 323.2, LCMS found m/z 323.1

Synthesis of 5-hydroxy-3-methyl-1-((2-(trimethylsilyl) ethoxy)methyl)-1H-benzo[d]imidazol-2(3H)-one (18f). To a mixture of (3-methyl-2-oxo-1-((2-(trimethylsilyl)ethoxy) methyl)-2,3-dihydro-1H-benzo[d]imidazol-5-yl)boronic acid (18e) (130 mg, 403.43 umol) in $CH_3CN$ (2 mL) was added $NH_4HCO_3$ (31.89 mg, 403.43 umol, 33.22 uL) in $H_2O$ (1 mL) and $H_2O_2$ (91.48 mg, 806.85 umol, 77.53 uL, 30% purity) under $N_2$. The mixture was stirred at 25° C. for 2 hours. The reaction mixture was poured into $NaHSO_3$ (10 mL). The aqueous phase was extracted with ethyl acetate (30 mL*2). The combined organic phase was washed with brine (20 mL*2), dried with anhydrous $Na_2SO_4$, filtered and concentrated in vacuum to give 18f. MS mass calculated for $[M+1]^+$ ($C_{14}H_{22}N_2O_3Si$) requires m/z 295.1, LCMS found m/z 295.2; $^1$HNMR (400 MHz, $CDCl_3$) δ 8.03 (s, 1H), 6.99 (s, 1H), 6.68-6.50 (m, 2H), 5.31-5.27 (m, 2H), 3.63-3.56 (m, 2H), 3.40-3.36 (m, 3H), 2.99-2.96 (m, 2H), 2.90 (s, 2H), 2.10 (s, 1H), 1.02-0.82 (m, 3H), −0.02-−0.05 (m, 9H).

Synthesis of 5-(2,6-dichloro-4-nitrophenoxy)-3-methyl-1-((2-(trimethylsilyl)ethoxy)methyl)-1H-benzo[d]imidazol-2(3H)-one (18g). To a mixture of 5-hydroxy-3-methyl-1-((2-(trimethylsilyl)ethoxy)methyl)-1H-benzo[d]imidazol-2 (3H)-one (18f) (130 mg, 441.55 umol) in DMF (3 mL) was added $K_2CO_3$ (91.54 mg, 662.32 umol) and 1,3-dichloro-2-fluoro-5-nitro-benzene (101.99 mg, 485.70 umol) under $N_2$. The mixture was stirred at 20° C. for 1 hour. LCMS showed the 18f was consumed completely and desired MS was detected. TLC indicated the starting material was consumed completely and many new spots were formed. The residue was poured into water (5 mL). The aqueous phase was extracted with ethyl acetate (15 mL*3). The combined organic phase was washed with brine (10 mL*2), dried with anhydrous $Na_2SO_4$, filtered and concentrated in vacuum. The residue was purified by prep-TLC ($SiO_2$, petroleum ether/ethyl acetate) to give 18g. MS mass calculated for $[M+1]^+$ ($C_{20}H_{23}Cl_2N_3O_5Si$) requires m/z 484.1, LCMS found m/z 484.1; $^1$H NMR (400 MHz, $CDCl_3$) δ 8.34 (s, 2H), 7.27 (s, 1H), 7.04 (d, J=8.4 Hz, 1H), 6.67-6.58 (m, 1H), 6.48-6.39 (m, 1H), 5.29 (s, 2H), 3.65-3.57 (m, 2H), 3.40 (s, 3H), 1.57 (s, 2H), 1.02-0.82 (m, 2H), −0.03 (s, 9H).

Synthesis of 5-(4-amino-2,6-dichlorophenoxy)-3-methyl-1-((2-(trimethylsilyl)ethoxy)methyl)-1H-benzo[d]imidazol-2(3H)-one (18h). To a mixture of 5-(2,6-dichloro-4-nitrophenoxy)-3-methyl-1-((2-(trimethylsilyl)ethoxy)methyl)-1H-benzo[d]imidazol-2(3H)-one (18g) (100 mg, 206.44 umol) in EtOH (4 mL) was added Fe (57.64 mg, 1.03 mmol) and $NH_4Cl$ (55.21 mg, 1.03 mmol) in $H_2O$ (1 mL) under $N_2$. The mixture was stirred at 80° C. for 2 hours. LCMS showed the starting material was consumed completely and one main peak with desired MS was detected. The reaction mixture was filtered and concentrated under reduced pressure to give a residue. The residue was diluted with ethyl acetate (10 mL) and water (10 mL). The aqueous phase was extracted with ethyl acetate (20 mL*2). The combined organic phase was washed with brine (15 mL*2), dried with anhydrous $Na_2SO_4$, filtered and concentrated in vacuum to give 18h. MS mass calculated for $[M+1]^+$ ($C_{20}H_{25}Cl_2N_3O_3Si$) requires m/z 454.1, LCMS found m/z 454.1; HNMR (400 MHz, $CDCl_3$) δ 7.04-6.98 (m, 1H), 6.72 (s, 2H), 6.60-6.58 (m, 1H), 6.54-6.50 (m, 1H), 5.28 (s, 2H), 3.71-3.50 (m, 2H), 3.38 (s, 3H), 1.02-0.82 (m, 2H), −0.02 (s, 9H).

Synthesis of N-(3,5-dichloro-4-((3-methyl-2-oxo-1-((2-(trimethylsilyl)ethoxy)methyl)-2,3-dihydro-1H-benzo[d] imidazol-5-yl)oxy)phenyl)-5-oxo-4,5-dihydro-1,2,4-oxadiazole-3-carboxamide (18i). To a mixture of 5-(4-amino-2,6-dichlorophenoxy)-3-methyl-1-((2-(trimethylsilyl)ethoxy) methyl)-1H-benzo[d]imidazol-2(3H)-one (18h) (20 mg, 44.01 umol) and in THF (1.5 mL) was added TEA (13.36 mg, 132.04 umol, 18.38 uL) and 5-oxo-4H-1,2,4-oxadiazole-3-carbonyl chloride (6.54 mg, 44.01 umol) under $N_2$. The mixture was stirred at 20° C. for 20 min. LCMS showed the 18h was consumed completely and one main peak with desired MS was detected. The reaction mixture was concentrated under reduced pressure to give a residue. The residue was purified by Prep-HPLC (column: Waters Xbridge BEH C18 100*30 mm*10 um; mobile phase: [water (10 mM $NH_4HCO_3$)-MeCN]) to give 18i. MS mass calculated for $[M+1]^+$ ($C_{23}H_{25}Cl_2N_5O_6Si$) requires m/z 566.1, LCMS found m/z 566.2; $^1$H NMR (400 MHz, METHANOL-$d_4$) δ 8.00-7.92 (m, 2H), 7.19-7.08 (m, 1H), 6.81-6.72 (m, 1H), 6.57-6.50 (m, 1H), 5.33-5.28 (m, 2H), 3.66-3.57 (m, 2H), 3.39-3.38 (m, 3H), 0.96-0.82 (m, 2H), −0.01-−0.07 (m, 9H).

Synthesis of N-(3,5-dichloro-4-((3-methyl-2-oxo-2,3-dihydro-1H-benzo[d]imidazol-5-yl)oxy)phenyl)-5-oxo-4,5-dihydro-1,2,4-oxadiazole-3-carboxamide (Example 18). To a mixture of N-(3,5-dichloro-4-((3-methyl-2-oxo-1-((2-(trimethylsilyl)ethoxy)methyl)-2,3-dihydro-1H-benzo[d] imidazol-5-yl)oxy)phenyl)-5-oxo-4,5-dihydro-1,2,4-oxadiazole-3-carboxamide (18i) (8.5 mg, 15.01 umol) in dioxane (0.5 mL) was added HCl (2 mL) under $N_2$. The mixture was stirred at 65° C. for 6 hours. LCMS showed the 18i was consumed. The reaction mixture was concentrated under reduced pressure to give a residue. The residue was purified by Prep-HPLC (column: Waters Xbridge BEH C18 100*30 mm*10 um; mobile phase: [water (10 mM $NH_4HCO_3$)-MeCN]) to give Example 18. MS mass calculated for $[M+1]^+$ ($C_{17}H_{11}Cl_2N_5O_5$) requires m/z 436.0, LCMS found m/z 435.9; $^1$H NMR (400 MHz, MeOH-$d_4$) δ 8.02-7.94 (m, 2H), 6.98 (d, J=8.6 Hz, 1H), 6.70 (d, J=2.4 Hz, 1H), 6.51 (dd, J=2.4, 8.6 Hz, 1H), 4.77 (s, 1H), 3.35 (s, 3H).

Example 19. 2-(3,5-dichloro-4-((1-methyl-1H-benzo [d]imidazol-6-yl)oxy)phenyl)-3,5-dioxo-2,3,4,5-tetrahydro-1,2,4-triazine-6-carbonitrile

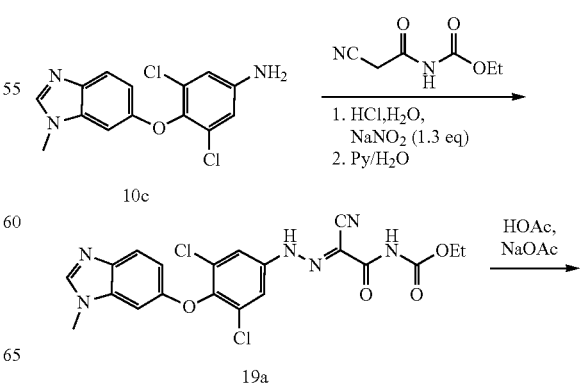

109

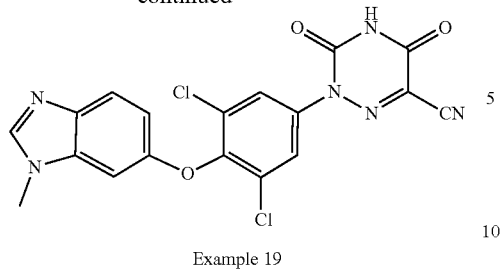

Example 19

Synthesis of (E)-ethyl (2-cyano-2-(2-(3,5-dichloro-4-((1-methyl-1H-benzo[d]imidazol-6-yl)oxy)phenyl)hydrazono)acetyl)carbamate (19a). To a mixture of 3,5-dichloro-4-((1-methyl-1H-benzo[d]imidazol-6-yl)oxy)aniline (10c) (20 mg, 64.9 umol) in HCl (0.5 mL) and was added $NaNO_2$ (5.82 mg, 84.4 umol) in $H_2O$ (1 mL) at 0° C. under $N_2$. The mixture was stirred at 0-5° C. for 30 minutes, then the mixture was added to a solution of ethyl (2-cyanoacetyl)carbamate (20.3 mg, 130 umol) in Pyr (0.5 mL) and $H_2O$ (1 mL) at 0° C. under $N_2$. The resulting mixture was stirred at 0-5° C. for another 30 minutes. LCMS showed the reaction was completed and the desired MS was detected. The reaction mixture was filtered and the filter cake was dried under reduced pressure to give 19a. MS mass calculated for $[M+1]^+$ ($C_{20}H_{16}Cl_2N_6O_4$) requires m/z 475.1, LCMS found m/z 475.1.

Synthesis of 2-(3,5-dichloro-4-((1-methyl-1H-benzo[d]imidazol-6-yl)oxy)phenyl)-3,5-dioxo-2,3,4,5-tetrahydro-1,2,4-triazine-6-carbonitrile (Example 19). To a mixture of (E)-ethyl (2-cyano-2-(2-(3,5-dichloro-4-((1-methyl-1H-benzo[d]imidazol-6-yl)oxy)phenyl)hydrazono)acetyl)carbamate (19a) (20 mg, 42.1 umol) in HOAc (2 mL) was added NaOAc (17.3 mg, 210 umol) under $N_2$. The mixture was stirred at 120° C. for 3 hours. LCMS showed 19a was consumed completely and the desired MS was detected. The reaction mixture was concentrated under reduced pressure to give a residue. The residue was purified by prep-HPLC (column: Phenomenex Luna C18 200*40 mm*10 um; mobile phase: [water (0.2% FA)-ACN]; 20%-60%, 10 min) to give Example 19. MS mass calculated for $[M+1]^+$ ($C_{18}H_{10}Cl_2N_6O_3$) requires m/z 429.0, LCMS found m/z 429.0; $^1$H NMR (400 MHz, $CD_3OD$) δ 8.09-8.16 (m, 1H), 7.76-7.88 (m, 2H), 7.58-7.67 (m, 1H), 6.86-7.07 (m, 2H), 3.77-3.84 (m, 3H).

Example 20. N-(3,5-dichloro-4-((1-isopropyl-1H-benzo[d]imidazol-6-yl)oxy)phenyl)-5-oxo-4,5-dihydro-1,2,4-oxadiazole-3-carboxamide

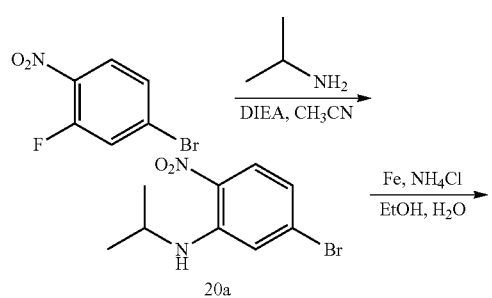

110

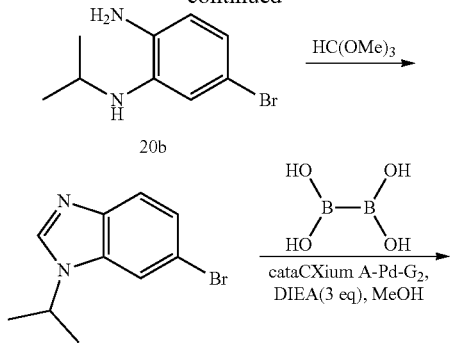

Example 20

Synthesis of 5-bromo-N-isopropyl-2-nitroaniline (20a). To a mixture of 4-bromo-2-fluoro-1-nitrobenzene (1 g, 4.55 mmol) and propan-2-amine (1.07 g, 18.2 mmol, 1.56 mL) in $CH_3CN$ (20 mL) was added DIEA (2.94 g, 22.7 mmol, 3.96 mL) under $N_2$. The mixture was stirred at 50° C. for 2 hours. TLC indicated the starting material was consumed completely and one new spot was formed. The reaction mixture was concentrated under reduced pressure, and the residue was diluted in water (20 mL), and extracted with ethyl acetate (30 mL*3). The combined organic phase was washed with brine (30 mL*2), dried with anhydrous $Na_2SO_4$, filtered and concentrated in vacuum to give 20a. $^1$H NMR (400 MHz, $CDCl_3$) δ 8.03 (d, J=9.0 Hz, 2H), 6.97-7.11 (m, 1H), 6.68-6.76 (m, 1H), 3.74-3.87 (m, 1H), 1.32-1.36 (m, 6H).

Synthesis of 5-bromo-N1-isopropylbenzene-1,2-diamine (20b). To a mixture of 5-bromo-N-isopropyl-2-nitroaniline (20a) (1.3 g, 5.02 mmol) in EtOH (10 mL) was added a solution of $NH_4Cl$ (1.34 g, 25.1 mmol) in $H_2O$ (3 mL) and Fe (1.40 g, 25.1 mmol) under $N_2$. The mixture was stirred at 80° C. for 2 hours. TLC indicated that 20a was consumed completely. The reaction mixture was filtered and concentrated under reduced pressure. The residue was diluted in water (20 mL) and extracted with ethyl acetate (40 mL*2). The combined organic phase was washed with brine (30 mL*2), dried with anhydrous $Na_2SO_4$, filtered and concentrated in vacuum to give 20b. $^1$H NMR (400 MHz, $CDCl_3$) δ 6.68-6.85 (m, 2H), 6.48-6.68 (m, 1H), 3.49-3.63 (m, 1H), 2.99-3.41 (m, 2H), 1.25 (s, 3H), 1.24 (s, 3H).

Synthesis of 6-bromo-1-isopropyl-1H-benzo[d]imidazole (20c). A mixture of 5-bromo-N1-isopropylbenzene-1,2-diamine (20b) (1.1 g, 4.80 mmol) and $HC(OMe)_3$ (12 mL) was stirred at 100° C. under $N_2$ for 2 hours. TLC (Petroleum ether:Ethyl acetate) indicated that 20b was consumed completely and one new spot was formed. The reaction mixture was concentrated under reduced pressure to give 20c. $^1$H NMR (400 MHz, $CDCl_3$) δ 7.97 (s, 1H), 7.64-7.71 (m, 1H), 7.57-7.61 (m, 1H), 7.34-7.41 (m, 1H), 4.54-4.63 (m, 1H), 1.57-1.65 (d, 6H).

Synthesis of isopropyl-1H-benzo[d]imidazol-6-yl)boronic acid (20d). To a mixture of 6-bromo-1-isopropyl-1H-benzo[d]imidazole (20c) (1 g, 4.18 mmol) in MeOH (6 mL) was added hypoboric acid (1.12 g, 12.6 mmol), DIEA (1.62 g, 12.6 mmol, 2.19 mL) and cataCXium A-Pd-G2 (28.0 mg, 41.8 umol) under $N_2$. The mixture was stirred at 50° C. for 0.5 hours. TLC indicated that 20c was consumed completely and one new spot was formed. The reaction mixture was filtered and concentrated under reduced pressure to give 20d.

Synthesis of isopropyl-1H-benzo[d]imidazol-6-ol (20e). To a mixture of isopropyl-1H-benzo[d]imidazol-6-yl)boronic acid (20d) (853 mg, 4.18 mmol) in $CH_3CN$ (10 mL) was added $NH_4HCO_3$ (330 mg, 4.18 mmol, 344 uL) in $H_2O$ (3 mL) and $H_2O_2$ (948 mg, 8.36 mmol, 803 uL, 30% purity) under $N_2$. The mixture was stirred at 25° C. for 1 hour. LCMS showed 20d was consumed completely and the desired MS was detected. The residue was poured into $NaHSO_3$ (20 mL). The aqueous phase was extracted with ethyl acetate (30 mL*2). The combined organic phase was washed with brine (20 mL*2), dried with anhydrous $Na_2SO_4$, filtered and concentrated in vacuum to give 20e. MS mass calculated for $[M+1]^+$ ($C_{10}H12N_2O$) requires m/z 177.1, LCMS found m/z 177.1.

Synthesis of 6-(2,6-dichloro-4-nitrophenoxy)-1-isopropyl-1H-benzo[d]imidazole (20f). To a mixture of 1-isopropyl-1H-benzo[d]imidazol-6-ol (20e) (640 mg, 3.63 mmol) and 1,3-dichloro-2-fluoro-5-nitro-benzene (839 mg, 4.00 mmol) in DMF (10 mL) was added $K_2CO_3$ (753 mg, 5.45 mmol) under $N_2$. The mixture was stirred at 25° C. for 1 hour. TLC indicated 20e was consumed completely and many new spots were formed. The reaction mixture was poured into water (15 mL) and extracted with ethyl acetate (30 mL*3). The combined organic phase was washed with brine (20 mL), dried with anhydrous $Na_2SO_4$, filtered and concentrated in vacuum. The residue was purified by column chromatography ($SiO_2$, Petroleum ether:Ethyl acetate) to give 20f. $^1$H NMR (400 MHz, $CD_3OD$) δ 8.45 (s, 2H), 8.25 (s, 1H), 7.62 (d, J=9.0 Hz, 1H), 7.07 (d, J=2.4 Hz, 1H), 6.88 (dd, J=2.6, 9.0 Hz, 1H), 4.85 (s, 8H), 4.62-4.72 (m, 1H), 1.56 (d, J=6.8 Hz, 6H).

Synthesis of 3,5-dichloro-4-((1-isopropyl-1H-benzo[d]imidazol-6-yl)oxy)aniline (20g). To a mixture of 6-(2,6-dichloro-4-nitrophenoxy)-1-isopropyl-1H-benzo[d]imidazole (20f) (500 mg, 1.37 mmol) in EtOH (8 mL) was added a solution of $NH_4Cl$ (365 mg, 6.83 mmol) in $H_2O$ (2 mL) and Fe (381 mg, 6.83 mmol) under $N_2$. The mixture was stirred at 80° C. for 2 hours. TLC indicated 20f was consumed completely and one new spot was formed. The reaction mixture was filtered and concentrated under reduced pressure. The residue was washed by water to give 20g. $^1$H NMR (400 MHz, $CD_3OD$) δ 8.18 (s, 1H), 7.57 (d, J=9.0 Hz, 1H), 6.82-6.94 (m, 2H), 6.69-6.82 (m, 2H), 4.51-4.67 (m, 1H), 4.60 (br d, J=7.0 Hz, 2H), 1.56 (d, J=6.6 Hz, 6H).

Synthesis of N-(3,5-dichloro-4-((1-isopropyl-1H-benzo[d]imidazol-6-yl)oxy)phenyl)-5-oxo-4,5-dihydro-1,2,4-oxadiazole-3-carboxamide (Example 20). To a mixture of 3,5-dichloro-4-((1-isopropyl-1H-benzo[d]imidazol-6-yl)oxy)aniline (20g) (50 mg, 149 umol) in THF (3 mL) was added TEA (45.2 mg, 446 umol, 62.1 uL) and 5-oxo-4,5-dihydro-1,2,4-oxadiazole-3-carbonyl chloride (22.1 mg, 149 umol) under $N_2$. The mixture was stirred at 25° C. for 1 hour. LCMS showed 20g was consumed completely and the desired MS was detected. The residue was poured into $NaHCO_3$ (5 mL) and extracted with ethyl acetate (10 mL*3). The combined organic phase was washed with brine (10 mL*2), dried with anhydrous $Na_2SO_4$, filtered and concentrated in vacuum. The crude product was washed by water (2 mL*2) and ethyl acetate (2 mL*4) to give Example 20. MS mass calculated for $[M+1]^+$ ($C_{19}H_{15}Cl_2N_5O_4$) requires m/z 448.1, LCMS found m/z 448.1; $^1$H NMR (400 MHz, DMSO-$d_6$) δ 8.22-8.36 (m, 1H), 7.61-7.80 (m, 2H), 7.51-7.60 (m, 1H), 7.00-7.13 (m, 1H), 6.61-6.73 (m, 1H), 4.57-4.70 (m, 1H), 3.33 (br s, 94H), 1.39-1.54 (m, 6H).

Example 21. 2-(3,5-dichloro-4-((1-isopropyl-1H-benzo[d]imidazol-6-yl)oxy)phenyl)-3,5-dioxo-2,3,4,5-tetrahydro-1,2,4-triazine-6-carbonitrile

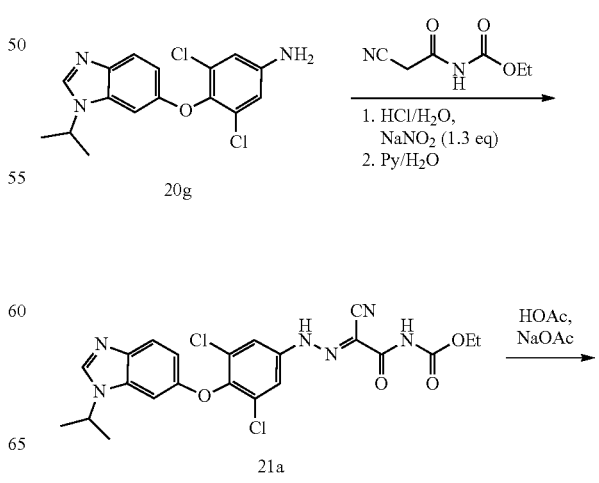

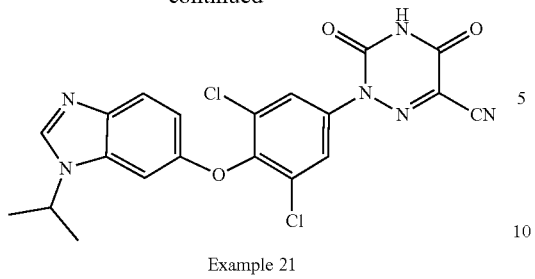

Example 21

Synthesis of (E)-ethyl (2-cyano-2-(2-(3,5-dichloro-4-((1-isopropyl-1H-benzo[d]imidazol-6-yl)oxy)phenyl)hydrazono)acetyl)carbamate (21a). To a mixture of 3,5-dichloro-4-((1-isopropyl-1H-benzo[d]imidazol-6-yl)oxy)aniline (20g) (100 mg, 297 umol) in HCl (1 mL) was added NaNO$_2$ (26.7 mg, 387 umol) in H$_2$O (2 mL), and the resulting mixture was stirred at 0-5° C. for 0.5 hours, then the reaction mixture was added to the mixture of ethyl (2-cyanoacetyl) carbamate (92.9 mg, 595 umol) in Py (1 mL) and H$_2$O (2 mL) under N$_2$. The final mixture was stirred at 0-5° C. for another 0.5 hours. LCMS showed 20g was consumed completely and the desired MS was detected. The reaction mixture was filtered and the filter cake was dried in vacuum to give 21a. MS mass calculated for [M+1]$^+$ (C$_{22}$H$_{20}$Cl$_2$N$_6$O$_4$) requires m/z 503.1, LCMS found m/z 503.1.

Synthesis of 2-(3,5-dichloro-4-((1-isopropyl-1H-benzo[d]imidazol-6-yl)oxy)phenyl)-3,5-dioxo-2,3,4,5-tetrahydro-1,2,4-triazine-6-carbonitrile (Example 21). To a mixture of (E)-ethyl (2-cyano-2-(2-(3,5-dichloro-4-((1-isopropyl-1H-benzo[d]imidazol-6-yl)oxy)phenyl)hydrazono)acetyl)carbamate (21a) (100 mg, 199 umol) in HOAc (4 mL) was added NaOAc (81.5 mg, 993 umol) under N$_2$. The mixture was stirred at 120° C. for 3 hours. LCMS showed 21a was consumed completely and one major peak with the desired MS was detected. The reaction mixture was concentrated under reduced pressure to give a residue. The residue was purified by prep-HPLC (column: Phenomenex Luna C18 200*40 mm*10 um; mobile phase: [water (0.2% FA)-ACN] to give Example 21. MS mass calculated for [M+1]$^+$ (C$_{20}$H$_{14}$Cl$_2$N$_6$O$_3$) requires m/z 457.1, LCMS found m/z 456.9; $^1$H NMR (400 MHz, CD$_3$OD) δ 8.30 (s, 1H), 7.81 (s, 2H), 7.63 (d, J=9.0 Hz, 1H), 7.04 (d, J=2.0 Hz, 1H), 6.83-7.00 (m, 1H), 4.63-4.72 (m, 1H), 4.68 (s, 1H), 2.59-2.67 (m, 1H), 1.90-2.01 (m, 1H), 1.63-1.65 (m, 1H), 1.57 (d, J=6.6 Hz, 5H).

Example 22. N-(3,5-dichloro-4-((1-cyclopropyl-1H-benzo[d]imidazol-6-yl)oxy)phenyl)-5-oxo-4,5-dihydro-1,2,4-oxadiazole-3-carboxamide

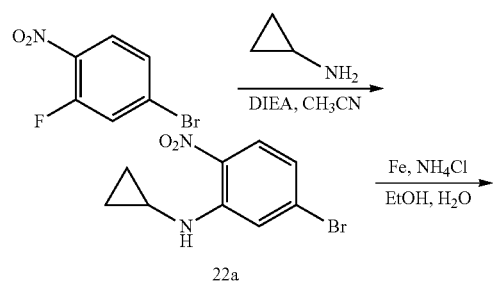

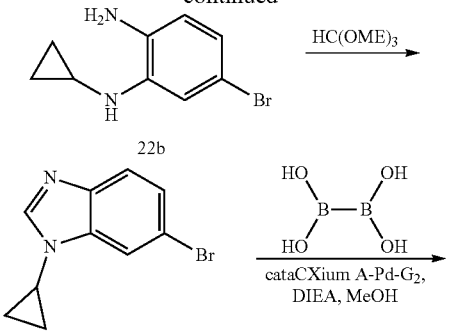

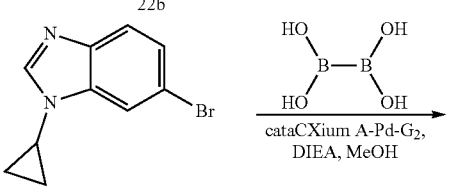

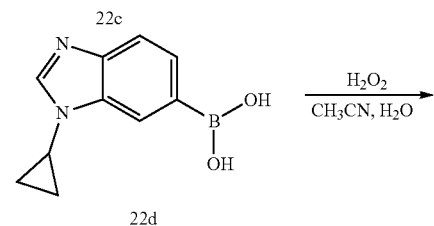

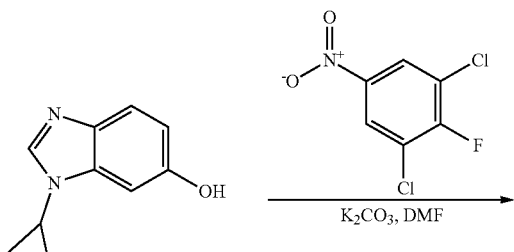

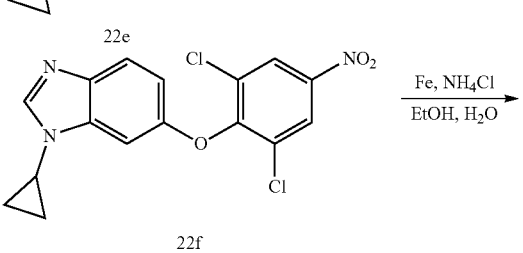

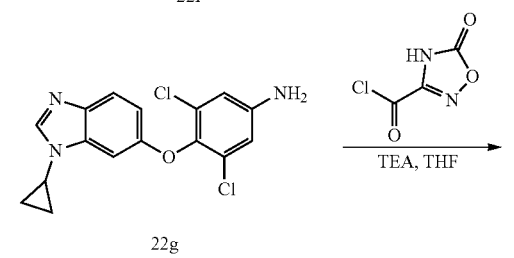

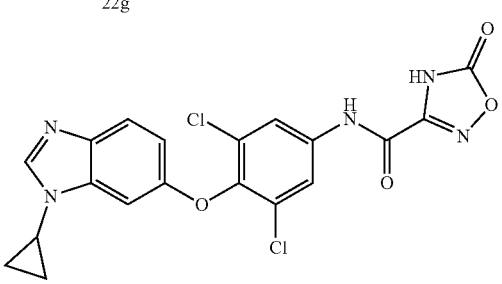

Example 22

Synthesis of 5-bromo-N-cyclopropyl-2-nitroaniline (22a). To a mixture of 4-bromo-2-fluoro-1-nitrobenzene (2 g, 9.09 mmol) and cyclopropanamine (2.08 g, 36.36 mmol, 2.52 mL) in CH$_3$CN (10 mL) was added DIEA (5.87 g, 45.45 mmol, 7.92 mL) under N$_2$. The mixture was stirred at 50° C. for 1 hour. TLC indicated that the starting material was consumed completely. The reaction mixture was concentrated under reduced pressure, and the residue was diluted with water (20 mL) and extracted with ethyl acetate (30 mL*3). The combined organic phase was washed with brine (20 mL*2), dried with anhydrous Na$_2$SO$_4$, filtered and concentrated in vacuum to give 22a. $^1$H NMR (400 MHz, CDCl$_3$) δ 7.72 (dd, J=9.0, 2.0 Hz, 1H), (dd, J=9.0, 2.0 Hz, 1H), 4.57 (s, 7H), 3.01 (br s, 2H), 2.27-2.36 (m, 1H), 0.57-0.70 (m, 2H), 0.28-0.38 (m, 2H).

Synthesis of 5-bromo-N1-cyclopropylbenzene-1,2-diamine (22b) To a solution of 5-bromo-N-cyclopropyl-2-nitroaniline (22a) (1 g, 3.89 mmol) in EtOH (10 mL) H$_2$O (2 mL) was added Fe (1.09 g, 19.45 mmol) and NH$_4$Cl (1.04 g, 19.45 mmol). The mixture was stirred at 80° C. for 5 hours. LCMS showed 22a was consumed completely and the desired MS was detected. The suspension was filtered through a pad of Celite and the pad cake was washed with EtOH (5 mL*3). The combined filtrates were concentrated in vacuum. The residue was extracted with Ethyl acetate (30 mL*2) and H$_2$O (10 mL). The combined organic phase was washed with brine (10 mL*3), dried with anhydrous Na$_2$SO$_4$, filtered and concentrated in vacuum to give 22b. MS mass calculated for [M+1]$^+$ (C$_9$H$_{11}$BrN$_2$) requires m/z 227.0, LCMS found m/z 227.1; $^1$H NMR (400 MHz, CD$_3$OD) δ 6.64-7.36 (m, 1H), 5.85-6.51 (m, 2H), 2.40-2.87 (m, 2H), 1.28-2.21 (m, 1H), 0.34-0.85 (m, 2H), −0.33-0.28 (m, 1H).

Synthesis of 6-bromo-1-cyclopropyl-1H-benzo[d]imidazole (22c). A solution of 5-bromo-N1-cyclopropylbenzene-1,2-diamine (22b) (800 mg, 3.52 mmol) in HC(OMe)$_3$ (5 mL) was stirred at 100° C. for 2 hours. LCMS showed 22b was consumed completely and the desired MS was detected. The mixture was concentrated in vacuum. The residue was purified by column chromatography (SiO$_2$, Petroleum ether: Ethyl acetate) to give 22c. MS mass calculated for [M+1]$^+$ (C$_{10}$H9BrN$_2$) requires m/z 237.0, LCMS found m/z 237.1; $^1$H NMR (400 MHz, CD$_3$OD) δ 8.18 (s, 1H), 7.85 (s, 1H), 7.68-7.76 (m, 1H), 7.29-7.60 (m, 5H), 1.16-1.33 (m, 4H), 1.04-1.14 (m, 4H).

Synthesis of (1-cyclopropyl-1H-benzo[d]imidazol-6-yl) boronic acid (22d). To a mixture of 6-bromo-1-cyclopropyl-1H-benzo[d]imidazole (22c) (420 mg, 1.77 mmol) in MeOH (10 mL) was added hypoboric acid (476.43 mg, 5.31 mmol), DIPEA (686.82 mg, 5.31 mmol, 925.63 uL) and [2-(2-aminophenyl) phenyl]-chloro-palladium; bis(1-adamantyl)-butyl-phosphane (11.84 mg, 17.71 umol) under N$_2$. The mixture was stirred at 50° C. for 1 hour. LCMS showed 22c was consumed completely and the desired MS was detected. The suspension was filtered through a pad of Celite and the pad cake was washed with MeOH (5 mL*3). The combined filtrates were concentrated in vacuum to give 22d. MS mass calculated for [M+1]$^+$ (C$_{10}$H$_{11}$BN$_2$O$_2$) requires m/z 203.1, LCMS found m/z 203.2.

Synthesis of 1-cyclopropyl-1H-benzo[d]imidazol-6-ol (22e). To a mixture of (1-cyclopropyl-1H-benzo[d]imidazol-6-yl)boronic acid (22d) (350 mg, 1.73 mmol) in H$_2$O (2 mL) and CH$_3$CN (4 mL) was added ammonium carbonate (136.97 mg, 1.73 mmol, 142.67 uL) and H$_2$O$_2$ (392.82 mg, 3.47 mmol, 332.90 uL, 30% purity) under N$_2$. The mixture was stirred at 20° C. for 1 hour. LCMS indicated 22d was consumed completely and the desired MS was detected. The residue was poured into NaHSO$_3$ (30 mL) and stirred for 10 minutes. The aqueous phase was extracted with ethyl acetate (20 mL*3). The combined organic phase was washed with brine (10 mL*2), dried with anhydrous Na$_2$SO$_4$, filtered and concentrated in vacuum to give 22e. MS mass calculated for [M+1]$^+$ (C$_{10}$H$_{10}$N$_2$O) requires m/z 175.1, LCMS found m/z 175.2; $^1$H NMR (400 MHz, CD$_3$OD) δ 7.93-8.01 (m, 1H), 7.43 (d, J=8.6 Hz, 1H), 6.95-7.03 (m, 2H), 6.76-6.83 (m, 2H), 3.95-4.08 (m, 1H), 1.99-2.04 (m, 2H), 1.24 (t, J=7.2 Hz, 4H), 1.11-1.17 (m, 2H).

Synthesis of 1-cyclopropyl-6-(2,6-dichloro-4-nitrophenoxy)-1H-benzo[d]imidazole (22f). To a solution of 1-cyclopropyl-1H-benzo[d]imidazol-6-ol (22e) (300 mg, 1.72 mmol) and 1,3-dichloro-2-fluoro-5-nitro-benzene (397.80 mg, 1.89 mmol) in DMF (10 mL) was added K$_2$CO$_3$ (357.03 mg, 2.58 mmol). The mixture was degassed and purged with N$_2$ for 3 times and stirred at 20° C. for 1 hour. LCMS and TLC showed 22e was consumed completely and the desired MS was detected. The mixture was extracted with Ethyl acetate (20 mL*2) and H$_2$O (5 mL). The combined organic phase was washed with brine (10 mL*3), dried with anhydrous Na$_2$SO$_4$, filtered and concentrated in vacuum. The residue was purified by column chromatography (SiO$_2$, Petroleum ether:Ethyl acetate) to give 22f. MS mass calculated for [M+1]$^+$ (C$_{16}$H$_{11}$Cl$_2$N$_3$O$_3$) requires m/z 364.0, LCMS found m/z 364.0; $^1$H NMR (400 MHz, CD$_3$OD) δ 8.46-8.48 (m, 2H), 8.14 (s, 1H), 7.61 (d, J=9.0 Hz, 1H), 7.11 (d, J=2.4 Hz, 1H), 6.89 (dd, J=8.8, 2.4 Hz, 1H), 4.03-4.07 (m, 1H), 3.42 (tt, J=7.0, 3.6 Hz, 1H), 3.21 (s, 3H), 1.20-1.26 (m, 1H), 1.10-1.16 (m, 2H), 0.99-1.08 (m, 3H).

Synthesis of 3,5-dichloro-4-((1-cyclopropyl-1H-benzo[d] imidazol-6-yl)oxy)aniline (22g). To a solution of 1-cyclopropyl-6-(2,6-dichloro-4-nitrophenoxy)-1H-benzo[d]imidazole (22f) (410 mg, 1.13 mmol) in EtOH (10 mL) and H$_2$O (3 mL) was added Fe (314.38 mg, 5.63 mmol) and NH$_4$Cl (301.10 mg, 5.63 mmol). The mixture was stirred at 80° C. for 2 hours. LCMS showed 22f was consumed completely and the desired MS was detected. The suspension was filtered through a pad of Celite and the pad cake was washed with EtOH (5 mL*3). The combined filtrates were extracted with Ethyl acetate (15 mL*2) and H$_2$O (5 mL). The combined organic phase was washed with brine (10 mL*3), dried with anhydrous Na$_2$SO$_4$, filtered and concentrated in vacuum. The residue was purified by column chromatography (SiO$_2$, Petroleum ether:Ethyl acetate) to give 22g. MS mass calculated for [M+1]$^+$ (C$_{16}$H$_{13}$Cl$_2$N$_3$O) requires m/z 334.0, LCMS found m/z 334.1; $^1$H NMR (400 MHz, CD$_3$OD) S 8.07 (s, 1H), 7.55 (d, J=8.8 Hz, 1H), 6.93 (d, J=2.4 Hz, 1H), 6.86 (dd, J=8.8, 2.4 Hz, 1H), 6.75-6.80 (m, 2H), 3.36-3.42 (m, 1H), 1.07-1.14 (m, 2H), 0.95-1.03 (m, 2H).

Synthesis of N-(3,5-dichloro-4-((1-cyclopropyl-1H-benzo[d]imidazol-6-yl)oxy)phenyl)-5-oxo-4,5-dihydro-1,2,4-oxadiazole-3-carboxamide (Example 22). To a solution of 3,5-dichloro-4-((1-cyclopropyl-1H-benzo[d]imidazol-6-yl)oxy)aniline (22g) (25 mg, 74.81 umol) in THF (3 mL) was added TEA (22.71 mg, 224.42 umol, 31.24 uL) and 5-oxo-4H-1,2,4-oxadiazole-3-carbonyl chloride (16.66 mg, 112.21 umol). The mixture was stirred at 25° C. for 0.5 hours. LCMS showed 22g was consumed completely and the desired MS was detected. The mixture was quenched with H$_2$O (1 mL) and MeOH (5 mL) and stirred at 25° C. for 10 minutes. The mixture was concentrated in vacuum. The residue was purified by Prep-HPLC ((NH$_4$HCO$_3$) column: Waters Xbridge BEH C18 100*25 mm*5 um; mobile phase: [water (10 mM NH$_4$HCO$_3$)-MeCN] to give Example 22. MS mass calculated for [M+1]$^+$ (C$_{16}$H$_{13}$Cl$_2$N$_3$O) requires m/z 446.0, LCMS found m/z 445.9; $^1$H NMR (400 MHz, DMSO-d$_6$) δ 10.97 (br s, 1H), 8.12 (s, 2H), 7.58 (d, J=9.0 Hz, 1H), 7.19 (s, 1H), 7.07 (s, 1H), 6.99 (d, J=2.4 Hz, 1H), 6.94 (s, 1H), 6.75 (dd, J=8.8, 2.6 Hz, 1H), 3.44 (td, J=7.0, 3.6 Hz, 1H), 0.99-1.06 (m, 2H), 0.93-0.98 (m, 2H).

Example 23. 2-(3,5-dichloro-4-((1-cyclopropyl-1H-benzo[d]imidazol-6-yl)oxy)phenyl)-3,5-dioxo-2,3,4,5-tetrahydro-1,2,4-triazine-6-carbonitrile

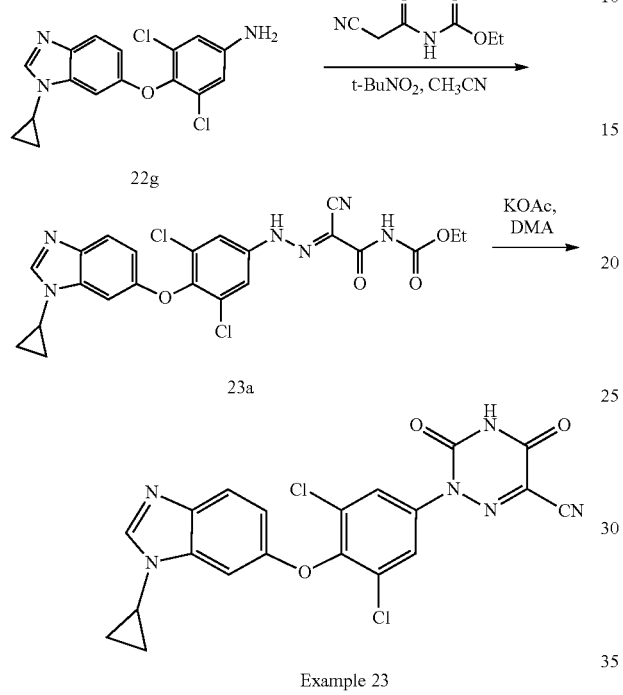

Example 23

Synthesis of (E)-ethyl (2-cyano-2-(2-(3,5-dichloro-4-((1-cyclopropyl-1H-benzo[d]imidazol-6-yl)oxy)phenyl)hydrazono)acetyl)carbamate (23a). To a mixture of 3,5-dichloro-4-((1-cyclopropyl-1H-benzo[d]imidazol-6-yl)oxy)aniline (22g) (30 mg, 89.77 umol) and ethyl N-(2-cyanoacetyl)carbamate (15.42 mg, 98.74 umol) in CH₃CN (2.5 mL) was added t-BuONO (18.51 mg, 179.53 umol, 21.35 uL) at 0° C. Then the mixture was stirred at 0° C. for 1 hour. LCMS showed 22g was consumed completely and the desired MS was detected. The suspension was filtered through a pad of Celite and the pad cake was washed with MeOH (5 mL*3). The combined filtrates were concentrated in vacuum to give 23a. MS mass calculated for [M+1]⁺ ($C_{22}H_{18}Cl_2N_6O_4$) requires m/z 501.0, LCMS found m/z 501.1; ¹H NMR (400 MHz, CD₃OD) δ 9.42 (br s, 1H), 7.91 (s, 1H), 7.77-7.86 (m, 2H), 7.70 (br s, 1H), 7.59 (br d, J=7.8 Hz, 1H), 7.22-7.40 (m, 4H), 4.05 (br s, 4H), 1.19-1.38 (m, 36H), 0.89 (br d, J=9.6 Hz, 4H).

Synthesis of 2-(3,5-dichloro-4-((1-cyclopropyl-1H-benzo[d]imidazol-6-yl)oxy)phenyl)-3,5-dioxo-2,3,4,5-tetrahydro-1,2,4-triazine-6-carbonitrile (Example 23). To a solution of (E)-ethyl (2-cyano-2-(2-(3,5-dichloro-4-((1-cyclopropyl-1H-benzo[d]imidazol-6-yl)oxy)phenyl)hydrazono)acetyl)carbamate (23a) (40 mg, 79.79 umol) in DMA (3 mL) was added KOAc (15.66 mg, 159.58 umol). The mixture was stirred at 115° C. for 3 hours. LCMS showed 23a were consumed completely and the desired MS was detected. The mixture was added dropwise to H₂O (4 mL) with stirring for 10 minutes. The mixture was filtrated, and the filter cake was washed with H₂O (1 mL*3) and dried over in vacuum. The residue was purified by Prep-HPLC; column: Waters Xbridge BEH C18 100*25 mm*5 um; mobile phase: [water (10 mM NH₄HCO₃)-ACN]; B %: 15%-45%, 8 min) to give Example 23. MS mass calculated for [M+1]⁺ ($C_{20}H_{12}Cl_2N_6O_3$) requires m/z 455.0, LCMS found m/z 454.9; ¹H NMR (400 MHz, DMSO-d₆) δ 8.17 (s, 1H), 7.84 (s, 2H), 7.60 (d, J=8.8 Hz, 1H), 7.08 (d, J=2.6 Hz, 1H), 6.75 (dd, J=8.8, 2.6 Hz, 1H), 3.44-3.50 (m, 1H), 1.00-1.06 (m, 2H), 0.95-1.00 (m, 2H).

Example 24. N-(3,5-dichloro-4-((2-cyclopropylquinolin-6-yl)oxy)phenyl)-5-oxo-4,5-dihydro-1,2,4-oxadiazole-3-carboxamide

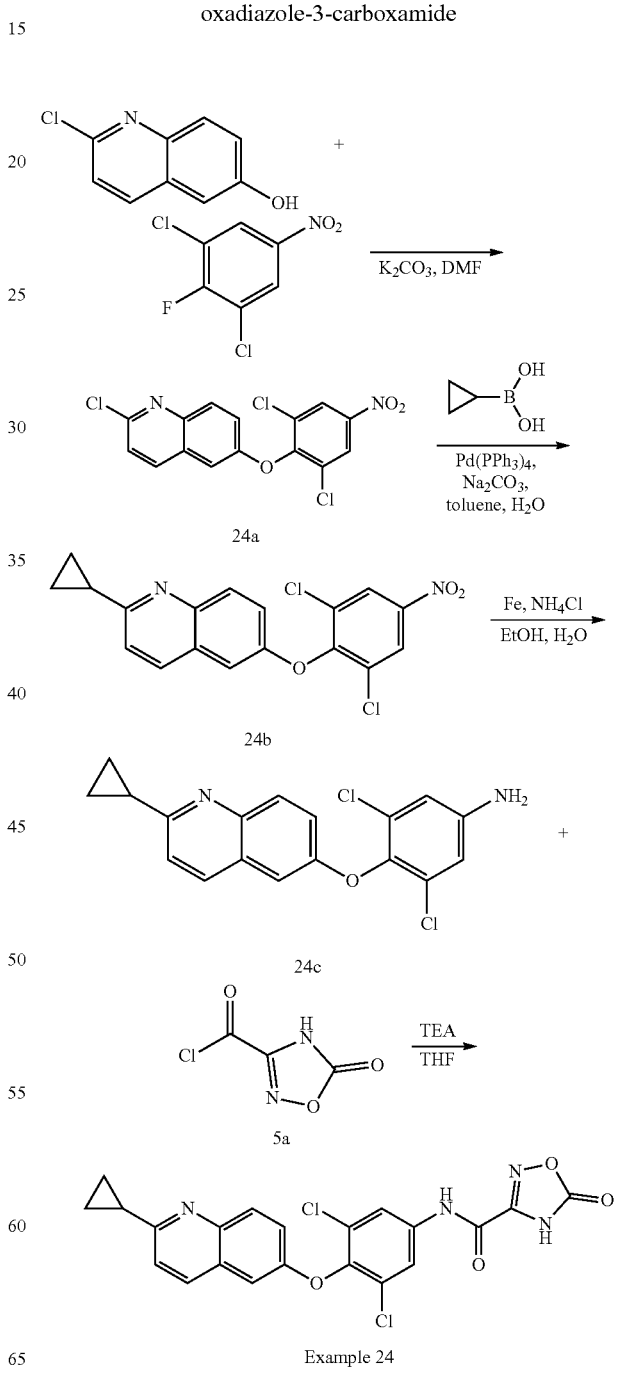

Example 24

Synthesis of 2-chloro-6-(2,6-dichloro-4-nitro-phenoxy) quinoline (24a). A mixture of 2-chloroquinolin-6-ol (400 mg, 2.23 mmol), 1,3-dichloro-2-fluoro-5-nitro-benzene (561.21 mg, 2.67 mmol), and $K_2CO_3$ (461.71 mg, 3.34 mmol) in DMF (10 mL) was degassed and purged with $N_2$ for 3 times, and then the mixture was stirred at 25° C. for 1 hour under $N_2$ atmosphere. TLC and LCMS showed the reaction was completed. The reaction mixture was diluted with $H_2O$ (20 mL) and extracted with ethyl acetate (20 mL*2). The combined organic layers were washed with brine (20 mL*2), dried over with $Na_2SO_4$, filtered and concentrated under reduced pressure. The residue was purified by column chromatography ($SiO_2$, Petroleum ether: Ethyl acetate=20:1 to 10:1) to give 24a. $^1$H NMR (400 MHz, $CDCl_3$) 8.38 (s, 2H), 8.07 (d, J=9.0 Hz, 1H), 7.94 (d, J=8.6 Hz, 1H), 7.52 (dd, J=9.2, 2.8 Hz, 1H), 7.39 (d, J=8.6 Hz, 1H), 6.92 (d, J=2.8 Hz, 1H).

Synthesis of 2-cyclopropyl-6-(2,6-dichloro-4-nitrophenoxy)quinoline (24b). A mixture of 2-chloro-6-(2,6-dichloro-4-nitro-phenoxy)quinoline (24a) (200 mg, 541.15 umol), cyclopropylboronic acid (92.97 mg, 1.08 mmol), $K_2CO_3$ (224.37 mg, 1.62 mmol), and $Pd(PPh_3)_4$ (62.53 mg, 54.11 umol) in dioxane (10 mL) and $H_2O$ (1 mL) was degassed and purged with $N_2$ 3 times, and then the mixture was stirred at 100° C. for 16 hours under $N_2$ atmosphere. TLC and LCMS showed the reaction was completed. The reaction mixture was diluted with $H_2O$ (20 mL) and extracted with ethyl acetate (20 mL*2). The combined organic layers were washed with brine (20 mL*2), dried over with $Na_2SO_4$, filtered and concentrated under reduced pressure. The residue was purified by column chromatography ($SiO_2$, Petroleum ether:Ethyl acetate=20:1 to 10:1) to give 24b. MS mass calculated for $[M+H]^+$ ($C_{18}H_{12}Cl_2N_2O_3$) requires m/z, 375.0, LCMS found m/z 375.0.

Synthesis of 3,5-dichloro-4-((2-cyclopropylquinolin-6-yl)oxy)aniline (24c). A mixture of 2-cyclopropyl-6-(2,6-dichloro-4-nitro-phenoxy)quinoline (24b) (200 mg, 533.04 umol), Fe (148.84 mg, 2.67 mmol), and $NH_4Cl$ (142.57 mg, 2.67 mmol) in EtOH (20 mL) and $H_2O$ (4 mL) was degassed and purged with $N_2$ 3 times, and then the mixture was stirred at 90° C. for 3 hours under $N_2$ atmosphere. TLC indicated the reaction was completed. The reaction mixture was filtered and concentrated, then diluted with $H_2O$ (20 mL) and extracted with ethyl acetate (20 mL*2). The combined organic layers were washed with brine (20 mL*2), dried over with $Na_2SO_4$, filtered and concentrated under reduced pressure to give a residue. The residue was purified by column chromatography ($SiO_2$, Petroleum ether:Ethyl acetate=10:1 to 5:1) to give 24c. MS mass calculated for $[M+H]^+$ ($C_{18}H_{14}Cl_2N_2O$) requires m/z, 345.0, LCMS found m/z 345.0. $^1$H NMR (400 MHz, $CDCl_3$) 7.93 (d, J=9.2 Hz, 1H), 7.82 (d, J=8.6 Hz, 1H), 7.41 (dd, J=9.2, 2.8 Hz, 1H), 7.12 (d, J=8.6 Hz, 1H), 6.86 (d, J=2.8 Hz, 1H), 6.74 (s, 2H), 3.80 (s, 2H), 2.16-2.26 (m, 1H), 1.04-1.12 (m, 4H).

Synthesis of N-(3,5-dichloro-4-((2-cyclopropylquinolin-6-yl)oxy)phenyl)-5-oxo-4,5-dihydro-1,2,4-oxadiazole-3-carboxamide (Example 24). To a mixture of 3,5-dichloro-4-[(2-cyclopropyl-6-quinolyl)oxy]aniline (24c) (20 mg, 57.93 umol) and TEA (11.72 mg, 115.87 umol, 16.13 uL) in THF (2 mL) was added 5-oxo-4H-1,2,4-oxadiazole-3-carbonyl chloride (17.21 mg, 115.87 umol) and the mixture was degassed and purged with $N_2$ for 3 times, and then the mixture was stirred at 25° C. for 0.5 hours under $N_2$ atmosphere. LCMS showed the reaction was completed and the desired MS was detected. The reaction mixture was concentrated under reduced pressure to give a residue. The residue was purified by prep-HPLC (FA condition: column: Welch Xtimate C18 150*25 mm*5 um; mobile phase: [water (0.2% FA)-ACN]) to give Example 24. MS mass calculated for $[M+H]^+$ ($C_{21}H_{14}Cl_2N_4O_4$) requires m/z, 457.0, LCMS found m/z 457.0. $^1$H NMR (400 MHz, $CD_3OD$) 8.04 (d, J=8.6 Hz, 1H), 8.00 (s, 2H), 7.95 (d, J=9.0 Hz, 1H), 7.47-7.50 (m, 1H), 7.21 (d, J=8.6 Hz, 1H), 6.96 (d, J=2.8 Hz, 1H), 2.24-2.28 (m, 1H), 1.08-1.16 (m, 4H).

Example 25. N-(3,5-dichloro-4-((4-methylquinolin-6-yl)oxy)phenyl)-5-oxo-4,5-dihydro-1,2,4-oxadiazole-3-carboxamide

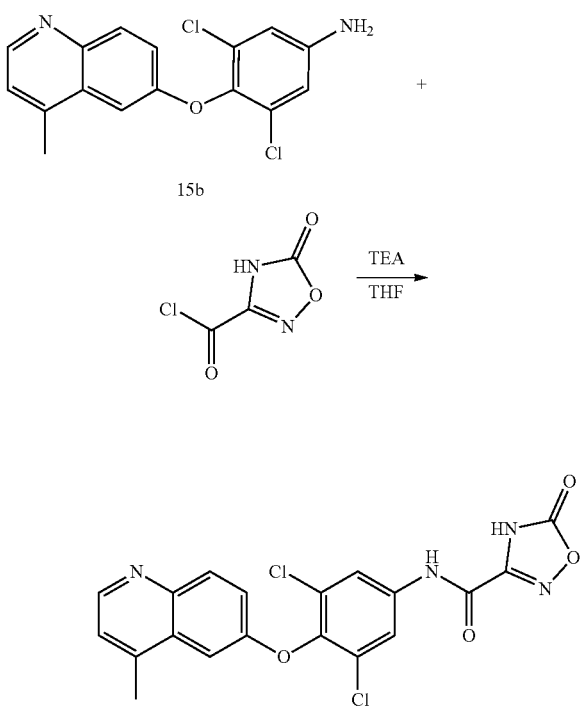

Example 25

Synthesis of N-(3,5-dichloro-4-((4-methylquinolin-6-yl)oxy)phenyl)-5-oxo-4,5-dihydro-1,2,4-oxadiazole-3-carboxamide (Example 25). To a mixture of 3,5-dichloro-4-((4-methylquinolin-6-yl)oxy)aniline (15b) (25 mg, 78.3 umol) in THF (2 mL) was added TEA (15.9 mg, 157 umol, 21.8 uL) and 5-oxo-4,5-dihydro-1,2,4-oxadiazole-3-carbonyl chloride (11.6 mg, 78.3 umol) under $N_2$. The mixture was stirred at 20° C. for 1 hour. LCMS showed 15b was consumed completely and the desired MS was detected. The residue was poured into $NaHCO_3$ (5 mL). The aqueous phase was extracted with ethyl acetate (10 mL*3). The combined organic phase was washed with brine (10 mL*2), dried with anhydrous $Na_2SO_4$, filtered and concentrated in vacuum. The crude product was washed by DCM (2 mL*1) and ethyl acetate (2 mL*3) to give Example 25. MS mass calculated for [M+1] ($C_{19}H_{12}Cl_2N_4O_4$) requires m/z 431.0, LCMS found m/z 430.9; $^1$H NMR (400 MHz, DMSO-$d_6$) δ 11.16-11.29 (m, 1H), 8.57-8.74 (m, 1H), 8.07-8.20 (m, 2H), 7.98-8.09 (m, 1H), 7.36-7.43 (m, 2H), 7.26-7.29 (m, 1H), 6.18-6.23 (m, 1H), 5.74-5.77 (m, 1H), 3.35 (br s, 1H), 2.55-2.72 (m, 2H), 2.55 (m, 1H), 2.54 (s, 3H).

Example 26. 2-(3,5-dichloro-4-((2-cyclopropylquinolin-6-yl)oxy)phenyl)-3,5-dioxo-2,3,4,5-tetrahydro-1,2,4-triazine-6-carbonitrile

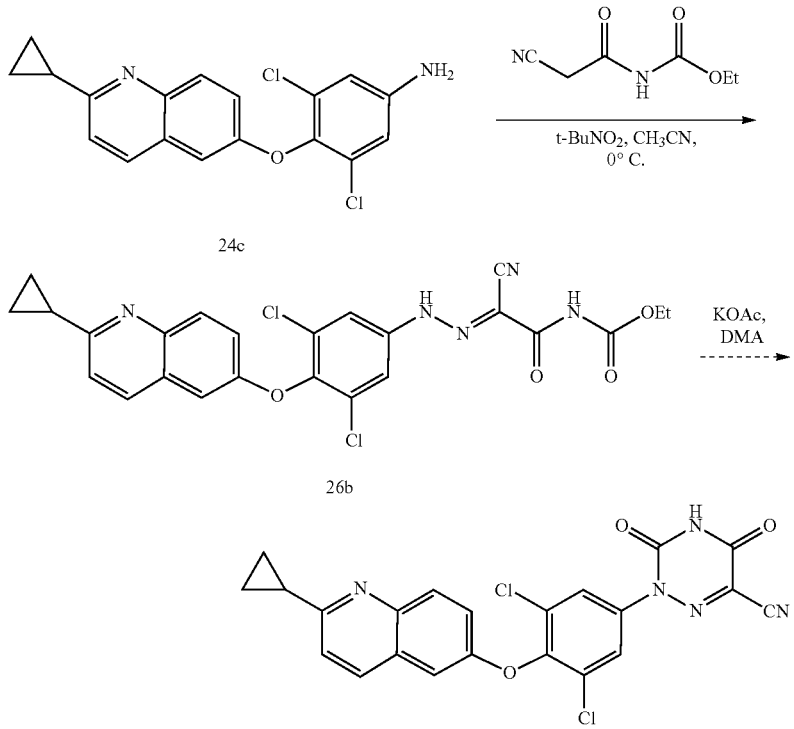

Example 26

Synthesis of (E)-ethyl (2-cyano-2-(2-(3,5-dichloro-4-((2-cyclopropylquinolin-6-yl)oxy)phenyl)hydrazono)acetyl)carbamate (26b). To a solution of 3,5-dichloro-4-[(2-cyclopropyl-6-quinolyl)oxy]aniline (24c) (40 mg, 115.87 umol) and ethyl N-(2-cyanoacetyl)carbamate (90.46 mg, 579.34 umol) in CH$_3$CN (3 mL) was added tert-butyl nitrite (23.90 mg, 231.73 umol, 27.56 uL) at 0° C. dropwise. The resulting mixture was stirred at 0° C. for 1 hour. LCMS showed the reaction was completed and the desired MS was detected. The reaction mixture was concentrated under reduced pressure to give 26b. MS mass calculated for [M+H]$^+$ (C$_{24}$H$_{19}$Cl$_2$N$_5$O$_4$) requires m/z, 512.1, LCMS found m/z 512.1.

Synthesis of 2-(3,5-dichloro-4-((2-cyclopropylquinolin-6-yl)oxy)phenyl)-3,5-dioxo-2,3,4,5-tetrahydro-1,2,4-triazine-6-carbonitrile (Example 26). A mixture of ethyl N-[(2E)-2-cyano-2-[[3,5-dichloro-4-[(2-cyclopropyl-6-quinolyl)oxy]phenyl]hydrazono]acetyl]carbamate (26b) (60 mg, 117.11 umol) and KOAc (22.99 mg, 234.22 umol) in DMA (4 mL) was degassed and purged with N$_2$ 3 times, and then the mixture was stirred at 115° C. for 3 hours under N$_2$ atmosphere. LCMS showed the reaction was completed and the desired MS was detected. The reaction mixture was filtered and concentrated under reduced pressure. The residue was purified by prep-HPLC (TFA condition: column: Welch Xtimate C18 150*25 mm*5 um; mobile phase: [water (0.2% FA)-ACN]) to give Example 26. MS mass calculated for [M+H]$^+$ (C$_{22}$H$_{13}$Cl$_2$N$_5$O$_3$) requires m/z, 466.0, LCMS found m/z 466.0; $^1$H NMR (400 MHz, CD$_3$OD) 8.03 (d, J=8.4 Hz, 1H), 7.96 (d, J=9.2 Hz, 1H), 7.83 (s, 2H), 7.50 (dd, J=9.2, 2.8 Hz, 1H), 7.21 (d, J=8.6 Hz, 1H), 7.00 (d, J=2.8 Hz, 1H), 2.22-2.30 (m, 1H), 1.04-1.17 (m, 4H).

Example 27. N-(3,5-dichloro-4-((3-cyclopropyl-2-oxo-2,3-dihydro-1H-benzo[d]imidazol-5-yl)oxy)phenyl)-5-oxo-4,5-dihydro-1,2,4-oxadiazole-3-carboxamide

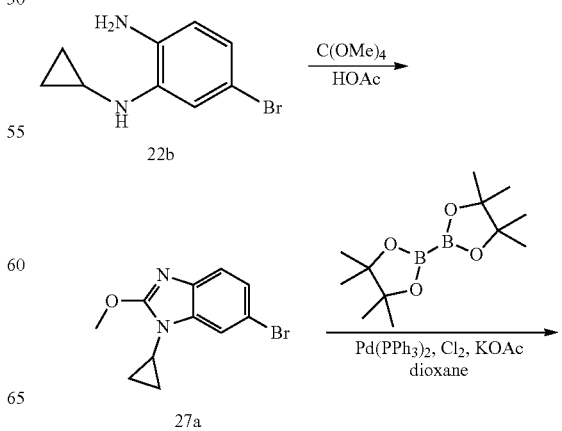

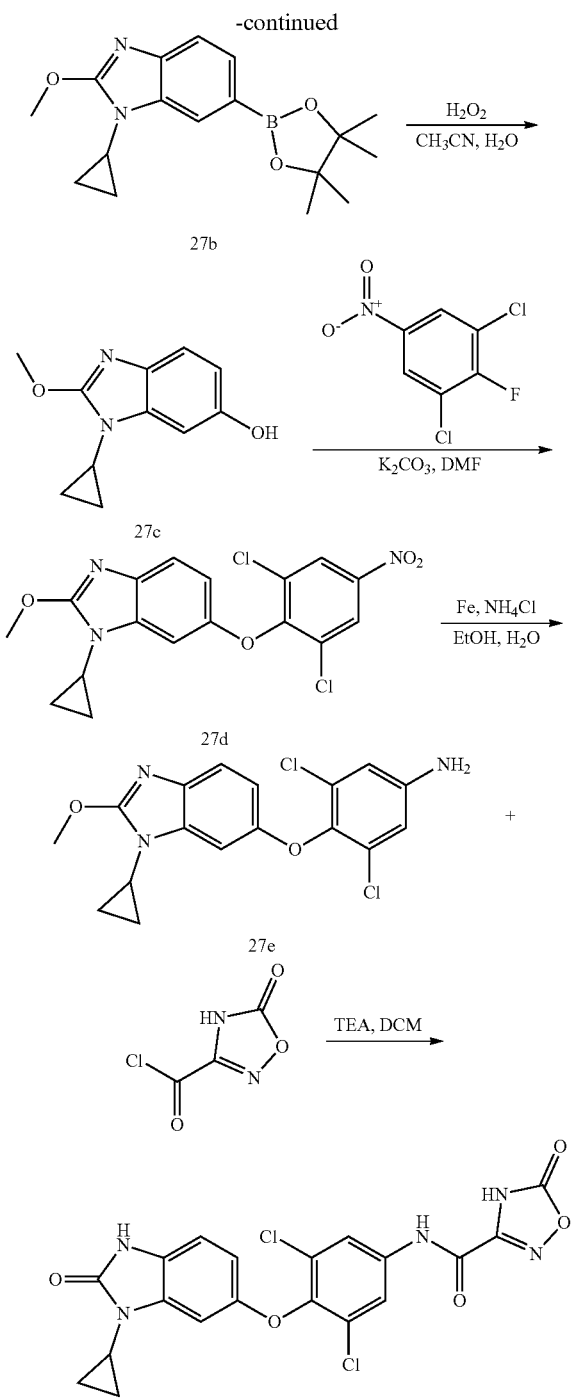

Example 27

Synthesis of 6-bromo-1-cyclopropyl-2-methoxy-1H-benzo[d]imidazole (27a). To a solution of 5-bromo-N1-cyclopropylbenzene-1, 2-diamine (22b) (1 g, 4.40 mmol) in AcOH (10 mL) was added tetramethoxymethane (1.20 g, 8.81 mmol). The mixture was stirred at 50° C. for 1 hour. LCMS showed 22b was consumed completely and the desired MS was detected. The reaction mixture was concentrated under reduced pressure to remove AcOH. The residue was diluted with $H_2O$ (15 mL) and extracted with Ethyl acetate (25 mL*2). The combined organic layers were washed with brine (15 mL*3), dried with anhydrous $Na_2SO_4$, filtered and concentrated under reduced pressure. The residue was purified by column chromatography ($SiO_2$, Petroleum ether:Ethyl acetate) to give 27a. MS mass calculated for $[M+1]^+$ ($C_{11}H_{11}BrN_2O$) requires m/z 267.0, LCMS found m/z 267.1; $^1H$ NMR (400 MHz, $CD_3OD$) δ 7.55 (d, J=1.4 Hz, 1H), 7.22-7.34 (m, 2H), 4.16 (s, 3H), 3.08 (tt, J=7.0, 3.6 Hz, 1H), 1.09-1.20 (m, 2H), 0.94-1.02 (m, 2H).

Synthesis of 1-cyclopropyl-2-methoxy-6-(4,4,5,5-tetramethyl-1,3,2-dioxaborolan-2-yl)-1H-benzo[d]imidazole (27b). To a solution of 6-bromo-1-cyclopropyl-2-methoxy-1H-benzo[d]imidazole (27a) (100 mg, 374.36 umol) and 4,4,5,5-tetramethyl-2-(4,4,5,5-tetramethyl-1,3,2-dioxaborolan-2-yl)-1,3,2-dioxaborolane (114.08 mg, 449.23 umol) in dioxane (3 mL) was added KOAc (183.70 mg, 1.87 mmol) and $Pd(PPh_3)_2Cl_2$ (26.28 mg, 37.44 umol) at 20° C. under $N_2$. The mixture was stirred at 90° C. for 4 hours. LCMS showed 27a was consumed completely and the desired MS was detected. The suspension was filtered through a pad of Celite and the pad cake was washed with Ethyl acetate (5 mL*3). The combined filtrates were concentrated in vacuum. The residue was diluted with $H_2O$ (10 mL) and extracted with Ethyl acetate (20 mL*2). The combined organic layers were washed with brine (15 mL*3), dried with anhydrous $Na_2SO_4$, filtered and concentrated under reduced pressure to give 27b. MS mass calculated for $[M+1]^+$ ($C_{17}H_{23}BN_2O_3$) requires m/z 315.2, LCMS found m/z 315.1; $^1H$ NMR (400 MHz, $CD_3OD$) δ 7.81 (s, 1H), 7.57 (br d, J=8.0 Hz, 2H), 7.36-7.44 (m, 1H), 4.17 (s, 3H), 3.11 (td, J=7.0, 3.55 Hz, 1H), 1.32-1.41 (m, 13H).

Synthesis of 1-cyclopropyl-2-methoxy-1H-benzo[d]imidazol-6-ol (27c). To a mixture of 1-cyclopropyl-2-methoxy-6-(4,4,5,5-tetramethyl-1,3,2-dioxaborolan-2-yl)-1H-benzo[d]imidazole (27b) (110 mg, 350.11 umol) in $H_2O$ (1.5 mL) and $CH_3CN$ (3 mL) was added ammonium carbonate (27.68 mg, 350.11 umol, 28.83 uL) and $H_2O_2$ (79.38 mg, 700.22 umol, 67.27 uL, 30% purity) under $N_2$. The mixture was stirred at 20° C. for 1 hour. LCMS indicated 27b was consumed completely and the desired MS was detected. The residue was poured into $NaHSO_3$ (30 mL) and stirred for 10 minutes. The aqueous phase was extracted with ethyl acetate (10 mL*3). The combined organic phase was washed with brine (10 mL*2), dried with anhydrous $Na_2SO_4$, filtered and concentrated in vacuum to give 27c. MS mass calculated for $[M+1]^+$ ($C_{11}H_{12}N_2O_2$) requires m/z 205.1, LCMS found m/z 205.1.

Synthesis of 1-cyclopropyl-6-(2,6-dichloro-4-nitrophenoxy)-2-methoxy-1H-benzo[d]imidazole (27d). To a solution of 1-cyclopropyl-2-methoxy-1H-benzo[d]imidazol-6-ol (27c) (70 mg, 342.76 umol) and 1,3-dichloro-2-fluoro-5-nitro-benzene (79.17 mg, 377.04 umol) in DMF (3 mL) was added $K_2CO_3$ (71.06 mg, 514.14 umol). The mixture was degassed and purged with $N_2$ 3 times and stirred at 20° C. for 1 hour. LCMS and TLC showed 27c was consumed completely and the desired MS was detected. The mixture was extracted with Ethyl acetate (20 mL*2) and $H_2O$ (5 mL). The combined organic phase was washed with brine (10 mL*3), dried with anhydrous $Na_2SO_4$, filtered and concentrated in vacuum. The residue was purified by Prep-TLC (Petroleum ether:Ethyl acetate) to give 27d. MS mass calculated for $[M+1]^+$ ($C_{17}H_{13}Cl_2N_3O_4$) requires m/z 394.0, LCMS found m/z 394.1; $^1H$ NMR (400 MHz, $CD_3OD$) δ 8.45 (s, 2H), 7.32 (d, J=8.6 Hz, 1H), 6.96 (d, J=2.4 Hz, 1H), 6.65 (dd, J=8.6, 2.4 Hz, 1H), 4.15 (s, 3H), 3.01-3.10 (m, 1H), 1.04-1.14 (m, 2H), 0.90-0.97 (m, 2H).

Synthesis of 3,5-dichloro-4-((1-cyclopropyl-2-methoxy-1H-benzo[d]imidazol-6-yl)oxy)aniline (27e). To a solution of 1-cyclopropyl-6-(2,6-dichloro-4-nitrophenoxy)-2- methoxy-1H-benzo[d]imidazole (27d) (120 mg, 304.41 umol) in EtOH (3 mL) and H$_2$O (1 mL) was added Fe (85.01 mg, 1.52 mmol) and NH$_4$Cl (81.41 mg, 1.52 mmol). The mixture was stirred at 80° C. for 2 hours. LCMS showed 27d was consumed completely and the desired MS was detected. The suspension was filtered through a pad of Celite and the pad cake was washed with EtOH (5 mL*3). The combined filtrates were extracted with Ethyl acetate (15 mL*2) and H$_2$O (5 mL). The combined organic phase was washed with brine (10 mL*3), dried with anhydrous Na$_2$SO$_4$, filtered and concentrated in vacuum. The residue was purified by Prep-TLC (Petroleum ether:Ethyl acetate) to give 27e. MS mass calculated for [M+1]$^+$ (C$_{17}$H$_{15}$Cl$_2$N$_3$O$_2$) requires m/z 364.1, LCMS found m/z 364.1; $^1$H NMR (400 MHz, CD$_3$OD) δ 7.98 (s, 1H), 7.53-7.70 (m, 1H), 7.28 (d, J=8.6 Hz, 1H), 6.73-6.81 (m, 3H), 6.64 (br d, J=8.6 Hz, 1H), 4.12 (s, 3H), 2.97-3.05 (m, 3H), 2.86 (s, 2H), 1.07 (br d, J=5.8 Hz, 2H), 0.91 (br s, 2H).

Synthesis of N-(3,5-dichloro-4-((3-cyclopropyl-2-oxo-2,3-dihydro-1H-benzo[d]imidazol-5-yl)oxy)phenyl)-5-oxo-4,5-dihydro-1,2,4-oxadiazole-3-carboxamide (Example 27). To a solution of 3,5-dichloro-4-((1-cyclopropyl-2-methoxy-1H-benzo[d]imidazol-6-yl)oxy)aniline (27e) (50 mg, 137.28 umol) in DCM (2 mL) was added TEA (41.67 mg, 411.83 umol, 57.32 uL) and 5-oxo-4H-1,2,4-oxadiazole-3-carbonyl chloride (30.58 mg, 205.92 umol). The mixture was stirred at 25° C. for 0.5 hours. LCMS showed 27e was consumed completely and the desired MS was detected. The mixture was quenched with H$_2$O (1 mL) and MeOH (5 mL). The mixture was concentrated in vacuum. The residue was purified by Prep-HPLC ((NH$_4$HCO$_3$) column: Waters Xbridge BEH C18 100*30 mm*10 um; mobile phase: [water (10 mM NH$_4$HCO$_3$)-MeCN]) to give Example 27. MS mass calculated for [M+1]$^+$ (C$_{17}$H$_{15}$Cl$_2$N$_3$O$_2$) requires m/z 462.0, LCMS found m/z 461.9; $^1$H NMR (400 MHz, DMSO-d$_6$) δ 10.82 (br s, 1H), 10.65 (s, 1H), 8.10 (s, 2H), 6.91-7.26 (m, 3H), 6.83 (d, J=8.4 Hz, 1H), 6.76 (d, J=2.0 Hz, 1H), 6.30 (dd, J=8.4, 2.4 Hz, 1H), 2.81 (br s, 1H), 0.97 (br d, J=5.4 Hz, 2H), 0.81 (br s, 2H).

Example 28. 2-(3,5-dichloro-4-((1-cyclopropyl-2-methoxy-1H-benzo[d]imidazol-6-yl)oxy)phenyl)-3,5-dioxo-2,3,4,5-tetrahydro-1,2,4-triazine-6-carbonitrile

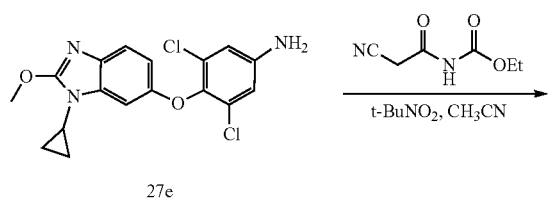

27e

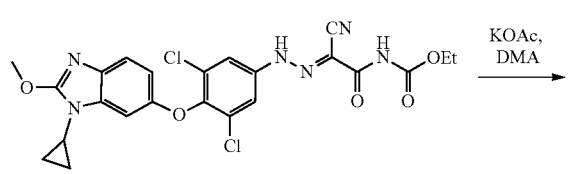

28a

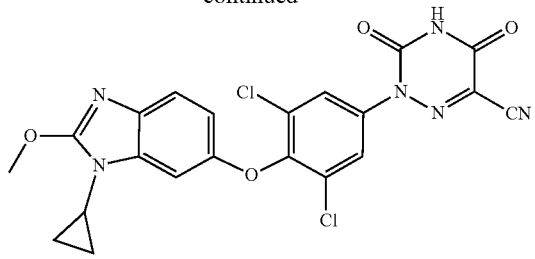

Example 28

Synthesis of (E)-ethyl (2-cyano-2-(2-(3,5-dichloro-4-((1-cyclopropyl-2-methoxy-1H-benzo[d]imidazol-6-yl)oxy)phenyl)hydrazono)acetyl)carbamate (28a). To a mixture of 3,5-dichloro-4-((1-cyclopropyl-2-methoxy-1H-benzo[d]imidazol-6-yl)oxy)aniline (27e) (180 mg, 494.20 umol) and ethyl (2-cyanoacetyl)carbamate (84.88 mg, 543.62 umol) in CH$_3$CN (6 mL) was added t-BuONO (101.92 mg, 988.40 umol, 117.56 uL) at 0° C. Then the mixture was stirred at 0° C. for 1 hour. LCMS showed 27e was consumed completely and the desired MS was detected. The mixture was concentrated in vacuum to give 28a. MS mass calculated for [M+1]$^+$ (C$_{23}$H$_{20}$Cl$_2$N$_6$O$_5$) requires m/z 531.1, LCMS found m/z 531.1.

Synthesis of 2-(3,5-dichloro-4-((1-cyclopropyl-2-methoxy-1H-benzo[d]imidazol-6-yl)oxy)phenyl)-3,5-dioxo-2,3,4,5-tetrahydro-1,2,4-triazine-6-carbonitrile (Example 28). To a solution of (E)-ethyl (2-cyano-2-(2-(3,5-dichloro-4-((1-cyclopropyl-2-methoxy-1H-benzo[d]imidazol-6-yl)oxy)phenyl)hydrazono)acetyl)carbamate (28a) (260 mg, 489.32 umol) in DMA (3 mL) was added KOAc (96.04 mg, 978.64 umol). The mixture was stirred at 115° C. for 3 hours. LCMS showed 28a were consumed completely and the desired MS was detected. The suspension was filtered through a pad of Celite and the pad cake was washed with MeOH (5 mL*3). The combined filtrates were concentrated in vacuum. The residue was purified by Prep-HPLC ((FA) column: Welch Ultimate C18 150*25 mm*5 um; mobile phase: [water (0.2% FA)-ACN]) to give Example 28. MS mass calculated for [M+1]$^+$ (C$_{21}$H$_{14}$Cl$_2$N$_6$O$_4$) requires m/z 485.0, LCMS found m/z 484.9; $^1$H NMR (400 MHz, DMSO-d$_6$) δ 7.82 (s, 2H), 7.31 (d, J=8.6 Hz, 1H), 6.90 (d, J=2.6 Hz, 1H), 6.55 (dd, J=8.6, 2.6 Hz, 1H), 4.07 (s, 3H), 3.10 (tt, J=7.0, 3.6 Hz, 1H), 1.01-1.07 (m, 2H), 0.85-0.90 (m, 2H).

Example 29. N-(3,5-dichloro-4-((2-methoxy-1-methyl-1H-benzo[d]imidazol-6-yl)oxy)phenyl)-5-oxo-4,5-dihydro-1,2,4-oxadiazole-3-carboxamide

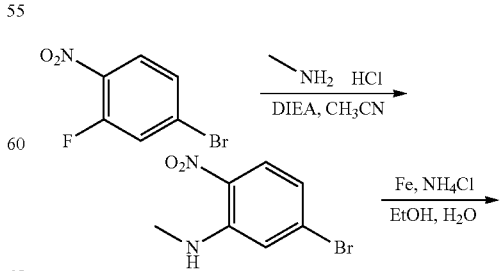

29a

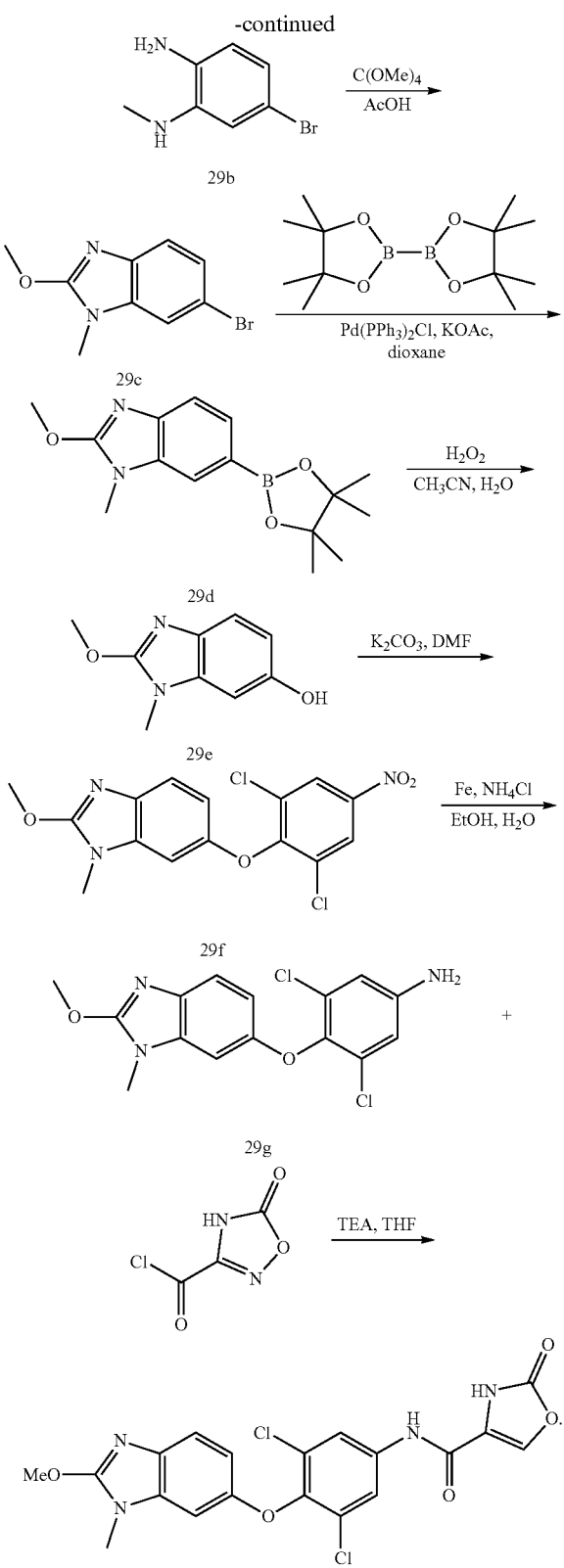

Example 29

Synthesis of 5-bromo-N-methyl-2-nitroaniline (29a). To a solution of 4-bromo-2-fluoro-1-nitrobenzene (1 g, 4.55 mmol) in CH₃CN (25 mL) was added DIEA (2.94 g, 22.7 mmol, 3.96 mL) and methanamine (1.23 g, 18.3 mmol, HCl). The mixture was stirred at 50° C. for 1 hour. TLC indicated the starting material was consumed completely and one new spot was formed. The reaction mixture was partitioned between Ethyl acetate (25 mL) and H₂O (25 mL). The organic phase was separated, washed with sat. NaCl (25 mL), dried over Na₂SO₄, filtered and concentrated under reduced pressure to give 29a. ¹H NMR (400 MHz, CD₃Cl) δ 11.25-11.44 (m, 1H), 8.04 (br d, J=9.0 Hz, 1H), 8.01-8.08 (m, 1H), 7.02 (s, 1H), 6.78 (br d, J=8.6 Hz, 1H), 3.63-3.71 (m, 1H), 3.07-3.13 (m, 1H), 3.01-3.05 (m, 3H), 1.46 (d, J=6.6 Hz, 1H).

Synthesis of 5-bromo-N1-methylbenzene-1,2-diamine (29b). To a solution of 5-bromo-N-methyl-2-nitroaniline (29a) (1.05 g, 4.54 mmol) in EtOH (30 mL) and H₂O (10 mL) was added NH₄Cl (1.22 g, 22.7 mmol) and Fe (1.27 g, 22.7 mmol). The mixture was stirred at 80° C. for 2 hours. TLC indicated 29a was consumed completely and one new spot was formed. The reaction mixture was filtered and then the filtrate was extracted with Ethyl acetate (10 mL*3). The combined organic layers were washed with sat. NaCl (5 mL), dried over Na₂SO₄, filtered and concentrated under reduced pressure to give 29b. ¹H NMR (400 MHz, CDCl₃) δ 6.66-6.72 (m, 1H), 6.63-6.66 (m, 1H), 6.46-6.51 (m, 1H), 2.99-3.35 (m, 2H), 2.71-2.82 (m, 3H).

Synthesis of 6-bromo-2-methoxy-1-methyl-1H-benzo[d] imidazole (29c). To a solution of 5-bromo-N1-methylbenzene-1,2-diamine (29b) (400 mg, 1.99 mmol) in AcOH (6 mL) was added tetramethoxymethane (2.17 g, 15.9 mmol). The mixture was stirred at 50° C. for 1 hour. LCMS showed 29b was consumed completely and one main peak with the desired MS was detected. The reaction mixture was quenched by addition NaHCO₃ (30 mL) at 0° C., and then extracted with Ethyl acetate (30 mL*3). The combined organic layers were washed with sat. NaCl (30 mL), dried over Na₂SO₄, filtered and concentrated under reduced pressure. The residue was purified by column chromatography (SiO₂, Petroleum ether:Ethyl acetate) to give 29c. ¹H NMR (400 MHz, CDCl₃) δ 7.29-7.37 (m, 1H), 7.15-7.24 (m, 2H), 4.10-4.15 (m, 3H), 3.43-3.49 (m, 3H).

Synthesis of 2-methoxy-1-methyl-6-(4,4,5,5-tetramethyl-1,3,2-dioxaborolan-2-yl)-1H-benzo[d]imidazole (29d). To a solution of 6-bromo-2-methoxy-1-methyl-1H-benzo[d]imidazole (29c) (330 mg, 1.37 mmol) and 4,4,4',4',5,5,5',5'-octamethyl-2,2'-bi(1,3,2-dioxaborolane) (1.04 g, 4.11 mmol) in dioxane (10 mL) was added Pd(PPh₃)₂Cl₂ (96.1 mg, 136.9 umol) and KOAc (1.34 g, 13.7 mmol). The mixture was stirred at 120° C. for 16 hours. LCMS showed 29c was consumed completely and one main peak with desired MS was detected. The reaction mixture was filtered and the filtrate was extracted with Ethyl acetate (30 mL*3). The combined organic layers were washed with sat. NaCl (30 mL), dried over Na₂SO₄, filtered and concentrated under reduced pressure to give 29d. MS mass calculated for [M+1]⁺ ($C_{15}H_{21}BN_2O_3$) requires m/z 289.2, LCMS found m/z 289.2; ¹H NMR (400 MHz, CDCl₃) δ 7.54-7.61 (m, 2H), 7.45-7.49 (m, 1H), 4.12-4.16 (m, 3H), 3.48-3.52 (m, 3H), 1.17-1.23 (m, 12H).

Synthesis of 2-methoxy-1-methyl-1H-benzo[d]imidazol-6-ol (29e). To a solution of 2-methoxy-1-methyl-6-(4,4,5,5-tetramethyl-1,3,2-dioxaborolan-2-yl)-1H-benzo[d]imidazole (29d) (240 mg, 1.17 mmol) in CH₃CN (5 mL) was added a solution of NH₄HCO₃ (92.11 mg, 1.17 mmol, 95.9 uL) in H₂O (2 mL) and H₂O₂ (264 mg, 2.33 mmol, 224 uL, 30% purity). The mixture was stirred at 20° C. for 2 hours. LCMS showed 29d was consumed completely and one main peak with desired MS was detected. The reaction mixture was quenched by addition Na₂S₂O₃ (10 mL), and then extracted with Ethyl acetate (10 mL*3). The combined organic layers were washed with sat. NaCl (10 mL), dried over Na$_2$SO$_4$, filtered and concentrated under reduced pressure to give 29e. MS mass calculated for [M+1]$^+$ (C$_9$H$_{10}$N$_2$O$_2$) requires m/z 179.1, LCMS found m/z 179.1; $^1$H NMR (400 MHz, CDCl$_3$) δ7.24-7.33 (m, 1H), 6.55-6.66 (m, 2H), 4.08-4.11 (m, 3H), 3.38-3.49 (m, 3H), 1.94-2.05 (m, 3H), 1.76-1.91 (m, 3H).

Synthesis of 6-(2,6-dichloro-4-nitrophenoxy)-2-methoxy-1-methyl-1H-benzo[d]imidazole (29f). To a solution of 2-methoxy-1-methyl-1H-benzo[d]imidazol-6-ol (29e) (240 mg, 1.35 mmol) in DMF (5 mL) was added K$_2$CO$_3$ (279 mg, 2.02 mmol) and 1,3-dichloro-2-fluoro-5-nitrobenzene (311 mg, 1.48 mmol). The mixture was stirred at 20° C. for 1 hour. LCMS showed 29e was consumed completely and one main peak with the desired MS was detected. The reaction mixture was quenched by addition of H$_2$O (5 mL) and extracted with Ethyl acetate (10 mL*3). The combined organic layers were washed with sat. NaCl (5 mL), dried over Na$_2$SO$_4$, filtered and concentrated under reduced pressure. The residue was purified by prep-TLC (SiO$_2$, Petroleum ether:Ethyl acetate) to give 29f. MS mass calculated for [M+1]$^+$ (C$_{15}$H$_{11}$Cl$_2$N$_3$O$_4$) requires m/z 368.0, LCMS found m/z 368.0; $^1$H NMR (400 MHz, CDCl$_3$) δ 8.20-8.44 (m, 2H), 7.40-7.53 (m, 1H), 6.55-6.74 (m, 2H), 4.13-4.29 (m, 3H), 3.45-3.63 (m, 3H).

Synthesis of 3,5-dichloro-4-((2-methoxy-1-methyl-1H-benzo[d]imidazol-6-yl)oxy)aniline (29g). To a solution of 6-(2,6-dichloro-4-nitrophenoxy)-2-methoxy-1-methyl-1H-benzo[d]imidazole (29f) (160 mg, 435 umol) in EtOH (3 mL) was added Fe (121 mg, 2.17 mmol) and NH$_4$Cl (116 mg, 2.17 mmol) in H$_2$O (1 mL). The mixture was stirred at 80° C. for 2 hours. LCMS showed 29f was consumed completely and one main peak with the desired MS was detected. The reaction mixture was filtered and then the filtrate was extracted with Ethyl acetate (10 mL*3). The combined organic layers were washed with sat. NaCl (5 mL), dried over Na$_2$SO$_4$, filtered and concentrated under reduced pressure to give 29g. $^1$H NMR (400 MHz, CDCl$_3$) δ 7.31-7.36 (m, 1H), 6.63-6.65 (m, 2H), 6.55-6.62 (m, 2H), 4.07-4.12 (m, 3H), 3.60-3.75 (m, 2H), 3.35-3.46 (m, 3H).

Synthesis of N-(3,5-dichloro-4-((2-methoxy-1-methyl-1H-benzo[d]imidazol-6-yl)oxy)phenyl)-5-oxo-4,5-dihydro-1,2,4-oxadiazole-3-carboxamide (Example 29). To a solution of 3,5-dichloro-4-((2-methoxy-1-methyl-1H-benzo[d]imidazol-6-yl)oxy)aniline (29g) (10 mg, 29.6 umol) in THF (1 mL) was added Et$_3$N (15.0 mg, 148 umol, 20.6 uL) and 5-oxo-4,5-dihydro-1,2,4-oxadiazole-3-carbonyl chloride (8.78 mg, 59.2 umol). The mixture was stirred at 20° C. for 20 minutes. LCMS showed 29g was consumed completely and one main peak with the desired MS was detected. The reaction mixture was concentrated under reduced pressure. The residue was purified by prep-HPLC (HCl condition: column: column: Welch Xtimate C18 150*25 mm*5 um; mobile phase: [water (0.04% HCl)-ACN]) to give Example 29. MS mass calculated for [M+1]$^+$ (C$_{18}$H$_{13}$Cl$_2$N$_5$O$_5$) requires m/z 450.0, LCMS found m/z 449.9; $^1$H NMR (400 MHz, CD$_3$OD) δ 7.74-7.85 (m, 2H), 7.20-7.24 (m, 1H), 6.59-6.60 (m, 1H), 6.55-6.58 (m, 1H), 4.03-4.06 (m, 3H), 3.33-3.37 (m, 3H).

Example 30. N-(3,5-dichloro-4-((3-isopropyl-2-oxo-2,3-dihydro-1H-benzo[d]imidazol-5-yl)oxy)phenyl)-5-oxo-4,5-dihydro-1,2,4-oxadiazole-3-carboxamide

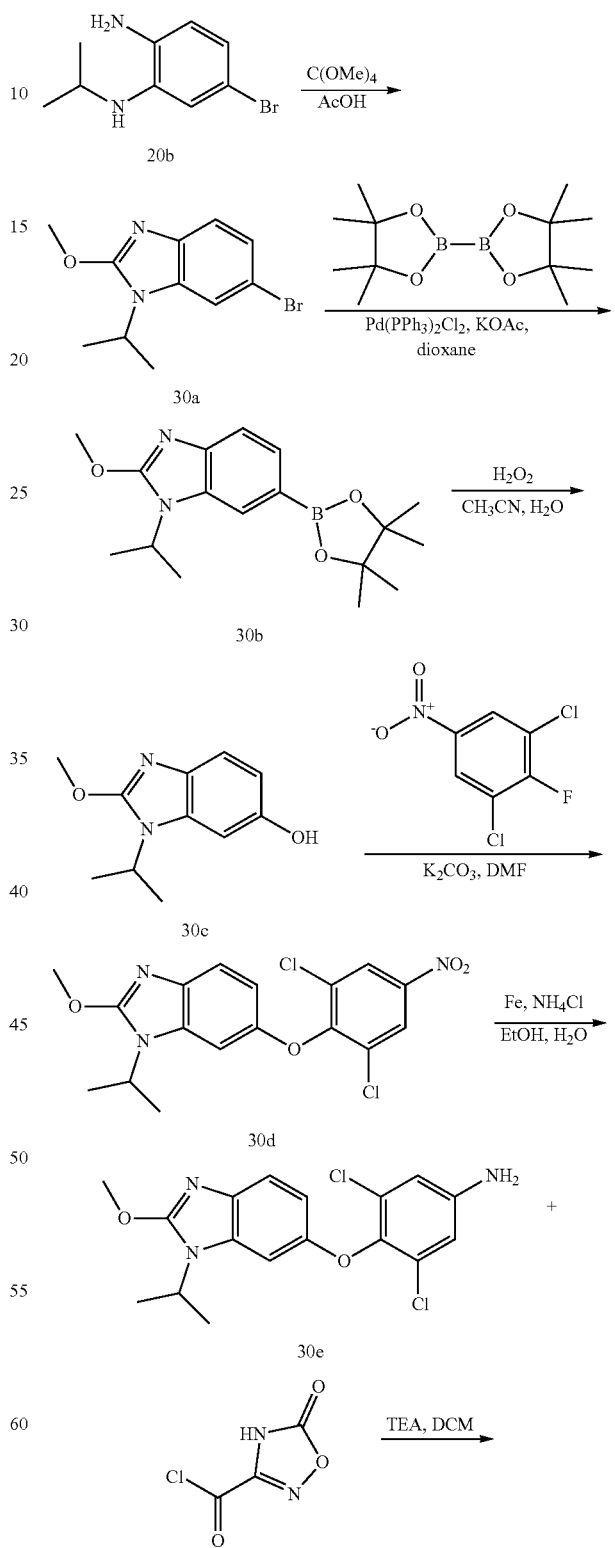

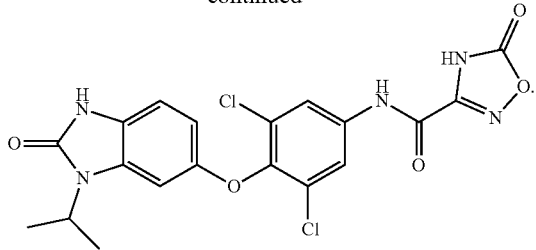

Example 30

Synthesis of 6-bromo-1-isopropyl-2-methoxy-1H-benzo[d]imidazole (30a). To a solution of 5-bromo-N1-isopropylbenzene-1,2-diamine (20b) (400 mg, 1.75 mmol) in AcOH (5 mL) was added tetramethoxymethane (1.90 g, 13.97 mmol). The mixture was stirred at 50° C. for 1 hour. LC-MS showed 20b was consumed completely and one main peak with the desired mass was detected. The reaction mixture was quenched by addition NaHCO$_3$ 30 mL at 0° C., and then extracted with Ethyl acetate (30 mL*3). The combined organic layers were washed with sat. NaCl (30 mL), dried over Na$_2$SO$_4$, filtered and concentrated under reduced pressure. The residue was purified by column chromatography (SiO$_2$, Petroleum ether:Ethyl acetate) to give 30a. MS mass calculated for [M+1]$^+$ (C$_{11}$H$_{13}$BrN$_2$O) requires m/z 269.0, LCMS found m/z 269.0; $^1$H NMR (400 MHz, CDCl$_3$) δ 7.31-7.53 (m, 2H), 7.26 (s, 1H), 4.52-4.71 (m, 1H), 4.20 (s, 3H), 1.50-1.60 (m, 6H).

Synthesis of 1-isopropyl-2-methoxy-6-(4,4,5,5-tetramethyl-1,3,2-dioxaborolan-2-yl)-1H-benzo[d]imidazole (30b). To a solution of 6-bromo-1-isopropyl-2-methoxy-1H-benzo[d]imidazole (30a) (320 mg, 1.19 mmol) and 4,4,4',4',5,5,5',5'-octamethyl-2,2'-bi(1,3,2-dioxaborolane) (905.78 mg, 3.57 mmol) in dioxane (15 mL) was added Pd(PPh$_3$)$_2$Cl$_2$ (83.45 mg, 118.90 umol) and KOAc (1.17 g, 11.89 mmol). The mixture was stirred at 120° C. for 16 hours. LC-MS showed 30a was consumed completely and one main peak with the desired mass was detected. The reaction mixture was filtered and then 30 mL of H$_2$O was added to the filtrate. The aqeuous layer was extracted with Ethyl acetate (30 mL*3). The combined organic layers were washed with sat. NaCl (30 mL), dried over Na$_2$SO$_4$, filtered and concentrated under reduced pressure to give 30b. MS mass calculated for [M+1]$^+$ (C$_{17}$H$_{25}$BN$_2$O$_3$) requires m/z 317.2, LCMS found m/z 317.1.

Synthesis of 1-isopropyl-2-methoxy-1H-benzo[d]imidazol-6-ol (30c). To a solution of 1-isopropyl-2-methoxy-6-(4,4,5,5-tetramethyl-1,3,2-dioxaborolan-2-yl)-1H-benzo[d]imidazole (30b) (375 mg, 1.19 mmol) in H$_2$O (2 mL) was added NH$_4$HCO$_3$ (93.76 mg, 1.19 mmol, 97.67 uL) in CH$_3$CN (5 mL) and H$_2$O$_2$ (268.89 mg, 2.37 mmol, 227.88 uL, 30% purity). The mixture was stirred at 20° C. for 2 hours. LCMS showed 30b was consumed completely and one main peak with the desired mass was detected. The reaction mixture was quenched by addition Na$_2$S$_2$O$_3$ (10 mL), and then extracted with Ethyl acetate (10 mL*3). The combined organic layers were washed with sat. NaCl (10 mL), dried over Na$_2$SO$_4$, filtered and concentrated under reduced pressure to give 30c. MS mass calculated for [M+1]$^+$ (C$_{11}$H$_{14}$N$_2$O$_2$) requires m/z 207.1, LCMS found m/z 207.1.

Synthesis of 6-(2,6-dichloro-4-nitrophenoxy)-1-isopropyl-2-methoxy-1H-benzo[d]imidazole (30d). To a solution of 1-isopropyl-2-methoxy-1H-benzo[d]imidazol-6-ol (30c) (244 mg, 1.18 mmol) in DMF (1 mL) was added K$_2$CO$_3$ (245.26 mg, 1.77 mmol) and 1,3-dichloro-2-fluoro-5-nitrobenzene (273.28 mg, 1.30 mmol). The mixture was stirred at 20° C. for 1 hour. LCMS showed 30c was consumed completely and one main peak with the desired mass was detected. The reaction mixture was quenched by addition of H$_2$O (5 mL), and then extracted with Ethyl acetate (10 mL*3). The combined organic layers were washed with sat. NaCl (5 mL), dried over Na$_2$SO$_4$, filtered and concentrated under reduced pressure. The residue was purified by prep-TLC (SiO$_2$, Petroleum ether:Ethyl acetate to give 30d. MS mass calculated for [M+1]$^+$ (C$_{17}$H$_{15}$Cl$_2$N$_3$O$_4$) requires m/z 396.0, LCMS found m/z 396.1; $^1$H NMR (400 MHz, CDCl$_3$) δ 8.28-8.38 (m, 2H), 7.39-7.44 (m, 1H), 6.86-6.89 (m, 1H), 6.52-6.56 (m, 1H), 4.51-4.60 (m, 1H), 4.16-4.19 (m, 3H), 1.50-1.55 (m, 6H).

Synthesis of 3,5-dichloro-4-((1-isopropyl-2-methoxy-1H-benzo[d]imidazol-6-yl)oxy)aniline (30e). To a solution of 6-(2,6-dichloro-4-nitrophenoxy)-1-isopropyl-2-methoxy-1H-benzo[d]imidazole (30d) (150 mg, 378.57 umol) in EtOH (3 mL) was added Fe (105.71 mg, 1.89 mmol) and NH$_4$Cl (101.25 mg, 1.89 mmol) in H$_2$O (1 mL). The mixture was stirred at 80° C. for 2 hours. TLC indicated 30d was consumed completely. The reaction mixture was filtered and the filtrate was extracted with Ethyl acetate (10 mL*3). The combined organic layers were washed with sat. NaCl (5 mL), dried over Na$_2$SO$_4$, filtered and concentrated under reduced pressure to give 30e. $^1$H NMR (400 MHz, CDCl$_3$) δ 7.38-7.41 (m, 1H), 6.83-6.86 (m, 1H), 6.70-6.73 (m, 1H), 6.57-6.62 (m, 1H), 4.51-4.58 (m, 1H), 4.14-4.18 (m, 2H), 3.74-3.77 (m, 1H), 1.49-1.54 (m, 6H), 1.24-1.29 (m, 2H).

Synthesis of N-(3,5-dichloro-4-((3-isopropyl-2-oxo-2,3-dihydro-1H-benzo[d]imidazol-5-yl)oxy)phenyl)-5-oxo-4,5-dihydro-1,2,4-oxadiazole-3-carboxamide (Example 30). To a solution of 3,5-dichloro-4-((1-isopropyl-2-methoxy-1H-benzo[d]imidazol-6-yl)oxy)aniline (30e) (30 mg, 81.91 umol) in DCM (0.5 mL) was added TEA (24.87 mg, 245.73 umol, 34.20 uL) and 5-oxo-4H-1,2,4-oxadiazole-3-carbonyl chloride (18.25 mg, 122.87 umol). The mixture was stirred at 25° C. for 0.5 hours. LCMS showed 30e was consumed completely and trace desired MS was detected. The mixture was stirred for another 2 hours. LCMS showed the reaction was completed. The reaction mixture was quenched with MeOH (5 mL) and concentrated in vacuum. The residue was purified by Prep-HPLC ((FA) column: Welch Xtimate C18 150*25 mm*5 um; mobile phase: [water (0.2% FA)-ACN]) to give crude product. The crude product was purified by Prep-TLC (SiO$_2$, Petroleum ether:Ethyl acetate) to give Example 30. MS mass calculated for [M+1]$^+$ (C$_{19}$H$_{15}$Cl$_2$N$_5$O$_5$) requires m/z 464.0, LCMS found m/z 464.0; $^1$H NMR (400 MHz, CD$_3$OD) δ 7.96 (s, 2H), 6.95 (d, J=8.6 Hz, 1H), 6.81 (d, J 2.2 Hz, 1H), 6.44 (dd, J=8.6, 2.4 Hz, 1H), 4.61 (dq, J=14.0, 6.8 Hz, 1H), 1.48 (d, J=7.0 Hz, 6H).

Example 31. 2-(3,5-dichloro-4-((3-isopropyl-2-oxo-2,3-dihydro-1H-benzo[d]imidazol-5-yl)oxy)phenyl)-3,5-dioxo-2,3,4,5-tetrahydro-1,2,4-triazine-6-carbonitrile

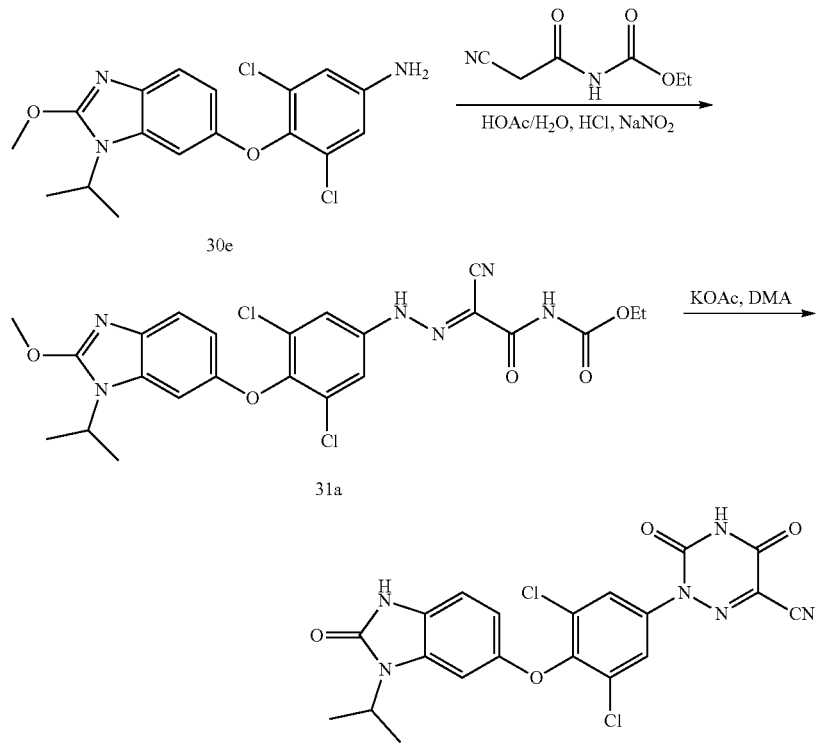

Example 31

Synthesis of (E)-ethyl (2-cyano-2-(2-(3,5-dichloro-4-((1-isopropyl-2-methoxy-1H-benzo[d]imidazol-6-yl)oxy)phenyl)hydrazono)acetyl)carbamate (31a). To a solution of 3,5-dichloro-4-((1-isopropyl-2-methoxy-1H-benzo[d]imidazol-6-yl)oxy)aniline (30e) (35 mg, 95.57 umol) in HOAc (2 mL) and H$_2$O (1 mL) was added ethyl (2-cyanoacetyl)carbamate (16.86 mg, 107.99 umol) at 0° C. Next, HCl (1 M, 23.89 uL) was added dropwise at 2-4° C., and then the mixture was stirred at 0° C. for 10 minutes. A solution of NaNO$_2$ (8.57 mg, 124.24 umol) in H$_2$O (0.05 mL) was added to the reaction mixture dropwise at 0° C. Then the mixture was stirred at 0° C. for 6 hours. LCMS showed 30e was consumed completely and one main peak with the desired mass was detected. The reaction mixture was quenched by addition H$_2$O (5 mL), and then extracted with Ethyl acetate (10 mL*3). The combined organic layers were washed with brine (5 mL), dried over Na$_2$SO$_4$, filtered and concentrated under reduced pressure to give 31a. MS mass calculated for [M+1]$^+$ (C$_{23}$H$_{22}$Cl$_2$N$_6$O$_5$) requires m/z 533.1, LCMS found m/z 533.1; H NMR (400 MHz, DMSO-d$_6$) δ 11.03-11.06 (m, 1H), 7.35-7.38 (m, 1H), 7.02-7.03 (m, 1H), 6.56-6.60 (m, 1H), 4.23-4.26 (m, 2H), 4.18-4.20 (m, 2H), 4.15-4.17 (m, 2H), 1.45-1.51 (m, 6H).

Synthesis of 2-(3,5-dichloro-4-((3-isopropyl-2-oxo-2,3-dihydro-1H-benzo[d]imidazol-5-yl)oxy)phenyl)-3,5-dioxo-2,3,4,5-tetrahydro-1,2,4-triazine-6-carbonitrile (Example 31). To a solution of (E)-ethyl (2-cyano-2-(2-(3,5-dichloro-4-((1-isopropyl-2-methoxy-1H-benzo[d]imidazol-6-yl)oxy) phenyl)hydrazono)acetyl)carbamate (31a) (20 mg, 37.50 umol) in DMA (1 mL) was added KOAc (7.36 mg, 75.00 umol). The mixture was stirred at 110° C. for 6 hours. LCMS showed 31a was consumed completely and one main peak with desired mass was detected. The reaction mixture was quenched by addition H$_2$O (5 mL), and then extracted with Ethyl acetate (10 mL*3). The combined organic layers were washed with brine (5 mL), dried over Na$_2$SO$_4$, filtered and concentrated under reduced pressure to give a residue. The residue was purified by prep-HPLC (column: Welch Xtimate C18 150*25 mm*5 um; mobile phase: [water (0.2% FA)-ACN]) to give Example 31. MS mass calculated for [M+H]$^+$ (C$_{20}$H$_{14}$Cl$_2$N$_6$O$_4$) requires m/z 473.0, MS found m/z 473.1; $^1$H NMR (400 MHz, DMSO-d$_6$) δ ppm 10.76 (s, 1H), 7.80 (s, 2H), 7.00 (s, 1H), 6.86 (d, J=8.4 Hz, 1H), 6.52 (s, 1H), 6.25 (dd, J=8.6, 2.4 Hz, 1H), 4.53 (dt, J=13.8, 7.0 Hz, 1H), 2.67-2.84 (m, 1H), 2.52-2.57 (m, 3H), 1.41 (d, J=7.0 Hz, 6H).

Example 32. N-(3,5-dichloro-4-((1-isopropyl-2-methoxy-1H-benzo[d]imidazol-6-yl)oxy)phenyl)-5-oxo-4,5-dihydro-1,2,4-oxadiazole-3-carboxamide

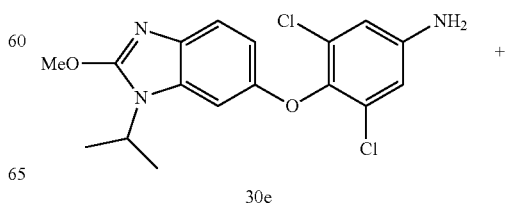

30e

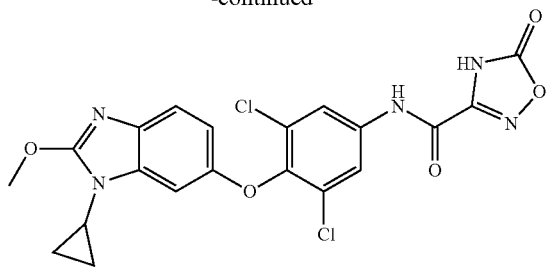

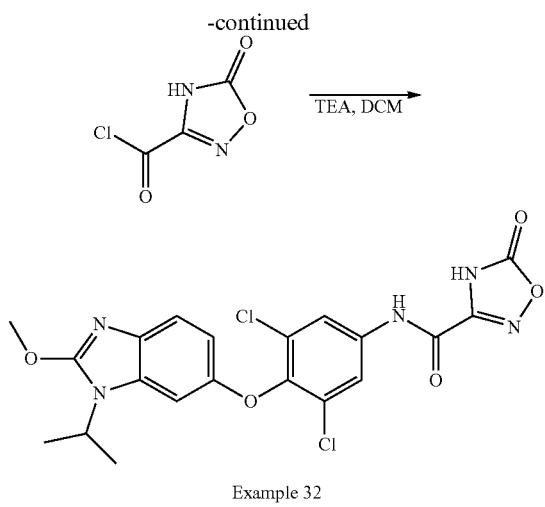

Example 32

Synthesis of N-(3,5-dichloro-4-((1-isopropyl-2-methoxy-1H-benzo[d]imidazol-6-yl)oxy)phenyl)-5-oxo-4,5-dihydro-1,2,4-oxadiazole-3-carboxamide (Example 32). To a solution of 3,5-dichloro-4-((1-isopropyl-2-methoxy-1H-benzo[d]imidazol-6-yl)oxy)aniline (30e) (30 mg, 81.91 umol) in DCM (0.5 mL) was added TEA (24.87 mg, 245.73 umol, 34.20 uL) and 5-oxo-4H-1,2,4-oxadiazole-3-carbonyl chloride (18.25 mg, 122.87 umol). The mixture was stirred at 25° C. for 0.5 hours. LCMS showed 30e was consumed completely and the desired MS was detected. The mixture was quenched with NaHCO$_3$ (10 mL) and extracted with DCM (10 mL*2). The combined organic phase was washed with brine (10 mL*3), dried with anhydrous Na$_2$SO$_4$, filtered and concentrated in vacuum. The residue was purified by Prep-HPLC ((FA) column: Phenomenex Luna C18 200*40 mm*10 um; mobile phase: [water (0.2% FA)-ACN]) to give Example 32. MS mass calculated for [M+1]$^+$ (C$_{20}$H$_{17}$Cl$_2$N$_5$O$_5$) requires m/z 478.1, LCMS found m/z 477.9; $^1$H NMR (400 MHz, DMSO-d$_6$) δ 10.49 (br s, 1H), 8.14 (s, 2H), 7.29 (d, J=8.6 Hz, 1H), 6.99 (d, J=1.8 Hz, 1H), 6.49 (dd, J=8.62, 1.65 Hz, 1H), 4.61 (dt, J=13.6, 6.8 Hz, 1H), 4.07 (s, 3H), 1.41 (d, J=6.8 Hz, 6H).

Example 33. N-(3,5-dichloro-4-((1-cyclopropyl-2-methoxy-1H-benzo[d]imidazol-6-yl)oxy)phenyl)-5-oxo-4,5-dihydro-1,2,4-oxadiazole-3-carboxamide

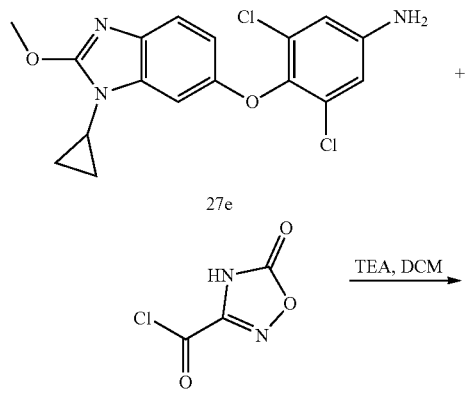

Example 33

Synthesis of N-(3,5-dichloro-4-((1-cyclopropyl-2-methoxy-1H-benzo[d]imidazol-6-yl)oxy)phenyl)-5-oxo-4,5-dihydro-1,2,4-oxadiazole-3-carboxamide (Example 33). To a solution of 3,5-dichloro-4-((1-cyclopropyl-2-methoxy-1H-benzo[d]imidazol-6-yl)oxy)aniline (27e) (20 mg, 54.91 umol) in DCM (0.5 mL) was added TEA (16.67 mg, 164.73 umol, 22.93 uL) and 5-oxo-4H-1,2,4-oxadiazole-3-carbonyl chloride (12.23 mg, 82.37 umol). The mixture was stirred at 25° C. for 0.5 hours. LCMS and HPLC showed 27e was consumed completely and the desired MS was detected. The mixture was quenched with NaHCO$_3$ (10 mL) and stirred for 10 minutes. The mixture was extracted with DCM (15 mL*2). The combined organic phase was washed with brine (10 mL*3), dried with anhydrous Na$_2$SO$_4$, filtered and concentrated in vacuum. The residue was purified by Prep-HPLC ((NH$_4$HCO$_3$) column: Waters Xbridge BEH C18 100*25 mm*5 um; mobile phase: [water (10 mM NH$_4$HCO$_3$)-ACN]) to give Example 33. MS mass calculated for [M+1]$^+$ (C$_{20}$H$_{15}$Cl$_2$N$_5$O$_5$) requires m/z 476.0, LCMS found m/z 475.9; $^1$H NMR (400 MHz, DMSO-d$_6$) δ 10.59 (br s, 1H), 8.14 (s, 2H), 7.30 (d, J=8.6 Hz, 1H), 6.84 (d, J=2.4 Hz, 1H), 6.54 (dd, J=8.6, 2.6 Hz, 1H), 4.07 (s, 3H), 3.08 (tt, J=7.0, 3.6 Hz, 1H), 1.00-1.10 (m, 2H), 0.82-0.90 (m, 2H).

Example 34. 2-(3,5-dichloro-4-((3-cyclopropyl-2-oxo-2,3-dihydro-1H-benzo[d]imidazol-5-yl)oxy)phenyl)-3,5-dioxo-2,3,4,5-tetrahydro-1,2,4-triazine-6-carbonitrile

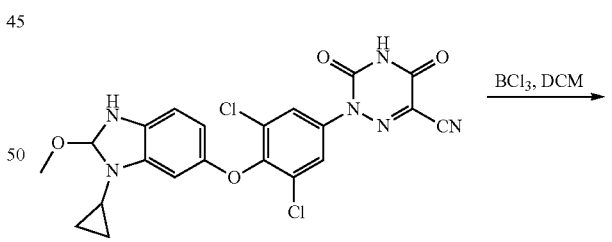

Example 28

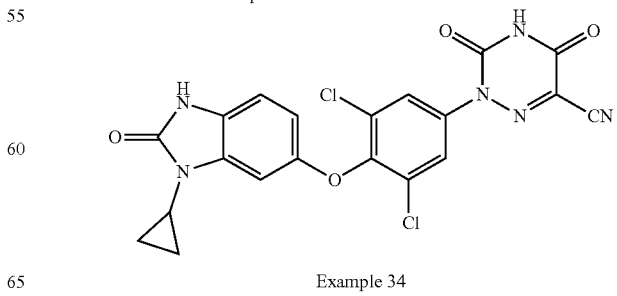

Example 34

Synthesis of 2-(3,5-dichloro-4-((3-cyclopropyl-2-oxo-2,3-dihydro-1H-benzo[d]imidazol-5-yl)oxy)phenyl)-3,5-dioxo-2,3,4,5-tetrahydro-1,2,4-triazine-6-carbonitrile (Example 34). To a solution of 2-(3,5-dichloro-4-((1-cyclopropyl-2-methoxy-1H-benzo[d]imidazol-6-yl)oxy)phenyl)-3,5-dioxo-2,3,4,5-tetrahydro-1,2,4-triazine-6-carbonitrile (Example 28) (10 mg, 20.61 umol) in DCM (3 mL) was added BCl$_3$ (1 M, 41.21 uL). The mixture was stirred at 40° C. for 32 hours. LCMS showed Example 28 was consumed completely and the desired MS was found. The mixture was quenched with MeOH (2 mL) and stirred at 25° C. for 10 minutes. The mixture was concentrated in vacuum. The residue was purified by Prep-HPLC ((FA) column: Phenomenex Luna C18 200*40 mm*10 um; mobile phase: [water (0.2% FA)-ACN]) to give Example 34. MS mass calculated for [M+1]$^+$ (C$_{20}$H$_{12}$Cl$_2$N$_6$O$_4$) requires m/z 471.0, LCMS found m/z 470.9; $^1$H NMR (400 MHz, DMSO-d$_6$) δ 10.69 (s, 1H), 7.81 (s, 2H), 6.82-6.87 (m, 2H), 6.31 (dd, J=8.4, 2.4 Hz, 1H), 2.83 (tt, J=7.0, 3.6 Hz, 1H), 0.95-1.01 (m, 2H), 0.80-0.86 (m, 2H).

Example 35. 2-(3,5-dichloro-4-((4-ethylquinolin-6-yl)oxy)phenyl)-3,5-dioxo-2,3,4,5-tetrahydro-1,2,4-triazine-6-carbonitrile

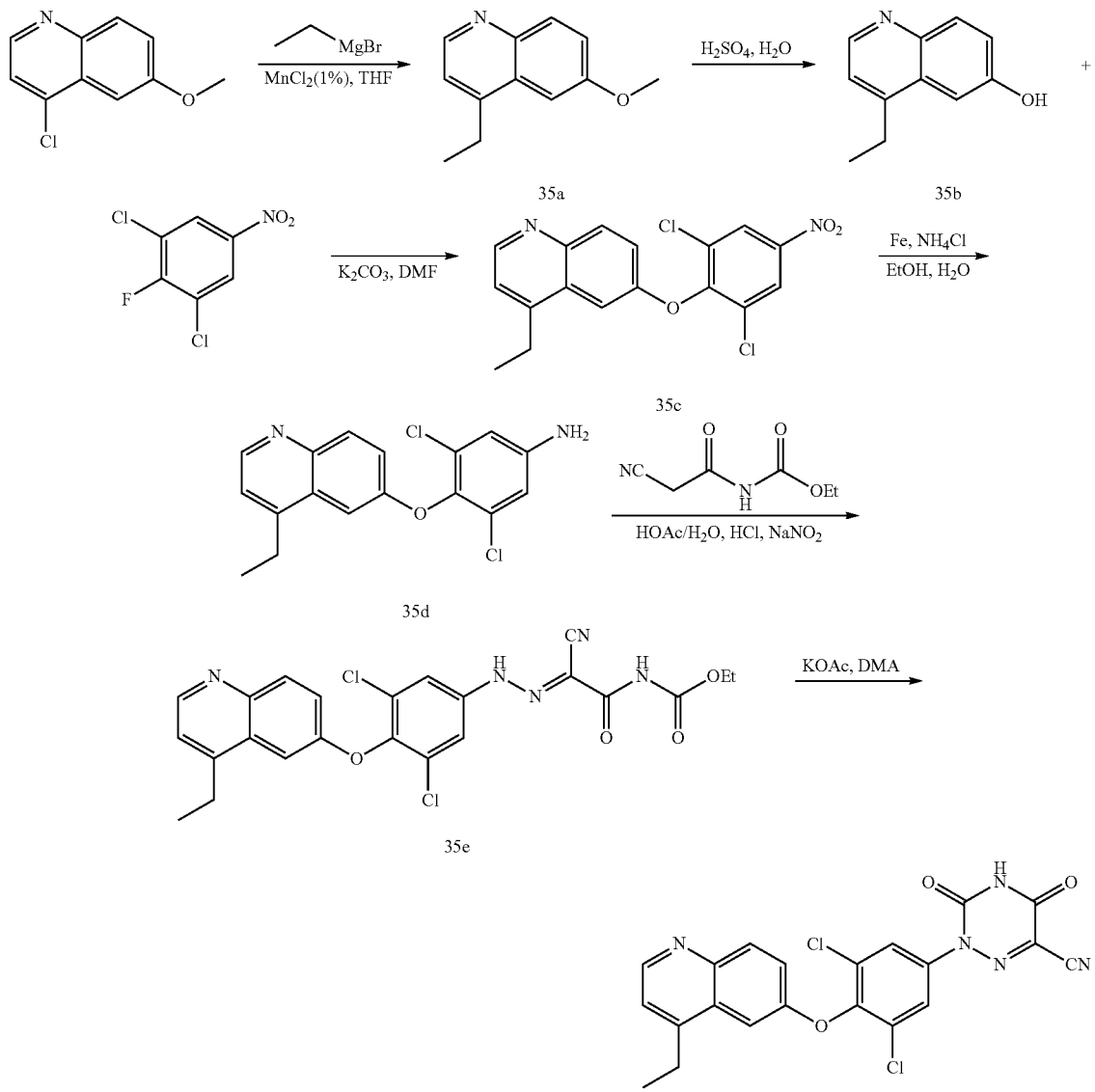

Example 35

Synthesis of 4-ethyl-6-methoxyquinoline (35a). To a solution of 4-chloro-6-methoxyquinoline (600 mg, 3.10 mmol) in THF (10 mL) was added dichloromanganese (12.58 mg, 0.1 mmol). EtMgBr (2 M, 2.32 mL) was added to the mixture dropwise at 0° C. The mixture was stirred at 0° C. for 1 hour. LCMS showed starting material was consumed completely and one main peak with the desired mass was detected. The reaction mixture was quenched by addition NH$_4$Cl aq. (10 mL). The mixture was extracted with Ethyl acetate (10 mL*2). The combined organic layers were washed with brine (5 mL), dried over anhydrous Na$_2$SO$_4$, filtered and concentrated under reduced pressure. The residue was purified by column chromatography (SiO$_2$, Petroleum ether:Ethyl acetate) to give 35a. MS mass calculated for [M+1]⁺ (C₁₂H₁₃NO) requires m/z 188.1, MS found m/z 188.0; ¹H NMR (400 MHz, CDCl₃) δ 8.69 (d, J=4.6 Hz, 1H), 8.02 (d, J=9.0 Hz, 1H), 7.37 (dd, J=9.2, 2.8 Hz, 1H), 7.20-7.28 (m, 2H), 3.96 (s, 3H), 3.03-3.11 (m, 2H), 1.41 (t, J=7.6 Hz, 3H).

Synthesis of 4-ethylquinolin-6-ol (35b). A solution of 4-ethyl-6-methoxyquinoline (35a) (537 mg, 2.87 mmol) in H₂SO₄ (3 mL) and H₂O (3 mL) was stirred at 100° C. for 24 hours. TLC and LCMS showed 35a was consumed completely and one main peak with the desired mass was detected. The mixture was adjusted to pH 9 with ammonium hydroxide. The mixture was filtered and the filter cake was washed with H₂O (20 mL*3), and dried in vacuum to give 35b. MS mass calculated for [M+1]⁺ (C₁₁H₁₁NO) requires m/z 174.1, MS found m/z 174.2; ¹H NMR (400 MHz, CDCl₃) δ ppm 8.67 (d, J=4.6 Hz, 1H), 7.99 (d, J=9.0 Hz, 1H), 7.37-7.42 (m, 1H), 7.33 (dd, J=9.0, 2.57 Hz, 1H), 7.22-7.25 (m, 1H), 2.98-3.11 (m, 2H), 1.34-1.45 (m, 3H).

Synthesis of 6-(2,6-dichloro-4-nitrophenoxy)-4-ethylquinoline (35c). To s solution of 4-ethylquinolin-6-ol (35b) (423 mg, 2.44 mmol) in DMF (2 mL) was added 1,3-dichloro-2-fluoro-5-nitro-benzene (512.82 mg, 2.44 mmol) and K₂CO₃ (675.03 mg, 4.88 mmol). The mixture was stirred at 20° C. for 1 hour. TLC indicated 35c was consumed completely and one new spot was formed. The reaction mixture was diluted with Ethyl acetate (30 mL) and H₂O (30 mL) and extracted with Ethyl acetate (20 mL*3). The combined organic layers were washed with brine (10 mL), dried over anhydrous Na₂SO₄, filtered and concentrated under reduced pressure. The residue was purified by column chromatography (SiO₂, Petroleum ether:Ethyl acetate) to give 35c. MS mass calculated for [M+1]⁺ (C₁₇H₁₂Cl₂N₂O₃) requires m/z 363.0, MS found m/z 363.0; ¹H NMR (400 MHz, CDCl₃) δ 8.77 (d, J=4.4 Hz, 1H), 8.37 (s, 2H), 8.13 (d, J=9.2 Hz, 1H), 7.37 (dd, J=9.2, 2.8 Hz, 1H), 7.22-7.29 (m, 3H), 2.95 (q, J=7.6 Hz, 2H), 1.25-1.44 (m, 3H).

Synthesis of 3,5-dichloro-4-((4-ethylquinolin-6-yl)oxy)aniline (35d). To a solution of 6-(2,6-dichloro-4-nitrophenoxy)-4-ethylquinoline (35c) (780 mg, 2.15 mmol) in EtOH (10 mL) was added Fe (599.67 mg, 10.74 mmol) and a solution of NH₄Cl (574.39 mg, 10.74 mmol) in H₂O (0.5 mL). The mixture was stirred at 80° C. for 2 hours. TLC indicated 35c was consumed completely and one new spot was formed. The suspension was filtered through a pad of Celite and the pad cake was washed with Ethyl acetate (10 mL*3). The combined filtrates were concentrated under reduced pressure. The residue was diluted with H₂O (20 mL) and extracted with Ethyl acetate (20 mL*3). The combined organic layers were washed with brine (20 mL), dried over anhydrous Na₂SO₄, filtered and concentrated under reduced pressure. The residue was purified by column chromatography (SiO₂, Petroleum ether:Ethyl acetate) to give 35d. MS mass calculated for [M+1]⁺ (C₁₇H₁₄Cl₂N₂O) requires m/z 333.0, MS found m/z 333.0; ¹H NMR (400 MHz, CDCl₃) δ ppm 8.71 (d, J=4.2 Hz, 1H), 8.07 (d, J=9.2 Hz, 1H), 7.38 (dd, J=9.2, 2.6 Hz, 1H), 7.17-7.31 (m, 3H), 6.75 (s, 2H), 3.83 (br s, 2H), 2.95 (q, J=7.4 Hz, 2H), 1.24-1.42 (m, 3H).

Synthesis of (E)-ethyl (2-cyano-2-(2-(3,5-dichloro-4-((4-ethylquinolin-6-yl)oxy)phenyl)hydrazono)acetyl)carbamate (35e). To a solution of 3,5-dichloro-4-((4-ethylquinolin-6-yl)oxy)aniline (35d) (20 mg, 60.02 umol) in HOAc (1 mL) and H₂O (0.5 mL) was added ethyl (2-cyanoacetyl)carbamate (14.06 mg, 90.03 umol) and HCl (1 M, 150.05 uL) at 0° C. Then NaNO₂ (5.38 mg, 78.03 umol) was added to the mixture. The mixture was stirred at 0° C. for 1 hour. LCMS showed 35d was consumed completely and one main peak with the desired mass was detected. The reaction mixture was diluted with Ethyl acetate (10 mL) and H₂O (10 mL) and extracted with Ethyl acetate (10 mL*2). The combined organic layers were washed with brine (5 mL), dried over anhydrous Na₂SO₄, filtered and concentrated under reduced pressure to give 35e. MS mass calculated for [M+1]⁺ (C₂₃H₁₉Cl₂N₅O₄) requires m/z 500.0, MS found m/z 500.1.

Synthesis of 2-(3,5-dichloro-4-((4-ethylquinolin-6-yl)oxy)phenyl)-3,5-dioxo-2,3,4,5-tetrahydro-1,2,4-triazine-6-carbonitrile (Example 35). To a solution of (E)-ethyl (2-cyano-2-(2-(3,5-dichloro-4-((4-ethylquinolin-6-yl)oxy)phenyl)hydrazono)acetyl)carbamate (35e) (30 mg, 59.96 umol) in DMA (2 mL) was added KOAc (11.77 mg, 119.92 umol). The mixture was stirred at 115° C. for 3 hours. LCMS showed 35e was consumed completely and one main peak with desired mass was detected. The reaction mixture was diluted with Ethyl acetate (10 mL) and H₂O (10 mL) and extracted with Ethyl acetate (10 mL*2). The combined organic layers were washed with brine (5 mL), dried over anhydrous Na₂SO₄, filtered and concentrated under reduced pressure. The residue was purified by prep-TLC (SiO₂, Petroleum ether:Ethyl acetate=0:1, R_f=0.45) to give Example 35. MS mass calculated for [M+1]⁺ (C₂₁H₁₃Cl₂N₅O₃) requires m/z 454.0, MS found m/z 454.1; ¹H NMR (400 MHz, CD₃OD) S 8.67 (d, J=4.6 Hz, 1H), 8.07 (d, J=9.2 Hz, 1H), 7.86 (s, 2H), 7.53 (dd, J=9.2, 2.8 Hz, 1H), 7.40 (d, J=4.8 Hz, 1H), 7.29 (d, J=2.4 Hz, 1H), 4.59 (br s, 1H), 2.98 (q, J=7.6 Hz, 2H), 1.31 (t, J=7.6 Hz, 3H).

Example 36. N-(3,5-dichloro-4-((4-ethylquinolin-6-yl)oxy)phenyl)-5-oxo-4,5-dihydro-1,2,4-oxadiazole-3-carboxamide

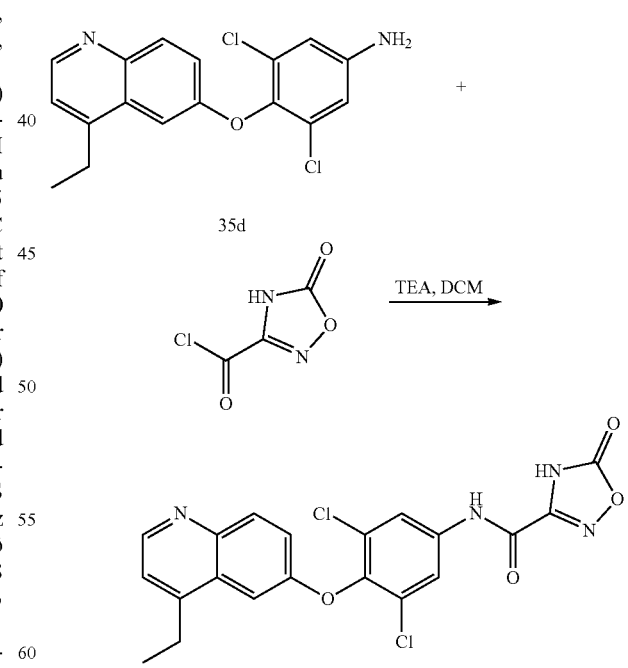

Example 36

Synthesis of N-(3,5-dichloro-4-((4-ethylquinolin-6-yl)oxy)phenyl)-5-oxo-4,5-dihydro-1,2,4-oxadiazole-3-carboxamide (Example 36). To a solution of 3,5-dichloro-4-((4-ethylquinolin-6-yl)oxy)aniline (35d) (30 mg, 90.03 umol) in DCM (2 mL) was added TEA (27.33 mg, 270.10 umol, 37.59 uL) and 5-oxo-4,5-dihydro-1,2,4-oxadiazole-3-carbonyl chloride (20.06 mg, 135.05 umol). The mixture was stirred at 20° C. for 0.5 hours. LCMS showed 35d was consumed completely, and one main peak with the desired mass was detected. The mixture was quenched with MeOH (0.5 mL). The mixture was purified by prep-HPLC (column: Welch Xtimate C18 150*25 mm*5 um; mobile phase: [water (0.2% FA)-ACN]; B %: 40%-70%, 10 min) to give Example 36. MS mass calculated for [M+1]$^+$ ($C_{20}H_{14}Cl_2N_4O_4$) requires m/z 445.0, MS found m/z 445.0; $^1$H NMR (400 MHz, DMSO-d$_6$) δ 11.34 (s, 1H), 8.73 (d, J=4.4 Hz, 1H), 8.12 (s, 1H), 8.01-8.10 (m, 1H), 7.44 (dd, J=9.2, 2.8 Hz, 1H), 7.38 (d, J=4.6 Hz, 1H), 7.28 (d, J=2.8 Hz, 1H), 2.81-3.05 (m, 3H), 1.23 (t, J=7.46 Hz, 3H).

Example 37. N-(4-((1-(tert-butyl)-1H-benzo[d]imidazol-6-yl)oxy)-3,5-dichlorophenyl)-5-oxo-4,5-dihydro-1,2,4-oxadiazole-3-carboxamide

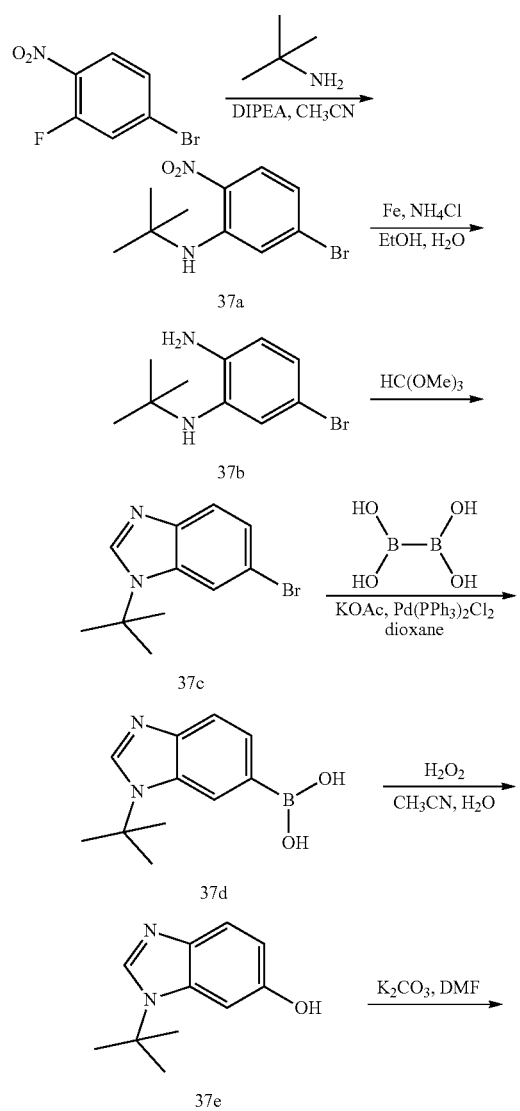

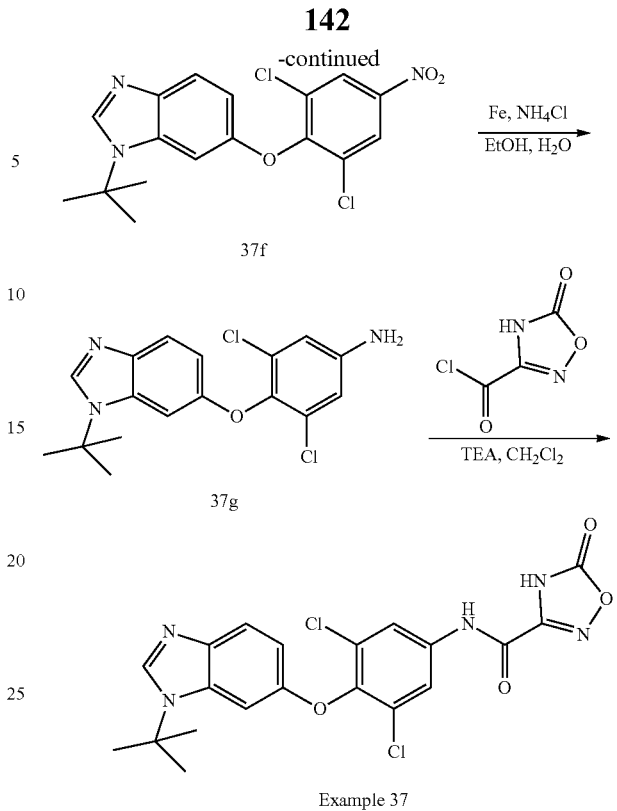

Example 37

Synthesis of 5-bromo-N-(tert-butyl)-2-nitroaniline (37a). To a solution of 4-bromo-2-fluoro-1-nitrobenzene (1 g, 4.55 mmol) in CH$_3$CN (10 mL) was added DIPEA (2.35 g, 18.18 mmol, 3.17 mL) and 2-methylpropan-2-amine (997.34 mg, 13.64 mmol, 1.43 mL). The mixture was stirred at 50° C. for 2 hours. TLC indicated starting material was consumed completely and one new spot was formed. The reaction mixture was concentrated under reduced pressure to remove CH$_3$CN. The residue was diluted with water (10 mL) and extracted with Ethyl acetate (15 mL*2). The combined organic layers were washed with brine (15 mL*2), dried over Na$_2$SO$_4$, filtered and concentrated under reduced pressure to give 37a. The crude product was used in the next step without further purification. $^1$H NMR (400 MHz, CDCl$_3$) δ 8.36-8.50 (m, 1H), 7.95-8.07 (m, 1H), 7.25-7.27 (m, 1H), 6.72 (dd, J=1.4, 9.2 Hz, 1H), 1.48-1.59 (m, 9H).

Synthesis of 5-bromo-N1-(tert-butyl)benzene-1,2-diamine (37b). To a solution of 5-bromo-N-(tert-butyl)-2-nitroaniline (37a) (1.24 g, 4.54 mmol) in EtOH (10 mL) was added Fe (1.27 g, 22.70 mmol) and then a solution of NH$_4$Cl (1.21 g, 22.70 mmol) in H$_2$O (4 mL) was added in the mixture by drop-wise. The mixture was stirred at 80° C. for 2 hours. TLC indicated 37a was consumed completely and one new spot formed. The reaction mixture was concentrated under reduced pressure to remove EtOH. The residue was diluted with water (40 mL) and extracted with Ethyl acetate (20 mL*3). The combined organic layers were washed with brine (15 mL*2), dried over Na$_2$SO$_4$, filtered and concentrated under reduced pressure. The residue was purified by column chromatography (SiO$_2$, petroleum ether: ethyl acetate) to give 37b. MS mass calculated for [M+1]$^+$ ($C_{10}H_{15}BrN_2$) requires m/z 243.04, LCMS found m/z 243.0; $^1$H NMR (400 MHz, CDCl$_3$) δ 6.98-7.05 (m, 1H), 6.82-6.88 (m, 1H), 6.56-6.64 (m, 1H), 3.34-3.60 (m, 2H), 2.78-3.19 (m, 1H), 1.31-1.35 (m, 9H).

Synthesis of 6-bromo-1-(tert-butyl)-1H-benzo[d]imidazole (37c). A solution of 5-bromo-N1-(tert-butyl) benzene-1,2-diamine (37b) (100 mg, 411.28 umol) in CH(OMe)$_3$ (3 mL) was stirred at 100° C. for 2 hours. LCMS showed the reaction was completed, and the desired MS was detected. The mixture was concentrated in vacuum to give 37c. MS mass calculated for [M+1]$^+$ (C$_{11}$H$_{13}$BrN$_2$) requires m/z 253.03, LCMS found m/z 253.0; $^1$H NMR (400 MHz, CD$_3$OD) δ 8.21-8.28 (m, 1H), 7.96-7.99 (m, 1H), 7.54-7.60 (m, 1H), 7.35-7.41 (m, 1H), 1.73-1.80 (m, 9H).

Synthesis of 1-(tert-butyl)-6-(4,4,5,5-tetramethyl-1,3,2-dioxaborolan-2-yl)-1H-benzo[d]imidazole (37d). To a solution of 6-bromo-1-(tert-butyl)-1H-benzo[d]imidazole (37c) (96 mg, 379.24 umol) and 4,4,5,5-tetramethyl-2-(4,4,5,5-tetramethyl-1,3,2-dioxaborolan-2-yl)-1,3,2-dioxaborolane (288.91 mg, 1.14 mmol) in dioxane (3 mL) was added KOAc (372.19 mg, 3.79 mmol) and Pd(PPh$_3$)$_2$Cl$_2$ (26.62 mg, 37.92 umol) at 20° C. under N$_2$. The mixture was stirred at 90° C. for 4 hours. TLC and LCMS showed 37c was consumed completely and the desired MS was detected. The suspension was filtered through a pad of Celite and the pad cake was washed with Ethyl acetate (3 mL*3). The combined filtrate was concentrated in vacuum. The residue was diluted with H$_2$O (5 mL) and extracted with Ethyl acetate (10 mL*2). The combined organic layers were washed with brine (10 mL*3), dried with anhydrous Na$_2$SO$_4$, filtered and concentrated under reduced pressure to give a residue. The residue was purified by prep-TLC (SiO$_2$, petroleum ether: ethyl acetate) to give 37d. MS mass calculated for [M+1]$^+$ (C$_{17}$H$_{25}$BN$_2$O$_2$) requires m/z 301.2, LCMS found m/z 301.2; $^1$H NMR (400 MHz, CD$_3$OD) δ 8.25-8.35 (m, 1H), 8.11-8.19 (m, 1H), 7.65-7.67 (m, 2H), 1.79-1.81 (m, 9H), 1.37-1.39 (m, 1H), 1.19 (s, 9H).

Synthesis of 1-(tert-butyl)-1H-benzo[d]imidazol-6-ol (37e). To a mixture of 1-(tert-butyl)-6-(4,4,5,5-tetramethyl-1,3,2-dioxaborolan-2-yl)-1H-benzo[d]imidazole (37d) (80 mg, 266.49 umol) in H$_2$O (1.5 mL) and CH$_3$CN (3 mL) was added ammonium carbonate (21.07 mg, 266.49 umol, 21.94 uL) and H$_2$O$_2$ (60.42 mg, 532.97 umol, 51.20 uL, 30% purity) under N$_2$. The mixture was stirred at 20° C. for 1 hour. LCMS indicated 37d was consumed completely and the desired MS was detected. The residue was poured into NaHSO$_3$ (30 mL) and stirred for 10 min. The aqueous phase was extracted with ethyl acetate (15 mL*3). The combined organic phase was washed with brine (10 mL*2), dried with anhydrous Na$_2$SO$_4$, filtered and concentrated to give 37e. The crude product was used in the next step without further purification. MS mass calculated for [M+1]$^+$ (C$_{11}$H$_{14}$N$_2$O) requires m/z 191.11, LCMS found m/z 191.2; $^1$H NMR (400 MHz, CD$_3$OD) δ 8.05 (s, 1H), 7.46 (d, J=8.6 Hz, 1H), 7.13 (d, J=2.0 Hz, 1H), 6.79 (dd, J=8.6, 2.20 Hz, 1H), 1.74 (s, 9H).

Synthesis of 1-(tert-butyl)-6-(2,6-dichloro-4-nitrophenoxy)-1H-benzo[d]imidazole (37f). To a solution of 1-(tert-butyl)-1H-benzo[d]imidazol-6-ol (37e) (50 mg, 262.82 umol) and 1,3-dichloro-2-fluoro-5-nitro-benzene (60.71 mg, 289.11 umol) in DMF (3 mL) was added K$_2$CO$_3$ (54.49 mg, 394.24 umol) at 20° C. under N$_2$. The mixture was stirred at 20° C. for 1 hour. TLC and LCMS showed 37e was consumed completely and the desired MS was detected. The mixture was extracted with Ethyl acetate (10 mL*2) and H$_2$O (5 mL). The combined organic phase was washed with brine (10 mL*3), dried with anhydrous Na$_2$SO$_4$, filtered and concentrated in vacuum. The residue was purified by prep-TLC (petroleum ether: ethyl acetate) to give 37f. MS mass calculated for [M+1]$^+$ (C$_{17}$H$_{15}$Cl$_2$N$_3$O$_3$) requires m/z 380.05, LCMS found m/z 380.1; $^1$H NMR (400 MHz, CD$_3$OD) δ 8.48 (m, 2H), 8.45 (m, 1H), 8.20-8.25 (m, 1H), 7.30 (d, J=2.4 Hz, 1H), 6.79-6.84 (m, 1H), 1.73 (s, 9H).

Synthesis of 4-((1-(tert-butyl)-1H-benzo[d]imidazol-6-yl)oxy)-3,5-dichloroaniline (37g). To a solution of 1-(tert-butyl)-6-(2,6-dichloro-4-nitrophenoxy)-1H-benzo[d]imidazole (37f) (54 mg, 142.02 umol) in EtOH (3 mL) and H$_2$O (1 mL) was added Fe (39.66 mg, 710.11 umol) and NH$_4$Cl (37.98 mg, 710.11 umol) at 25° C. Then the mixture was stirred at 80° C. for 1 hour. TLC and LCMS showed 37f was consumed completely and the desired MS was detected. The suspension was filtered through a pad of Celite and the pad cake was washed with EtOH (5 mL*3). The combined filtrate was extracted with ethyl acetate (15 mL*2) and H$_2$O (5 mL). The combined organic phase was washed with brine (5 mL*3), dried with anhydrous Na$_2$SO$_4$, filtered and concentrated in vacuum to give 37g. The solid was used directly in the next step without further purification. MS mass calculated for [M+1]$^+$ (C$_{17}$H$_{17}$Cl$_2$N$_3$O) requires m/z 350.07, LCMS found m/z 350.1; $^1$H NMR (400 MHz, CD$_3$OD) δ 8.12-8.23 (m, 1H), 6.74-6.81 (m, 1H), 7.51-7.68 (m, 4H), 5.49 (s, 2H), 1.63-1.74 (m, 9H).

Synthesis of N-(4-((1-(tert-butyl)-1H-benzo[d]imidazol-6-yl)oxy)-3,5-dichlorophenyl)-5-oxo-4,5-dihydro-1,2,4-oxadiazole-3-carboxamide (Example 37). To a solution of 4-((1-(tert-butyl)-1H-benzo[d]imidazol-6-yl)oxy)-3,5-dichloroaniline (37g) (20 mg, 57.10 umol) and 5-oxo-4H-1,2,4-oxadiazole-3-carbonyl chloride (25.44 mg, 171.31 umol) in CH$_2$Cl$_2$ (3 mL) was added TEA (17.33 mg, 171.31 umol, 23.84 uL) at 25° C. Then the mixture was stirred at 25° C. for 30 minutes. LCMS showed 37g was consumed completely and the desired MS was detected. The mixture was quenched with MeOH (5 mL*3) and stirred at 25° C. for 5 minutes. Then the mixture was concentrated in vacuum. The residue was purified by Prep-HPLC ((FA) column: Phenomenex Luna C18 200*40 mm*10 um; mobile phase: [water (0.2% FA)-ACN]) to give Example 37. MS mass calculated for [M+1]$^+$ (C$_{20}$H$_{17}$Cl$_2$N$_5$O$_4$) requires m/z 462.0, LCMS found m/z 462.0; $^1$H NMR (400 MHz, DMSO-d$_6$) δ 11.08 (br s, 1H), 8.24 (s, 1H), 8.07-8.15 (m, 2H), 7.60 (d, J=8.8 Hz, 1H), 7.22 (d, J=2.2 Hz, 1H), 6.70 (dd, J=8.8, 2.45 Hz, 1H), 1.64 (s, 9H).

Example 38. 2-(4-((1-(tert-butyl)-1H-benzo[d]imidazol-6-yl)oxy)-3,5-dichlorophenyl)-3,5-dioxo-2,3,4,5-tetrahydro-1,2,4-triazine-6-carbonitrile

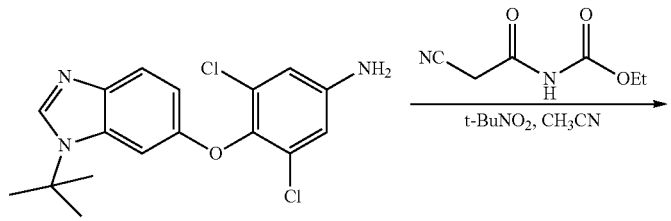

37g

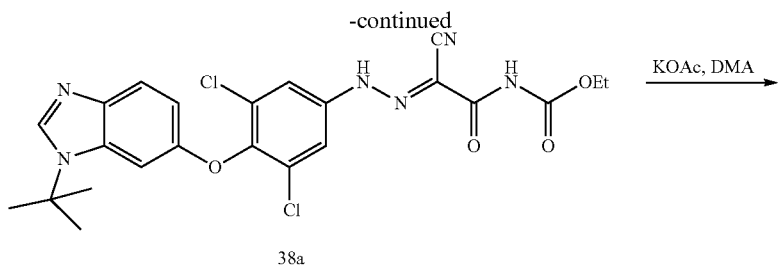

Example 38

Synthesis of (E)-ethyl (2-(2-(4-((1-(tert-butyl)-1H-benzo[d]imidazol-6-yl)oxy)-3,5-dichlorophenyl)hydrazono)-2-cyanoacetyl)carbamate (38a). To a mixture of 4-((1-(tert-butyl)-1H-benzo[d]imidazol-6-yl)oxy)-3,5-dichloroaniline (37g) (20 mg, 57.10 umol) and ethyl N-(2-cyanoacetyl)carbamate (9.81 mg, 62.81 umol) in $CH_3CN$ (2 mL) was added t-BuONO (17.67 mg, 171.31 umol, 20.38 uL) at 0° C. Then the mixture was stirred at 0° C. for 1 hour. LCMS showed 37g was consumed completely and the desired MS was detected. The mixture was quenched with MeOH (15 mL) and stirred at 25° C. for 5 minutes. Then the mixture was concentrated in vacuum to give 38a. The solid was used directly in the next step without further purification. MS mass calculated for [M+1]$^+$ ($C_{23}H_{22}Cl_2N_6O_4$) requires m/z 517.1, LCMS found m/z 517.1.

Synthesis of 2-(4-((1-(tert-butyl)-1H-benzo[d]imidazol-6-yl)oxy)-3,5-dichlorophenyl)-3,5-dioxo-2,3,4,5-tetrahydro-1,2,4-triazine-6-carbonitrile (Example 38). To a solution of (E)-ethyl (2-(2-(4-((1-(tert-butyl)-1H-benzo[d]imidazol-6-yl)oxy)-3,5-dichlorophenyl)hydrazono)-2-cyanoacetyl)carbamate (38a) (28 mg, 54.12 umol) in DMA (2 mL) was added KOAc (10.62 mg, 108.24 umol). The mixture was stirred at 115° C. for 3 hours. LCMS and HPLC showed 38a was consumed completely and the desired MS was detected. Then the mixture was concentrated in vacuum to give a residue. The residue was purified by Prep-HPLC ((FA) column: Phenomenex Luna C18 200*40 mm*10 um; mobile phase: [water (0.2% FA)-ACN]) to give Example 38. MS mass calculated for [M+1]$^+$ ($C_{21}H_{16}Cl_2N_6O_3$) requires m/z 471.0, LCMS found m/z 470.9; $^1$HNMR (400 MHz, DMSO-d$_6$) δ8.19-8.31 (m, 1H), 7.78-7.91 (m, 2H), 7.56-7.68 (m, 1H), 7.27-7.40 (m, 1H), 6.61-6.76 (m, 1H), 1.59-1.71 (m, 9H).

Example 39. N-(3,5-dichloro-4-((3,4-dihydro-2H-benzo[4,5]imidazo[2,1-b][1,3]oxazin-7-yl)oxy)phenyl)-5-oxo-4,5-dihydro-1,2,4-oxadiazole-3-carboxamide

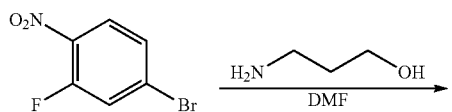

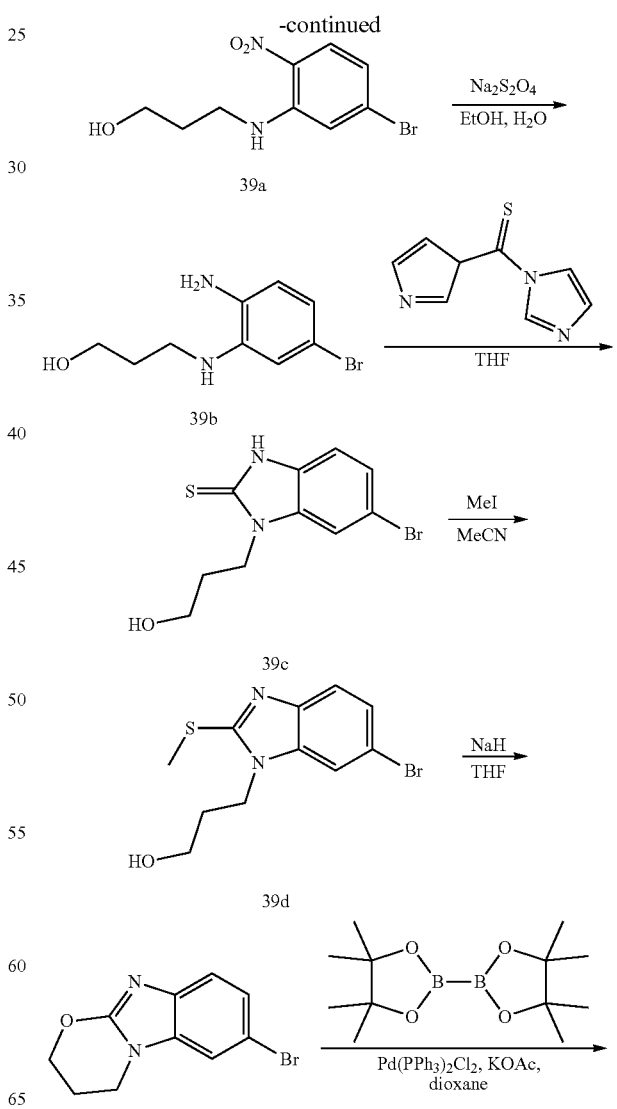

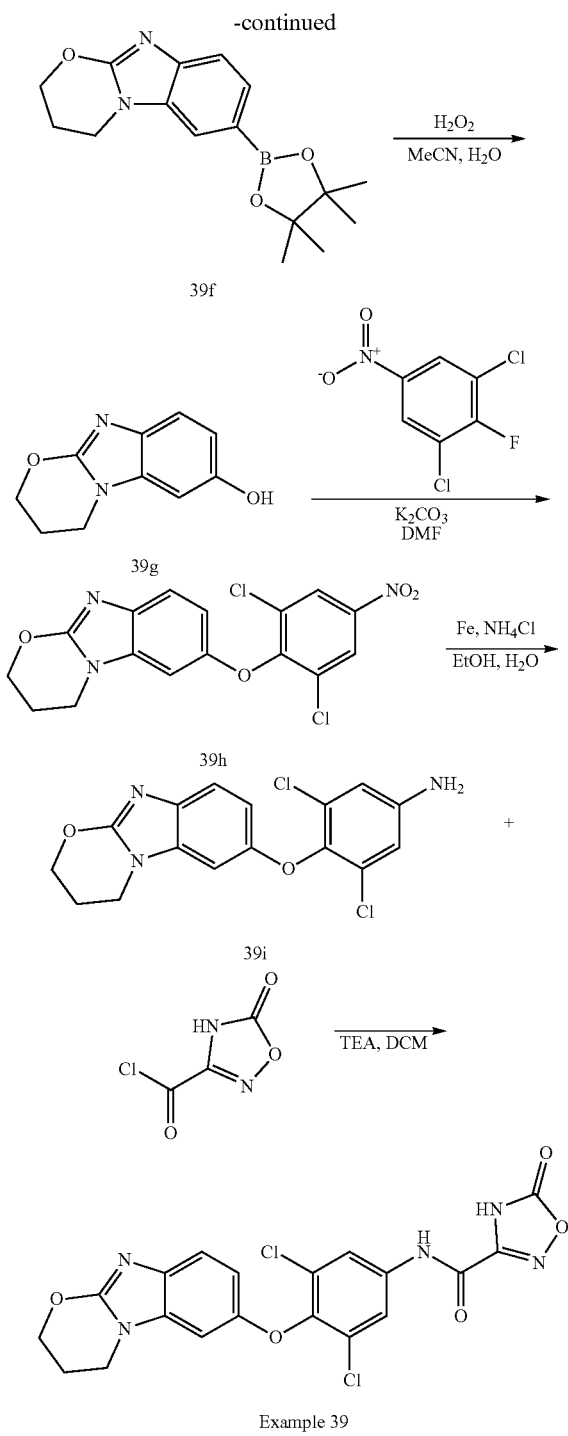

Example 39

Synthesis of 3-((5-bromo-2-nitrophenyl)amino)propan-1-ol (39a). To a solution of 4-bromo-2-fluoro-1-nitro-benzene (1 g, 4.55 mmol) in DMF (10 mL) was added 3-aminopropan-1-ol (1.02 g, 13.64 mmol, 1.05 mL) at 25° C. under nitrogen. The mixture was stirred at 25° C. for 3 hours under nitrogen. LCMS showed the starting material was consumed completely and the desired MS was detected. The mixture was extracted with ethyl acetate (20 mL*2) and H$_2$O (5 mL). The combined organic phase was washed with brine (10 mL*3), dried with anhydrous Na$_2$SO$_4$, filtered and concentrated in vacuum to give 39a. MS mass calculated for [M+1]$^+$ (C$_9$H$_{11}$BrN$_2$O$_3$) requires m/z 275.0, LCMS found m/z 275.0; $^1$H NMR (400 MHz, CDCl$_3$) δ 8.24 (br s, 1H), 8.03 (d, J=9.2 Hz, 1H), 7.07 (d, J=2.0 Hz, 1H), 6.76 (dd, J=9.0, 2.0 Hz, 1H), 3.86 (t, J=5.8 Hz, 2H), 3.42-3.49 (m, 2H), 2.00 (quin, J=6.2 Hz, 2H).

Synthesis of 3-((2-amino-5-bromophenyl)amino)propan-1-ol (39b). To a solution of 3-(5-bromo-2-nitro-anilino)propan-1-ol (39a) (900 mg, 3.27 mmol) in EtOH (10 mL) was added Na$_2$S$_2$O$_4$ (4.56 g, 26.17 mmol) in H$_2$O (8 mL). The mixture was stirred at 25° C. for 16 hours. LCMS showed 39a was consumed completely and the desired MS was detected. The suspension was filtered through a pad of Celite and the pad cake was washed with EtOH (5 mL*3). The combined filtrate was concentrated in vacuum. The residue was extracted with ethyl acetate (25 mL*2) and H$_2$O (10 mL). The combined organic phase was washed with brine (10 mL*3), dried with anhydrous Na$_2$SO$_4$, filtered and concentrated in vacuum to give 39b. MS mass calculated for [M+1]$^+$ (C$_9$H$_{13}$BrN$_2$O) requires m/z 245.0, LCMS found m/z 245.1; $^1$H NMR (400 MHz, CD$_3$OD) δ 6.53-6.70 (m, 3H), 3.71 (t, J=6.2 Hz, 2H), 3.18 (t, J=7.0 Hz, 2H), 1.88 (quin, J=6.6 Hz, 2H).

Synthesis of 6-bromo-1-(3-hydroxypropyl)-1H-benzo[d]imidazole-2(3H)-thione (39c). To a solution of 3-(2-amino-5-bromo-anilino)propan-1-ol (39b) (640 mg, 2.61 mmol) in THF (5 mL) was added di(imidazol-1-yl)methanethione (604.91 mg, 3.39 mmol) at 25° C. under N$_2$. The mixture was stirred at 25° C. for 16 hours. LCMS and TLC showed 39b was consumed completely and the desired MS was detected. The mixture was extracted with ethyl acetate (25 mL*2) and NH$_4$Cl aq (15 mL). The combined organic phase was washed with brine (15 mL*3), dried with anhydrous Na$_2$SO$_4$, filtered and concentrated in vacuum. The residue was purified by column chromatography (SiO$_2$, petroleum ether:ethyl acetate) to give 39c. MS mass calculated for [M+1]$^+$ (C$_{10}$H$_{11}$BrN$_2$OS) requires m/z 287.0, LCMS found m/z 287.0; $^1$H NMR (400 MHz, CD$_3$OD) δ 7.60 (d, J=1.8 Hz, 1H), 7.34 (dd, J=8.4, 1.8 Hz, 1H), 7.14 (d, J=8.4 Hz, 1H), 4.84 (s, 20H), 4.36 (t, J=7.0 Hz, 2H), 3.59 (t, J=6.0 Hz, 2H), 1.95-2.05 (m, 2H).

Synthesis of 3-(6-bromo-2-(methylthio)-1H-benzo[d]imidazol-1-yl)propan-1-ol (39d). To a solution of 5-bromo-3-(3-hydroxypropyl)-1H-benzimidazole-2-thione (39c) (200 mg, 696.44 umol) in CH$_3$CN (3 mL) was added MeI (118.62 mg, 835.73 umol, 52.03 uL) at 25° C. The mixture was stirred at 25° C. for 16 hours. LCMS showed 39c was consumed completely and the desired MS was detected. The mixture was extracted with ethyl acetate (20 mL*2) and H$_2$O (10 mL). The combined organic phase was washed with brine (10 mL*3), dried with anhydrous Na$_2$SO$_4$, filtered and concentrated in vacuum. The residue was purified by Prep-TLC (petroleum ether:ethyl acetate) to give 39d. MS mass calculated for [M+1]$^+$ (C$_{11}$H$_{13}$BrN$_2$OS) requires m/z 301.0, LCMS found m/z 301.0; $^1$H NMR (400 MHz, CD$_3$OD) δ 7.70 (d, J=1.4 Hz, 1H), 7.46 (d, J=8.4 Hz, 1H), 7.33 (dd, J=8.6, 1.8 Hz, 1H), 4.86 (s, 39H), 4.25 (t, J=7.2 Hz, 2H), 3.59 (t, J=6.0 Hz, 2H), 2.76 (s, 3H), 1.99 (quin, J=6.6 Hz, 2H).

Synthesis of 7-bromo-3,4-dihydro-2H-benzo[4,5]imidazo[2,1-b][1,3]oxazine (39e). To a solution of 3-(6-bromo-2-methylsulfanyl-benzimidazol-1-yl) propan-1-ol (39d) (193 mg, 640.77 umol) in THF (5 mL) was degassed and purged with O2 for 3 times. NaH (51.26 mg, 1.28 mmol, 60% purity) was added at 0° C. The mixture was stirred at 0-25° C. for 16 hours under O2. LCMS and TLC showed 39d was consumed completely and the desired MS was detected. The mixture was quenched with NH$_4$Cl (20 mL) and extracted with ethyl acetate (15 mL*3), the combined organic phase was washed with brine (10 mL), dried with anhydrous $Na_2SO_4$, filtered and concentrated in vacuum. The residue was purified by Prep-TLC (petroleum ether:ethyl acetate) to give 39e. MS mass calculated for $[M+1]^+$ ($C_{10}H9BrN_2O$) requires m/z 253.0, LCMS found m/z 252.9; $^1H$ NMR (400 MHz, $CD_3OD$) δ 7.50 (s, 1H), 7.28 (s, 2H), 4.55-4.61 (m, 2H), 4.14 (t, J=6.0 Hz, 2H), 2.34 (quin, J=5.6 Hz, 2H).

Synthesis of 7-(4,4,5,5-tetramethyl-1,3,2-dioxaborolan-2-yl)-3,4-dihydro-2H-benzo[4,5]imidaz-o[2,1-b][1,3]oxazine (39f). To a solution of 7-bromo-3,4-dihydro-2H-benzo[4,5]imidazo[2,1-b][1,3]oxazine (39e) (100 mg, 395.11 umol) and 4,4,5,5-tetramethyl-2-(4,4,5,5-tetramethyl-1,3,2-dioxaborolan-2-yl)-1,3,2-dioxaborolane (301.00 mg, 1.19 mmol) in dioxane (6 mL) was added KOAc (387.76 mg, 3.95 mmol) and $Pd(PPh_3)_2Cl_2$ (27.73 mg, 39.51 umol) at 20° C. under $N_2$. The mixture was stirred at 90° C. for 4 hours. LCMS showed 39e was consumed completely and the desired MS was detected. The suspension was filtered through a pad of Celite and the pad cake was washed with Ethyl acetate (5 mL*3). The combined filtrate was concentrated in vacuum. The residue was diluted with $H_2O$ (10 mL) and extracted with Ethyl acetate (20 mL*2). The combined organic layers were washed with brine (15 mL*3), dried with anhydrous $Na_2SO_4$, filtered and concentrated under reduced pressure. The residue was purified by Prep-TLC (petroleum ether:ethyl acetate) to give 39f. MS mass calculated for $[M+1]^+$ ($C_{16}H_{21}BN_2O_3$) requires m/z 301.2, LCMS found m/z 301.1.

Synthesis of 3,4-dihydro-2H-benzo[4,5]imidazo[2,1-b][1,3]oxazin-7-ol (39g). To a mixture of 7-(4,4,5,5-tetramethyl-1,3,2-dioxaborolan-2-yl)-3,4-dihydro-2H-benzo[4,5]imi-daz-o[2,1-b][1,3]oxazine (39f) (50 mg, 166.58 umol) in $H_2O$ (1 mL) and $CH_3CN$ (2 mL) was added ammonium carbonate (13.17 mg, 166.58 umol, 13.72 uL) and $H_2O_2$ (37.77 mg, 333.16 umol, 32.01 uL, 30% purity) under $N_2$. The mixture was stirred at 20° C. for 1 hour. LCMS indicated 39f was consumed completely and the desired MS was detected. The residue was poured into $NaHSO_3$ (20 mL) and stirred for 10 minutes. The aqueous phase was extracted with ethyl acetate (15 mL*3). The combined organic phase was washed with brine (10 mL*2), dried with anhydrous $Na_2SO_4$, filtered and concentrated in vacuum to give 39g. The product was used into the next step without further purification. MS mass calculated for $[M+1]^+$ ($C_{10}H_{10}N_2O_2$) requires m/z 191.2, LCMS found m/z 191.2.

Synthesis of 7-(2,6-dichloro-4-nitrophenoxy)-3,4-dihydro-2H-benzo[4,5]imidazo[2,1-b][1,3]oxazine (39h). To a solution of 3,4-dihydro-2H-benzo[4,5]imidazo[2,1-b][1,3]oxazin-7-ol (39g) (30 mg, 157.73 umol) and 1,3-dichloro-2-fluoro-5-nitro-benzene (36.43 mg, 173.50 umol) in DMF (2 mL) was added $K_2CO_3$ (32.70 mg, 236.60 umol). The mixture was degassed and purged with $N_2$ 3 times and stirred at 20° C. for 16 hours. LCMS showed 39g was consumed completely and the desired MS was detected. The mixture was extracted with ethyl acetate (20 mL*2) and $H_2O$ (10 mL). The combined organic phase was washed with brine (10 mL*3), dried with anhydrous $Na_2SO_4$, filtered and concentrated in vacuum. The residue was purified by Prep-TLC (petroleum ether:ethyl acetate) to give 39h. MS mass calculated for $[M+1]^+$ ($C_{16}H_{11}Cl_2N_3O_4$) requires m/z 380.0, LCMS found m/z 380.1; $^1H$ NMR (400 MHz, $CD_3OD$) δ 8.44 (s, 2H), 7.30 (d, J=8.6 Hz, 1H), 6.86 (d, J=2.4 Hz, 1H), 6.73 (dd, J=8.6, 2.6 Hz, 1H), 4.55 (dd, J=10.8, 5.6 Hz, 3H), 4.08 (t, J=6.2 Hz, 2H), 2.26-2.35 (m, 2H).

Synthesis of 3,5-dichloro-4-((3,4-dihydro-2H-benzo[4,5]imidazo[2,1-b][1,3]oxazin-7-yl)oxy)aniline (39i). To a solution of 7-(2,6-dichloro-4-nitro-phenoxy)-3,4-dihydro-2H-[1,3]oxazino[3,2-a]benzimidazole (39h) (55 mg, 144.67 umol) in EtOH (2 mL) and $H_2O$ (0.5 mL) was added Fe (40.40 mg, 723.34 umol) and $NH_4Cl$ (38.69 mg, 723.34 umol). The mixture was stirred at 80° C. for 2 hours. LCMS showed 39h was consumed completely and the desired MS was detected. The suspension was filtered through a pad of Celite and the pad cake was washed with EtOH (5 mL*3). The combined filtrate was extracted with ethyl acetate (15 mL*2) and $H_2O$ (5 mL). The combined organic phase was washed with brine (10 mL*3), dried with anhydrous $Na_2SO_4$, filtered and concentrated in vacuum to give 39i. The product was used directly for the next step without further purification. MS mass calculated for $[M+1]^+$ ($C_{16}H_{13}Cl_2N_3O_2$) requires m/z 350.0, LCMS found m/z 350.1; $^1H$ NMR (400 MHz, $CD_3OD$) δ 7.28 (br d, J=9.2 Hz, 1H), 6.75 (s, 2H), 6.67-6.71 (m, 2H), 4.51-4.57 (m, 2H), 4.06 (t, J=6.2 Hz, 2H), 2.31 (dt, J=11.0, 5.8 Hz, 2H), 1.96-2.07 (m, 1H).

Synthesis of N-(3,5-dichloro-4-((3,4-dihydro-2H-benzo[4,5]imidazo[2,1-b][1,3]oxazin-7-yl)oxy)phenyl)-5-oxo-4,5-dihydro-1,2,4-oxadiazole-3-carboxamide (Example 39). To a solution of 3,5-dichloro-4-((3,4-dihydro-2H-benzo[4,5]imidazo[2,1-b][1,3]oxazin-7-yl)oxy)aniline (39i) (15 mg, 42.83 umol) in DCM (2 mL) was added TEA (13.00 mg, 128.50 umol, 17.89 uL) and 5-oxo-4H-1,2,4-oxadiazole-3-carbonyl chloride (9.54 mg, 64.25 umol). The mixture was stirred at 25° C. for 0.5 hours. The mixture was quenched with MeOH (5 mL) and stirred at 25° C. for 10 minutes. Then the mixture was concentrated in vacuum. The residue was purified by Prep-HPLC ((FA) column: Welch Xtimate C18 150*25 mm*5 um; mobile phase: [water (0.2% FA)-ACN]) to give Example 39. MS mass calculated for $[M+1]^+$ ($C_{19}H_{13}Cl_2N_5O_5$) requires m/z 462.0, LCMS found m/z 461.9; $^1H$ NMR (400 MHz, DMSO-$d_6$) δ 11.28 (br s, 1H), 8.02-8.12 (m, 2H), 7.27 (br d, J=8.6 Hz, 1H), 6.88 (s, 1H), 6.60 (br d, J=8.6 Hz, 1H), 4.49 (br d, J=4.2 Hz, 2H), 4.01-4.08 (m, 2H), 2.21 (br d, J=4.8 Hz, 2H).

Example 40. 2-(3,5-dichloro-4-((3,4-dihydro-2H-benzo[4,5]imidazo[2,1-b][1,3]oxazin-7-yl)oxy)phenyl)-3,5-dioxo-2,3,4,5-tetrahydro-1,2,4-triazine-6-carbonitrile

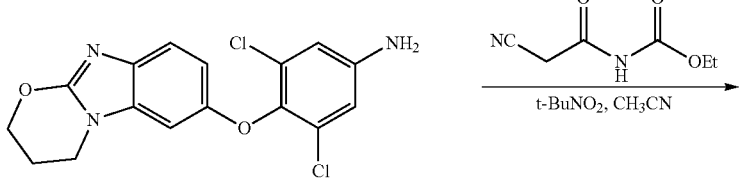

39i

-continued

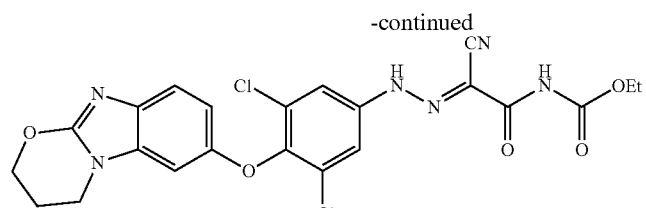

40a

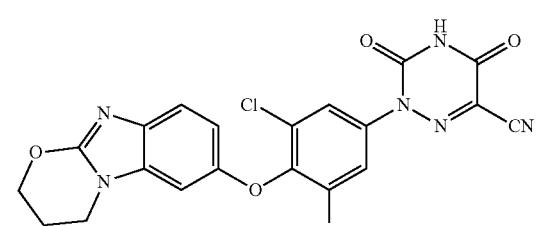

Example 40

Synthesis of (E)-ethyl (2-cyano-2-(2-(3,5-dichloro-4-((3,4-dihydro-2H-benzo[4,5]imidazo[2,1-b][1,3]oxazin-7-yl)oxy)phenyl)hydrazono)acetyl)carbamate (40a). To a mixture of 3,5-dichloro-4-((3,4-dihydro-2H-benzo[4,5]imidazo[2,1-b][1,3]oxazin-7-yl)oxy)aniline (39i) (15 mg, 42.83 umol) and ethyl N-(2-cyanoacetyl)carbamate (7.36 mg, 47.12 umol) in $CH_3CN$ (2 mL) was added t-BuONO (8.83 mg, 85.67 umol, 10.19 uL) at 0° C. Then the mixture was stirred at 0° C. for 1 hour. LCMS showed the reaction was completed and the desired MS was detected. The mixture was quenched with MeOH (5 mL) and stirred for 5 minutes. Then the mixture was concentrated in vacuum to give 40a. The product was used directly in the next step without further purification. MS mass calculated for $[M+1]^+$ ($C_{22}H_{18}Cl_2N_6O_5$) requires m/z 517.1, LCMS found m/z 517.1.

Synthesis of 2-(3,5-dichloro-4-((3,4-dihydro-2H-benzo[4,5]imidazo[2,1-b][1,3]oxazin-7-yl)oxy)phenyl)-3,5-dioxo-2,3,4,5-tetrahydro-1,2,4-triazine-6-carbonitrile (Example 40). To a solution of (E)-ethyl (2-cyano-2-(2-(3,5-dichloro-4-((3,4-dihydro-2H-benzo[4,5]imidazo[2,1-b][1,3]oxazin-7-yl)oxy)phenyl)hydrazono)acetyl)carbamate (40a) (20 mg, 38.66 umol) in DMA (2 mL) was added KOAc (7.59 mg, 77.32 umol). The mixture was stirred at 115° C. for 3 hours. LCMS showed the reaction was completed and the desired MS was detected. The mixture was concentrated in vacuum. The residue was purified by Prep-HPLC ((FA) column: Phenomenex Luna C18 200*40 mm*10 um; mobile phase: [water (0.2% FA)-ACN]) to give Example 40. MS mass calculated for $[M+1]^+$ ($C_{20}H_{12}Cl_2N_6O_4$) requires m/z 471.0, LCMS found m/z 470.9; $^1H$ NMR (400 MHz, DMSO-$d_6$) δ 7.80 (s, 2H), 7.29 (d, J=8.6 Hz, 1H), 6.95 (d, J=2.4 Hz, 1H), 6.61 (dd, J=8.6, 2.52 Hz, 1H), 4.46-4.52 (m, 2H), 4.06 (t, J=6.0 Hz, 2H), 2.17-2.24 (m, 2H).

Example 41. N-(4-((1-(tert-butyl)-2-methoxy-1H-benzo[d]imidazol-6-yl)oxy)-3,5-dichlorophenyl)-5-oxo-4,5-dihydro-1,2,4-oxadiazole-3-carboxamide

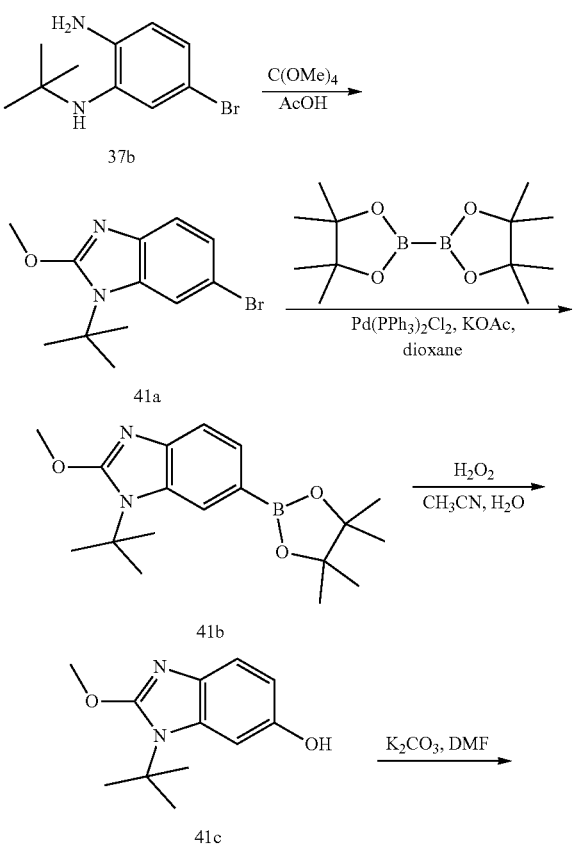

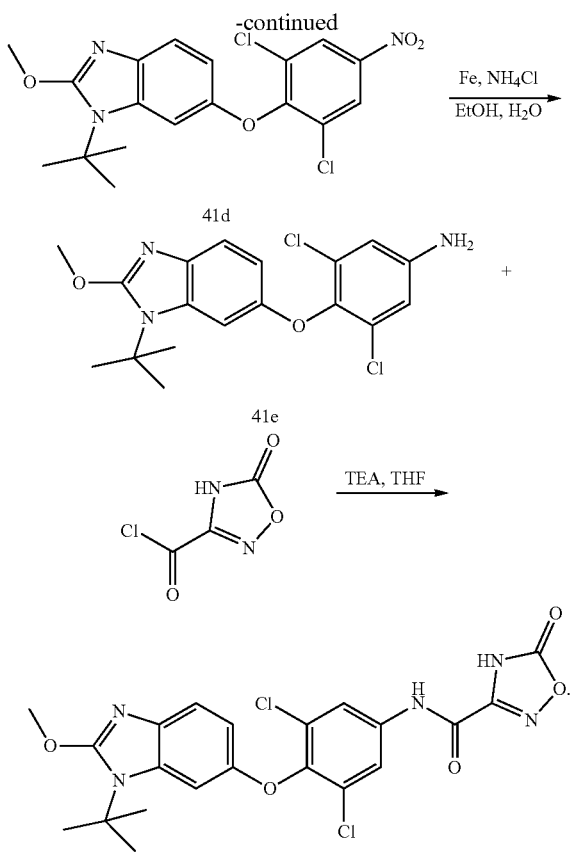

Example 41

Synthesis of 6-bromo-1-(tert-butyl)-2-methoxy-1H-benzo[d]imidazole (41a). To a solution of 5-bromo-N1-(tert-butyl)benzene-1,2-diamine (37b) (1 g, 4.11 mmol) in HOAc (5 mL) was added C(OCH$_3$)$_4$ (2.24 g, 16.45 mmol). The mixture was stirred at 50° C. for 16 hours. TLC and LCMS showed the reaction was completed. The reaction mixture was quenched by addition the aqueous NaHCO$_3$ (50 mL) at 20° C., and then extracted with Ethyl acetate (10 mL*2). The combined organic layers were washed with brine (15 mL*2), dried over Na$_2$SO$_4$, filtered and concentrated under reduced pressure. The residue was purified by column chromatography (SiO$_2$, Petroleum ether:Ethyl acetate) to give 41a. MS mass calculated for [M+1]$^+$ (C$_{12}$H$_{15}$BrN$_2$O) requires m/z 283.0, LCMS found m/z 283.0.

Synthesis of 1-(tert-butyl)-2-methoxy-6-(4,4,5,5-tetramethyl-1,3,2-dioxaborolan-2-yl)-1H-benzo[d]imidazole (41b). A mixture of 6-bromo-1-(tert-butyl)-2-methoxy-1H-benzo[d]imidazole (41a) (700 mg, 2.47 mmol), KOAc (1.21 g, 12.36 mmol), BPD (1.88 g, 7.42 mmol) and Pd(PPh$_3$)$_2$Cl$_2$ (173.51 mg, 247.21 umol) in dioxane (3 mL) was degassed and purged with N$_2$ 3 times, and then the mixture was stirred at 110° C. for 16 hours under N$_2$ atmosphere. TLC and LCMS showed the reaction was completed. The reaction mixture was concentrated under reduced pressure to remove dioxane. The residue was diluted with water (40 mL) and extracted with Ethyl acetate (20 mL*3). The combined organic layers were washed with brine (15 mL*2), dried over Na$_2$SO$_4$, filtered and concentrated under reduced pressure. The residue was purified by column chromatography (SiO$_2$, Petroleum ether:Ethyl acetate) to give 41b. MS mass calculated for [M+1]$^+$ (C$_{18}$H$_{27}$BN$_2$O$_3$) requires m/z 331.2, LCMS found m/z 331.2; $^1$H NMR (400 MHz, CDCl$_3$) δ 7.99 (s, 1H), 7.59-7.64 (m, 1H), 7.51-7.55 (m, 1H), 4.19 (s, 3H), 1.79-1.83 (m, 9H), 1.36 (s, 12H).

Synthesis of 1-(tert-butyl)-2-methoxy-1H-benzo[d]imidazol-6-ol (41c). To a solution of 1-(tert-butyl)-2-methoxy-6-(4,4,5,5-tetramethyl-1,3,2-dioxaborolan-2-yl)-1H-benzo[d]imidazole (41b) (440 mg, 1.33 mmol) in ACN (10 mL) was added a solution of NH$_4$HCO$_3$ (105.34 mg, 1.33 mmol, 109.73 uL) in H$_2$O (5 mL) at 20° C. Then H$_2$O$_2$ (302.10 mg, 2.66 mmol, 256.02 uL, 30% purity) was added dropwise at 20° C. The resulting mixture was stirred at 20° C. for 1 hour. TLC indicated 41b was consumed completely and one new spot was formed. The mixture was poured into saturated solution of NaHSO$_3$ (10 mL) and stirred for 10 minutes. The aqueous phase was extracted with ethyl acetate (15 mL*3). The combined organic phase was washed with brine (10 mL), dried with anhydrous Na$_2$SO$_4$, filtered and concentrated in vacuum to give 41c. MS mass calculated for [M+1]$^+$ (C$_{12}$H$_{16}$N$_2$O$_2$) requires m/z 221.1, LCMS found m/z 221.1.

Synthesis of 1-(tert-butyl)-6-(2,6-dichloro-4-nitrophenoxy)-2-methoxy-1H-benzo[d]imidazole (41d). To a solution of 1-(tert-butyl)-2-methoxy-1H-benzo[d]imidazol-6-ol (41c) (340 mg, 1.54 mmol) and 1,3-dichloro-2-fluoro-5-nitro-benzene (356.55 mg, 1.70 mmol) in DMF (20 mL) was added K$_2$CO$_3$ (320.01 mg, 2.32 mmol). The mixture was stirred at 20° C. for 1 hour. TLC indicated 41c was consumed completely and one new spot was formed. The reaction mixture was diluted with water (20 mL) and extracted with Ethyl acetate (20 mL*2). The combined organic layers were washed with brine (20 mL), dried over Na$_2$SO$_4$, filtered and concentrated under reduced pressure. The residue was purified by column chromatography (SiO$_2$, Petroleum ether:Ethyl acetate) to give 41d. MS mass calculated for [M+1]$^+$ (C$_{18}$H$_{17}$Cl$_2$N$_3$O$_4$) requires m/z 410.0, LCMS found m/z 410.0; $^1$H NMR (400 MHz, CDCl$_3$) δ 8.32 (s, 2H), 7.38 (d, J=8.8 Hz, 1H), 7.24 (d, J=2.4 Hz, 1H), 6.48 (dd, J=2.4, 8.6 Hz, 1H), 4.16 (s, 3H), 1.75 (s, 9H).

Synthesis of 4-((1-(tert-butyl)-2-methoxy-1H-benzo[d]imidazol-6-yl)oxy)-3,5-dichloroaniline (41e). To a solution of 1-(tert-butyl)-6-(2,6-dichloro-4-nitrophenoxy)-2-methoxy-1H-benzo[d]imidazole (41d) (200 mg, 487.51 umol) in EtOH (10 mL) was added Fe (136.12 mg, 2.44 mmol) and then a solution of NH$_4$Cl (130.39 mg, 2.44 mmol) in H$_2$O (4 mL) was added in the mixture dropwise. The mixture was stirred at 80° C. for 1 hour. TLC and LCMS indicated 41d was consumed completely and one new spot was formed. The reaction mixture was concentrated under reduced pressure to remove EtOH. The residue was diluted with water (5 mL) and extracted with Ethyl acetate (15 mL*2). The combined organic layers were washed with brine (10 mL*2), dried over Na$_2$SO$_4$, filtered and concentrated under reduced pressure. The residue was purified by prep-TLC (SiO$_2$, Petroleum ether:Ethyl acetate) to give 41e. MS mass calculated for [M+1]$^+$ (C$_{18}$H$_{19}$Cl$_2$N$_3$O$_2$) requires m/z 380.1, LCMS found m/z 380.0.

Synthesis of N-(4-((1-(tert-butyl)-2-methoxy-1H-benzo[d]imidazol-6-yl)oxy)-3,5-dichlorophenyl)-5-oxo-4,5-dihydro-1,2,4-oxadiazole-3-carboxamide (Example 41). A mixture of 4-((1-(tert-butyl)-2-methoxy-1H-benzo[d]imidazol-6-yl)oxy)-3,5-dichloroaniline (41e) (30 mg, 78.89 umol), 5-oxo-4H-1,2,4-oxadiazole-3-carbonyl chloride (58.58 mg, 394.46 umol) and TEA (39.92 mg, 394.46 umol, 54.90 uL) in THF (3 mL) was degassed and purged with N$_2$ 3 times. Then the mixture was stirred at 20° C. for 1 hour under N$_2$ atmosphere. TLC and LCMS showed the reaction was completed. The reaction mixture was diluted with water (10 mL) and extracted with Ethyl acetate (10 mL*3). The combined organic layers were washed with brine (10 mL*2), dried over Na$_2$SO$_4$, filtered and concentrated under reduced pressure. The residue was purified by prep-HPLC (column: Waters Xbridge BEH C18 100*30 mm*10 um; mobile phase: [water (10 mM NH$_4$HCO$_3$)-ACN]) to give Example 41. MS mass calculated for [M+1]$^+$ (C$_{21}$H$_{19}$Cl$_2$N$_5$O$_5$) requires m/z 492.10, LCMS found m/z 492.1; $^1$H NMR (400 MHz, DMSO-d$_6$) δ 10.87-10.95 (m, 1H), 8.06-8.12 (m, 2H), 7.25-7.31 (m, 1H), 7.13 (d, J=2.4 Hz, 1H), 6.47 (dd, J=2.3, 8.7 Hz, 1H), 4.05 (s, 3H), 1.66 (s, 9H).

Example 42. N-(4-((3-(tert-butyl)-2-oxo-2,3-dihydro-1H-benzo[d]imidazol-5-yl)oxy)-3,5-dichlorophenyl)-5-oxo-4,5-dihydro-1,2,4-oxadiazole-3-carboxamide

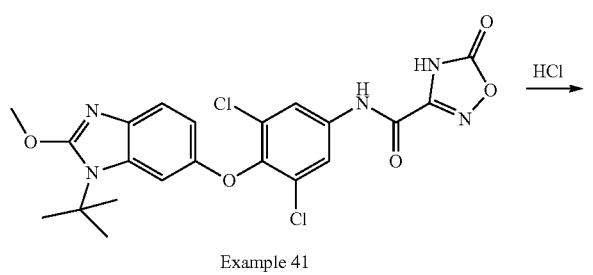

Example 41

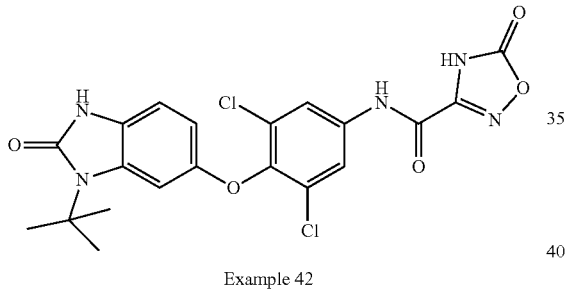

Example 42

Synthesis of N-(4-((3-(tert-butyl)-2-oxo-2,3-dihydro-1H-benzo[d]imidazol-5-yl)oxy)-3,5-dichlorophenyl)-5-oxo-4,5-dihydro-1,2,4-oxadiazole-3-carboxamide (Example 42). To a solution of N-(4-((1-(tert-butyl)-2-methoxy-1H-benzo[d]imidazol-6-yl)oxy)-3,5-dichlorophenyl)-5-oxo-4,5-dihydro-1,2,4-oxadiazole-3-carboxamide (Example 41) (15 mg, 30.47 umol) in MeOH (2 mL) was added conc. HCl (0.2 mL). The mixture was stirred at 20° C. for 16 hours. LCMS showed the reaction was completed. The reaction mixture was concentrated under reduced pressure to remove MeOH. The residue was diluted with water (10 mL) and extracted with Ethyl acetate (10 mL*3). The combined organic layers were washed with brine (20 mL), dried over Na$_2$SO$_4$, filtered and concentrated under reduced pressure. The residue was purified by prep-HPLC (column: Waters Xbridge BEH C18 100*25 mm*5 um; mobile phase: [water (10 mM NH$_4$HCO$_3$)-ACN]) to give Example 42. MS mass calculated for [M+1]$^+$ (C$_{20}$H$_{17}$Cl$_2$N$_5$O$_5$) requires m/z 478.1, LCMS found m/z 478.1; $^1$H NMR (400 MHz, DMSO-d$_6$) δ 12.03-12.06 (m, 1H), 8.25-8.36 (m, 3H), 8.09-8.14 (m, 1H), 8.02-8.07 (m, 3H), 7.94-7.99 (m, 2H), 7.85 (m, 1H).

Example 43. N-(3,5-dichloro-4-((1-(1-methylcyclopropyl)-1H-benzo[d]imidazol-6-yl)oxy)phenyl)-5-oxo-4,5-dihydro-1,2,4-oxadiazole-3-carboxamide

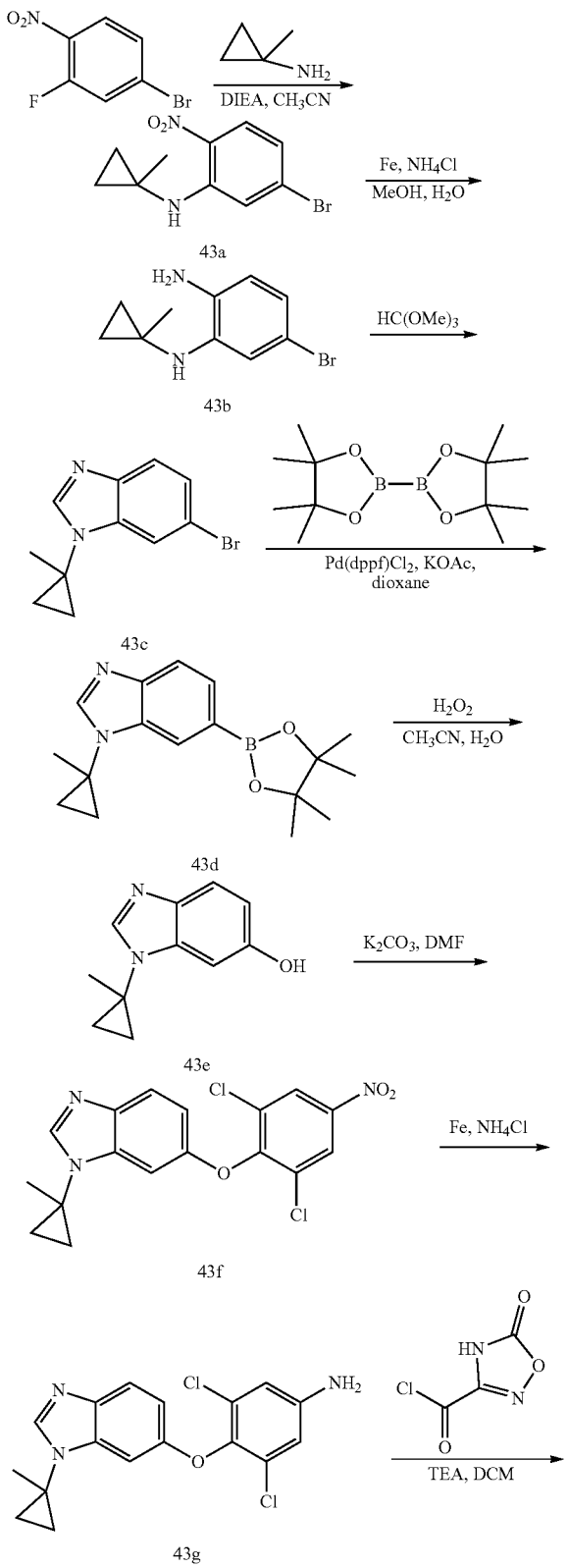

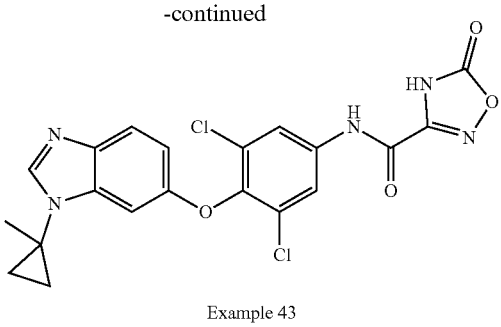

Example 43

Synthesis of 5-bromo-N-(1-methylcyclopropyl)-2-nitroaniline (43a). A mixture of 4-bromo-2-fluoro-1-nitro-benzene (1 g, 4.55 mmol), 1-methylcyclopropanamine (978.03 mg, 9.09 mmol, HCl), and DIPEA (2.35 g, 18.18 mmol, 3.17 mL) in $CH_3CN$ (10 mL) was degassed and purged with $N_2$ 3 times, and then the mixture was stirred at 50° C. for 3 hours under $N_2$ atmosphere. TLC indicated the reaction was completed, and one new spot was formed. The reaction mixture was concentrated under reduced pressure; the residue was diluted in ethyl acetate (20 mL) and washed with brine (20 mL*2), dried over with $Na_2SO_4$, filtered and concentrated under reduced pressure to give 43a. MS mass calculated for $[M+H]^+$ ($C_{10}H_{11}Br_2N_2O_2$) requires m/z, 271.0, LCMS found m/z 271.0; $^1$H NMR (400 MHz, $CDCl_3$) δ 8.27 (br s, 1H), 8.02 (d, J=9.2 Hz, 1H), 7.45 (d, J=2.0 Hz, 1H), 6.79 (dd, J=9.0, 2.08 Hz, 1H), 1.46 (s, 3H), 0.90 (d, J=4.8 Hz, 2H), 0.82-0.87 (m, 2H).

Synthesis of 5-bromo-N1-(1-methylcyclopropyl)benzene-1,2-diamine (43b). To a solution of 5-bromo-N-(1-methylcyclopropyl)-2-nitro-aniline (43a) (1 g, 3.69 mmol), Fe (1.03 g, 18.44 mmol) in $H_2O$ (4 mL) and MeOH (20 mL) was added Fe (1.03 g, 18.44 mmol) and $NH_4Cl$ (986.52 mg, 18.44 mmol), the mixture stirred at 80° C. for 1 hour under $N_2$ atmosphere. TLC indicated the reaction was completed. The reaction mixture was diluted with $H_2O$ (20 mL) and extracted with ethyl acetate (20 mL*2). The combined organic layers were washed with brine (20 mL*2), dried over with $Na_2SO_4$, filtered and concentrated under reduced pressure. The residue was purified by column chromatography ($SiO_2$, Petroleum ether:Ethyl acetate) to give 43b. $^1$H NMR (400 MHz, $CD_3OD$) 6.98 (d, J=2.0 Hz, 1H), 6.54-6.62 (m, 2H), 1.36 (s, 3H), 0.74-0.77 (m, 2H), 0.65-0.69 (m, 2H).

Synthesis of 6-bromo-1-(1-methylcyclopropyl)-1H-benzo[d]imidazole (43c). A mixture of 4-bromo-N2-(1-methylcyclopropyl)benzene-1,2-diamine (43b) (250 mg, 1.04 mmol) in $HC(OMe)_3$ (10 mL) was degassed and purged with $N_2$ 3 times, and then the mixture was stirred at 100° C. for 1 hour under $N_2$ atmosphere. TLC indicated the reaction was completed, and one new spot was formed. The reaction mixture was concentrated under reduced pressure to give 43c. MS mass calculated for $[M+H]^+$ ($C_{12}H_{13}BrN_2$) requires m/z, 251.0, LCMS found m/z 251.0.

Synthesis of 1-(1-methylcyclopropyl)-6-(4,4,5,5-tetramethyl-1,3,2-dioxaborolan-2-yl)-1H-benzo[d]imidazole (43d). A mixture of 6-bromo-1-(1-methylcyclopropyl)benzimidazole (43c) (260 mg, 1.04 mmol), 4,4,5,5-tetramethyl-2-(4,4,5,5-tetramethyl-1,3,2-dioxaborolan-2-yl)-1,3,2-dioxaborolane (394.37 mg, 1.55 mmol), KOAc (304.84 mg, 3.11 mmol), and $Pd(PPh_3)_2Cl_2$ (72.67 mg, 103.54 umol) in dioxane (20 mL) was degassed and purged with $N_2$ 3 times, and then the mixture was stirred at 90° C. for 16 hours under $N_2$ atmosphere. TLC indicated the reaction was completed and one new spot was formed. The reaction mixture was diluted with $H_2O$ (20 mL) and extracted with ethyl acetate (20 mL*2). The combined organic layers were washed with brine (20 mL*2), dried over with $Na_2SO_4$, filtered and concentrated under reduced pressure. The residue was purified by column chromatography ($SiO_2$, Petroleum ether: Ethyl acetate) to give 43d. MS mass calculated for $[M+H]^+$ ($C_{17}H_{23}BN_2O_2$) requires m/z, 299.1, LCMS found m/z 299.1.

Synthesis of 1-(1-methylcyclopropyl)-1H-benzo[d]imidazol-6-ol (43e). To a mixture of 1-(1-methylcyclopropyl)-6-(4,4,5,5-tetramethyl-1,3,2-dioxaborolan-2-yl)benzimidazole (43d) (300 mg, 1.01 mmol), $NH_4HCO_3$ (79.54 mg, 1.01 mmol) in $CH_3CN$ (20 mL) and $H_2O$ (10 mL) was added $H_2O_2$ (228.14 mg, 2.01 mmol, 193.34 uL, 30% purity). The mixture was degassed and purged with $N_2$ 3 times, and then the mixture was stirred at 25° C. for 1 hour under $N_2$ atmosphere. LCMS showed the reaction was completed, and the desired MS was detected. The reaction mixture was quenched by addition $Na_2SO_3$ solution (20 mL) at 0° C., and then diluted with $H_2O$ (20 mL) and extracted with ethyl acetate (30 mL*2). The combined organic layers were dried over with $Na_2SO_4$, filtered and concentrated under reduced pressure to give 43e. MS mass calculated for $[M+H]^+$ ($C_{11}H_{12}N_2O$) requires m/z, 189.1, LCMS found m/z 189.1.

Synthesis of 6-(2,6-dichloro-4-nitrophenoxy)-1-(1-methylcyclopropyl)-1H-benzo[d]imidazole (43f). A mixture of 1-(1-methylcyclopropyl)benzimidazol-5-ol (43e) (240 mg, 1.28 mmol), 1,3-dichloro-2-fluoro-5-nitro-benzene (294.53 mg, 1.40 mmol), and $K_2CO_3$ (352.44 mg, 2.55 mmol) in DMF (10 mL) was degassed and purged with $N_2$ 3 times, and then the mixture was stirred at 25° C. for 1 hour under $N_2$ atmosphere. TLC indicated the reaction was completed. The reaction mixture was diluted with $H_2O$ (20 mL) and extracted with ethyl acetate (20 mL*2). The combined organic layers were washed with brine (20 mL*2), dried over with $Na_2SO_4$, filtered and concentrated under reduced pressure. The residue was purified by column chromatography ($SiO_2$, Petroleum ether:Ethyl acetate) to give 43f. MS mass calculated for $[M+H]^+$ ($C_{17}H_{13}Cl_2N_3O_3$) requires m/z, 378.0, LCMS found m/z 378.0; $^1$H NMR (400 MHz, $CDCl_3$) 8.35 (s, 2H), 7.95 (s, 1H), 7.95 (s, 1H), 7.95 (s, 1H), 7.68 (d, J=8.8 Hz, 1H), 7.09 (d, J=2.2 Hz, 1H), 6.73 (dd, J=8.8, 2.4 Hz, 1H), 1.59 (s, 3H), 1.17-1.22 (m, 2H), 1.01-1.05 (m, 2H).

Synthesis of 3,5-dichloro-4-((1-(1-methylcyclopropyl)-1H-benzo[d]imidazol-6-yl)oxy)aniline (43g). A mixture of 6-(2,6-dichloro-4-nitro-phenoxy)-1-(1-methylcyclopropyl)benzimidazole (43f) (150 mg, 396.61 umol), Fe (110.74 mg, 1.98 mmol), and $NH_4Cl$ (106.07 mg, 1.98 mmol) in EtOH (10 mL) and $H_2O$ (2 mL) was degassed and purged with $N_2$ 3 times, and then the mixture was stirred at 80° C. for 1 hour under $N_2$ atmosphere. TLC indicated the reaction was completed, and one major new spot was formed. The reaction mixture was filtered and then diluted with $H_2O$ (20 mL) and extracted with ethyl acetate (20 mL*2). The combined organic layers were washed with brine (20 mL*2), dried over with $Na_2SO_4$, filtered and concentrated under reduced pressure to give 43g. $^1$H NMR (400 MHz, $CDCl_3$) 7.95 (br s, 1H), 7.67 (br d, J=8.6 Hz, 1H), 7.27 (s, 1H), 7.06 (d, J=2.2 Hz, 1H), 6.78 (dd, J=8.8, 2.2 Hz, 1H), 6.73 (s, 2H), 1.58 (s, 3H), 1.16-1.22 (m, 2H), 0.98-1.04 (m, 2H).

Synthesis of N-(3,5-dichloro-4-((1-(1-methylcyclopropyl)-1H-benzo[d]imidazol-6-yl)oxy)phenyl)-5-oxo-4,5-dihydro-1,2,4-oxadiazole-3-carboxamide (Example 43). To a mixture of 3,5-dichloro-4-[3-(1-methylcyclopropyl)benzimidazol-5-yl]oxy-aniline (43g) (10 mg, 28.72 umol) and TEA (8.72 mg, 86.15 umol, 11.99 uL) in THF (2 mL) was added 5-oxo-4H-1,2,4-oxadiazole-3-carbonyl chloride (8.53 mg, 57.43 umol), and the mixture was stirred at 25° C. for 0.1 hour under $N_2$ atmosphere. LCMS showed the reaction was completed, and the desired MS was detected. The reaction mixture was concentrated under reduced pressure. The residue was purified by prep-HPLC (FA condition: column: Phenomenex Luna C18 200*40 mm*10 um; mobile phase: [water (0.2% FA)-ACN]) to give Example 43. MS mass calculated for $[M+H]^+$ ($C_{20}H_{15}Cl_2N_5O_4$) requires m/z, 460.1, LCMS found m/z 460.1; $^1H$ NMR (400 MHz, $CD_3OD$) 8.27 (br s, 1H), 7.99 (s, 2H), 7.04 (br s, 1H), 6.86 (br dd, J=8.8, 2.4 Hz, 1H), 3.30 (dt, J=3.4, 1.6 Hz, 1H), 1.56 (s, 3H), 1.19 (s, 2H), 1.06 (s, 2H).

Example 44. 2-(3,5-dichloro-4-((1-(1-methylcyclopropyl)-1H-benzo[d]imidazol-6-yl)oxy)phenyl)-3,5-dioxo-2,3,4,5-tetrahydro-1,2,4-triazine-6-carbonitrile

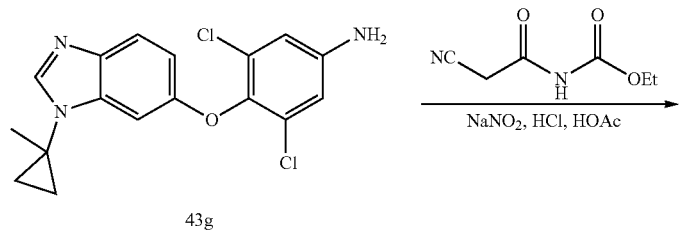

43g reaction was completed. The reaction mixture was diluted with $H_2O$ (10 mL) and extracted with ethyl acetate (10 mL*2). The combined organic layers were washed with brine (10 mL*2), dried over with $Na_2SO_4$, filtered and concentrated under reduced pressure to give 44a. MS mass calculated for $[M+H]^+$ ($C_{23}H_{20}Cl_2N_6O_4$) requires m/z, 515.1, LCMS found m/z 515.1.

Synthesis of 2-(3,5-dichloro-4-((1-(1-methylcyclopropyl)-1H-benzo[d]imidazol-6-yl)oxy)phenyl)-3,5-dioxo-2,3,4,5-tetrahydro-1,2,4-triazine-6-carbonitrile (Example 44). A mixture of ethyl N-[(2E)-2-cyano-2-[[3,5-dichloro-4-[3-(1-methylcyclopropyl)benzimidazol-5-yl]oxy-phenyl]hydrazono]acetyl]carbamate (44a) (36 mg, 69.86 umol) and KOAc (13.71 mg, 139.71 umol) in DMA (3 mL) was degassed and purged with $N_2$ 3 times, and then the mixture was stirred at 115° C. for 3 hours under $N_2$ atmosphere. LCMS showed the reaction was completed. The reaction mixture was concentrated under reduced pressure to give a

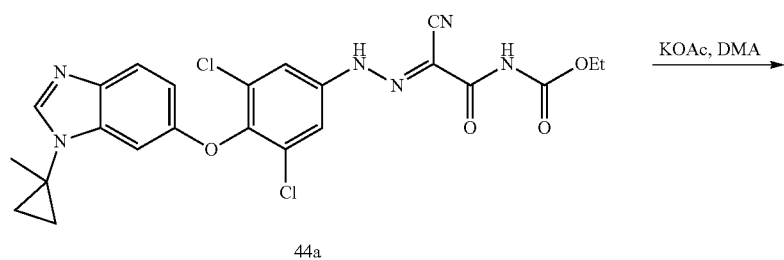

44a

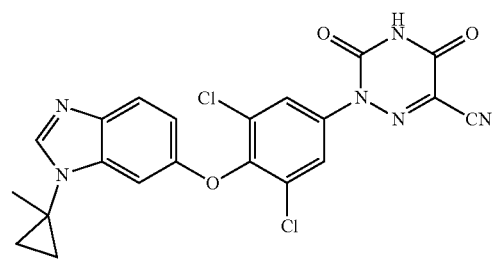 [SMILES: CC1(n2cnc3ccc(Oc4c(Cl)cc(-n5nc(C#N)c(=O)[nH]c5=O)cc4Cl)cc32)CC1]

Example 44

Synthesis of (E)-ethyl (2-cyano-2-(2-(3,5-dichloro-4-((1-(1-methylcyclopropyl)-1H-benzo[d]imidazol-6-yl)oxy)phenyl)hydrazono)acetyl)carbamate (44a). To a solution of 3,5-dichloro-4-[3-(1-methylcyclopropyl)benzimidazol-5-yl]oxy-aniline (43g) (30 mg, 86.15 umol) in HOAc (5 mL) and $H_2O$ (2 mL) was added ethyl N-(2-cyanoacetyl)carbamate (15.47 mg, 99.07 umol) and HCl (12 M, 1.79 uL) at 0° C. After 10 min, a solution of $NaNO_2$ (7.73 mg, 112.00 umol) in $H_2O$ (2 mL) was added, and then the mixture was stirred at 0° C. for 5 hours under $N_2$ atmosphere. LCMS showed the residue. The residue was purified by prep-HPLC (FA condition: column: Phenomenex Luna C18 200*40 mm*10 um; mobile phase: [water (0.2% FA)-ACN]) to give Example 44. MS mass calculated for $[M+H]^+$ ($C_{21}H_{14}Cl_2N_6O_3$) requires m/z, 469.1, LCMS found m/z 469.1. $^1H$ NMR (400 MHz, $CD_3OD$) 8.21 (s, 1H), 7.82 (s, 2H), 7.61 (br d, J=8.8 Hz, 1H), 7.10 (br d, J=2.2 Hz, 1H), 6.86 (br dd, J=8.8, 2.4 Hz, 1H), 4.59 (br s, 1H), 1.57 (s, 3H), 1.17-1.23 (m, 2H), 1.07 (br t, J=6.0 Hz, 2H).

Example 45. N-(3,5-dichloro-4-((2-methoxy-1-(1-methylcyclopropyl)-1H-benzo[d]imidazol-6-yl)oxy)phenyl)-5-oxo-4,5-dihydro-1,2,4-oxadiazole-3-carboxamide

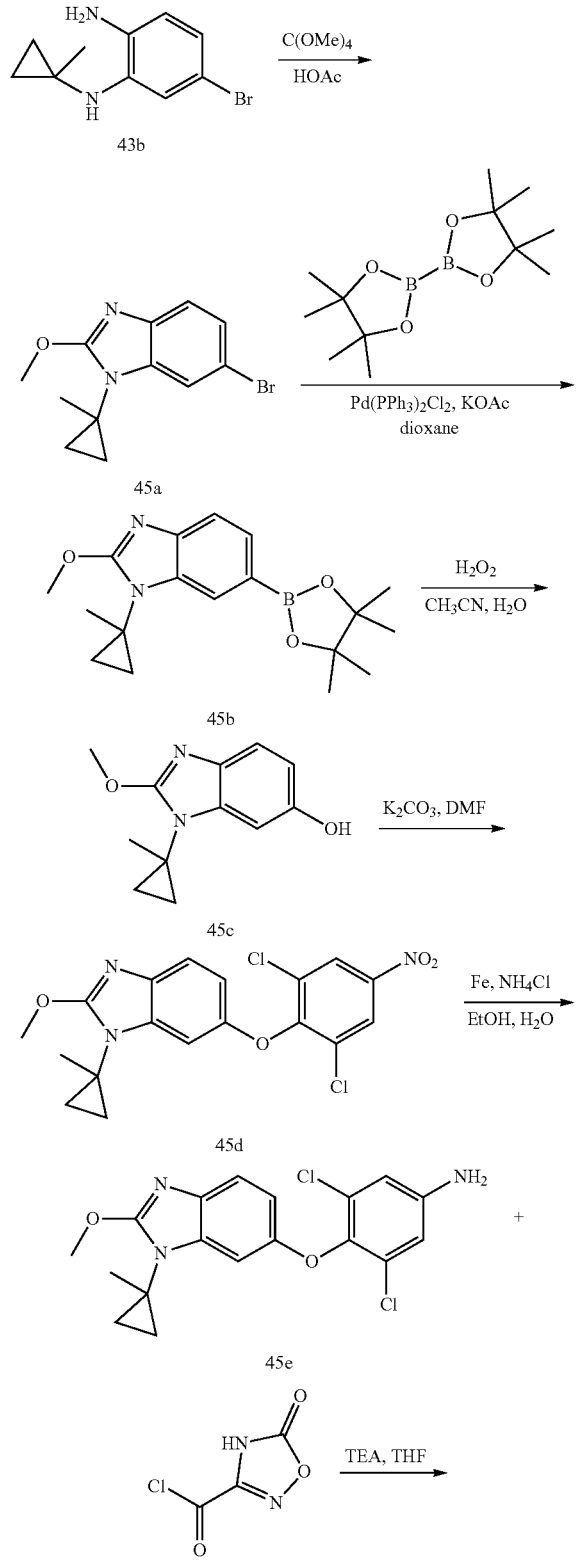

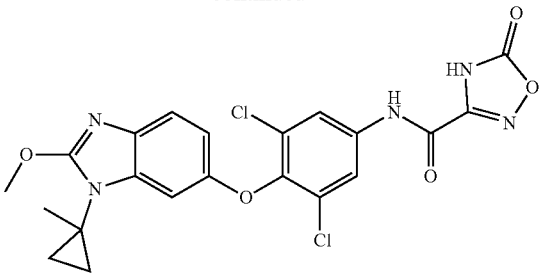 [SMILES: COc1nc2ccc(Oc3c(Cl)cc(NC(=O)c4noc(=O)[nH]4)cc3Cl)cc2n1C1(C)CC1]

Example 45

Synthesis of 6-bromo-2-methoxy-1-(1-methylcyclopropyl)-1H-benzo[d]imidazole (45a). To a solution of 5-bromo-N1-(1-methylcyclopropyl)benzene-1,2-diamine (43b) (200 mg, 829.44 umol) in AcOH (5 mL) was added tetramethoxymethane (225.85 mg, 1.66 mmol). The mixture was stirred at 50° C. for 1 hour. LCMS and TLC showed 43b was consumed completely and one new spot was formed. The reaction mixture was concentrated under reduced pressure to remove AcOH. The residue was diluted with $H_2O$ (10 mL) and extracted with Ethyl acetate (30 mL*2). The combined organic layers were washed with brine (15 mL*3), dried with anhydrous $Na_2SO_4$, filtered and concentrated under reduced pressure to give a residue. The residue was purified by prep-TLC (Petroleum ether:Ethyl acetate) to give 45a. MS mass calculated for $[M+1]^+$ ($C_{12}H_{13}BrN_2O$) requires m/z 281.0, LCMS found m/z 281.0; T HNMR (400 MHz, $CD_3OD$) δ 1.01-1.19 (m, 4H), 1.45-1.50 (m, 3H), 4.15-4.19 (m, 3H), 7.24-7.33 (m, 2H), 7.53-7.58 (m, 1H).

Synthesis of 2-methoxy-1-(1-methylcyclopropyl)-6-(4,4,5,5-tetramethyl-1,3,2-dioxaborolan-2-yl)-1H-benzo[d]imidazole (45b). To a solution of 6-bromo-2-methoxy-1-(1-methylcyclopropyl)-1H-benzo[d]imidazole (45a) (210 mg, 746.94 umol) and BPD (569.03 mg, 2.24 mmol) in dioxane (5 mL) was added $Pd(PPh_3)_2Cl_2$ (52.43 mg, 74.69 umol) and KOAc (733.06 mg, 7.47 mmol) at 20° C. under $N_2$. The mixture was stirred at 90° C. for 4 hours. TLC and LCMS showed 45a was consumed completely and the desired MS was detected. The suspension was filtered through a pad of Celite and the pad cake was washed with Ethyl acetate (10 mL*3). The combined filtrates were concentrated in vacuum. The residue was diluted with $H_2O$ (10 mL) and extracted with Ethyl acetate (30 mL*2). The combined organic layers were washed with brine (15 mL*3), dried with anhydrous $Na_2SO_4$, filtered and concentrated under reduced pressure. The residue was purified by prep-TLC (Petroleum ether:Ethyl acetate) to give 45b. MS mass calculated for $[M+1]^+$ ($C_{18}H_{25}BN_2O_3$) requires m/z 329.2, LCMS found m/z 329.1; $^1$HNMR (400 MHz, $CD_3OD$) δ 1.05-1.11 (m, 2H), 1.17-1.22 (m, 13H), 1.23-1.26 (m, 2H), 1.35-1.40 (m, 14H), 1.48-1.52 (m, 4H), 4.19 (s, 3H), 4.76-4.94 (m, 1H), 7.39-7.43 (m, 1H), 7.42 (s, 1H), 7.55-7.59 (m, 1H), 7.80-7.82 (m, 1H).

Synthesis of 2-methoxy-1-(1-methylcyclopropyl)-1H-benzo[d]imidazol-6-ol (45c). To a mixture of 2-methoxy-1-(1-methylcyclopropyl)-6-(4,4,5,5-tetramethyl-1,3,2-dioxaborolan-2-yl)-1H-benzo[d]imidazole (45b) (205 mg, 624.59 umol) in $H_2O$ (1.5 mL) and $CH_3CN$ (3 mL) was added ammonium carbonate (49.38 mg, 624.59 umol, 51.43 uL) and $H_2O_2$ (141.62 mg, 1.25 mmol, 120.01 uL, 30% purity) under $N_2$. The mixture was stirred at 20° C. for 1 hour. LCMS indicated 45b was consumed completely and the desired MS was detected. The residue was poured into NaHSO$_3$ solution (30 mL) and stirred for 10 minutes. The aqueous phase was extracted with ethyl acetate (15 mL*3). The combined organic phase was washed with brine (10 mL*2), dried with anhydrous Na$_2$SO$_4$, filtered and concentrated in vacuum to give 45c. The crude product was used in the next step without further purification. MS mass calculated for [M+1]$^+$ (C$_{12}$H$_{14}$N$_2$O$_2$) requires m/z 219.1, LCMS found m/z 219.0; $^1$HNMR (400 MHz, CD$_3$OD) δ 7.20 (d, J=8.4 Hz, 1H), 6.83 (d, J=2.4 Hz, 1H), 6.63 (dd, J=8.6, 2.32 Hz, 1H), 4.12 (s, 3H), 1.46 (s, 3H), 1.11-1.17 (m, 3H), 0.98-1.04 (m, 2H).

Synthesis of 6-(2,6-dichloro-4-nitrophenoxy)-2-methoxy-1-(1-methylcyclopropyl)-1H-benzo[d]imidazole (45d). To a solution of 2-methoxy-1-(1-methylcyclopropyl)-1H-benzo[d]imidazol-6-ol (45c) (170 mg, 778.92 umol) and 1, 3-dichloro-2-fluoro-5-nitro-benzene (179.92 mg, 856.81 umol) in DMF (3 mL) was added K$_2$CO$_3$ (161.48 mg, 1.17 mmol) at 20° C. under N$_2$. The mixture was stirred at 20° C. for 1 hour. TLC and LCMS showed 45c was consumed completely and the desired MS was detected. The mixture was extracted with Ethyl acetate (30 mL*2) and H$_2$O (10 mL). The combined organic phase was washed with brine (10 mL*3), dried with anhydrous Na$_2$SO$_4$, filtered and concentrated in vacuum to give a residue. The residue was purified by prep-TLC (Petroleum ether:Ethyl acetate) to give 45d. MS mass calculated for [M+1]$^+$ (C$_{18}$H$_{15}$Cl$_2$N$_3$O$_4$) requires m/z 408.0, LCMS found m/z 408.0; $^1$HNMR (400 MHz, CD$_3$OD) δ 8.44-8.46 (m, 1H), 7.33 (d, J=8.6 Hz, 1H), 6.99 (d, J=2.4 Hz, 1H), 6.62 (dd, J=8.6, 2.6 Hz, 1H), 4.15-4.18 (m, 2H), 2.98-3.00 (m, 1H), 2.85-2.87 (m, 1H), 1.44-1.47 (m, 2H), 1.19-1.21 (m, 3H).

Synthesis of 3,5-dichloro-4-((2-methoxy-1-(1-methylcyclopropyl)-1H-benzo[d]imidazol-6-yl)oxy)aniline (45e). To a solution of 6-(2,6-dichloro-4-nitrophenoxy)-2-methoxy-1-(1-methylcyclopropyl)-1H-benzo[d]imidazole (45d) (170 mg, 416.43 umol) in EtOH (5 mL) and H$_2$O (1 mL) was added Fe (116.29 mg, 2.08 mmol) and NH$_4$Cl (111.37 mg, 2.08 mmol) at 25° C. Then the mixture was stirred at 80° C. for 1 hour. LCMS showed 45d was consumed completely and the desired MS was detected. The suspension was filtered through a pad of Celite and the pad cake was washed with EtOH (10 mL*3). The combined filtrates were extracted with Ethyl acetate (30 mL*2) and H$_2$O (10 mL). The combined organic phase was washed with brine (10 mL*3), dried with anhydrous Na$_2$SO$_4$, filtered and concentrated in vacuum to give 45e. The solid was used directly for the next step without further purification. MS mass calculated for [M+1]$^+$ (C$_{18}$H$_{17}$Cl$_2$N$_3$O$_2$) requires m/z 378.1, LCMS found m/z 378.1; $^1$HNMR (400 MHz, CD$_3$OD) δ 7.26-7.30 (m, 1H), 6.74-6.81 (m, 2H), 4.06-4.17 (m, 3H), 1.43 (s, 3H), 1.24 (s, 1H), 1.05-1.13 (m, 2H), 0.93-1.00 (m, 2H).

Synthesis of N-(3,5-dichloro-4-((2-methoxy-1-(1-methylcyclopropyl)-1H-benzo[d]imidazol-6-yl)oxy)phenyl)-5-oxo-4,5-dihydro-1,2,4-oxadiazole-3-carboxamide (Example 45). To a solution of 3,5-dichloro-4-((2-methoxy-1-(1-methylcyclopropyl)-1H-benzo[d]imidazol-6-yl)oxy)aniline (45e) (40 mg, 105.75 umol) and 5-oxo-4H-1,2,4-oxadiazole-3-carbonyl chloride (47.11 mg, 317.25 umol) in THF (4 mL) was added TEA (32.10 mg, 317.25 umol, 44.16 uL) at 25° C. Then the mixture was stirred at 25° C. for 0.5 hour. LCMS showed 45e was consumed completely and the desired MS was detected. The mixture was quenched with MeOH (5 mL*3) and stirred at 25° C. for 5 minutes. Then the mixture was concentrated in vacuum. The residue was purified by Prep-HPLC ((FA) column: Welch Xtimate C18 150*25 mm*5 um; mobile phase: [water (0.2% FA)-ACN]). And the obtained solution was diluted with NaHCO$_3$ (5 mL) and extracted with Ethyl acetate (15 mL*2). The combined organic layers were washed with brine (5 mL*3), dried with anhydrous Na$_2$SO$_4$, filtered and concentrated under reduced pressure to give Example 45. MS mass calculated for [M+1]$^+$ (C$_{21}$H$_{17}$Cl$_2$N$_5$O$_5$) requires m/z 490.1, LCMS found m/z 489.9; HNMR (400 MHz, DMSO-d$_6$) δ10.45-10.55 (m, 1H), 8.11-8.23 (m, 2H), 7.23-7.34 (m, 1H), 6.82-6.96 (m, 1H), 6.45-6.55 (m, 1H), 4.05-4.11 (m, 3H), 1.38 (s, 3H), 0.94-1.09 (m, 4H).

Example 46. 2-(3,5-dichloro-4-((2-methoxy-1-(1-methylcyclopropyl)-1H-benzo[d]imidazol-6-yl)oxy)phenyl)-3,5-dioxo-2,3,4,5-tetrahydro-1,2,4-triazine-6-carbonitrile

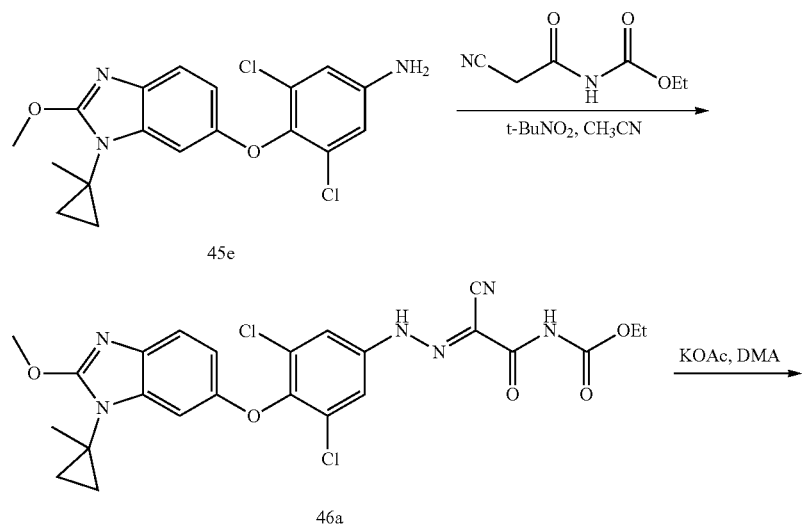

-continued

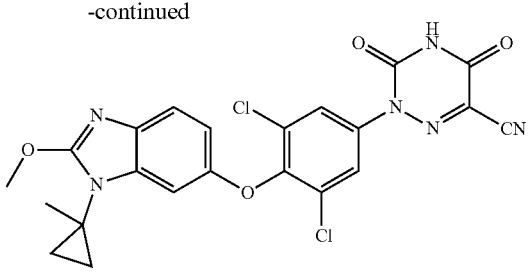

Example 46

Synthesis of (E)-ethyl (2-cyano-2-(2-(3,5-dichloro-4-((2-methoxy-1-(1-methylcyclopropyl)-1H-benzo[d]imidazol-6-yl)oxy)phenyl)hydrazono)acetyl)carbamate (46a). To a mixture of 3,5-dichloro-4-((2-methoxy-1-(1-methylcyclopropyl)-1H-benzo[d]imidazol-6-yl)oxy)aniline (45e) (10 mg, 26.44 umol) and ethyl N-(2-cyanoacetyl) carbamate (12.38 mg, 79.31 umol) in CH$_3$CN (1 mL) was added t-BuONO (8.18 mg, 79.31 umol, 9.43 uL) at 0° C. Then the mixture was stirred at 0° C. for 1 hour. LCMS showed 45e was consumed completely and the desired MS was detected. The mixture was quenched with MeOH (15 mL) and concentrated in vacuum to give 46a. The solid was used directly in the next step without further purification. MS mass calculated for [M+1]$^+$ (C$_{24}$H$_{22}$Cl$_2$N$_6$O$_5$) requires m/z 545.1, LCMS found m/z 545.1.

Synthesis of 2-(3,5-dichloro-4-((2-methoxy-1-(1-methylcyclopropyl)-1H-benzo[d]imidazol-6-yl)oxy)phenyl)-3,5-dioxo-2,3,4,5-tetrahydro-1,2,4-triazine-6-carbonitrile (Example 46). To a solution of (E)-ethyl (2-cyano-2-(2-(3,5-dichloro-4-((2-methoxy-1-(1-methylcyclopropyl)-1H-benzo[d]imidazol-6-yl)oxy)phenyl)hydrazono)acetyl)carbamate (46a) (14 mg, 25.67 umol) in DMA (2 mL) was added KOAc (5.04 mg, 51.34 umol). The mixture was stirred at 115° C. for 3 hours. LCMS showed 46a was consumed completely and the desired MS was detected. The mixture was diluted with MeOH (15 mL) and concentrated in vacuum to give a residue. The residue was purified by Prep-HPLC ((FA) column: Xtimate C18 100*30 mm*3 um; mobile phase: [water (0.2% FA)-ACN]). The obtained solution was diluted with NaHCO$_3$ (5 mL) and extracted with Ethyl acetate (15 mL*2). The combined organic layers were washed with brine (5 mL*3), dried with anhydrous Na$_2$SO$_4$, filtered and concentrated under reduced pressure to give Example 46. MS mass calculated for [M+1]$^+$ (C$_{22}$H$_{16}$Cl$_2$N$_6$O$_4$) requires m/z 499.1, LCMS found m/z 498.9; $^1$HNMR (400 MHz, DMSO-d$_6$) δ 7.80-7.86 (m, 2H), 7.30 (d, J=8.6 Hz, 1H), 6.94-6.99 (m, 1H), 6.46-6.53 (m, 1H), 4.05-4.13 (m, 3H), 1.40 (s, 3H), 1.03-1.08 (m, 2H), 0.98-1.02 (m, 2H).

Example 47. N-(3,5-dichloro-4-((3-(1-methylcyclopropyl)-2-oxo-2,3-dihydro-1H-benzo[d]imidazol-5-yl)oxy)phenyl)-5-oxo-4,5-dihydro-1,2,4-oxadiazole-3-carboxamide

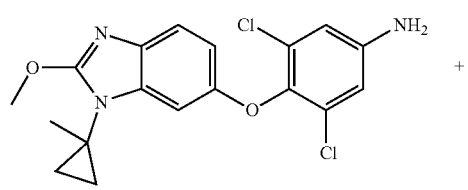

45e

-continued

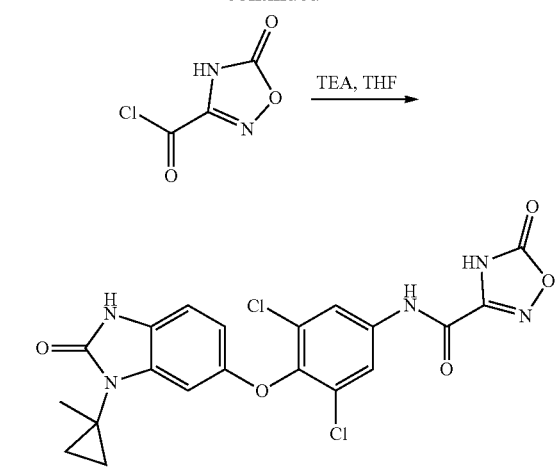

Example 47

Synthesis of N-(3,5-dichloro-4-((3-(1-methylcyclopropyl)-2-oxo-2,3-dihydro-1H-benzo[d]imidazol-5-yl)oxy)phenyl)-5-oxo-4,5-dihydro-1,2,4-oxadiazole-3-carboxamide (Example 47). To a solution of 3,5-dichloro-4-((2-methoxy-1-(1-methylcyclopropyl)-1H-benzo[d]imidazol-6-yl)oxy)aniline (45e) (30 mg, 79.31 umol) and 5-oxo-4H-1,2,4-oxadiazole-3-carbonyl chloride (35.33 mg, 237.94 umol) in THF (3 mL) was added TEA (24.08 mg, 237.94 umol, 33.12 uL) at 25° C. Then the mixture was stirred at 25° C. for 0.5 hour. LCMS showed 45e was consumed completely and the desired MS was detected. The mixture was quenched with MeOH (15 mL) and stirred at 25° C. for 5 minutes. Then the mixture was concentrated in vacuum to give a residue. The residue was purified by Prep-HPLC ((FA) column: Welch Xtimate C18 150*25 mm*5 um; mobile phase: [water (0.2% FA)-ACN]) to give Example 47. MS mass calculated for [M+1]$^+$ (C$_{20}$H$_{15}$Cl$_2$N$_5$O$_5$) requires m/z 476.0, LCMS found m/z 475.9; $^1$HNMR (400 MHz, DMSO-d$_6$) δ11.24-11.34 (m, 1H), 10.59-10.68 (m, 1H), 8.05 (s, 2H), 6.78-6.85 (m, 2H), 6.27 (dd, J=8.50, 2.51 Hz, 1H), 1.35 (s, 3H), 0.88-0.98 (m, 4H).

Example 48. 2-(3,5-dichloro-4-((3-(1-methylcyclopropyl)-2-oxo-2,3-dihydro-1H-benzo[d]imidazol-5-yl)oxy)phenyl)-3,5-dioxo-2,3,4,5-tetrahydro-1,2,4-triazine-6-carbonitrile

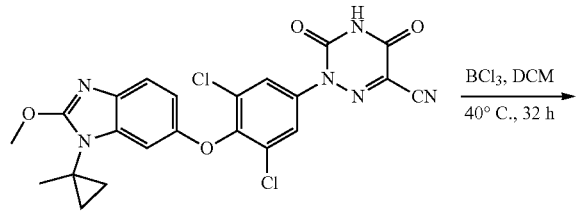

Example 46

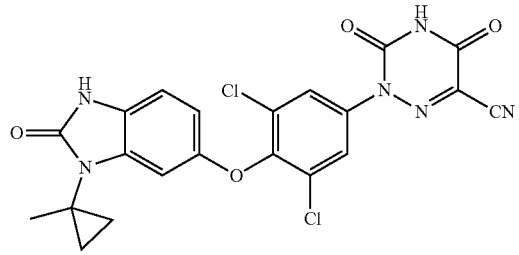 [SMILES: CC1(n2c(=O)[nH]c3ccc(Oc4c(Cl)cc(-n5nc(C#N)c(=O)[nH]c5=O)cc4Cl)cc32)CC1]

Example 48

Synthesis of 2-(3,5-dichloro-4-((3-(1-methylcyclopropyl)-2-oxo-2,3-dihydro-1H-benzo[d]imidazol-5-yl)oxy)phenyl)-3,5-dioxo-2,3,4,5-tetrahydro-1,2,4-triazine-6-carbonitrile (Example 48). To a solution of 2-(3,5-dichloro-4-((2-methoxy-1-(1-methylcyclopropyl)-1H-benzo[d]imidazol-6-yl)oxy)phenyl)-3,5-dioxo-2,3,4,5-tetrahydro-1,2,4-triazine-6-carbonitrile (Example 46) (28 mg, 56.08 umol) in DCM (2 mL) was added $BCl_3$/DCM (1 M, 112.16 ul, 112.16 umol). The mixture was stirred at 40° C. for 32 hours. LCMS and HPLC showed Example 46 was consumed and the desired MS was detected. The mixture was quenched by MeOH (5 mL*3) and then the mixture was concentrated in vacuum to give a residue. The residue was purified by Prep-HPLC (column: Welch Xtimate C18 150*25 mm*5 um; mobile phase: [water (0.2% FA)-ACN]) to give Example 48. MS mass calculated for $[M+1]^+$ ($C_{21}H_{14}Cl_2N_6O_4$) requires m/z 485.0, LCMS found m/z 485.0; 1H NMR (400 MHz, DMSO-$d_6$) δ 10.65-10.69 (m, 1H), 7.79-7.83 (m, 2H), 6.82-6.89 (m, 2H), 6.23-6.29 (m, 1H), 1.34-1.39 (m, 3H), 0.95-1.01 (m, 2H), 0.89-0.95 (m, 2H).

Example 49. 2-(4-((1-(tert-butyl)-2-methoxy-1H-benzo[d]imidazol-6-yl)oxy)-3,5-dichlorophenyl)-3,5-dioxo-2,3,4,5-tetrahydro-1,2,4-triazine-6-carbonitrile

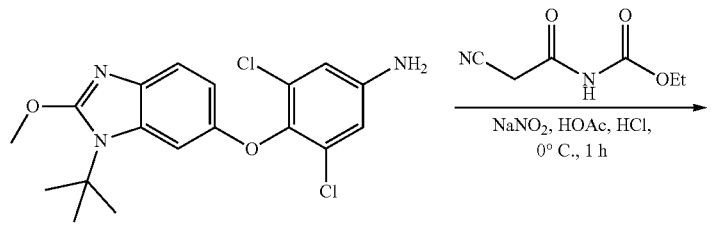

41e

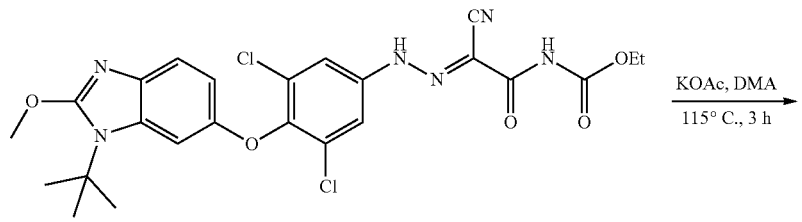

49a

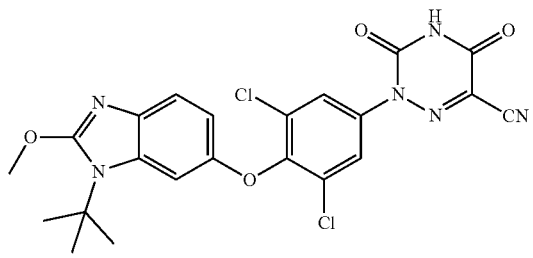 [SMILES: COc1nc2ccc(Oc3c(Cl)cc(-n4nc(C#N)c(=O)[nH]c4=O)cc3Cl)cc2n1C(C)(C)C]

Example 49

Synthesis of (E)-ethyl (2-(2-(4-((1-(tert-butyl)-2-methoxy-1H-benzo[d]imidazol-6-yl)oxy)-3,5-dichlorophenyl)hydrazono)-2-cyanoacetyl)carbamate (49a). To a solution of 4-((1-(tert-butyl)-2-methoxy-1H-benzo[d]imidazol-6-yl)oxy)-3,5-dichloroaniline (41e) (50 mg, 131.49 umol) in HOAc (3 mL) and H₂O (1.5 mL) was added ethyl (2-cyanoacetyl)carbamate (102.65 mg, 657.43 umol). Then HCl (1 M, 32.87 uL) was added to the mixture dropwise at 2-4° C. The mixture was stirred at 0° C. for 10 minutes. A solution of NaNO₂ (11.79 mg, 170.93 umol) in H₂O (1.5 mL) was added in the reaction mixture dropwise at 0° C. The solid in the mixture was consumed completely. Then the mixture was stirred at 0° C. for 1 hour. LCMS showed 41e was consumed completely. The reaction mixture was added in water (5 mL) and filtered. The filter cake was diluted with MeOH (10 mL) and concentrated under reduced pressure to give 49a. The crude product was used in the next step without further purification. MS mass calculated for [M+H]⁺ (C₂₄H₂₄Cl₂N₆O₅) requires m/z 547.1, LCMS found m/z 547.1.

Synthesis of 2-(4-((1-(tert-butyl)-2-methoxy-1H-benzo[d]imidazol-6-yl)oxy)-3,5-dichlorophenyl)-3,5-dioxo-2,3,4,5-tetrahydro-1,2,4-triazine-6-carbonitrile (Example 49). To a solution of (E)-ethyl (2-(2-(4-((1-(tert-butyl)-2-methoxy-1H-benzo[d]imidazol-6-yl)oxy)-3,5-dichlorophenyl)hydrazono)-2-cyanoacetyl)carbamate (49a) (50 mg, 91.34 umol) in DMA (5 mL) was added KOAc (17.93 mg, 182.69 umol). The mixture was stirred at 115° C. for 3 hours. LCMS showed 49a was consumed completely. The reaction mixture was diluted with water (5 mL) and extracted with Ethyl acetate (10 mL*3). The combined organic layers were washed with brine (10 mL), dried over Na₂SO₄, filtered and concentrated under reduced pressure to give a residue. The residue was purified by prep-HPLC (column: Xtimate C18 100*30 mm*3 um; mobile phase: [water (0.2% FA)-ACN]) to give Example 49. MS mass calculated for [M+H]⁺ (C₂₂H₁₈Cl₂N₆O₄) requires m/z 501.1, LCMS found m/z 501.0; ¹H NMR (400 MHz, DMSO-d₆) δ 7.81 (s, 2H), 7.30 (d, J=8.6 Hz, 1H), 7.23 (d, J=2.4 Hz, 1H), 6.48 (dd, J=2.4, 8.6 Hz, 1H), 4.07 (s, 3H), 3.33 (s, 72H), 1.66-1.70 (m, 9H).

Example 50. 2-(4-((3-(tert-butyl)-2-oxo-2,3-dihydro-1H-benzo[d]imidazol-5-yl)oxy)-3,5-dichlorophenyl)-3,5-dioxo-2,3,4,5-tetrahydro-1,2,4-triazine-6-carbonitrile

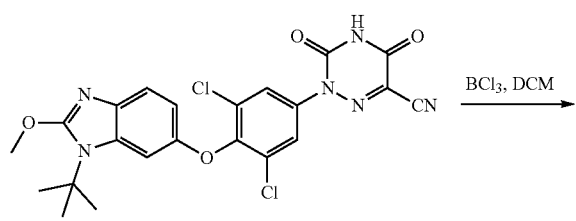

Example 49

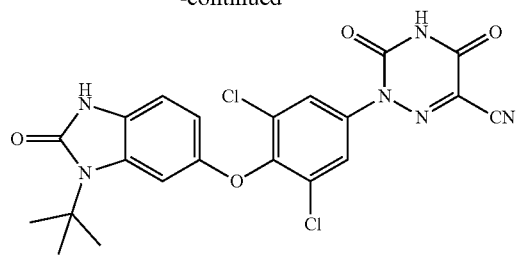

Example 50

Synthesis of 2-(4-((3-(tert-butyl)-2-oxo-2,3-dihydro-1H-benzo[d]imidazol-5-yl)oxy)-3,5-dichlorophenyl)-3,5-dioxo-2,3,4,5-tetrahydro-1,2,4-triazine-6-carbonitrile (Example 50). A mixture of 2-(4-((1-(tert-butyl)-2-methoxy-1H-benzo[d]imidazol-6-yl)oxy)-3,5-dichlorophenyl)-3,5-dioxo-2,3,4,5-tetrahydro-1,2,4-triazine-6-carbonitrile (Example 49) (10 mg, 19.95 umol) in DCM (3 mL) was added BCl₃ (4.67 mg, 39.89 umol, 5.19 uL), then degassed and purged with N₂ 3 times, and then the mixture was stirred at 40° C. for 24 hours under N₂ atmosphere. LCMS showed the reaction was completed and the desired MS was detected. The reaction mixture was quenched by addition MeOH (2 mL) at 20° C., and then concentrated under reduced pressure. The residue was purified by prep-HPLC (column: Waters Xbridge BEH C18 100*30 mm*10 um; mobile phase: [water (10 mM NH₄HCO₃)-ACN]) to give Example 50. MS mass calculated for [M+1]⁺ (C₂₁H₁₆Cl₂N₆O₄) requires m/z 487.1, LCMS found m/z 487.0; ¹H NMR (400 MHz, CD₃OD) δ 7.77 (s, 2H), 7.12 (d, J=2.2 Hz, 1H), 6.91 (d, J=8.6 Hz, 1H), 6.44 (dd, J=8.4, 2.0 Hz, 1H), 1.73-1.77 (m, 9H).

Example 51. N-(3,5-dichloro-4-((4-cyclopropylquinolin-6-yl)oxy)phenyl)-5-oxo-4,5-dihydro-1,2,4-oxadiazole-3-carboxamide

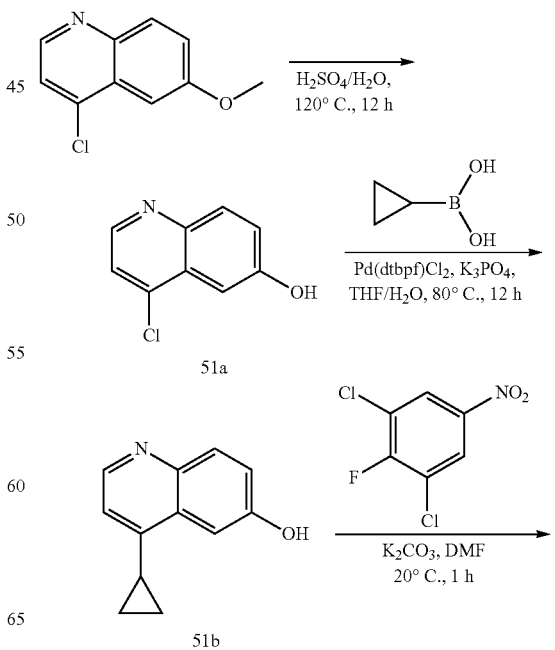

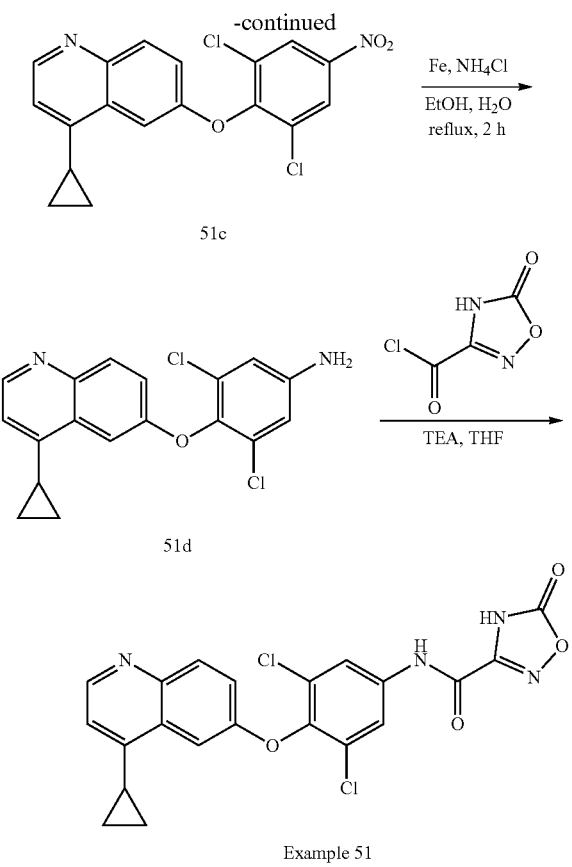

Example 51

Synthesis of 4-chloroquinolin-6-ol (51a). A solution of 4-chloro-6-methoxyquinoline (1 g, 5.16 mmol) in $H_2SO_4$ (4 mL) and $H_2O$ (4 mL) was stirred at 120° C. for 12 hours. LCMS showed the starting material was consumed completely and one main peak with the desired mass was detected. The mixture was adjusted to pH=9 with ammonium hydroxide. Then the mixture was filtered, the filter cake was washed with $H_2O$ (10 mL*3), and dried in vacuum to give 51a. $^1$H NMR (400 MHz, $CD_3OD$) δ 8.52 (d, J=4.6 Hz, 1H), 7.93 (d, J=9.2 Hz, 1H), 7.57 (d, J=4.8 Hz, 1H), 7.48 (d, J=2.6 Hz, 1H), 7.41 (dd, J=9.0, 2.65 Hz, 1H).

Synthesis of 4-cyclopropylquinolin-6-ol (51b). To a solution of 4-chloroquinolin-6-ol (51a) (200 mg, 1.11 mmol) in THF (4 mL) and $H_2O$ (1 mL) was added cyclopropylboronic acid (114.78 mg, 1.34 mmol), $K_3PO_4$ (472.75 mg, 2.23 mmol), and Pd (dtbpf)$Cl_2$ (72.58 mg, 111.36 umol) under $N_2$. The mixture was stirred at 80° C. for 12 hours. TLC and LCMS indicated 51a was consumed completely and one main peak with the desired mass was detected. The suspension was filtered through a pad of Celite and the pad cake was washed with EtOAc (10 mL*3). The filtration was extracted with EtOAc (10 mL*3) and $H_2O$ (5 mL). The combined organic layers were washed with brine (5 mL), dried over anhydrous $Na_2SO_4$, filtered and concentrated under reduced pressure. The residue was purified by prep-TLC ($SiO_2$, Petroleum ether:Ethyl acetate) to give 51b. MS mass calculated for [M+1]$^+$ ($C_{12}H_{11}NO$) requires m/z 186.1, MS found m/z 186.0; $^1$H NMR (400 MHz, $CDCl_3$) δ 9.58 (br s, 1H), 8.64 (d, J=4.6 Hz, 1H), 7.99 (d, J=9.0 Hz, 1H), 7.70 (d, 2.6 Hz, 1H), 7.35 (dd, J=9.0, 2.6 Hz, 1H), 7.04 (d, J=4.6 Hz, 1H), 2.21-2.32 (m, 1H), 1.05-1.15 (m, 2H), 0.77-0.89 (m, 2H).

Synthesis of 4-cyclopropyl-6-(2,6-dichloro-4-nitrophenoxy)quinoline (51c). To a solution of 4-cyclopropylquinolin-6-ol (51b) (80 mg, 431.92 umol) in DMF (2 mL) was added 1,3-dichloro-2-fluoro-5-nitrobenzene (99.77 mg, 475.11 umol) and $K_2CO_3$ (119.39 mg, 863.83 umol). The mixture was stirred at 20° C. for 1 hour. TLC indicated 51b was consumed completely and one new spot formed. The reaction mixture was diluted with EtOAc (10 mL) and $H_2O$ (10 mL) and extracted with EtOAc (10 mL*3). The combined organic layers were washed with brine (5 mL), dried over anhydrous $Na_2SO_4$, filtered and concentrated under reduced pressure. The residue was purified by prep-TLC ($SiO_2$, Petroleum ether:Ethyl acetate) to give 51c. MS mass calculated for [M+1]$^+$ ($C_{18}H_{12}Cl_2N_2O_3$) requires m/z 375.0, MS found m/z 375.0; $^1$H NMR (400 MHz, $CDCl_3$) δ 8.74 (d, J=4.6 Hz, 1H), 8.38 (s, 2H), 8.12 (d, J=9.2 Hz, 1H), 7.55 (d, J=2.8 Hz, 1H), 7.38 (dd, J=9.2, 2.8 Hz, 1H), 7.06 (d, J=4.6 Hz, 1H), 2.12-2.22 (m, 1H), 0.98-1.14 (m, 2H), 0.72-0.92 (m, 2H).

Synthesis of 3,5-dichloro-4-((4-cyclopropylquinolin-6-yl)oxy)aniline (51d). To a solution of 4-cyclopropyl-6-(2,6-dichloro-4-nitrophenoxy)quinoline (51c) (126 mg, 335.82 umol) in EtOH (2 mL) was added Fe (93.78 mg, 1.68 mmol) and a solution of $NH_4Cl$ (89.81 mg, 1.68 mmol) in $H_2O$ (0.1 mL). The mixture was stirred at 80° C. for 2 hours. TLC indicated 51c was consumed completely and one new spot formed. The residue mixture was diluted with MeOH (2 mL). The suspension was filtered through a pad of Celite and the pad cake was washed with EtOAc (10 mL*3). The filtration was concentrated under reduced pressure, and the residue was diluted with EtOAc (5 mL) and $H_2O$ (4 mL) and extracted with EtOAc (5 mL*3). The combined organic layers were washed with brine (5 mL), dried over anhydrous $Na_2SO_4$, filtered and concentrated under reduced pressure to give 51d. MS mass calculated for [M+1]$^+$ ($C_{18}H_{14}Cl_2N_2O$) requires m/z 345.0, LCMS found m/z 345.0; $^1$H NMR (400 MHz, $CDCl_3$) δ 8.61 (d, J=4.4 Hz, 1H), 8.00 (d, J=9.0 Hz, 1H), 7.49 (d, J=2.6 Hz, 1H), 7.30 (dd, J=9.2, 2.8 Hz, 1H), 7.26 (s, 1H), 6.89-6.98 (m, 1H), 6.68 (s, 2H), 2.08-2.20 (m, 1H), 0.95-1.09 (m, 2H), 0.68-0.79 (m, 2H).

Synthesis of N-(3,5-dichloro-4-((4-cyclopropylquinolin-6-yl)oxy)phenyl)-5-oxo-4,5-dihydro-1,2,4-oxadiazole-3-carboxamide (Example 51). To a solution of 4-cyclopropyl-6-(2,6-dichloro-4-nitrophenoxy)quinoline (51d) (20 mg, 57.93 umol) in THF (2 mL) was added TEA (17.59 mg, 173.80 umol, 24.19 uL) and a solution of 5-oxo-4,5-dihydro-1,2,4-oxadiazole-3-carbonyl chloride (12.91 mg, 86.90 umol) in THF under $N_2$. The mixture was stirred at 20° C. for 0.5 hours. TLC and LCMS showed 51d was consumed completely and one main peak with the desired mass was detected. The reaction mixture was quenched by addition $H_2O$ (0.1 mL). The reaction mixture was concentrated under reduced pressure to remove solvent until a solid was formed. The residue mixture was filtered and the filter cake was washed with $H_2O$ (5 mL*3), and dried in vacuum to give Example 51. MS mass calculated for [M+1]$^+$ ($C_{21}H_{14}Cl_2N_4O_4$) requires m/z 457.0 MS found m/z 457.0; $^1$H NMR (400 MHz, DMSO-$d_6$) δ 11.43 (br s, 1H), 8.88 (br s, 1H), 8.19 (br d, J=9.2 Hz, 1H), 8.13 (s, 2H), 7.81 (br s, 1H), 7.63 (br d, J=9.6 Hz, 1H), 7.36 (br s, 1H), 1.24 (br s, 2H), 1.00 (br s, 2H).

Example 52. 2-(3,5-dichloro-4-((4-cyclopropylquinolin-6-yl)oxy)phenyl)-3,5-dioxo-2,3,4,5-tetrahydro-1,2,4-triazine-6-carbonitrile

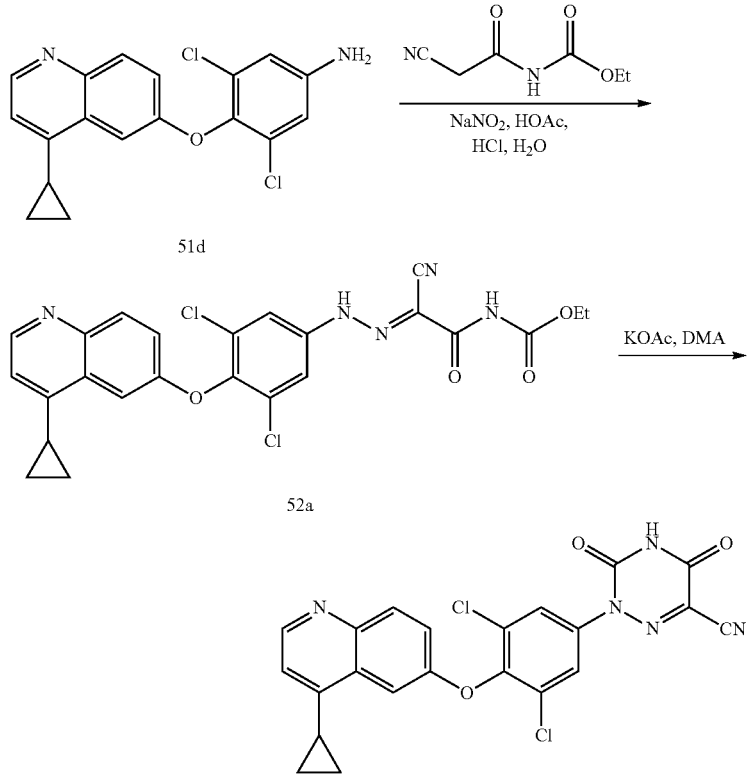

Example 52

Synthesis of (E)-ethyl (2-cyano-2-(2-(3,5-dichloro-4-((4-cyclopropylquinolin-6-yl)oxy)phenyl)hydrazono)acetyl)carbamate (52a). To a solution of 3,5-dichloro-4-((4-cyclopropylquinolin-6-yl)oxy)aniline (51d) (20 mg, 57.93 umol) in HOAc (1 mL) and $H_2O$ (0.5 mL) was added ethyl (2-cyanoacetyl)carbamate (13.57 mg, 86.90 umol) and HCl (1 M, 14.48 uL) at 0° C. The mixture was stirred at 0° C. for 10 minutes. Then $NaNO_2$ (19.99 mg, 289.67 umol) was added. The mixture was stirred at 0° C. for 1 hour. LCMS showed 51d was consumed completely and one main peak with the desired mass was detected. To the reaction mixture was added $H_2O$ (5 mL). The mixture was filtered. The filter cake was washed with $H_2O$ (5 mL*2) and dried in vacuum to give 52a. MS mass calculated for $[M+1]^+$ ($C_{24}H_{19}Cl_2N_5O_4$) requires m/z 512.0, LCMS found m/z 512.0; $^1H$ NMR (400 MHz, $CD_3OD$) δ 8.67 (d, J=4.8 Hz, 1H), 8.07 (d, J=9.0 Hz, 1H), 7.91 (s, 2H), 7.62 (d, J=2.6 Hz, 1H), 7.55 (dd, J=9.2, 2.6 Hz, 1H), 7.24 (d, J=4.8 Hz, 1H), 4.24-4.32 (m, 2H), 2.27-2.35 (m, 1H), 1.28-1.41 (m, 3H), 1.12-1.23 (m, 2H), 0.87-0.93 (m, 2H).

Synthesis of 2-(3,5-dichloro-4-((4-cyclopropylquinolin-6-yl)oxy)phenyl)-3,5-dioxo-2,3,4,5-tetrahydro-1,2,4-triazine-6-carbonitrile (Example 52). To a solution of (E)-ethyl (2-cyano-2-(2-(3,5-dichloro-4-((4-cyclopropylquinolin-6-yl)oxy)phenyl)hydrazono)acetyl)carbamate (52a) (30 mg, 58.55 umol) in DMA (2 mL) was added KOAc (11.49 mg, 117.11 umol). The mixture was stirred at 115° C. for 3 hours. LCMS showed 52a was consumed completely and one peak with the desired mass was detected. The reaction mixture was filtered. The mixture was purified by prep-HPLC (column: Phenomenex Luna C18 200*40 mm*10 um; mobile phase: [water (0.2% FA)-ACN]) to give Example 52. MS mass calculated for $[M+1]^+$ ($C_{22}H_{13}Cl_2N_5O_3$) requires m/z 466.0, LCMS found m/z 466.3; $^1H$ NMR (400 MHz, DMSO-$d_6$) δ 8.69 (d, J=4.4 Hz, 1H), 8.05 (d, J=9.2 Hz, 1H), 7.88 (s, 2H), 7.67 (d, J=2.8 Hz, 1H), 7.43 (dd, J=9.2, 2.8 Hz, 1H), 7.16 (d, J=4.6 Hz, 1H), 2.34-2.39 (m, 1H), 1.02-1.15 (m, 2H), 0.76-0.84 (m, 2H).

Example 53. N-(3,5-dichloro-4-((1-(1-(trifluoromethyl)cyclopropyl)-1H-benzo[d]imidazol-6-yl)oxy)phenyl)-5-oxo-4,5-dihydro-1,2,4-oxadiazole-3-carboxamide

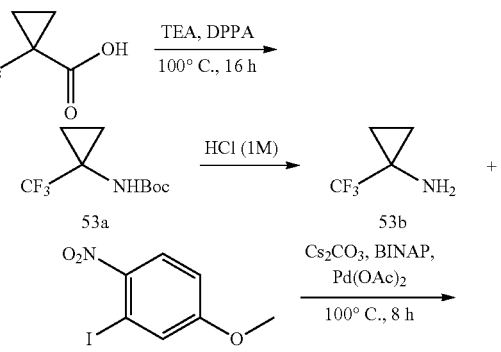

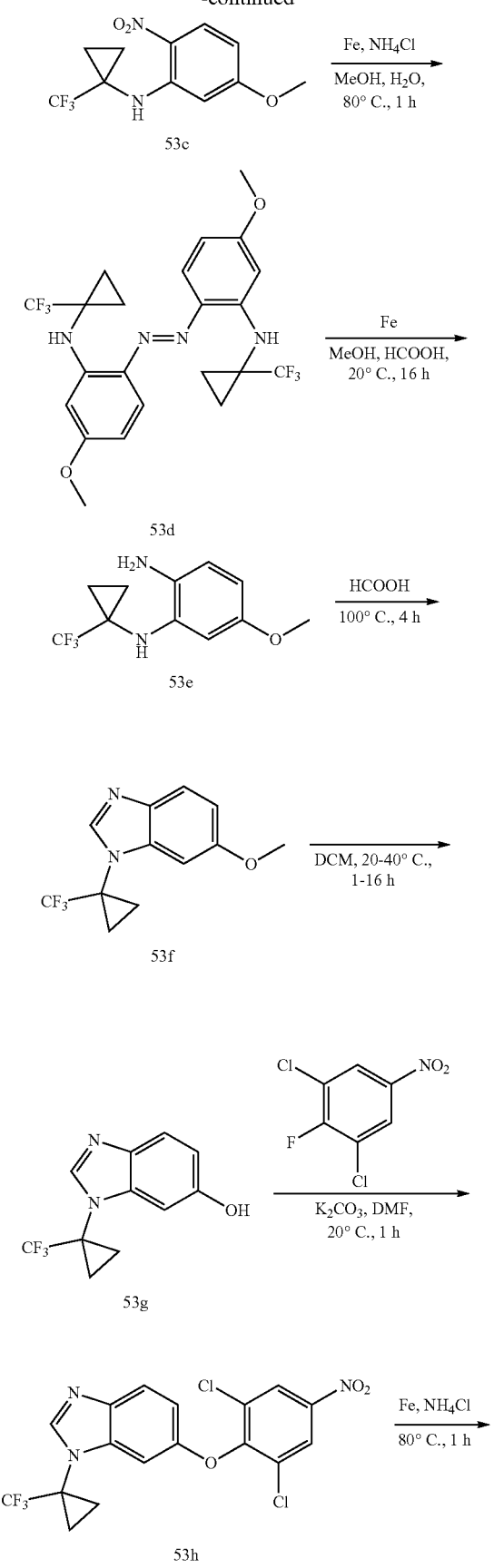

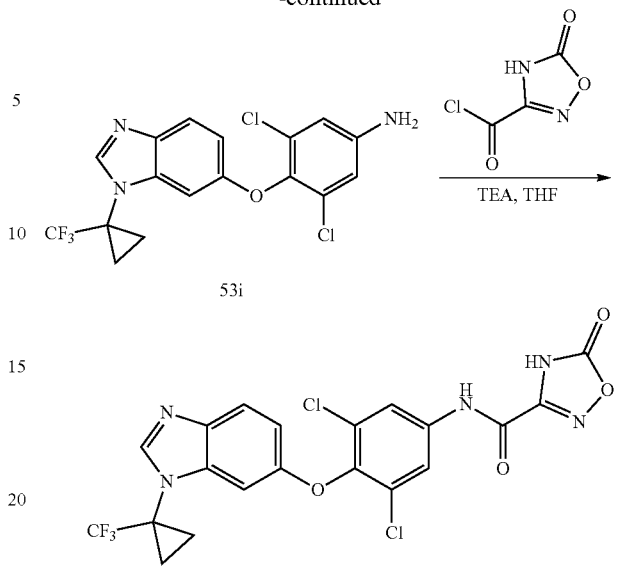

Example 53

Synthesis of Tert-butyl (1-(trifluoromethyl)cyclopropyl) carbamate (53a). To a solution of 1-(trifluoromethyl)cyclopropanecarboxylic acid (2.11 g, 13.69 mmol) and TEA (1.39 g, 13.69 mmol, 1.91 mL) in t-BuOH (25 mL) was added DPPA (4.15 g, 15.06 mmol, 3.26 mL) at 25° C. dropwise. After addition, the resulting mixture was stirred at 100° C. for 18 hours. TLC indicated the starting material was consumed completely and one new spot was formed. The reaction mixture was concentrated under reduced pressure. The residue was diluted with water (10 mL) and extracted with Ethyl acetate (10 mL*3). The combined organic layers were washed with 5% citric acid (10 mL), saturated aqueous $NaHCO_3$ (10 mL), and brine (10 mL), dried over anhydrous $Na_2SO_4$, filtered and concentrated under reduced pressure. The residue was purified by column chromatography ($SiO_2$, Petroleum ether:Ethyl acetate) to give 53a. $^1$H NMR (400 MHz, DMSO) δ 7.81 (br s, 1H), 1.38 (s, 9H), 1.13-1.20 (m, 2H), 0.99 (br s, 2H).

Synthesis of 1-(trifluoromethyl)cyclopropanamine (53b). A mixture of tert-butyl (1-(trifluoromethyl)cyclopropyl)carbamate (53a) (3 g, 13.32 mmol) and HCl (1 M, 66.61 mL) was degassed and purged with $N_2$ 3 times, and then the mixture was stirred at 100° C. for 2 hours under $N_2$ atmosphere. TLC indicated 53a was consumed completely. The reaction mixture was concentrated under reduced pressure. The crude product was triturated with dry ethyl acetate (10 mL) at 20° C. for 10 min, and filtrated to give 53b. $^1$H NMR (400 MHz, DMSO) δ ppm 9.58 (br s, 2H), 1.38-1.45 (m, 2H), 1.27-1.33 (m, 2H).

Synthesis of 5-methoxy-2-nitro-N-(1-(trifluoromethyl) cyclopropyl)aniline (53c). A mixture of 1-(trifluoromethyl) cyclopropanamine (53b) (926.37 mg, 5.73 mmol, HCl), 2-iodo-4-methoxy-1-nitrobenzene (400 mg, 1.43 mmol), $Pd(OAc)_2$ (32.18 mg, 143.35 umol), BINAP (178.52 mg, 286.71 umol) and $Cs_2CO_3$ (2.80 g, 8.60 mmol) in tol. (15 mL) was degassed and purged with $N_2$ 3 times, and then the mixture was stirred at 100° C. for 8 hours under $N_2$ atmosphere. TLC and LCMS indicated one main peak with the desired MS was formed. The suspension was filtered through a pad of Celite and the pad cake was washed with Ethyl acetate (5 mL*3). The combined filtrates were concentrated in vacuum. The residue was purified by column chromatography (SiO$_2$, Petroleum ether:Ethyl acetate) to give 53c. MS mass calculated for [M+H]$^+$ (C$_{11}$H$_{11}$F3N$_2$O$_3$) requires m/z, 277.1, LCMS found m/z 277.1; $^1$H NMR (400 MHz, CDCl$_3$) δ 8.56 (br s, 1H), 8.17 (d, J=9.6 Hz, 1H), 6.64 (d, J=1.4 Hz, 1H), 6.38 (dd, J=2.5, 9.6 Hz, 1H), 3.89 (s, 3H), 1.49-1.55 (m, 2H), 1.20 (br s, 2H).

Synthesis of (E)-6,6'-(diazene-1,2-diyl)bis(3-methoxy-N-(1-(trifluoromethyl)cyclopropyl)aniline) (53d). A mixture of 5-methoxy-2-nitro-N-(1-(trifluoromethyl)cyclopropyl)aniline (53c) (325 mg, 1.18 mmol), Fe (328.58 mg, 5.88 mmol), and NH$_4$Cl (314.69 mg, 5.88 mmol) in H$_2$O (1 mL) and MeOH (5 mL) was degassed and purged with N$_2$ 3 times, and then the mixture was stirred at 80° C. for 1 hour under N$_2$ atmosphere. TLC indicated 53c was consumed completely and one new spot formed. The suspension was filtered through a pad of Celite and the pad cake was washed with MeOH (5 mL*2). The combined filtrates were concentrated to dryness, and then diluted with water (10 mL) and extracted with MTBE (10 mL*2). The combined organic layers were washed with brine 10 mL, dried over anhydrous Na$_2$SO$_4$, filtered and concentrated under reduced pressure to give 53d. The mixture was used in the next step without further purification. MS mass calculated for [M+H]$^+$ (C$_{22}$H$_{22}$F6N$_4$O$_2$) requires m/z 489.2, LCMS found m/z 489.1.

Synthesis of 5-methoxy-N1-(1-(trifluoromethyl)cyclopropyl)benzene-1,2-diamine (53e). A mixture of (E)-6,6'-(diazene-1,2-diyl)bis(3-methoxy-N-(1-(trifluoromethyl)cyclopropyl)aniline) (53d) (193 mg, 395.15 umol) and Fe (110.34 mg, 1.98 mmol) in HCOOH (0.2 mL) and MeOH (2 mL) was degassed and purged with N$_2$ 3 times, and then the mixture was stirred at 20° C. for 16 hours under N$_2$ atmosphere. LCMS showed one main peak with the desired MS. The suspension was filtered through a pad of Celite and the pad cake was washed with MeOH (5 mL*2). The combined filtrates were concentrated to dryness to give 53e. The residue was used in the next step without further purification. MS mass calculated for [M+H]$^+$ (C$_{11}$H$_{13}$F3N$_2$O) requires m/z 247.1, LCMS found m/z 247.1.

Synthesis of 6-methoxy-1-(1-(trifluoromethyl)cyclopropyl)-1H-benzo[d]imidazole (53f). A mixture of 5-methoxy-N1-(1-(trifluoromethyl)cyclopropyl)benzene-1,2-diamine (53e) (215 mg, 873.17 umol) in HCOOH (3 mL) was degassed and purged with N$_2$ 3 times, and then the mixture was stirred at 70° C. for 4 hours under N$_2$ atmosphere. LCMS showed one main peak with the desired MS. The reaction mixture was concentrated under reduced pressure. Then diluted with saturated NaHCO$_3$ aq. (10 mL) and extracted with Ethyl acetate (10 mL*2). The combined organic layers were washed with brine (10 mL), dried over anhydrous Na$_2$SO$_4$, filtered and concentrated under reduced pressure. The residue was purified by prep-TLC (SiO$_2$, Ethyl acetate:Petroleum ether) to give 53f. MS mass calculated for [M+H]$^+$ (C$_{12}$H$_{11}$F3N$_2$O) requires m/z 257.1, LCMS found m/z 257.1; $^1$H NMR (400 MHz, CDCl$_3$) δ 7.90 (s, 1H), 7.69 (d, J=9.0 Hz, 1H), 6.94-6.99 (m, 2H), 3.90 (s, 3H), 1.70-1.76 (m, 2H), 1.44-1.51 (m, 2H).

Synthesis of 1-(1-(trifluoromethyl)cyclopropyl)-1H-benzo[d]imidazol-6-ol (53g). To a solution of 6-methoxy-1-(1-(trifluoromethyl)cyclopropyl)-1H-benzo[d]imidazole (53f) (20 mg, 78.06 umol) in DCM (2 mL) was added BBr$_3$ (1 M, 234.17 uL) at 0° C. The mixture was stirred at 20° C. for 4 hours. LCMS showed 53f was consumed completely and one main peak with the desired MS. The reaction mixture was quenched with MeOH (3 mL) and concentrated. The residue was dissolved in Ethyl acetate (10 mL) and washed with brine (5 mL). The organic phase was dried Na$_2$SO$_4$, filtered and concentrated. The residue was purified by Prep-TLC (SiO$_2$, Ethyl acetate:Petroleum ether) to give 53g. MS mass calculated for [M+H]$^+$ (C$_{11}$H$_9$F3N$_2$O) requires m/z 243.1, LCMS found m/z 243.1.

Synthesis of 6-(2,6-dichloro-4-nitrophenoxy)-1-(1-(trifluoromethyl)cyclopropyl)-1H-benzo[d]imidazole (53h). To a solution of 1-(1-(trifluoromethyl)cyclopropyl)-1H-benzo[d]imidazol-6-ol (53g) (26 mg, 107.35 umol) and 1,3-dichloro-2-fluoro-5-nitrobenzene (23.67 mg, 112.72 umol) in DMF (3 mL) was added K$_2$CO$_3$ (22.26 mg, 161.03 umol). The mixture was stirred at 20° C. for 1 hour. TLC and LCMS indicated 53g was consumed completely and the desired MS was detected. The reaction mixture was diluted with water (10 mL) and extracted with Ethyl acetate (10 mL*2). The combined organic layers were washed with brine (10 mL), dried over anhydrous Na$_2$SO$_4$, filtered and concentrated under reduced pressure. The residue was purified by Prep-TLC (Ethyl acetate:Petroleum ether) to give 53h. MS mass calculated for [M+H]$^+$ (C$_{17}$H$_{10}$Cl$_2$F3N$_3$O$_3$) requires m/z 432.0, LCMS found m/z 432.0; $^1$H NMR (400 MHz, CDCl$_3$) δ 8.35 (s, 2H), 7.98 (s, 1H), 7.72 (d, J=8.8 Hz, 1H), 7.05 (d, J=2.0 Hz, 1H), 6.78 (dd, J=2.4, 8.8 Hz, 1H), 1.69-1.75 (m, 2H), 1.43-1.50 (m, 2H).

Synthesis of 3,5-dichloro-4-((1-(1-(trifluoromethyl)cyclopropyl)-1H-benzo[d]imidazol-6-yl)oxy)aniline (53i). A mixture of 6-(2,6-dichloro-4-nitrophenoxy)-1-(1-(trifluoromethyl)cyclopropyl)-1H-benzo[d]imidazole (53h) (40 mg, 92.55 umol), Fe (25.85 mg, 462.77 umol), and NH$_4$Cl (24.75 mg, 462.77 umol) in H$_2$O (0.6 mL) and EtOH (3 mL) was degassed and purged with N$_2$ 3 times, and then the mixture was stirred at 80° C. for 30 minutes under N$_2$ atmosphere. TLC indicated 53h was consumed completely and one new spot was formed. The suspension was filtered through a pad of Celite and the pad cake was washed with EtOH (5 mL*2). The combined filtrates were concentrated in vacuum, and the residue was diluted with water (10 mL) and extracted with Ethyl acetate (10 mL*2). The combined organic layers were washed with brine (10 mL), dried over anhydrous Na$_2$SO$_4$, filtered and concentrated under reduced pressure. The residue was purified by Prep-TLC (Ethyl acetate:Petroleum ethe) to give 53i. MS mass calculated for [M+H]$^+$ (C$_{17}$H$_{12}$Cl$_2$F3N$_3$O) requires m/z 402.0, LCMS found m/z 402.0.

Synthesis of N-(3,5-dichloro-4-((1-(1-(trifluoromethyl)cyclopropyl)-1H-benzo[d]imidazol-6-yl)oxy)phenyl)-5-oxo-4,5-dihydro-1,2,4-oxadiazole-3-carboxamide (Example 53). To a solution of 5-oxo-4H-1,2,4-oxadiazole-3-carbonyl chloride (7.20 mg, 48.48 umol) (1.5 M in THF, assume the previous step 100% yield) in THE (10 mL) was added dropwise a solution of TEA (16.35 mg, 161.61 umol, 22.49 uL) and 3,5-dichloro-4-((1-(1-(trifluoromethyl)cyclopropyl)-1H-benzo[d]imidazol-6-yl)oxy)aniline (53i) (13 mg, 32.32 umol) in THE (10 mL) at 20° C. over 10 minutes. After addition, the mixture was stirred at this temperature for 30 minutes. TLC (Petroleum ether:Ethyl acetate:AcOH=1: 1:0.05) showed 53i was consumed completely. LCMS showed one main peak with the desired MS was formed. The mixture was diluted with H$_2$O (10 mL) and extracted with Ethyl acetate (15 mL*2). The combined organic layers were washed with brine (10 mL*2), dried over anhydrous Na$_2$SO$_4$, filtered and concentrated under reduced pressure. The residue was purified by Prep-HPLC (column: Waters Xbridge BEH C18 100*30 mm*10 um; mobile phase: [water (10 mM NH$_4$HCO$_3$)-ACN]) to give Example 53. MS mass calculated for [M+H]$^+$ (C$_{20}$H$_{12}$Cl$_2$F3N$_5$O$_4$) requires m/z 514.0, LCMS found m/z 513.9; $^1$H NMR (400 MHz, DMSO) δ 10.69 (br s, 1H), 8.36 (s, 1H), 8.15 (s, 2H), 7.64 (br d, J=8.8 Hz, 1H), 7.03 (br s, 1H), 6.76 (br d, J=8.8 Hz, 1H), 1.72 (br s, 2H), 1.59 (br s, 2H).

Example 54. 2-(3,5-dichloro-4-((1-(1-(trifluoromethyl)cyclopropyl)-1H-benzo[d]imidazol-6-yl)oxy)phenyl)-3,5-dioxo-2,3,4,5-tetrahydro-1,2,4-triazine-6-carbonitrile

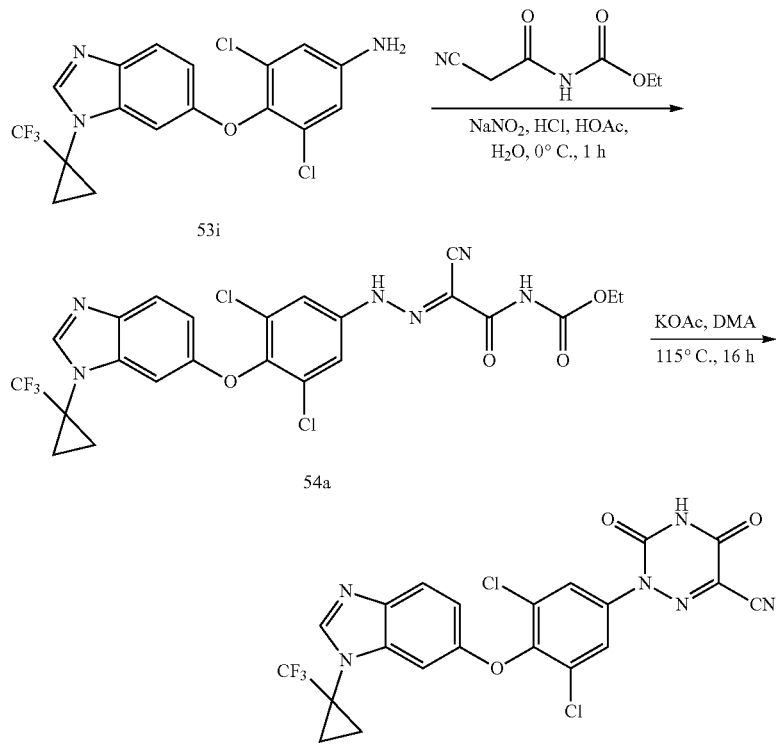

Example 54

Synthesis of (E)-ethyl (2-cyano-2-(2-(3,5-dichloro-4-((1-(1-(trifluoromethyl)cyclopropyl)-1H-benzo[d]imidazol-6-yl)oxy)phenyl)hydrazono)acetyl)carbamate (54a). To a solution of ethyl N-(2-cyanoacetyl)carbamate (34.94 mg, 223.77 umol) in HOAc (1 mL) and H$_2$O (0.5 mL) was added 3,5-dichloro-4-((1-(1-(trifluoromethyl)cyclopropyl)-1H-benzo[d]imidazol-6-yl)oxy)aniline (53i) (18 mg, 44.75 umol). Then HCl (1 M, 11.19 uL) was added dropwise at 2-4° C., and the mixture was stirred at 0° C. for 10 minutes. A solution of NaNO$_2$ (4.01 mg, 58.18 umol) in H$_2$O (0.5 mL) was added in the reaction mixture by dropwise at 0° C. The solid in the mixture was consumed completely. Then the mixture was stirred at 0° C. for 1 hour. LCMS showed 53i was consumed completely. To the reaction mixture was added water (5 mL) and the mixture was filtered. The filter cake was diluted with MeOH (10 mL) and concentrated under reduced pressure to give 54a. The crude product was used into the next step without further purification. MS mass calculated for [M+1]$^+$ (C$_{23}$H$_{17}$Cl$_2$F3N$_6$O$_4$) requires m/z 569.1, LCMS found m/z 569.0.

Synthesis of 2-(3,5-dichloro-4-((1-(1-(trifluoromethyl)cyclopropyl)-1H-benzo[d]imidazol-6-yl)oxy)phenyl)-3,5-dioxo-2,3,4,5-tetrahydro-1,2,4-triazine-6-carbonitrile (Example 54). To a solution of (E)-ethyl (2-cyano-2-(2-(3,5-dichloro-4-((1-(1-(trifluoromethyl)cyclopropyl)-1H-benzo[d]imidazol-6-yl)oxy)phenyl)hydrazono)acetyl) carbamate (54a) (20 mg, 35.13 umol) in DMA (3 mL) was added KOAc (10.34 mg, 105.39 umol). The mixture was stirred at 115° C. for 16 hours. LCMS showed 54a was consumed completely. The reaction mixture was concentrated under reduced pressure. The residue was diluted with MeOH (3 mL) and concentrated under reduced pressure. The residue was purified by prep-HPLC (column: Phenomenex Gemini-NX 150*30 mm*5 um; mobile phase: [water (0.2% FA)-ACN]) to give Example 54. MS mass calculated for [M+H]$^+$ (C$_{21}$H$_{11}$Cl$_2$F3N$_6$O$_3$) requires m/z 523.0, LCMS found m/z 523.0; $^1$H NMR (400 MHz, CD$_3$OD) δ 8.34 (s, 1H), 7.82 (s, 2H), 7.66 (br d, J=8.8 Hz, 1H), 7.09 (br s, 1H), 6.91 (dd, J=2.0, 8.8 Hz, 1H), 1.70-1.78 (m, 2H), 1.58 (br s, 2H).

Example 55. N-(3,5-dichloro-4-((1-(1-(difluoromethyl)cyclopropyl)-1H-benzo[d]imidazol-6-yl)oxy)phenyl)-5-oxo-4,5-dihydro-1,2,4-oxadiazole-3-carboxamide

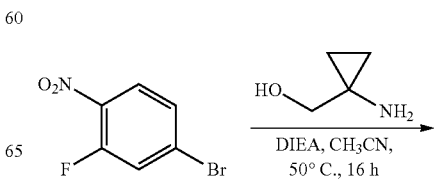

-continued

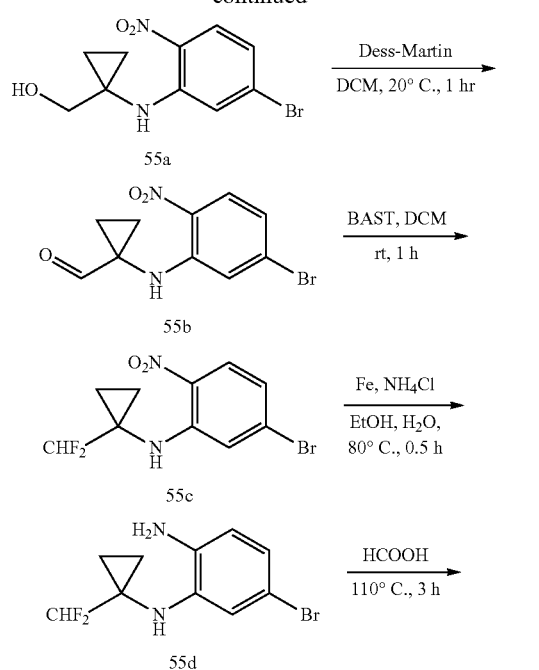

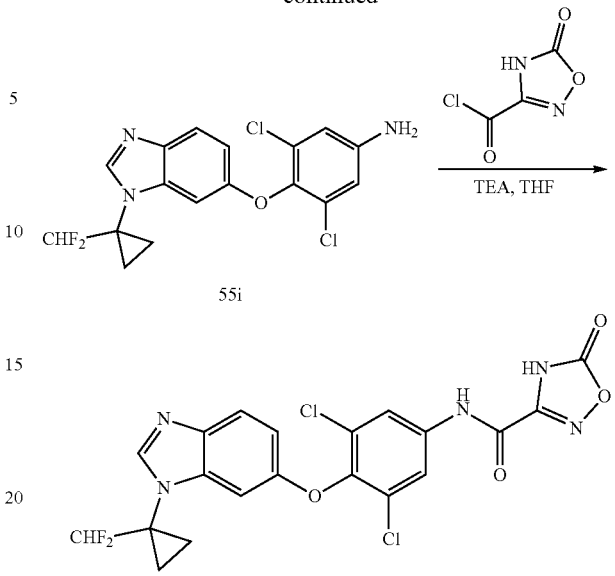

Example 55

Synthesis of (1-((5-bromo-2-nitrophenyl)amino)cyclopropyl)methanol (55a). To a solution of (1-aminocyclopropyl) methanol (359.52 mg, 2.91 mmol, HCl) in ACN (5 mL) was added 4-bromo-2-fluoro-1-nitrobenzene (320 mg, 1.45 mmol) and DIEA (939.97 mg, 7.27 mmol, 1.27 mL). The mixture was stirred at 50° C. for 16 hours. LCMS showed the reaction was completed and one main peak with the desired mass was formed. The reaction mixture was diluted with EtOAc (50 mL) and H₂O (20 mL), and extracted with EtOAc (20 mL*2). The combined organic layers were washed with brine (10 mL), dried over anhydrous Na₂SO₄, filtered and concentrated under reduced pressure to give 55a. MS mass calculated for [M+1]⁺ ($C_{10}H_{11}BrN_2O_3$) requires m/z 287.0, LCMS found m/z 287.1; ¹H NMR (400 MHz, CDCl₃) δ 8.35 (br s, 1H), 8.03 (d, J=9.0 Hz, 1H), 7.46 (d, J=1.8 Hz, 1H), 6.82 (dd, J=9.2, 2.0 Hz, 1H), 3.73 (s, 2H), 1.03-1.10 (m, 2H), 0.95-1.00 (m, 1H).

Synthesis of 1-((5-bromo-2-nitrophenyl)amino)cyclopropanecarbaldehyde (55b). To a solution of (1-((5-bromo-2-nitrophenyl)amino)cyclopropyl)methanol (55a) (880 mg, 3.07 mmol) in DCM (10 mL) was added Dess-Martin periodinane (1.43 g, 3.37 mmol). The mixture was stirred at 20° C. for 1 hour. TLC indicated 55a was consumed completely and one new spot was formed. The reaction mixture was quenched by addition saturated aqueous Na₂S₂O₃ (10 mL). The mixture was diluted with DCM (20 mL) and extracted with DCM (20 mL*3). The combined organic layers were washed with brine (10 mL), dried over anhydrous Na₂SO₄, filtered and concentrated under reduced pressure. The residue was purified by prep-TLC (SiO₂, Petroleum ether:Ethyl acetate) to give 55b. MS mass calculated for [M+1]⁺ ($C_{10}H9BrN_2O_3$) requires m/z 285.0, LCMS found m/z 285.0; ¹H NMR (400 MHz, CDCl₃) δ 9.26 (s, 1H), 8.37 (br s, 1H), 8.07 (d, J=9.0 Hz, 1H), 7.07 (d, J=2.0 Hz, 1H), 6.91 (dd, J=9.0, 2.0 Hz, 1H), 1.71-1.86 (m, 2H), 1.43-1.58 (m, 2H).

Synthesis of 5-bromo-N-(1-(difluoromethyl)cyclopropyl)-2-nitroaniline (55c). To a solution of 1-((5-bromo-2-nitrophenyl)amino)cyclopropanecarbaldehyde (55b) (970 mg, 3.40 mmol) in DCM (20 mL) was added BAST (1.51 g, 6.80 mmol, 1.49 mL). The mixture was stirred at 20° C. for 1 hour under $N_2$. TLC indicated 55b was remained and one new spot was formed. The reaction mixture was quenched by addition saturated aqueous $NaHCO_3$ (30 mL) and extracted with DCM (20 mL*3). The combined organic layers were washed with brine (5 mL), dried over anhydrous $Na_2SO_4$, filtered and concentrated under reduced pressure. The residue was purified by prep-TLC ($SiO_2$, Petroleum ether:Ethyl acetate) to give 55c. MS mass calculated for $[M+1]^+$ ($C_{10}H_9BrF_2N_2O_2$) requires m/z 307.0, LCMS found m/z 307.0; $^1$H NMR (400 MHz, $CDCl_3$) δ 8.33 (br s, 1H), 8.04 (d, J=9.0 Hz, 1H), 7.45 (s, 1H), 6.90 (dd, J=9.0, 2.0 Hz, 1H), 5.56-6.08 (m, 1H), 1.31-1.43 (m, 2H), 1.06-1.13 (m, 2H).

Synthesis of 5-bromo-N1-(1-(difluoromethyl)cyclopropyl)benzene-1,2-diamine (55d). A mixture of 5-bromo-N-(1-(difluoromethyl)cyclopropyl)-2-nitroaniline (55c) (180 mg, 586.15 umol), Fe (163.68 mg, 2.93 mmol) and $NH_4Cl$ (156.76 mg, 2.93 mmol) in $H_2O$ (1 mL) and MeOH (5 mL) was degassed and purged with $N_2$ 3 times, and then the mixture was stirred at 80° C. for 0.5 hour under $N_2$ atmosphere. TLC indicated 55c was consumed completely and one new spot was formed. The suspension was filtered through a pad of Celite and the pad cake was washed with MeOH (5 mL*2). The combined filtrates were concentrated in vacuum, and the residue diluted with water (10 mL) and extracted with MTBE (10 mL*2). The combined organic layers were washed with brine (10 mL), dried over anhydrous $Na_2SO_4$, filtered and concentrated under reduced pressure to give 55d.

Synthesis of 6-bromo-1-(1-(difluoromethyl)cyclopropyl)-1H-benzo[d]imidazole (55e). A mixture of 5-bromo-N1-(1-(difluoromethyl)cyclopropyl)benzene-1,2-diamine (55d) (60 mg, 216.52 umol) in HCOOH (2 mL) was stirred at 110° C. for 3 hours. LCMS showed 55d was consumed completely and one main peak with the desired mass was detected. The reaction mixture was concentrated under reduced pressure. The residue was extracted with EtOAc (10 mL*3) and $H_2O$ (10 mL). The combined organic layers were washed with brine (5 mL), dried over anhydrous $Na_2SO_4$, filtered and concentrated under reduced pressure to give 55e. MS mass calculated for $[M+1]^+$ ($C_{11}H_9BrF_2N_2$) requires m/z 287.0, LCMS found m/z 286.9; $^1$H NMR (400 MHz, $CDCl_3$) δ 7.97 (s, 1H), 7.66-7.71 (m, 2H), 7.43 (dd, J=8.6, 1.8 Hz, 1H), 5.61-6.05 (m, 1H), 1.54-1.62 (m, 2H), 1.38-1.44 (m, 2H).

Synthesis of 1-(1-(difluoromethyl)cyclopropyl)-6-(4,4,5,5-tetramethyl-1,3,2-dioxaborolan-2-yl)-1H-benzo[d]imidazole (55f). To a solution of 6-bromo-1-(1-(difluoromethyl)cyclopropyl)-1H-benzo[d]imidazole (55e) (30 mg, 104.49 umol) in dioxane (3 mL) was added BPD (79.60 mg, 313.48 umol), KOAc (51.28 mg, 522.46 umol) and $Pd(PPh_3)_2Cl_2$ (7.33 mg, 10.45 umol) under $N_2$. The mixture was stirred at 120° C. for 4 hours. TLC and LCMS showed 55e was consumed completely and one main peak with the desired mass was detected. The reaction mixture was extracted with EtOAc (10 mL*3) and $H_2O$ (10 mL). The combined organic layers were washed with brine (5 mL), dried over anhydrous $Na_2SO_4$, filtered and concentrated under reduced pressure. The residue was purified by prep-TLC ($SiO_2$, Ethyl acetate: Petroleum ether) to give 55f. MS mass calculated for $[M+1]^+$ ($C_{17}H_{21}BF_2N_2O_2$) requires m/z 335.2, LCMS found m/z 335.1; $^1$H NMR (400 MHz, $CD_3OD$) δ 8.32 (s, 1H), 8.05 (s, 1H), 7.67-7.72 (m, 2H), 5.77-6.12 (m, 1H), 1.57-1.63 (m, 2H), 1.48-1.54 (m, 2H), 1.38 (s, 12H).

Synthesis of 1-(1-(difluoromethyl)cyclopropyl)-1H-benzo[d]imidazol-6-ol (55g). To a solution of 1-(1-(difluoromethyl)cyclopropyl)-6-(4,4,5,5-tetramethyl-1,3,2-dioxaborolan-2-yl)-1H-benzo[d]imidazole (55f) (40 mg, 119.70 umol) in ACN (1 mL) was added a solution of $NH_4HCO_3$ (9.46 mg, 119.70 umol, 9.86 uL) in $H_2O$ (0.5 mL) and $H_2O_2$ (40.72 mg, 359.10 umol, 34.50 uL, 30% purity). The mixture was stirred at 20° C. for 1 hour under $N_2$ atmosphere. TLC showed 55f was consumed completely and one new spot was formed. The reaction mixture was quenched by addition saturated aqueous $Na_2S_2O_3$ (10 mL) at 0° C., and extracted with EtOAc (10 mL*2). The combined organic layers were washed with saturated aqueous $Na_2S_2O_3$ (10 mL*2), dried over with $Na_2SO_4$, filtered and concentrated under reduced pressure to give 55g. MS mass calculated for $[M+1]^+$ ($C_{11}H_{10}F_2N_2O$) requires m/z 225.1, LCMS found m/z 225.0.

Synthesis of 6-(2,6-dichloro-4-nitrophenoxy)-1-(1-(difluoromethyl)cyclopropyl)-1H-benzo[d]imidazole (55h). To a solution of 1-(1-(difluoromethyl)cyclopropyl)-1H-benzo[d]imidazol-6-ol (55g) (40 mg, 178.41 umol) in DMF (1 mL) was added $K_2CO_3$ (36.99 mg, 267.61 umol) and 1,3-dichloro-2-fluoro-5-nitrobenzene (37.46 mg, 178.41 umol) under $N_2$. The mixture was stirred at 80° C. for 2 hours. LCMS showed 55g was consumed completely and one main peak with the desired mass was detected. The residue was extracted with EtOAc (5 mL*3) and $H_2O$ (3 mL). The combined organic layers were washed with brine (5 mL), dried over anhydrous $Na_2SO_4$, filtered and concentrated under reduced pressure to give 55h. MS mass calculated for $[M+1]^+$ ($C_{17}H_{11}Cl_2F_2N_3O_3$) requires m/z 414.0, LCMS found m/z 414.0; $^1$H NMR (400 MHz, $CD_3OD$) δ 8.47 (s, 2H), 8.23 (s, 1H), 7.63 (d, J=8.8 Hz, 1H), 7.10 (s, 1H), 6.89 (dd, J=8.8, 2.2 Hz, 1H), 5.67-6.03 (m, 1H), 1.47-1.57 (m, 2H), 1.38-1.47 (m, 2H).

Synthesis of 3,5-dichloro-4-((1-(1-(difluoromethyl)cyclopropyl)-1H-benzo[d]imidazol-6-yl)oxy)aniline (55i). To a solution of 6-(2,6-dichloro-4-nitrophenoxy)-1-(1-(difluoromethyl)cyclopropyl)-1H-benzo[d]imidazole (55h) (30 mg, 72.43 umol) in EtOH (2 mL) was added Fe (20.23 mg, 362.15 umol) and a solution of $NH_4Cl$ (19.37 mg, 362.15 umol) in $H_2O$ (0.1 mL). The mixture was stirred at 80° C. for 1 hour. TLC indicated 55h was consumed completely and one new spot was formed. The reaction mixture was filtered, and the filtration was concentrated under reduced pressure to give 55i. MS mass calculated for $[M+1]^+$ ($C_{17}H_{13}Cl_2F_2N_3O$) requires m/z 384.0, LCMS found m/z 384.0; $^1$H NMR (400 MHz, $CD_3OD$) δ 8.16 (s, 1H), 7.57 (d, J=8.8 Hz, 1H), 6.93 (s, 1H), 6.86 (dd, J=8.8, 2.2 Hz, 1H), 6.77 (s, 2H), 5.67-6.01 (m, 1H), 1.50 (s, 2H), 1.35-1.45 (m, 2H).

Synthesis of N-(3,5-dichloro-4-((1-(1-(difluoromethyl)cyclopropyl)-1H-benzo[d]imidazol-6-yl)oxy)phenyl)-5-oxo-4,5-dihydro-1,2,4-oxadiazole-3-carboxamide (Example 55). To a solution of 3,5-dichloro-4-((1-(1-(difluoromethyl)cyclopropyl)-1H-benzo[d]imidazol-6-yl)oxy)aniline (55i) (20.06 mg, 135.05 umol) in DCM (2 mL) was added TEA (18.22 mg, 180.07 umol, 25.06 uL) and a solution of 5-oxo-4,5-dihydro-1,2,4-oxadiazole-3-carbonyl chloride (34.59 mg, 90.03 umol) in THF (1 mL). The mixture was stirred at 20° C. for 0.5 hour. LCMS showed 55i was consumed completely and one main peak with the desired mass was detected. The mixture was quenched by addition MeOH (0.5 mL) and concentrated in vacuum. The residue was purified by prep-HPLC (column: Phenomenex Luna C18 100*30 mm*5 um; mobile phase: [water (0.2% FA)-ACN]) to give Example 55. MS mass calculated for $[M+1]^+$ ($C_{20}H_{13}Cl_2F_2N_5O_4$) requires m/z 496.0, LCMS found m/z 496.0; $^1$H NMR (400 MHz, DMSO-$d_6$) δ 11.29 (s, 1H), 8.22 (s, 1H), 8.08 (s, 2H), 7.62 (d, J=8.8 Hz, 1H), 6.97 (d, J=2.2

Hz, 1H), 6.75 (dd, J=8.8, 2.4 Hz, 1H), 5.83-6.20 (m, 1H), 1.43-1.51 (m, 2H), 1.35-1.43 (m, 2H).

Example 56. 2-(3,5-dichloro-4-((1-(1-(difluoromethyl)cyclopropyl)-1H-benzo[d]imidazol-6-yl)oxy)phenyl)-3,5-dioxo-2,3,4,5-tetrahydro-1,2,4-triazine-6-carbonitrile completely and one main peak with the desired mass was detected. The reaction mixture was filtered. The filtration was purified by prep-HPLC (column: Welch Xtimate C18 150*25 mm*5 um; mobile phase: [water (0.2% FA)-ACN]) to give Example 56. MS mass calculated for [M+1]$^+$ ($C_{21}H_{12}Cl_2F2N_6O_3$) requires m/z 505.0, LCMS found m/z 505.1; $^1$H NMR (400 MHz, CD$_3$OD) δ ppm 8.21 (s, 1H),

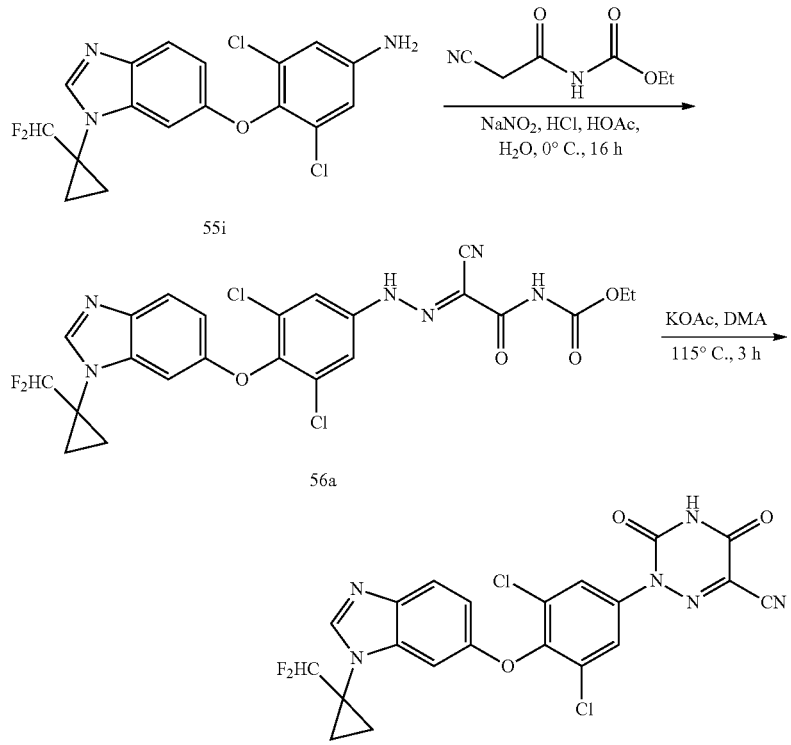

Synthesis of (E)-ethyl (2-cyano-2-(2-(3,5-dichloro-4-((1-(1-(difluoromethyl)cyclopropyl)-1H-benzo[d]imidazol-6-yl)oxy)phenyl)hydrazono)acetyl)carbamate (56a). To a solution of 3,5-dichloro-4-((1-(1-(difluoromethyl)cyclopropyl)-1H-benzo[d]imidazol-6-yl)oxy)aniline (55i) (10 mg, 26.03 umol) and ethyl (2-cyanoacetyl)carbamate (8.13 mg, 52.06 umol) in HOAc (1 mL) and H$_2$O (0.5 mL) was added HCl (1 M, 26.03 uL) and NaNO$_2$ (1.80 mg, 26.03 umol) at 0° C. The mixture was stirred at 0° C. for 1 hour. LCMS showed 55i was consumed completely and one main peak with the desired mass was detected. H$_2$O (3 mL) was added to the reaction mixture. Then the mixture was filtered and the filter cake was washed with H$_2$O (2 mL*3) and dried in vacuum to give 56a. MS mass calculated for [M+1]$^+$ ($C_{23}H_{18}Cl_2F2N_6O_4$) requires m/z 551.1 LCMS found m/z 551.1.

Synthesis of 2-(3,5-dichloro-4-((1-(1-(difluoromethyl)cyclopropyl)-1H-benzo[d]imidazol-6-yl)oxy)phenyl)-3,5-dioxo-2,3,4,5-tetrahydro-1,2,4-triazine-6-carbonitrile (Example 56). To a solution of (E)-ethyl (2-cyano-2-(2-(3,5-dichloro-4-((1-(1-(difluoromethyl)cyclopropyl)-1H-benzo[d]imidazol-6-yl)oxy)phenyl)hydrazono)acetyl)carbamate (56a) (15 mg, 27.21 umol) in DMA (1 mL) was added KOAc (13.35 mg, 136.03 umol) under N$_2$. The mixture was stirred at 115° C. for 3 hours. LCMS showed 56a was consumed 7.81 (s, 2H), 7.63 (d, J=9.0 Hz, 1H), 7.07 (d, J=2.2 Hz, 1H), 6.89 (dd, J=8.8, 2.45 Hz, 1H), 5.70-6.02 (m, 1H), 1.48-1.57 (m, 2H), 1.42 (br s, 2H).

Example 57. N-(3,5-dichloro-4-((3-(1-(difluoromethyl)cyclopropyl)-2-oxo-2,3-dihydro-1H-benzo[d]imidazol-5-yl)oxy)phenyl)-5-oxo-4,5-dihydro-1,2,4-oxadiazole-3-carboxamide

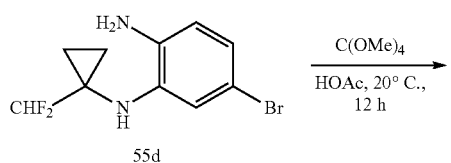

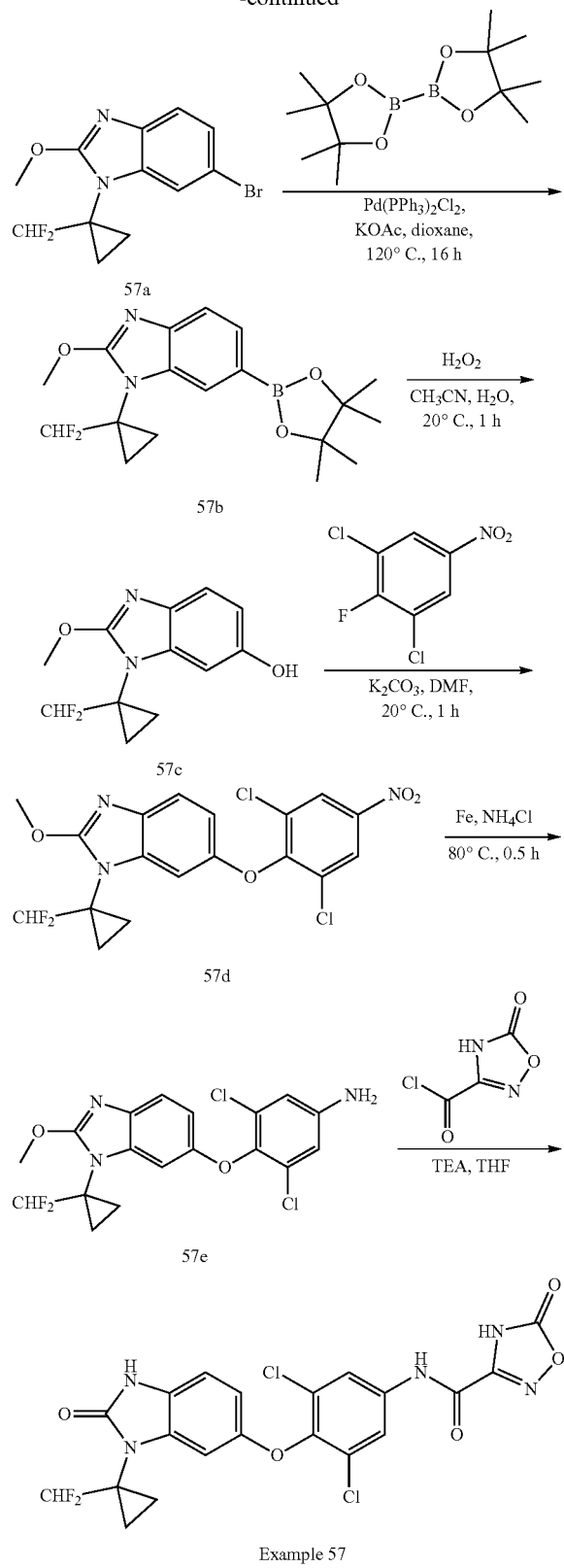

Example 57

Synthesis of 6-bromo-1-(1-(difluoromethyl)cyclopropyl)-2-methoxy-1H-benzo[d]imidazole (57a). To a solution of 5-bromo-N1-(1-(difluoromethyl)cyclopropyl)benzene-1,2-diamine (55d) (122 mg, 440.26 umol) in AcOH (3 mL) was added tetramethoxymethane (239.77 mg, 1.76 mmol). The mixture was stirred at 20° C. for 12 hours. TLC and LCMS showed 55d was consumed completely and the desired MS was detected. The reaction mixture was concentrated under reduced pressure to remove AcOH. The residue was diluted with saturated NaHCO₃ (10 mL) and extracted with EtOAc (10 mL*2). The combined organic layers were washed with brine (10 mL), dried over anhydrous Na₂SO₄, filtered and concentrated under reduced pressure. The residue was purified by Prep-TLC (SiO₂, Petroleum ether:Ethyl acetate) to give 57a. MS mass calculated for [M+1]⁺ ($C_{12}H_{11}BrF_2N_2O$) requires m/z 317.0, LCMS found m/z 317.1; ¹H NMR (400 MHz, CDCl₃) δ 7.46 (s, 1H), 7.39 (d, J=8.6 Hz, 2H), 7.32-7.28 (m, 1H), 6.02-5.71 (m, 1H), 4.21 (s, 3H), 1.63-1.55 (m, 3H), 1.54-1.49 (m, 2H), 1.32 (br s, 2H).

Synthesis of 1-(1-(difluoromethyl)cyclopropyl)-2-methoxy-6-(4,4,5,5-tetramethyl-1,3,2-dioxab-orolan-2-yl)-1H-benzo[d]imidazole (57b). A mixture of 6-bromo-1-(1-(difluoromethyl)cyclopropyl)-2-methoxy-1H-benzo[d]imidazole (57a) (103 mg, 324.79 umol), BPD (247.43 mg, 974.37 umol), Pd(PPh₃)₂Cl₂ (22.80 mg, 32.48 umol) and AcOK (159.37 mg, 1.62 mmol) in dioxane (3 mL) was degassed and purged with N₂ 3 times, and then the mixture was stirred at 100° C. for 16 hours under N₂ atmosphere. LCMS showed 57a was consumed completely and the desired MS was detected. The suspension was filtered through a pad of Celite and the pad cake was washed with EtOAc (5 mL*3). The combined filtrates were diluted with brine (10 mL) and extracted with EtOAc (10 mL*2). The combined organic layers dried over Na₂SO₄, filtered and concentrated under reduced pressure. The residue was purified by Prep-TLC (SiO₂, Petroleum ether:Ethyl acetate) to give 57b. MS mass calculated for [M+1]⁺ ($C_{18}H_{23}BF_2N_2O_3$) requires m/z 365.2, LCMS found m/z 365.2; ¹H NMR (400 MHz, CDCl₃) δ 7.74 (s, 1H), 7.69 (dd, J=0.8, 8.0 Hz, 1H), 7.53 (d, J=8.0 Hz, 1H), 6.09-5.80 (m, 1H), 4.23 (s, 3H), 1.57-1.52 (m, 2H), 1.37 (s, 12H), 1.35 (br s, 2H).

Synthesis of 1-(1-(difluoromethyl)cyclopropyl)-2-methoxy-1H-benzo[d]imidazol-6-ol (57c). To a solution of 1-(1-(difluoromethyl)cyclopropyl)-2-methoxy-6-(4,4,5,5-tetramethyl-1,3,2-dioxab-orolan-2-yl)-1H-benzo[d]imidazole (57b) (99.5 mg, 273.21 umol) in ACN (2 mL) was added a solution of NH₄HCO₃ (21.60 mg, 273.21 umol, 22.50 uL) in H₂O (1 mL) at 20° C. Then H₂O₂ (61.94 mg, 546.41 umol, 52.50 uL, 30% purity) was added in the reaction mixture dropwise at 20° C. The resulting mixture was stirred at 20° C. for 1 hour. TLC indicated 57b was consumed completely and one new spot was formed. The mixture was poured into a saturated solution of NaHSO₃ (3 mL) and stirred for 10 minutes. The aqueous phase was extracted with ethyl acetate (10 mL*2). The combined organic phase was washed with brine 10 mL, dried with anhydrous Na₂SO₄, filtered and concentrated in vacuum to give 57c. The crude product was used in the next step without further purification.

Synthesis of 6-(2,6-dichloro-4-nitrophenoxy)-1-(1-(difluoromethyl)cyclopropyl)-2-methoxy-1H-benzo[d]imidazole (57d). To a solution of 1-(1-(difluoromethyl)cyclopropyl)-2-methoxy-1H-benzo[d]imidazol-6-ol (57c) (68.00 mg, 267.48 umol) and 1,3-dichloro-2-fluoro-5-nitro-benzene (58.97 mg, 280.85 umol) in DMF (3 mL) was added K₂CO₃ (55.45 mg, 401.21 umol). The mixture was stirred at 20° C. for 1 hour. TLC indicated 57c was consumed completely and the desired spot was found. The reaction mixture was diluted with water (10 mL) and extracted with EtOAc (10 mL*2). The combined organic layers were washed with brine (10 mL), dried over anhydrous Na₂SO₄, filtered and concentrated under reduced pressure. The residue was purified by Prep-TLC (Ethyl acetate:Petroleum ether) to give 57d. $^1$H NMR (400 MHz, CDCl$_3$) δ 8.32 (s, 2H), 7.40 (d, J=8.8 Hz, 1H), 6.96 (d, J=2.2 Hz, 1H), 6.57 (dd, J=2.4, 8.6 Hz, 1H), 6.02-5.71 (m, 1H), 4.20 (s, 3H), 1.53-1.45 (m, 2H), 1.35-1.28 (m, 2H).

Synthesis of 3,5-dichloro-4-((1-(1-(difluoromethyl)cyclopropyl)-2-methoxy-1H-benzo[d]imidazo-1-6-yl)oxy)aniline (57e). A mixture of 6-(2,6-dichloro-4-nitrophenoxy)-1-(1-(difluoromethyl)cyclopropyl)-2-methoxy-1H-benzo[d]imidazole (57d) (55 mg, 123.81 umol), Fe (34.57 mg, 619.07 umol), NH$_4$Cl (33.11 mg, 619.07 umol) in H$_2$O (1 mL) and MeOH (5 mL) was degassed and purged with N$_2$ 3 times, and then the mixture was stirred at 80° C. for 0.5 hours under N$_2$ atmosphere. TLC indicated 57d was consumed completely and one new spot formed. The suspension was filtered through a pad of Celite and the pad cake was washed with MeOH (5 mL*2). The combined filtrates were concentrated to dryness, and then diluted with water (10 mL) and extracted with EtOAc (10 mL*2). The combined organic layers were washed with brine (10 mL), dried over anhydrous Na$_2$SO$_4$, filtered and concentrated under reduced pressure. The residue was purified by Prep-TLC (SiO$_2$, Petroleum ether:Ethyl acetate) to give 57e. $^1$H NMR (400 MHz, CDCl$_3$) δ 7.38 (d, J=8.6 Hz, 1H), 6.98-6.90 (m, 1H), 6.76-6.70 (m, 2H), 6.62 (dd, J=2.4, 8.6 Hz, 1H), 6.05-6.02

M in THF, assume the previous step 100% yield) in THF (10 mL) was added dropwise a solution of TEA (24.43 mg, 241.41 umol, 33.60 uL) and 3,5-dichloro-4-((1-(1-(difluoromethyl)cyclopropyl)-2-methoxy-1H-benzo[d]imidazo-1-6-yl)oxy)aniline (57e) (20 mg, 48.28 umol) in THF (10 mL) at 20° C. over 10 minutes. After addition, the mixture was stirred at this temperature for 30 minutes. TLC and LCMS showed 57e was consumed completely and the desired MS was detected. The mixture was diluted with H$_2$O (10 mL) and extracted with EtOAc (15 mL*2). The combined organic layers were washed with brine 10 mL, dried over anhydrous Na$_2$SO$_4$, filtered and concentrated under reduced pressure. The residue was checked by HPLC and then purified by Prep-HPLC (column: Phenomenex Luna C18 200*40 mm*10 um; mobile phase: [water (0.2% FA)-ACN]) to give Example 57. MS mass calculated for [M+1]$^+$ (C$_{20}$H$_{13}$Cl$_2$F$_2$N$_5$O$_5$) requires m/z 512.3, LCMS found m/z 512.0; $^1$H NMR (400 MHz, CD$_3$OD) δ 7.96 (s, 2H), 6.96 (d, J=8.6 Hz, 1H), 6.80 (s, 1H), 6.54-6.49 (m, 1H), 6.03-5.72 (m, 1H), 1.45 (br s, 2H), 1.30 (br s, 2H).

Example 58. 2-(3,5-dichloro-4-((3-(1-(difluoromethyl)cyclopropyl)-2-oxo-2,3-dihydro-1H-benzo[d]imidazol-5-yl)oxy)phenyl)-3,5-dioxo-2,3,4,5-tetrahydro-1,2,4-triazine-6-carbonitrile

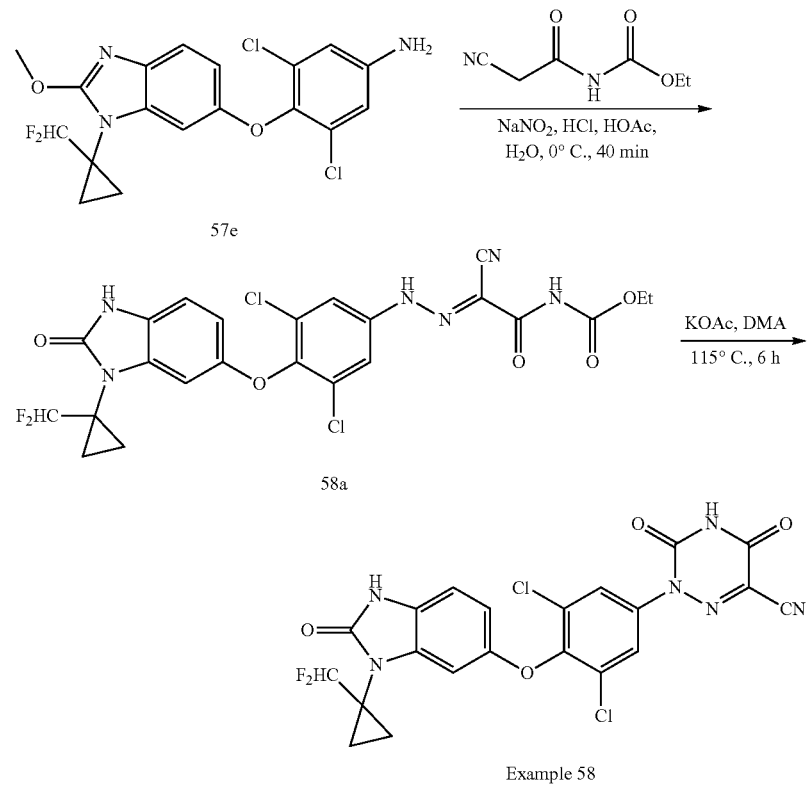

Example 58

(m, 1H), 5.91-5.88 (m, 1H), 5.77-5.74 (m, 1H), 4.18 (s, 3H), 1.51-1.44 (m, 2H), 1.29 (br s, 2H).

Synthesis of N-(3,5-dichloro-4-((3-(1-(difluoromethyl)cyclopropyl)-2-oxo-2,3-dihydro-1H-benzo-[d]imidazol-5-yl)oxy)phenyl)-5-oxo-4,5-dihydro-1,2,4-oxadiazole-3-carboxamide (Example 57). To a solution of 5-oxo-4H-1,2,4-oxadiazole-3-carbonyl chloride (10.76 mg, 72.42 umol) (1.5

Synthesis of (E)-ethyl (2-cyano-2-(2-(3,5-dichloro-4-((3-(1-(difluoromethyl)cyclopropyl)-2-oxo-2,3-dihydro-1H-benzo[d]imidazol-5-yl)oxy)phenyl)hydrazono)acetyl)carbamate (58a). To a solution of 3,5-dichloro-4-((1-(1-(difluoromethyl)cyclopropyl)-2-methoxy-1H-benzo[d]imidazol-6-yl)oxy)aniline (57e) (10 mg, 24.14 umol) and ethyl (2-cyanoacetyl)carbamate (18.85 mg, 120.71 umol) in AcOH (2 mL) was added dropwise HCl (1 M, 6.04 uL) at 0° C. After addition, the mixture was stirred at this temperature for 10 minutes, and then NaNO$_2$ (2.17 mg, 31.38 umol) in H$_2$O (1 mL) was added dropwise at 0° C. The resulting mixture was stirred at 0° C. for 0.5 hours. LCMS showed 57e was consumed completely and the desired MS was detected. The reaction mixture was diluted with saturated NaHCO$_3$ (10 mL) and extracted with EtOAc (10 mL*2). The combined organic layers were washed with brine (10 mL), dried over anhydrous Na$_2$SO$_4$, filtered and concentrated under reduced pressure to give 58a. MS mass calculated for [M+1]$^+$ (C$_{23}$H$_{18}$Cl$_2$F2N$_6$O$_5$) requires m/z 567.1, LCMS found m/z 567.0. The crude product was used in the next step without further purification.

Synthesis of 2-(3,5-dichloro-4-((3-(1-(difluoromethyl)cyclopropyl)-2-oxo-2,3-dihydro-1H-benzo[d]imidazol-5-yl)oxy)phenyl)-3,5-dioxo-2,3,4,5-tetrahydro-1,2,4-triazine-6-carbonitrile (Example 58). A mixture of (E)-ethyl (2-cyano-2-(2-(3,5-dichloro-4-((3-(1-(difluoromethyl)cyclopropyl)-2-oxo-2,3-dihydro-1H-benzo[d]imidazol-5-yl)oxy)phenyl)hydrazono)acetyl)carbamate (58a) (21.47 mg, 37.84 umol) and AcOK (7.43 mg, 75.69 umol) in DMA (1 mL) was degassed and purged with N$_2$ 3 times, and then the mixture was stirred at 115° C. for 6 hours under N$_2$ atmosphere. LCMS showed 58a was consumed completely and the desired product was detected. The reaction mixture was diluted with water (10 mL) and extracted with EtOAc (10 mL*3). The combined organic layers were washed with brine (10 mL), dried over anhydrous Na$_2$SO$_4$, filtered and concentrated under reduced pressure. The residue was purified by Prep-HPLC (column: Phenomenex Luna C18 200*40 mm*10 um; mobile phase: [water (0.2% FA)-ACN]) to give Example 58. MS mass calculated for [M+1]$^+$ (C$_{21}$H$_{12}$Cl$_2$F2N$_6$O$_4$) requires m/z 521.0, LCMS found m/z 521.0; $^1$H NMR (400 MHz, CD$_3$OD) δ 7.78 (s, 2H), 6.95 (d, J=8.8 Hz, 1H), 6.84 (s, 1H), 6.50 (dd, J=2.6, 8.6 Hz, 1H), 6.00-5.72 (m, 1H), 4.85 (s, 86H), 3.34-3.28 (m, 27H), 1.44 (br s, 2H), 1.28 (br s, 2H).

Example 59. 2-(3,5-dichloro-4-((3-ethyl-1H-indol-5-yl)oxy)phenyl)-3,5-dioxo-2,3,4,5-tetrahydro-1,2,4-triazine-6-carbonitrile

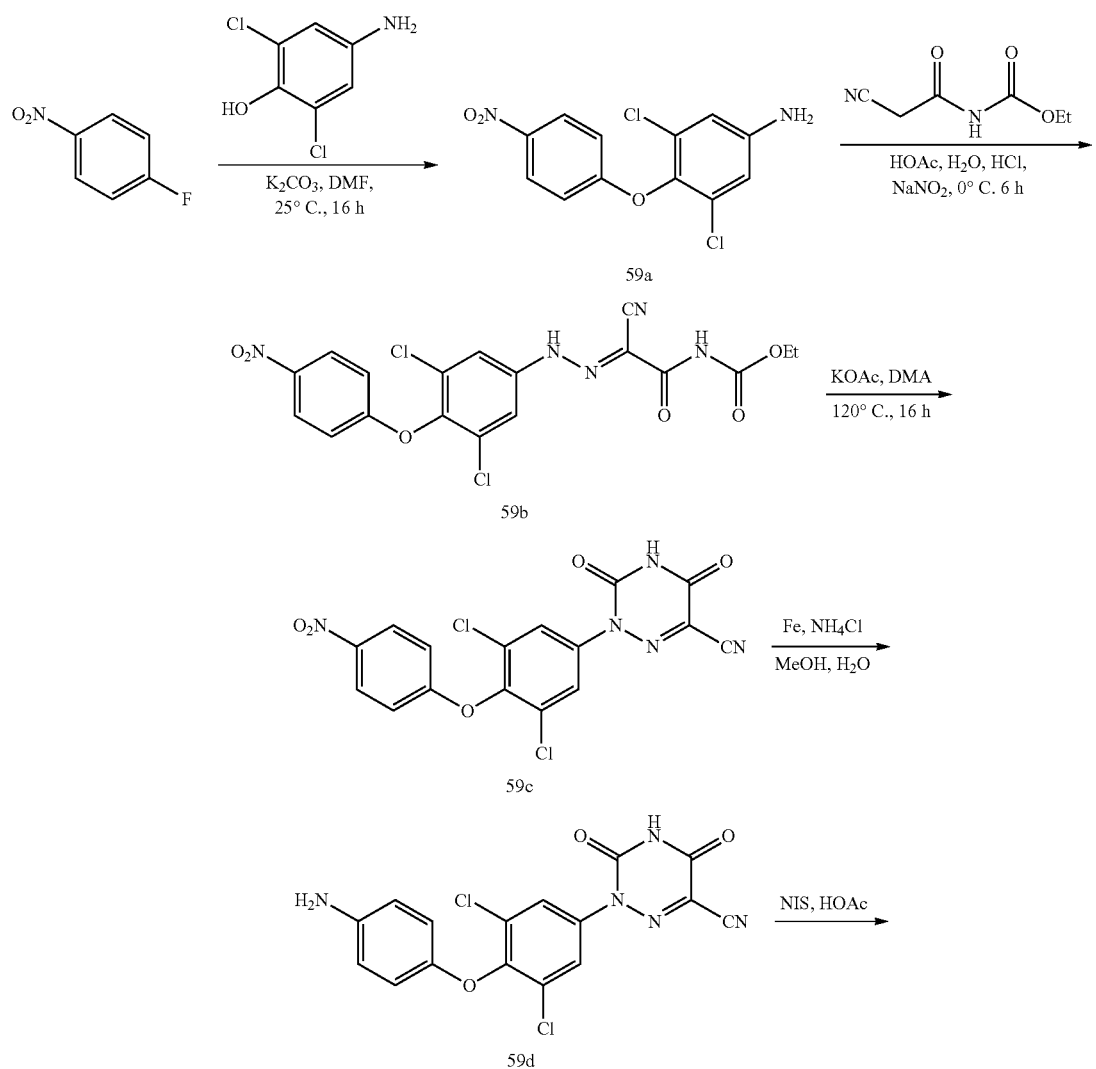

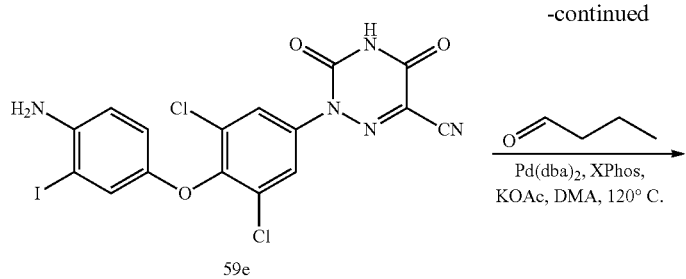

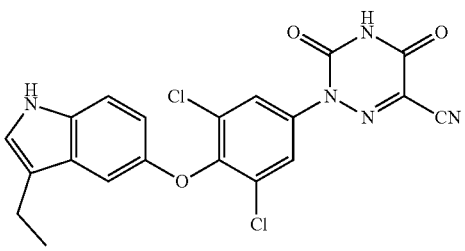 [SMILES: CCc1c[nH]c2ccc(Oc3c(Cl)cc(-n4nc(C#N)c(=O)[nH]c4=O)cc3Cl)cc12]

59e

Example 59

Synthesis of 3,5-dichloro-4-(4-nitrophenoxy)aniline (59a). A mixture of 1-fluoro-4-nitrobenzene (100 mg, 708.72 umol, 75.19 uL), 4-amino-2,6-dichlorophenol (138.78 mg, 779.59 umol) and $K_2CO_3$ (146.92 mg, 1.06 mmol) in DMF (5 mL) was degassed and purged with $N_2$ 3 times, and then the mixture was stirred at 25° C. for 16 hours under $N_2$ atmosphere. LCMS showed the starting material was consumed completely and the desired MS was detected. The reaction mixture was diluted with $H_2O$ (10 mL) and extracted with Ethyl acetate (10 mL*2). The combined organic layers were washed with brine (10 mL*2), dried over with $Na_2SO_4$, filtered and concentrated under reduced pressure. The residue was purified by Prep-TLC (SiO2, Petroleum ether:Ethyl acetate) to give 59a. MS mass calculated for $[M+1]^+$ ($C_{12}H_8Cl_2N_2O_3$) requires m/z 299.0, LCMS found m/z 298.9; $^1H$ NMR (400 MHz, DMSO) δ 8.24 (d, J=9.0 Hz, 2H), 7.03 (d, J=9.3 Hz, 2H), 6.74 (s, 2H), 5.77 (s, 2H), 2.50 (br d, J=1.5 Hz, 17H).

Synthesis of (E)-ethyl (2-cyano-2-(2-(3,5-dichloro-4-(4-nitrophenoxy)phenyl)hydrazono)acetyl) carbamate (59b). To a solution of ethyl (2-cyanoacetyl)carbamate (574.21 mg, 3.68 mmol) in HOAc (20 mL) and $H_2O$ (10 mL) was added 3,5-dichloro-4-(4-nitrophenoxy)aniline (59a) (1 g, 3.34 mmol) and HCl (12 M, 69.65 uL) at 0° C. for 10 minutes. A solution of $NaNO_2$ (299.89 mg, 4.35 mmol) in $H_2O$ (10 mL) was added in the mixture, and then the mixture was stirred at 0° C. for 6 hours under $N_2$ atmosphere. LCMS showed 59a was consumed completely and the desired MS was detected. The reaction mixture was filtered and the filtrate was concentrated under reduced pressure to give 59b. The mixture was used in the next step without further purification. MS mass calculated for $[M+1]^+$ ($C_{18}H_{13}Cl_2N_5O_6$) requires m/z 466.0, LCMS found m/z 466.0.

Synthesis of 2-(3,5-dichloro-4-(4-nitrophenoxy)phenyl)-3,5-dioxo-2,3,4,5-tetrahydro-1,2,4-triazine-6-carbonitrile (59c). To a solution of (E)-ethyl (2-cyano-2-(2-(3,5-dichloro-4-(4-nitrophenoxy)phenyl)hydrazono)acetyl)carbamate (59b) (1.6 g, 3.43 mmol) in DMA (20 mL) was added KOAc (3.37 g, 34.32 mmol). The mixture was stirred at 120° C. for 16 hours. LCMS showed 59b was consumed completely and the desired MS was detected. The reaction mixture was concentrated, and the residue was extracted with $H_2O$ (50 mL) and ethyl acetate (40 mL*2). The combined organic layers were washed with brine (50 mL*2), dried over with $Na_2SO_4$, filtered and concentrated under reduced pressure. The residue was purified by column chromatography (SiO$_2$, Petroleum ether:Ethyl acetate) to give 59c. MS mass calculated for $[M-1]^-$ ($C_{16}H_7Cl_2N_5O_5$) requires m/z 418.0, LCMS found m/z 417.9; $^1H$ NMR (400 MHz, $CD_3OD$) δ 8.29 (d, J=9.4 Hz, 2H), 7.85 (s, 2H), 7.08 (d, J=9.4 Hz, 2H).

Synthesis of 2-(4-(4-aminophenoxy)-3,5-dichlorophenyl)-3,5-dioxo-2,3,4,5-tetrahydro-1,2,4-triazine-6-carbonitrile (59d). To a solution of 2-(3,5-dichloro-4-(4-nitrophenoxy)phenyl)-3,5-dioxo-2,3,4,5-tetrahydro-1,2,4-triazine-6-carbonitrile (59c) (400 mg, 952.01 umol) in MeOH (5 mL) was added Fe (265.83 mg, 4.76 mmol) and $NH_4Cl$ (254.62 mg, 4.76 mmol) in $H_2O$ (1 mL). The mixture was stirred at 80° C. for 1 hour. LCMS showed 59c was consumed completely and the desired MS was detected. The mixture was filtered through a pad of Celite, the pad was washed with MeOH (10 mL*3), and the combined filtrates were concentrated in vacuum. The residue was diluted in Ethyl acetate (30 mL) and extracted with Ethyl acetate (20 mL*3) and $H_2O$ (20 mL). The combined organic layers were washed with brine (15 mL*2), dried over $Na_2SO_4$, filtered and concentrated under reduced pressure to give 59d. The residue was used directly in the next step without purification. MS mass calculated for $[M-1]^-$ ($C_{16}H_9Cl_2N_5O_3$) requires m/z 388.0, LCMS found m/z 387.9.

Synthesis of 2-(4-(4-amino-3-iodophenoxy)-3,5-dichlorophenyl)-3,5-dioxo-2,3,4,5-tetrahydro-1,2,4-triazine-6-carbonitrile (59e). To a solution of 2-(4-(4-aminophenoxy)-3,5-dichlorophenyl)-3,5-dioxo-2,3,4,5-tetrahydro-1,2,4-triazine-6-carbonitrile (59d) (400 mg, 1.03 mmol) in AcOH (6 mL) was added NIS (230.65 mg, 1.03 mmol) degassed and purged with $N_2$ for 3 times. The mixture was stirred at 25° C. for 1 hour under $N_2$ atmosphere. LCMS showed some of 59d remained and the desired MS was detected. The reaction mixture was concentrated under reduced pressure to remove AcOH. The residue was purified by Prep-HPLC (column: Phenomenex Luna C18 200*40 mm*10 um; mobile phase: [water (0.2% FA)-ACN]) to give 59e. MS mass calculated for $[M+1]^+$ ($C_{16}H_8Cl_2IN_5O_3$) requires m/z 515.9, LCMS found m/z 515.9; $^1H$ NMR (400 MHz, $CD_3OD$) δ 7.76 (s, 2H), 7.08 (d, J=3.0 Hz, 1H), 6.76-6.81 (m, 1H), 6.68-6.74 (m, 1H).

Synthesis of 2-(3,5-dichloro-4-((3-ethyl-1H-indol-5-yl)oxy)phenyl)-3,5-dioxo-2,3,4,5-tetrahydro-1,2,4-triazine-6-carbonitrile (Example 59). A mixture of 2-(4-(4-amino-3-iodophenoxy)-3,5-dichlorophenyl)-3,5-dioxo-2,3,4,5-tetrahydro-1,2,4-triazine-6-carbonitrile (59e) (40 mg, 77.51 umol), butanal (5.59 mg, 77.51 umol, 6.84 uL) and KOAc (15.21 mg, 155.02 umol) in dry DMA (2.5 mL) was degassed with $N_2$ for 20 minutes, Pd(dba)$_2$ (2.23 mg, 3.88 umol) and XPhos (3.69 mg, 7.75 umol) were added in the reaction, and the resulting reaction mixture was stirred at 120° C. for 3 hours. LCMS showed 59e was consumed completely and the desired MS was detected. The reaction mixture was concentrated under reduced pressure to remove DMA. The residue was diluted with $H_2O$ (5 mL) and extracted with Ethyl acetate (10 mL*3). The combined organic layers were washed with brine (5 mL*2), dried over $Na_2SO_4$, filtered and concentrated under reduced pressure.

The residue was purified by Prep-HPLC (column: Phenomenex Luna C18 200*40 mm*10 um; mobile phase: [water (0.2% FA)-ACN]; B %: 50%-90%, 8 min) to give 20 mg of crude product. The crude product was re-purified by Prep-HPLC (column: Welch Xtimate C18 150*25 mm*5 um; mobile phase: [water (0.04% HCl)-ACN]) to give Example 59. MS mass calculated for $[M+1]^+$ ($C_{20}H_{13}Cl_2N_5O_3$) requires m/z 442.0, LCMS found m/z 442.0; $^1$H NMR (400 MHz, $CD_3OD$) δ 7.74-7.83 (m, 2H), 7.27 (d, J=8.8 Hz, 1H), 7.02 (s, 1H), 6.81 (d, J=2.2 Hz, 1H), 6.75 (dd, J=2.4, 8.8 Hz, 1H), 2.64 (q, J=7.6 Hz, 2H), 1.25 (t, J=7.6 Hz, 3H).

Biological Example: Biological Screening

Example B1: Time-Resolved Fluorescence Resonance Energy Transfer (TR-FRET) Assay for Thyroid Hormone Receptor Agonist Screening LanthaScreen™ TR-FRET Thyroid Receptor alpha Coactivator Assay kit (ThermoFisher) and LanthaScreen™ TR-FRET Thyroid Receptor beta Coactivator Assay kit (ThermoFisher) were used for agonist compound screening. Compounds in DMSO were diluted using ECHO Liquid Handler (Labcyte Inc.) into 384 plates in 10-point 3-fold series in duplicate (5 micro M final top concentration). Buffer C (ThermoFisher) was added to each well before the 4× mixture of fluorescein-SCR2-2 coactivator (200 nM final concentration), Terbium-labeled anti-GST antibody (2 nM final concentration), and TR alpha-LBD (0.4 nM final concentration) or TR beta-LBD (1.0 nM final concentration) was added. After 2 hour incubation at room temperature in dark, the TR-FRET signal was measured on an EnVision plate reader (PerkinElmer) with excitation at 340 nm and dual emission readout at 495 and 520 nm with the delay time of 100 micro second and the integration time of 200 micro second. The ratio of emission signal at 520 and at 495 was used to calculate $EC_{50}$ using GraphPad Prism (GraphPad Software). In every batch of compound screening, T3 (L-3, 3',5-Triiodothyronine sodium salt, >95%) (Calbiochem) was used as reference compound. The $EC_{50}$ of T3 measured were within 3-fold of the reference value provided by the assay kit manufacturer (ThermoFisher Scientific). The Z' factors measured in every batch of screening using T3 as high percent effect (HPE) control and 0.5% DMSO as zero percent effect (ZPE) control were in the range of 0.5 to 0.8. Compounds' THR-beta selectivity values are derived from T3-selectivity normalized data. Data obtained using the TR-FRET assay for certain compounds disclosed herein are listed in Table 2.

Example B2: THR/RXR Heterodimer Assay for Thyroid Hormone Receptor Agonist Screening Test compounds were prepared as 10 mM DMSO stock solutions. The stock solution (45 uL) was transferred to a 384-well assay plate, and 3-fold, 10-point dilutions were performed by transferring 15 μL of the compound solution into 30 μL DMSO using TECAN (EV0200) liquid handler. The compound solutions (200 nL, serially diluted) and the positive control triiodothyronine (T3) (100 nL) were transferred to an assay plate using ECHO550. Next, H6-THR-α (150.64 uM, 10 μL) or H6-THR-β (32.57 uM, 10 μL) in binding buffer (50 mM HEPES, pH 7.0, 1 mM DTT, 0.05% NP40, 0.2 mg/mL BSA) was mixed with retinoid X receptor alpha (RxRα) (146.76 uM, 10 μL) in binding buffer, and transferred to the 384-well assay plate containing T3 or compound solution. After incubation at 37° C. for 30 min, biotin-GRIP1 peptide (3262.1 uM, 10 μL) in binding buffer and 5% DMSO was added to the 384-well assay plate and incubated at 37° C. for 30 min. A solution (10 μL) containing europium-conjugated anti-hexa(His) antibody (0.625 uM) and APC-conjugated streptavidin (1.18 uM) in buffer (50 mM Tris, pH 7.4, 100 mM NaCl, and 0.2 mg/mL BSA) was then added to the 384-well assay plate and incubated at 25° C. for 60 min. The assay plate was read using Envision (PerkinElmer), using T3 as the positive control for both THR-β/RXR-α and THR-α/RXR-α activity. DMSO was used as the negative control. Compound activity for the THR-β/RXR-α and THR-α/RXR-α assays were normalized to T3 activity for each assay run. THR-β selectivity was calculated by dividing the normalized THR-β/RXR-α compound activity by the normalized THR-α/RXR-α compound activity. Data using the RXR Heterodimer assay for certain compounds disclosed herein are listed in Table 3.

TABLE 2

| Example | $EC_{50}$ THRβ-FRET [nM] | $EC_{50}$ THRα-FRET [nM] | THRβ-Selectivity |
|---|---|---|---|
| 1 | 11.2 | 180.6 | 44.5 |
| 2 | 44.7 | 414.6 | 28.0 |
| 3 | 7.6 | 114.5 | 32.0 |
| 4 | 46.3 | 363.5 | 18.8 |
| 5 | 20.2 | 135.9 | 15.6 |
| 6 | 810.7 | >5000 | >18.5 |
| 7 | 74.5 | 250.7 | 9.5 |
| 8 | 369.4 | 2868.0 | 17.6 |
| 9 | 45.9 | 102.2 | 8.0 |
| 10 | 56.1 | 346.2 | 25.8 |
| 11 | 627.0 | >5000 | >30.5 |
| 12 | 9.5 | 71.4 | 20.0 |
| 13 | 27.5 | 20.0 | 3.7 |
| 14 | 5.5 | 24.0 | 10.7 |
| 15 | 3.9 | 19.4 | 15.9 |
| 16 | 124.6 | 2969.8 | 68.1 |
| 17 | 2709.4 | 2659.7 | 2.2 |
| 18 | 73.6 | 244.6 | 14.1 |
| 19 | 13.0 | 198.7 | 38.0 |
| 20 | 21.4 | 2596.7 | 348.9 |
| 21 | 3.4 | 21.5 | 12.9 |
| 22 | 71.6 | >5000 | >253.0 |
| 23 | 13.5 | 146.4 | 20.2 |
| 24 | 31.7 | 85.8 | 8.1 |
| 25 | 12.8 | 2540.0 | 1286.7 |

TABLE 3

| Example | $EC_{50}$ THRβ-het [μM] | $EC_{50}$ THRα-het [μM] | THRβ-Selectivity |
|---|---|---|---|
| 1 | 0.06 | 0.8 | 13.3 |
| 2 | 0.38 | 1.6 | 3.6 |
| 3 | 0.10 | 0.9 | 8.5 |
| 4 | 0.46 | 3.3 | 6.6 |
| 5 | 0.39 | 1.3 | 3.1 |
| 6 | 2.36 | 12.6 | 5.6 |
| 7 | 0.70 | 7.3 | 9.7 |
| 8 | 1.28 | 10.0 | 7.8 |
| 9 | 0.14 | 2.2 | 10.3 |
| 10 | 0.21 | 2.0 | 9.3 |
| 11 | 1.99 | 22.2 | 10.4 |
| 12 | 0.11 | 1.3 | 12.0 |
| 13 | 0.24 | 1.5 | 5.5 |
| 14 | 0.06 | 0.4 | 6.6 |
| 15 | 0.05 | 0.8 | 15.4 |
| 16 | 0.78 | 8.4 | 7.1 |

TABLE 3-continued

| Example | EC$_{50}$ THRβ-het [μM] | EC$_{50}$ THRα-het [μM] | THRβ-Selectivity |
|---|---|---|---|
| 17 | 0.60 | 4.1 | 6.3 |
| 18 | 0.46 | 3.3 | 5.3 |
| 19 | 0.27 | 2.0 | 5.6 |
| 20 | 0.19 | 2.8 | 11.3 |
| 21 | 0.03 | 0.4 | 10.9 |
| 22 | 0.68 | 5.1 | 5.9 |
| 23 | 0.15 | 1.1 | 5.7 |
| 24 | 0.04 | 0.2 | 4.8 |
| 25 | 0.41 | 3.1 | 5.7 |
| 26 | 0.04 | 0.1 | 3.3 |
| 27 | 0.75 | 4.6 | 5.1 |
| 28 | 0.09 | 1.9 | 16.9 |
| 29 | 0.20 | 2.2 | 9.7 |
| 30 | 0.21 | 2.4 | 9.9 |
| 31 | 0.04 | 0.3 | 5.8 |
| 32 | 0.13 | 2.5 | 16.9 |
| 33 | 0.20 | 4.5 | 21.2 |
| 34 | 0.33 | 3.2 | 7.2 |
| 35 | 0.11 | 1.5 | 10.2 |
| 36 | 0.39 | 3.4 | 7.1 |
| 37 | 0.41 | 4.5 | 8.3 |
| 38 | 0.03 | 0.4 | 8.4 |
| 39 | 0.90 | 5.5 | 5.1 |
| 40 | 0.27 | 3.9 | 11.6 |
| 41 | 0.15 | 3.0 | 16.5 |
| 42 | 0.29 | 3.3 | 7.7 |
| 43 | 0.14 | 2.0 | 11.8 |
| 44 | 0.02 | 0.3 | 10.1 |
| 45 | 0.06 | 1.4 | 17.7 |
| 46 | 0.04 | 0.7 | 18.7 |
| 47 | 0.21 | 3.0 | 11.0 |
| 48 | 0.06 | 0.9 | 12.0 |
| 49 | 0.03 | 0.4 | 10.3 |
| 50 | 0.10 | 1.2 | 9.8 |
| 51 | 1.44 | 16.1 | 8.1 |
| 52 | 0.17 | 2.6 | 11.9 |
| 53 | 0.24 | 4.7 | 14.7 |
| 54 | 0.03 | 0.6 | 19.7 |
| 55 | 0.16 | 2.5 | 14.3 |
| 56 | 0.02 | 0.2 | 9.0 |
| 57 | 0.20 | 2.4 | 10.1 |
| 58 | 0.06 | 0.6 | 8.2 |
| 59 | 0.10 | 1.2 | 8.4 |

All publications, including patents, patent applications, and scientific articles, mentioned in this specification are herein incorporated by reference in their entirety for all purposes to the same extent as if each individual publication, including patent, patent application, or scientific article, were specifically and individually indicated to be incorporated by reference.

Although the foregoing invention has been described in some detail by way of illustration and example for purposes of clarity of understanding, it is apparent to those skilled in the art that certain minor changes and modifications will be practiced in light of the above teaching. Therefore, the description and examples should not be construed as limiting the scope of the invention.

The invention claimed is:
1. A compound of formula (I):

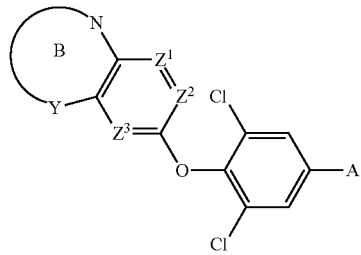

or a tautomer thereof, or a pharmaceutically acceptable salt of any of the foregoing, wherein: A is

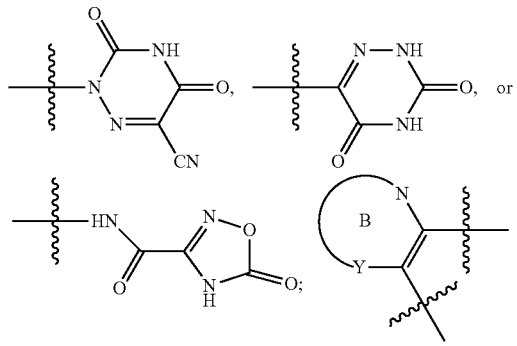

is 5-membered heterocyclyl or 5- to 6-membered heteroaryl, each of which optionally contains 1-2 additional annular heteroatoms selected from the group consisting of N and O,
  wherein each heteroatom of the heterocyclyl or heteroaryl is bound to one $R^1$ group if needed to complete the valency of the heteroatom, and
  wherein each carbon atom of the heterocyclyl or heteroaryl is bound to one $R^2$ group if needed to complete the valency of the carbon atom, provided that no more than one $R^2$ group is needed to complete the valency of each carbon atom,
$Z^1$, $Z^2$, and $Z^3$ are independently N or CH;
Y is N or C;
each $R^1$ is independently H, $C_1$-$C_6$ alkyl, or $C_3$-$C_6$ cycloalkyl,
  wherein each $C_1$-$C_6$ alkyl or $C_3$-$C_6$ cycloalkyl group is optionally substituted by 1-5 $R^3$ groups;
each $R^2$ is independently H, $C_1$-$C_6$ alkyl, $C_3$-$C_6$ cycloalkyl, —O($C_1$-$C_6$ alkyl),
—O($C_3$-$C_6$ cycloalkyl), hydroxyl, or oxo,
  wherein each $C_1$-$C_6$ alkyl, $C_3$-$C_6$ cycloalkyl, —O($C_1$-$C_6$ alkyl), or
—O($C_3$-$C_6$ cycloalkyl) group is optionally substituted by 1-5 $R^3$ groups;
or $R^1$ and $R^2$ are taken together to form a 5- to 6-membered heteroaryl or 5- to 7-membered heterocyclyl;
or two $R^2$ groups are taken together to form a 5- to 6-membered heteroaryl, 5- to 7-membered heterocyclyl, $C_5$-$C_7$ cycloalkyl, or $C_6$ aryl; and
each $R^3$ is independently halogen, $C_1$-$C_6$ alkyl, $C_3$-$C_6$ cycloalkyl, $C_1$-$C_6$ haloalkyl, $C_1$-$C_6$ alkyl-OH, —NH$_2$, —CN, or hydroxyl.

2. The compound of claim 1, or a tautomer thereof, or a pharmaceutically acceptable salt of any of the foregoing, wherein:
A is

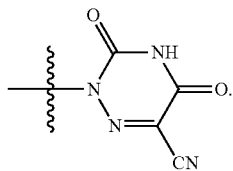 [SMILES: *n1nc(C#N)c(=O)[nH]c1=O]

3. The compound of claim 1, or a tautomer thereof, or a pharmaceutically acceptable salt of any of the foregoing, wherein:
A is

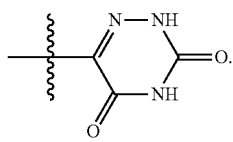 [SMILES: *c1n[nH]c(=O)[nH]c1=O]

4. The compound of claim 1, or a tautomer thereof, or a pharmaceutically acceptable salt of any of the foregoing, wherein:
A is

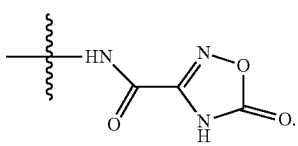 [SMILES: *NC(=O)c1noc(=O)[nH]1]

5. The compound of claim 1, or a tautomer thereof, or a pharmaceutically acceptable salt of any of the foregoing, wherein:

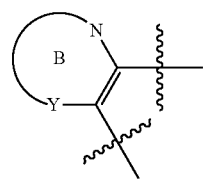

is 5-6 membered heteroaryl optionally containing 1-2 additional annular heteroatoms selected from the group consisting of N and O,
  wherein each heteroatom of the heteroaryl is bound to one $R^1$ group if needed to complete the valency of the heteroatom, and
  wherein each carbon atom of the heteroaryl is bound to one $R^2$ group if needed to complete the valency of the carbon atom, provided that no more than one $R^2$ group is needed to complete the valency of each carbon atom.

6. The compound of claim 5, or a tautomer thereof, or a pharmaceutically acceptable salt of any of the foregoing, wherein:
Y is C.

7. The compound of claim 6, or a tautomer thereof, or a pharmaceutically acceptable salt of any of the foregoing, wherein:

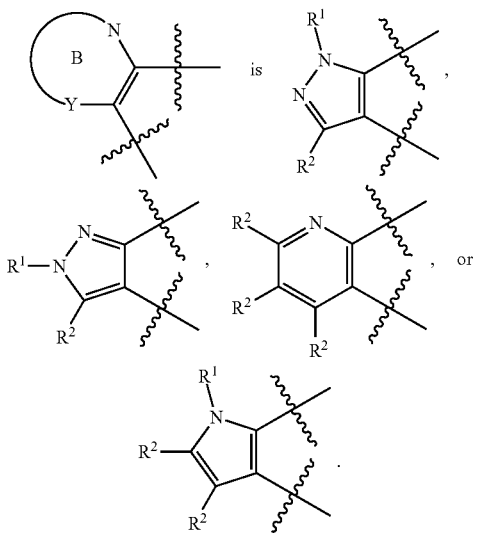

8. The compound of claim 5, or a tautomer thereof, or a pharmaceutically acceptable salt of any of the foregoing, wherein:
Y is N.

9. The compound of claim 8, or a tautomer thereof, or a pharmaceutically acceptable salt of any of the foregoing, wherein:

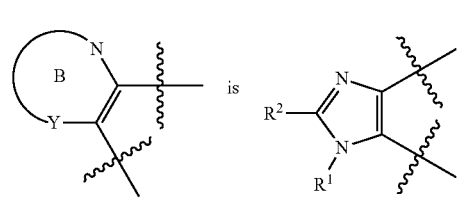

10. The compound of claim 1, or a tautomer thereof, or a pharmaceutically acceptable salt of any of the foregoing, wherein:

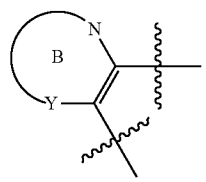

is 5-membered heterocyclyl optionally containing 1-2 additional annular heteroatoms selected from the group consisting of N and O,
  wherein each heteroatom of the heterocyclyl is bound to one $R^1$ group if needed to complete the valency of the heteroatom, and
  wherein each carbon atom of the heterocyclyl is bound to one $R^2$ group if needed to complete the valency of the carbon atom, provided that no more than one $R^2$ group is needed to complete the valency of each carbon atom.

11. The compound of claim 10, or a tautomer thereof, or a pharmaceutically acceptable salt of any of the foregoing, wherein:

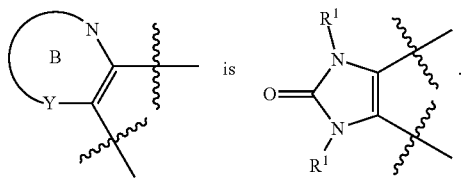 is

12. The compound of claim 1, or a tautomer thereof, or a pharmaceutically acceptable salt of any of the foregoing, wherein:
   $Z^1$ is CH.
13. The compound of claim 1, or a tautomer thereof, or a pharmaceutically acceptable salt of any of the foregoing, wherein:
   $Z^1$ is N.
14. The compound of claim 1, or a tautomer thereof, or a pharmaceutically acceptable salt of any of the foregoing, wherein:
   $Z^2$ is CH.
15. The compound of claim 1, or a tautomer thereof, or a pharmaceutically acceptable salt of any of the foregoing, wherein:
   $Z^2$ is N.
16. The compound of claim 1, or a tautomer thereof, or a pharmaceutically acceptable salt of any of the foregoing, wherein:
   $Z^3$ is CH.
17. The compound of claim 1, or a tautomer thereof, or a pharmaceutically acceptable salt of any of the foregoing, wherein:
   $Z^3$ is N.
18. The compound of claim 1, or a tautomer thereof, or a pharmaceutically acceptable salt of any of the foregoing, wherein:
   $Z^1$, $Z^2$, and $Z^3$ are each CH.
19. The compound of claim 1, or a tautomer thereof, or a pharmaceutically acceptable salt of any of the foregoing, wherein:
   $Z^1$ is N; and
   $Z^2$ and $Z^3$ are each CH.
20. The compound of claim 1, or a tautomer thereof, or a pharmaceutically acceptable salt of any of the foregoing, wherein:
   $Z^2$ is N; and
   $Z^1$ and $Z^3$ are each CH.
21. The compound of claim 1, or a tautomer thereof, or a pharmaceutically acceptable salt of any of the foregoing, wherein:
   each $R^1$ is independently H, $C_1$-$C_3$ alkyl, or $C_3$-$C_8$ cycloalkyl, wherein each $C_1$-$C_3$ alkyl or $C_3$-$C_8$ cycloalkyl group is optionally substituted by 1-3 $R^3$ groups.
22. The compound of claim 21, or a tautomer thereof, or a pharmaceutically acceptable salt of any of the foregoing, wherein:
   each $R^1$ is independently H, cyclopropyl, —$CH_3$, —CH($CH_3$)$_2$, t-butyl, —$CH_2CH_3$,

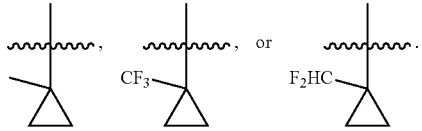

23. The compound of claim 1, or a tautomer thereof, or a pharmaceutically acceptable salt of any of the foregoing, wherein:
   each $R^2$ is independently H, $C_1$-$C_3$ alkyl, $C_3$-$C_5$ cycloalkyl, O ($C_1$-$C_3$ alkyl), —O($C_3$-$C_5$ cycloalkyl), hydroxyl, or oxo,
   wherein each $C_1$-$C_3$ alkyl, $C_3$-$C_5$ cycloalkyl, —O($C_1$-$C_3$ alkyl), or —O($C_3$-$C_5$ cycloalkyl) group is optionally substituted by 1-3 $R^3$ groups.
24. The compound of claim 23, or a tautomer thereof, or a pharmaceutically acceptable salt of any of the foregoing, wherein:
   each $R^2$ is independently H, —$CH_3$, —$CH_2CH_3$, —$OCH_3$, cyclopropyl, or oxo.
25. The compound of claim 1, or a tautomer thereof, or a pharmaceutically acceptable salt of any of the foregoing, wherein:
   $R^1$ and $R^2$ are taken together to form a 5- to 6-membered heteroaryl or 5- to 7-membered heterocyclyl.
26. The compound of claim 25, or a tautomer thereof, or a pharmaceutically acceptable salt of any of the foregoing, wherein:
   $R^1$ and $R^2$ are taken together to form

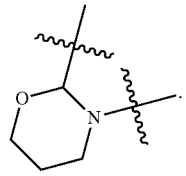 [SMILES: *C1OCCCN1*]

27. The compound of claim 1, or a tautomer thereof, or a pharmaceutically acceptable salt of any of the foregoing, wherein:
   two $R^2$ groups are taken together to form a 5- to 6-membered heteroaryl, 5- to 7-membered heterocyclyl, $C_5$-$C_7$ cycloalkyl, or $C_6$ aryl.
28. The compound of claim 1, or a tautomer thereof, or a pharmaceutically acceptable salt of any of the foregoing, wherein:
   each $R^3$, where present, is independently halogen, $C_1$-$C_3$ alkyl, $C_1$-$C_3$ haloalkyl, $C_1$-$C_3$ alkyl-OH, —$NH_2$, —CN, or hydroxyl.
29. The compound of claim 28, or a tautomer thereof, or a pharmaceutically acceptable salt of any of the foregoing, wherein:
   each $R^3$ is independently Cl, F, —$CH_3$, —$CF_3$, —$CHF_2$, —$CH_2OH$, —$NH_2$, —CN, or hydroxyl.
30. A compound selected from the compounds in Table 1, or a tautomer thereof, or a pharmaceutically acceptable salt of any of the foregoing selected from the group consisting of:

1

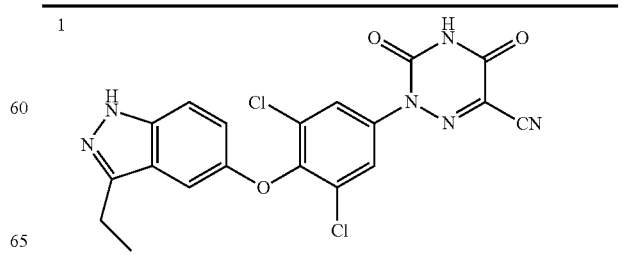

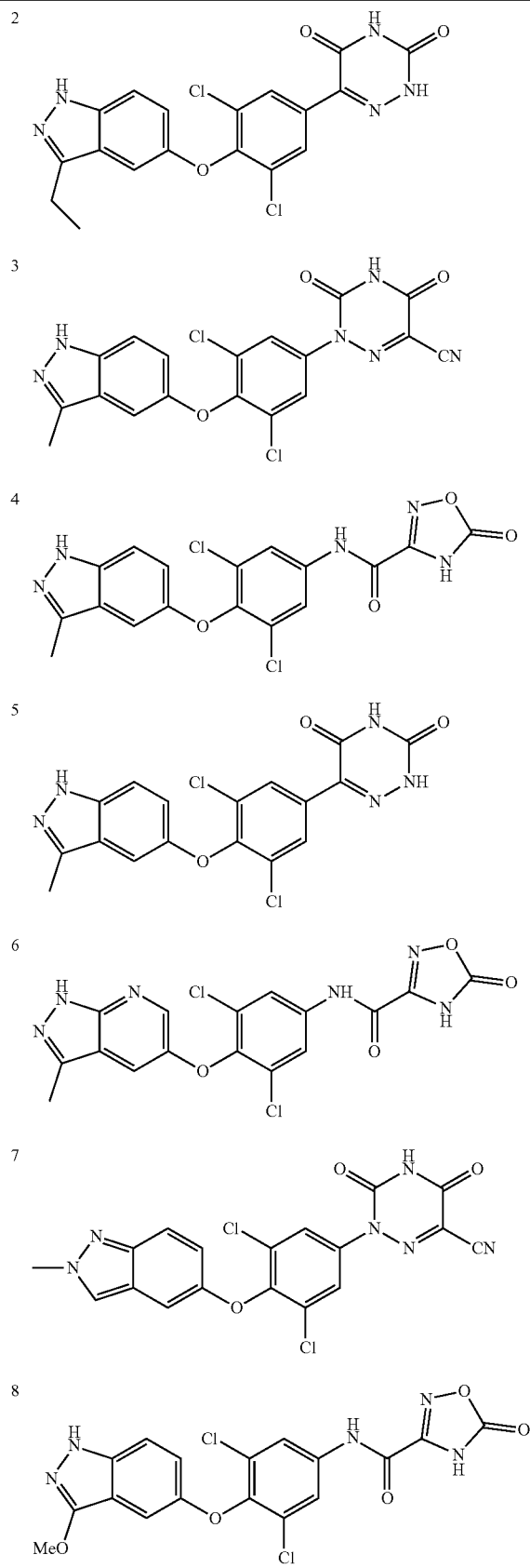
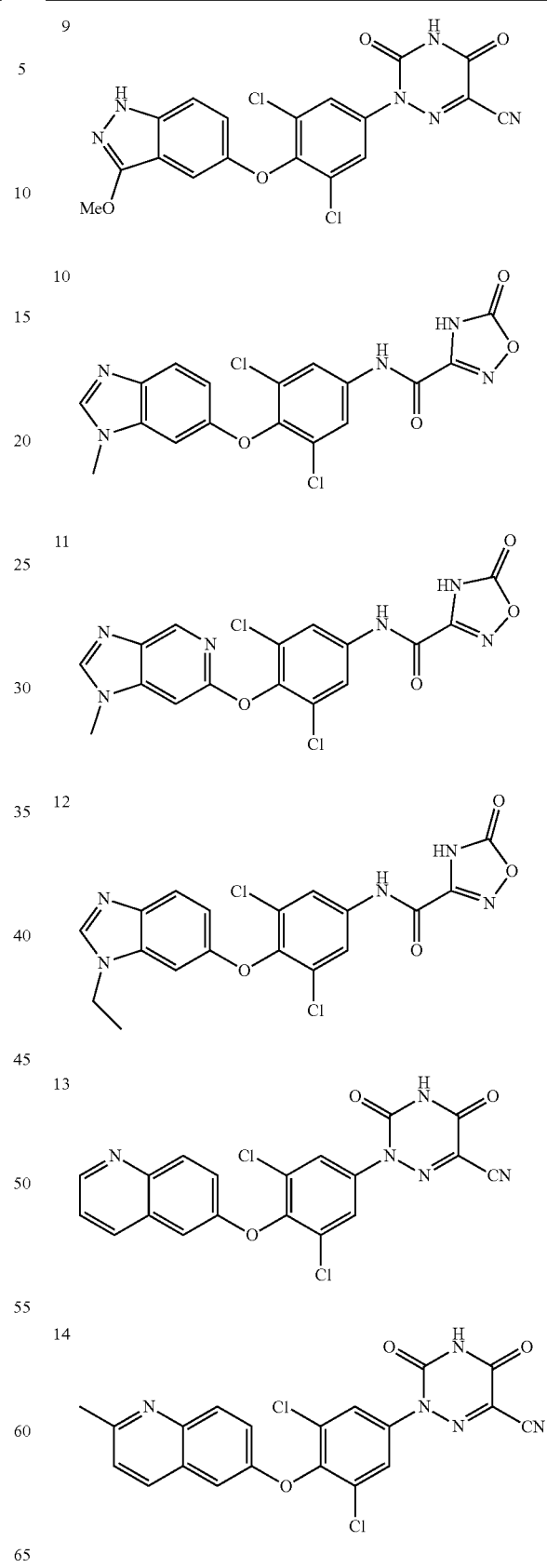

| 15 | 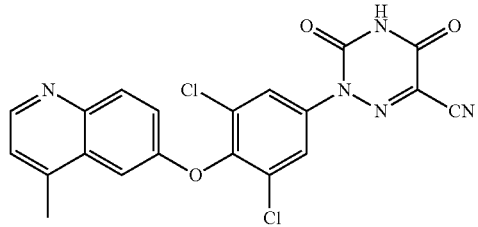 [SMILES: Cc1ccnc2ccc(Oc3c(Cl)cc(-n4nc(C#N)c(=O)[nH]c4=O)cc3Cl)cc12] |
| --- | --- |
| 16 | 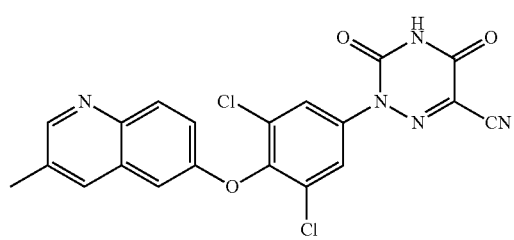 [SMILES: Cc1cnc2ccc(Oc3c(Cl)cc(-n4nc(C#N)c(=O)[nH]c4=O)cc3Cl)cc2c1] |
| 17 | 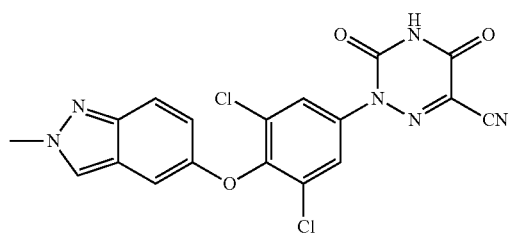 [SMILES: Cn1cc2cc(Oc3c(Cl)cc(-n4nc(C#N)c(=O)[nH]c4=O)cc3Cl)ccc2n1] |
| 18 | 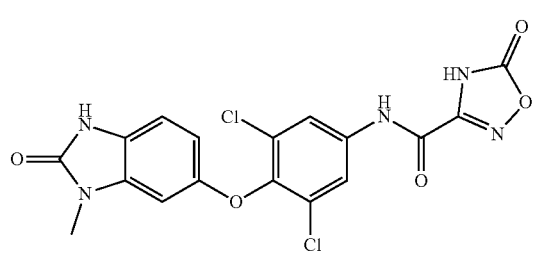 [SMILES: Cn1c(=O)[nH]c2ccc(Oc3c(Cl)cc(NC(=O)c4noc(=O)[nH]4)cc3Cl)cc21] |
| 19 | 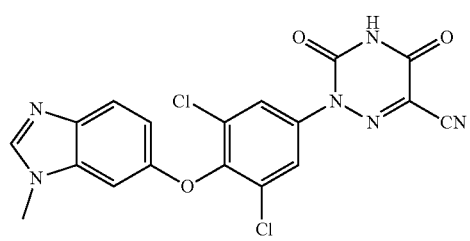 [SMILES: Cn1cnc2ccc(Oc3c(Cl)cc(-n4nc(C#N)c(=O)[nH]c4=O)cc3Cl)cc21] |
| 20 | 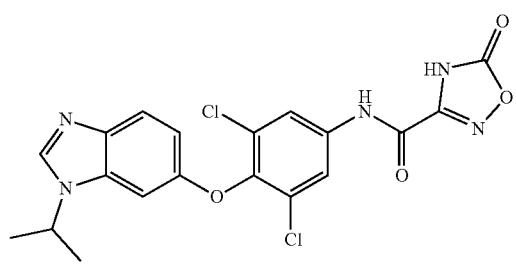 [SMILES: CC(C)n1cnc2ccc(Oc3c(Cl)cc(NC(=O)c4noc(=O)[nH]4)cc3Cl)cc21] |
| 21 | 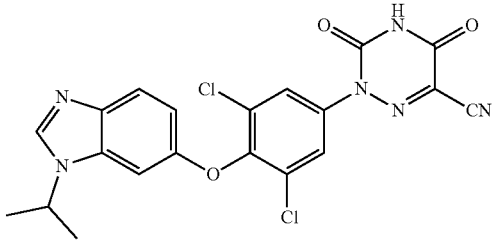 [SMILES: CC(C)n1cnc2ccc(Oc3c(Cl)cc(-n4nc(C#N)c(=O)[nH]c4=O)cc3Cl)cc21] |
| 22 | 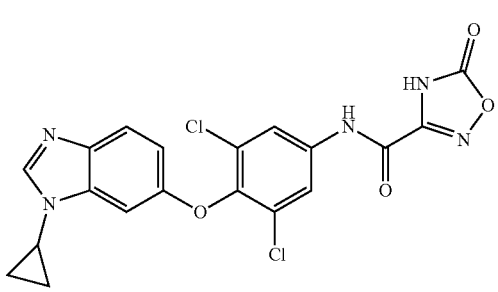 [SMILES: O=C(Nc1cc(Cl)c(Oc2ccc3ncn(C4CC4)c3c2)c(Cl)c1)c1noc(=O)[nH]1] |
| 23 | 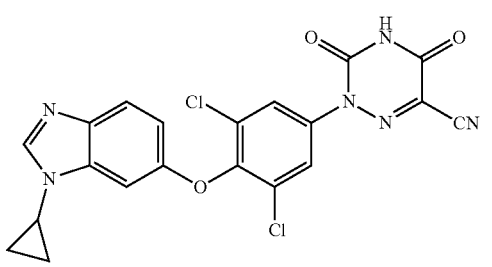 [SMILES: N#Cc1nn(-c2cc(Cl)c(Oc3ccc4ncn(C5CC5)c4c3)c(Cl)c2)c(=O)[nH]c1=O] |
| 24 | 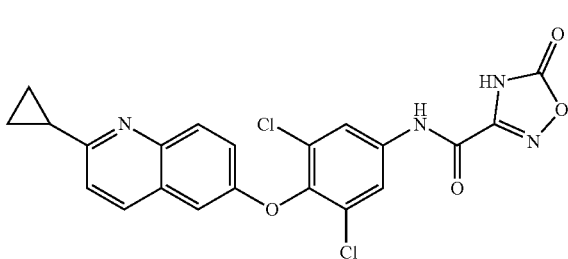 [SMILES: O=C(Nc1cc(Cl)c(Oc2ccc3nc(C4CC4)ccc3c2)c(Cl)c1)c1noc(=O)[nH]1] |
| 25 | 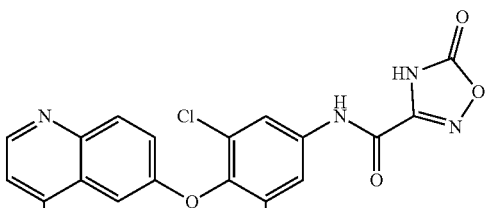 |
| 26 | 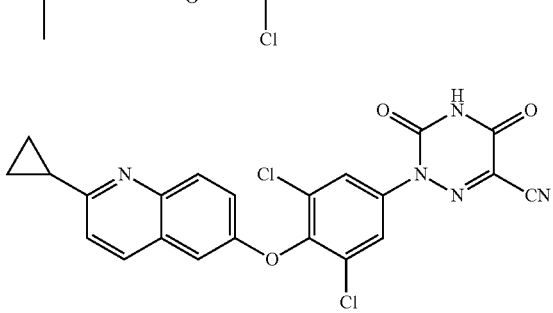 |

-continued
27
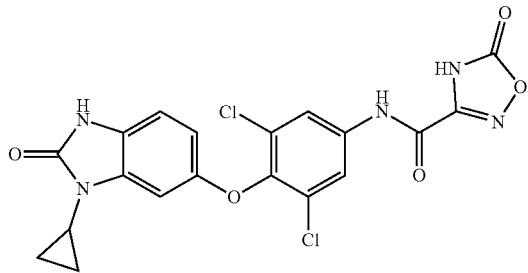 [SMILES: O=C(Nc1cc(Cl)c(Oc2ccc3[nH]c(=O)n(C4CC4)c3c2)c(Cl)c1)c1noc(=O)[nH]1]
28
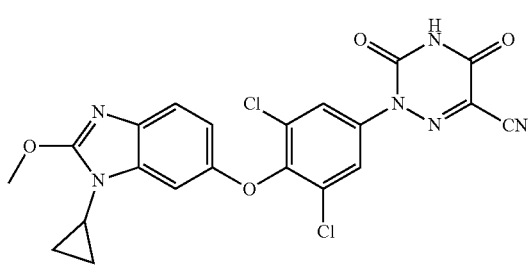 [SMILES: COc1nc2ccc(Oc3c(Cl)cc(-n4nc(C#N)c(=O)[nH]c4=O)cc3Cl)cc2n1C1CC1]
29
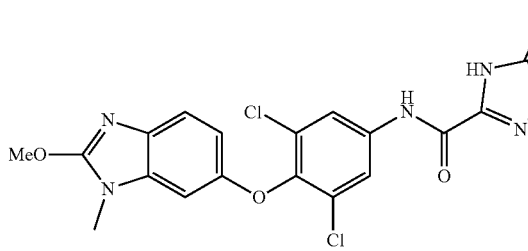
30
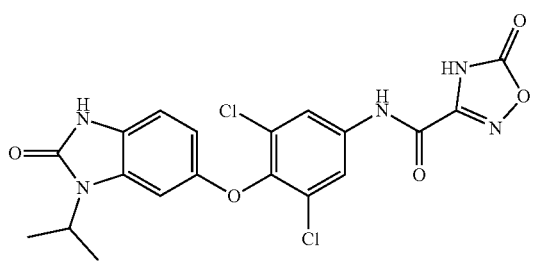 [SMILES: CC(C)n1c(=O)[nH]c2ccc(Oc3c(Cl)cc(NC(=O)c4noc(=O)[nH]4)cc3Cl)cc21]
31
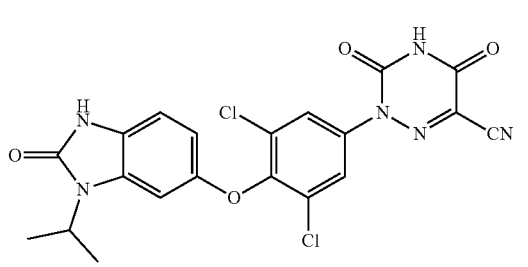 [SMILES: CC(C)n1c(=O)[nH]c2ccc(Oc3c(Cl)cc(-n4nc(C#N)c(=O)[nH]c4=O)cc3Cl)cc21]
32
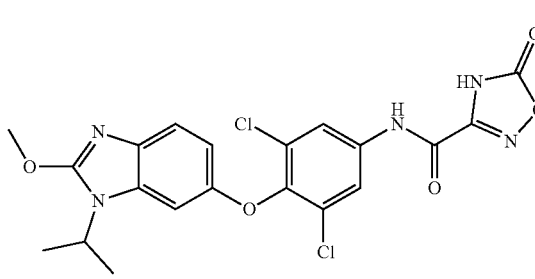
-continued
33
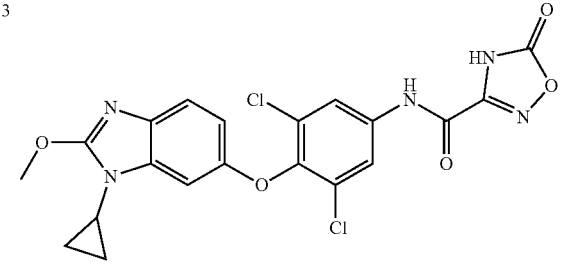
34
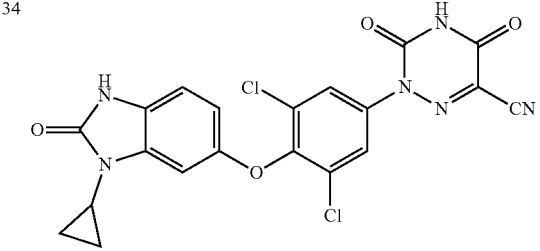
35
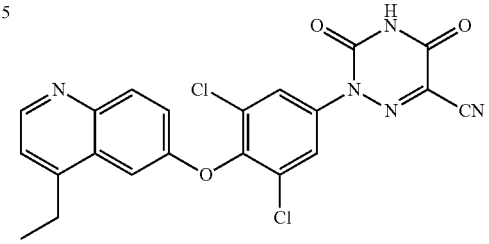
36
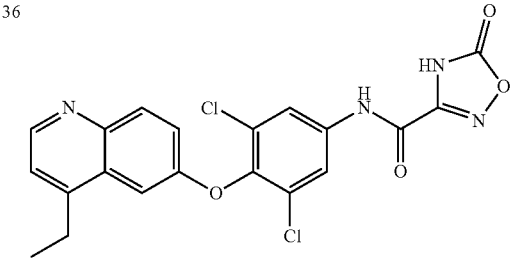
37
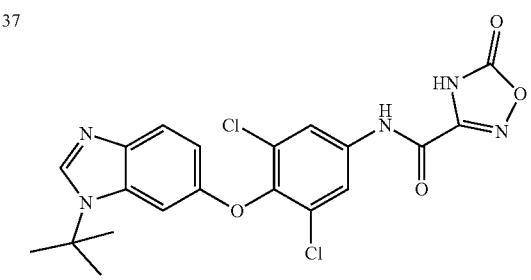
38
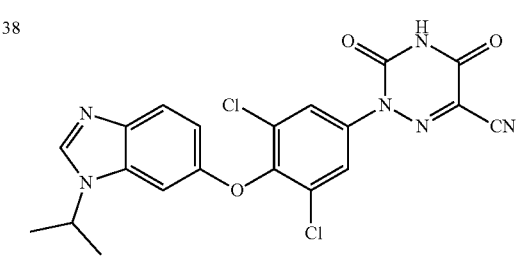

-continued
39
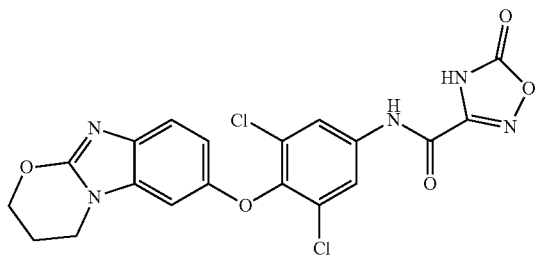 [SMILES: O=C(Nc1cc(Cl)c(Oc2ccc3nc4n(c3c2)CCCO4)c(Cl)c1)c1noc(=O)[nH]1]
40
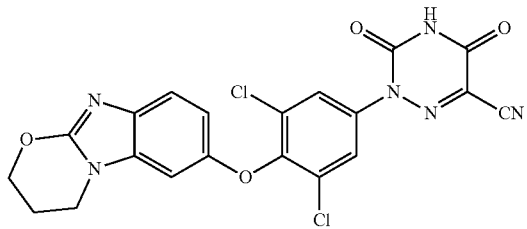 [SMILES: N#Cc1nn(-c2cc(Cl)c(Oc3ccc4nc5n(c4c3)CCCO5)c(Cl)c2)c(=O)[nH]c1=O]
41
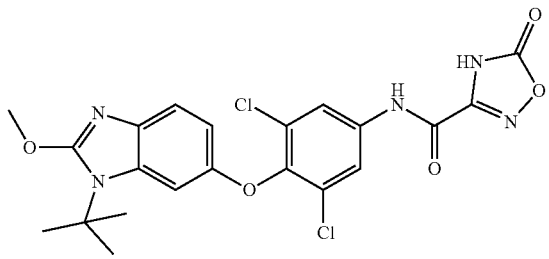 [SMILES: COc1nc2ccc(Oc3c(Cl)cc(NC(=O)c4noc(=O)[nH]4)cc3Cl)cc2n1C(C)(C)C]
42
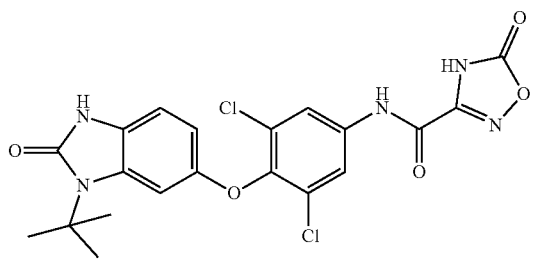 [SMILES: CC(C)(C)n1c(=O)[nH]c2ccc(Oc3c(Cl)cc(NC(=O)c4noc(=O)[nH]4)cc3Cl)cc21]
43
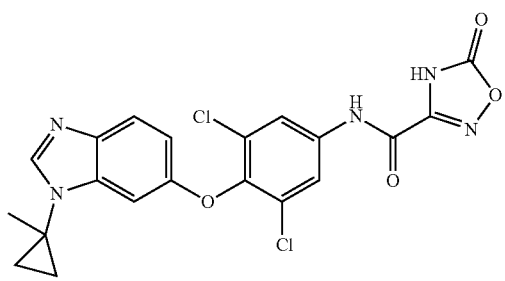 [SMILES: CC1(n2cnc3ccc(Oc4c(Cl)cc(NC(=O)c5noc(=O)[nH]5)cc4Cl)cc32)CC1]
44
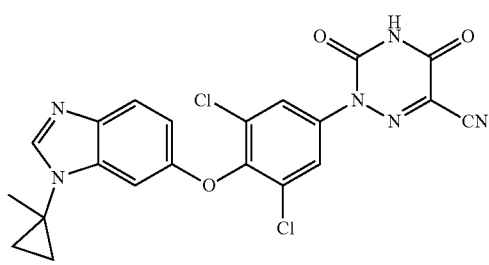 [SMILES: CC1(n2cnc3ccc(Oc4c(Cl)cc(-n5nc(C#N)c(=O)[nH]c5=O)cc4Cl)cc32)CC1]
-continued
45
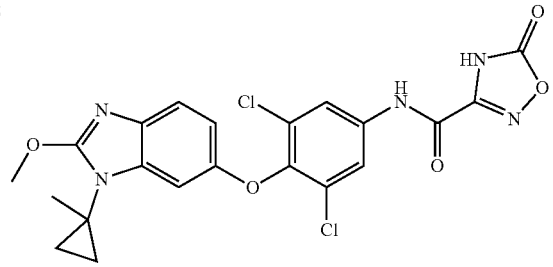 [SMILES: COc1nc2ccc(Oc3c(Cl)cc(NC(=O)c4noc(=O)[nH]4)cc3Cl)cc2n1C1(C)CC1]
46
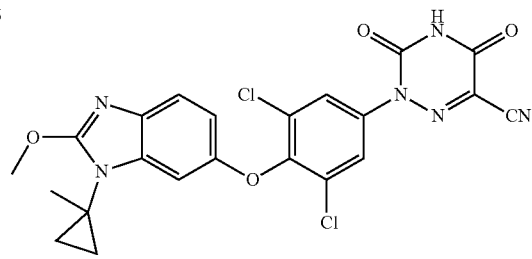
47
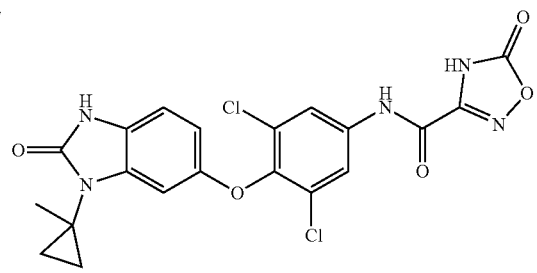
48
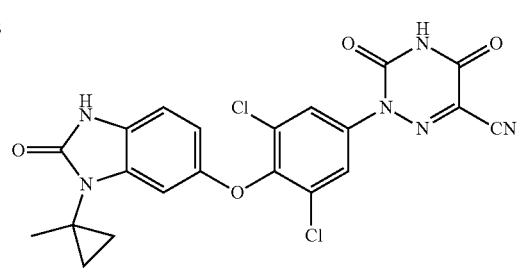
49
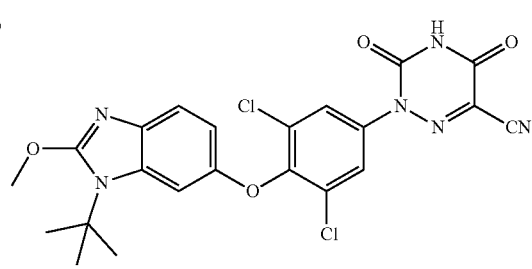
50
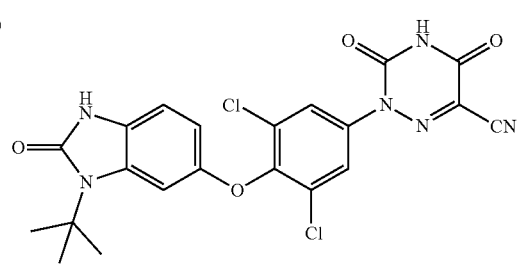

51 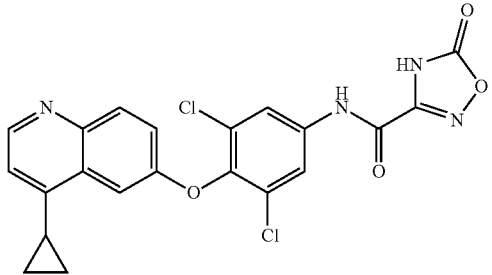 [SMILES: O=C(Nc1cc(Cl)c(Oc2ccc3nccc(C4CC4)c3c2)c(Cl)c1)c1noc(=O)[nH]1]

52 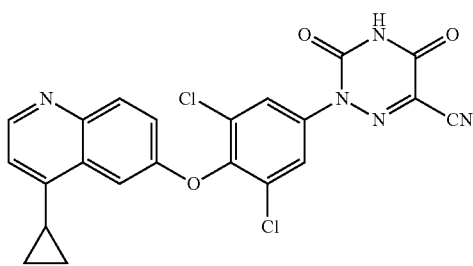 [SMILES: N#Cc1nn(-c2cc(Cl)c(Oc3ccc4nccc(C5CC5)c4c3)c(Cl)c2)c(=O)[nH]c1=O]

53 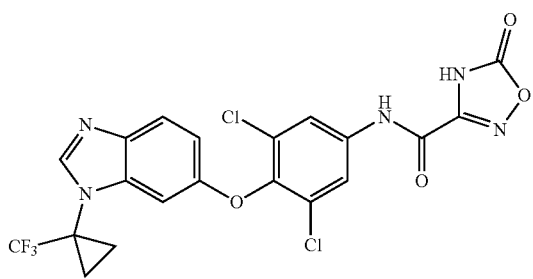 [SMILES: O=C(Nc1cc(Cl)c(Oc2ccc3ncn(C4(C(F)(F)F)CC4)c3c2)c(Cl)c1)c1noc(=O)[nH]1]

54 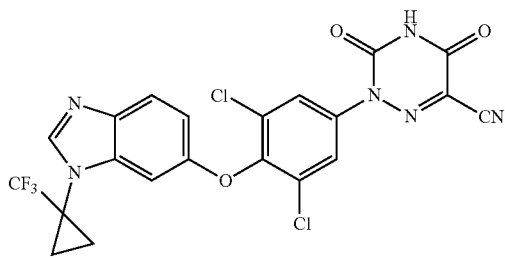 [SMILES: N#Cc1nn(-c2cc(Cl)c(Oc3ccc4ncn(C5(C(F)(F)F)CC5)c4c3)c(Cl)c2)c(=O)[nH]c1=O]

55 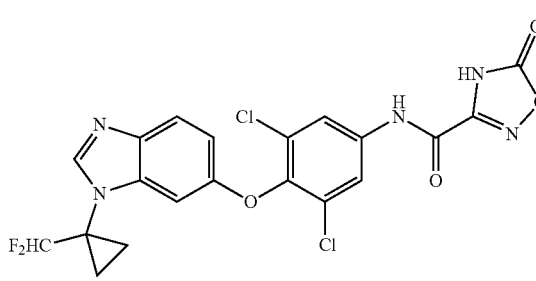

56 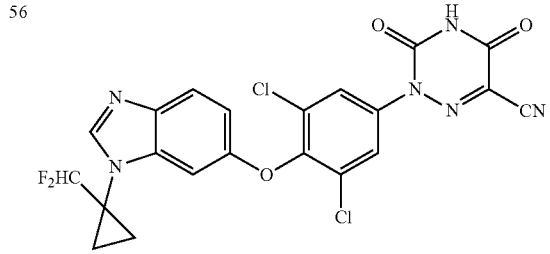

57 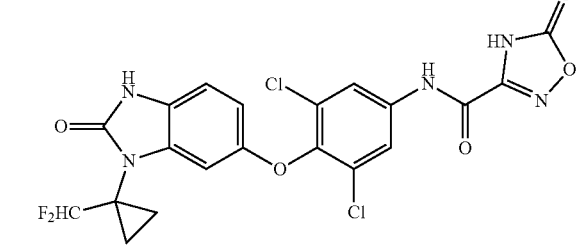

58 and

59 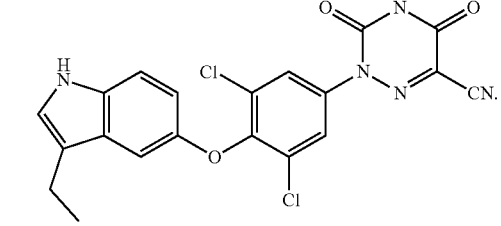

31. A pharmaceutical composition comprising the compound of claim 1, or a tautomer thereof, or a pharmaceutically acceptable salt of any of the foregoing, and at least one pharmaceutically acceptable excipient.

32. A method of agonizing thyroid hormone receptor beta (THR beta) comprising contacting an effective amount of the compound of claim 1 or a tautomer thereof, or a pharmaceutically acceptable salt of any of the foregoing with the THR beta.

33. A method of treating non-alcoholic steatohepatitis (NASH) in a patient in need thereof, comprising administering to the patient a therapeutically effective amount of the compound of claim 1, or a tautomer thereof, or a pharmaceutically acceptable salt of any of the foregoing.

* * * * *